US009336533B2

(12) United States Patent
Cronin et al.

(10) Patent No.: US 9,336,533 B2
(45) Date of Patent: May 10, 2016

(54) SYSTEMS, METHODS, AND APPARATUSES FOR IMPLEMENTING A SIMILAR COMMAND WITH A PREDICTIVE QUERY INTERFACE

(71) Applicants: Beau David Cronin, Oakland, CA (US); Fritz Heinrich Obermeyer, San Francisco, CA (US); Eric Michael Jonas, San Francisco, CA (US); Jonathan Glidden, San Francisco, CA (US)

(72) Inventors: Beau David Cronin, Oakland, CA (US); Fritz Heinrich Obermeyer, San Francisco, CA (US); Eric Michael Jonas, San Francisco, CA (US); Jonathan Glidden, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 141 days.

(21) Appl. No.: 14/014,241

(22) Filed: Aug. 29, 2013

(65) Prior Publication Data

US 2014/0280193 A1 Sep. 18, 2014

Related U.S. Application Data

(60) Provisional application No. 61/780,503, filed on Mar. 13, 2013.

(51) Int. Cl.
*G06F 7/00* (2006.01)
*G06F 17/30* (2006.01)
(Continued)

(52) U.S. Cl.
CPC ........ *G06Q 30/0201* (2013.01); *G06F 17/3053* (2013.01); *G06F 17/30286* (2013.01);
(Continued)

(58) Field of Classification Search
CPC ..................... G06F 17/30539; G06F 17/30321
USPC ................................................. 707/776, 741
See application file for complete search history.

(56) References Cited

U.S. PATENT DOCUMENTS 5,418,950 A 5/1995 Li et al.
5,577,188 A 11/1996 Zhu
(Continued)

OTHER PUBLICATIONS

"Prior Knowledge: A Predictive Database for Developers," by Alex Williams, dated Sep. 11, 2012, http://techcrunch.com/2012/09/11/prior-knowledge-a-predictive-database-for-developers/, 7 pages.
(Continued)

*Primary Examiner* — Usmaan Saeed
*Assistant Examiner* — Brian E. Weinrich
(74) *Attorney, Agent, or Firm* — Blakely Sokoloff Taylor & Zafman LLP

(57) ABSTRACT

Disclosed herein are systems and methods for implementing a SIMILAR command with a predictive query interface including means for generating indices from a dataset of columns and rows, the indices representing probabilistic relationships between the rows and the columns of the dataset; storing the indices within a database of a host organization; exposing the database of the host organization via a request interface; receiving, at the request interface, a query for the database specifying a SIMILAR command term, a specified row as a parameter for the SIMILAR command term, and a specified column as a parameter for the SIMILAR command term; querying the database using the SIMILAR command term and passing the specified row and the specified column to generate a predictive record set; and returning the predictive record set responsive to the query, the predictive record set having a plurality of elements therein, each of the returned elements of the predictive record set including (i) a row identifier which corresponds to a row of the dataset assessed to be similar, according to a latent structure, to the specified row passed with the SIMILAR command term based on the specified column and (ii) a confidence indicator which indicates a likelihood of a latent relationship between the specified row passed with the SIMILAR command and the row identifier returned for the respective element. Other related embodiments are further disclosed.

28 Claims, 58 Drawing Sheets

(51) Int. Cl.
*G06Q 30/02* (2012.01)
*G06F 15/16* (2006.01)

(52) U.S. Cl.
CPC .... *G06F17/30321* (2013.01); *G06F 17/30345* (2013.01); *G06F 17/30424* (2013.01); *G06F 17/30483* (2013.01); *G06F 17/30539* (2013.01); *G06F 17/30598* (2013.01); *G06F 17/30619* (2013.01); *G06Q 30/0202* (2013.01)

(56) References Cited

U.S. PATENT DOCUMENTS

| | | |
|---|---|---|
| 5,608,872 A | 3/1997 | Schwartz et al. |
| 5,649,104 A | 7/1997 | Carleton et al. |
| 5,701,400 A * | 12/1997 | Amado ............ 706/45 |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,383 B1 | 4/2003 | Martin |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,472,114 B1 | 12/2008 | Rowney et al. |
| 7,620,655 B2 | 11/2009 | Larsson et al. |
| 7,779,039 B2 | 8/2010 | Weissman et al. |
| 8,775,517 B1 | 7/2014 | Goldman et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2002/0178146 A1 | 11/2002 | Akella et al. |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0105732 A1 | 6/2003 | Kagalwala et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0133500 A1 | 7/2004 | Thompson et al. |
| 2004/0138958 A1 | 7/2004 | Watarai et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0097204 A1 | 5/2005 | Horowitz et al. |
| 2005/0154710 A1 | 7/2005 | Ruhlow et al. |
| 2005/0154757 A1 | 7/2005 | Barsness et al. |
| 2005/0198011 A1 | 9/2005 | Barsness et al. |
| 2006/0179041 A1 | 8/2006 | Ohi et al. |
| 2006/0271361 A1 | 11/2006 | Vora et al. |
| 2007/0005420 A1 | 1/2007 | Roy et al. |
| 2007/0136429 A1 | 6/2007 | Fine et al. |
| 2008/0133514 A1 | 6/2008 | Relyea |
| 2008/0222199 A1 | 9/2008 | Tiu et al. |
| 2009/0006156 A1 | 1/2009 | Hunt et al. |
| 2009/0055422 A1 | 2/2009 | Williams et al. |
| 2009/0119172 A1 | 5/2009 | Soloff |
| 2009/0177744 A1 | 7/2009 | Marlow et al. |
| 2009/0319517 A1 | 12/2009 | Guha et al. |
| 2010/0299367 A1 | 11/2010 | Chakrabarti et al. |

(56) References Cited

U.S. PATENT DOCUMENTS

| | | | |
|---|---|---|---|
| 2010/0318511 A1 | 12/2010 | Phan et al. | |
| 2011/0082854 A1 | 4/2011 | Eidson et al. | |
| 2011/0191290 A1* | 8/2011 | Gutlapalli et al. | 707/769 |
| 2011/0191361 A1 | 8/2011 | Gupta et al. | |
| 2011/0282806 A1 | 11/2011 | Wilcox | |
| 2012/0047158 A1 | 2/2012 | Lee et al. | |
| 2012/0072972 A1 | 3/2012 | Christiansen et al. | |
| 2012/0215560 A1* | 8/2012 | Ofek et al. | 705/3 |
| 2012/0310763 A1* | 12/2012 | Meehan | 705/26.2 |
| 2012/0317058 A1* | 12/2012 | Abhulimen | 706/2 |
| 2013/0151567 A1 | 6/2013 | Ellison et al. | |
| 2013/0238979 A1 | 9/2013 | Sayers et al. | |
| 2013/0268520 A1* | 10/2013 | Fisher et al. | 707/723 |
| 2014/0019207 A1 | 1/2014 | Kraus et al. | |
| 2014/0074805 A1 | 3/2014 | Kapoor et al. | |
| 2014/0081950 A1 | 3/2014 | Rajan et al. | |
| 2014/0114941 A1* | 4/2014 | Ahlberg et al. | 707/769 |
| 2014/0149554 A1 | 5/2014 | Krishna et al. | |

OTHER PUBLICATIONS

"A probabilistic model of cross-categorization," by Patrick Shafto et al., dated Feb. 7, 2011, 44 pages.
"Cross-Categorization: A Method for Discovering Multiple Overlapping Clusterings," by Vikash K. Mansinghka et al., dated Jan. 1, 2009, 3 pages.
"Efficient Distribution-free Learning of Probabilistic Concepts" by Kearns et al., Laboratory of Computer Science, 1990 IEEE, 10 pages.
"Learning with Bayesian Networks and Probability Trees to Approximate a Joint Distribution" by Cano et al., dated Nov. 22, 2011, IEEE, 6 pages.
International Search Report & Written Opinion for International Application No. PCT/US2013/070198, mailed Feb. 4, 2014, 8 pages.
Non-Final Office Action for U.S. Appl. No. 14/014,204 mailed Aug. 12, 2015, 17 pages.
Wilson, "Machine Learning Throwdown" Year 2012, 43 pages.
Non-Final Office Action for U.S. Appl. No. 14/014,250 mailed Aug. 17, 2015, 41 pages.
Non-Final Office Action for U.S. Appl. No. 14/014,221 mailed Aug. 26, 2015, 7 pages.
Non-Final Office Action for U.S. Appl. No. 14/014,236 mailed Jul. 16, 2015, 22 pages.
Non-Final Office Action for U.S. Appl. No. 14/014,225 mailed Jul. 8, 2015, 48 pages.
Notice of Allowance for U.S. Appl. No. 14/014,264 mailed Aug. 28, 2015, 23 pages.
Notice of Allowance for U.S. Appl. No. 14/014,258 mailed Sep. 14, 2015, 24 pages.
Non-Final Office Action for U.S. Appl. No. 14/014,269 mailed Sep. 8, 2015, 37 pages.
International Preliminary Report on Patentability for International Application No. PCT/US2013/070198, mailed Sep. 24, 2015, 5 pages.
Notice of Allowance for U.S. Appl. No. 14/014,225, mailed Jan. 12, 2016, 28 pages.
Non-Final Office Action for U.S. Appl. No. 14/014,271, mailed Jan. 13, 2016, 34 pages.
Notice of Allowance for U.S. Appl. No. 14/014,250, mailed Jan. 20, 2016, 27 pages.
Notice of Allowance for U.S. Appl. No. 14/014,221, mailed Feb. 12, 2016, 24 pages.
Final Office Action for U.S. Appl. No. 14/014,236, mailed Feb. 11, 2016, 12 pages.
Final Office Action for U.S. Appl. No. 14/014,204, mailed Feb. 29, 2016, 44 pgs.
Notice of Allowance for U.S. Appl. No. 14/014,269, mailed Mar. 14, 2016, 12 pgs.

* cited by examiner

FIG. 8

Motivation

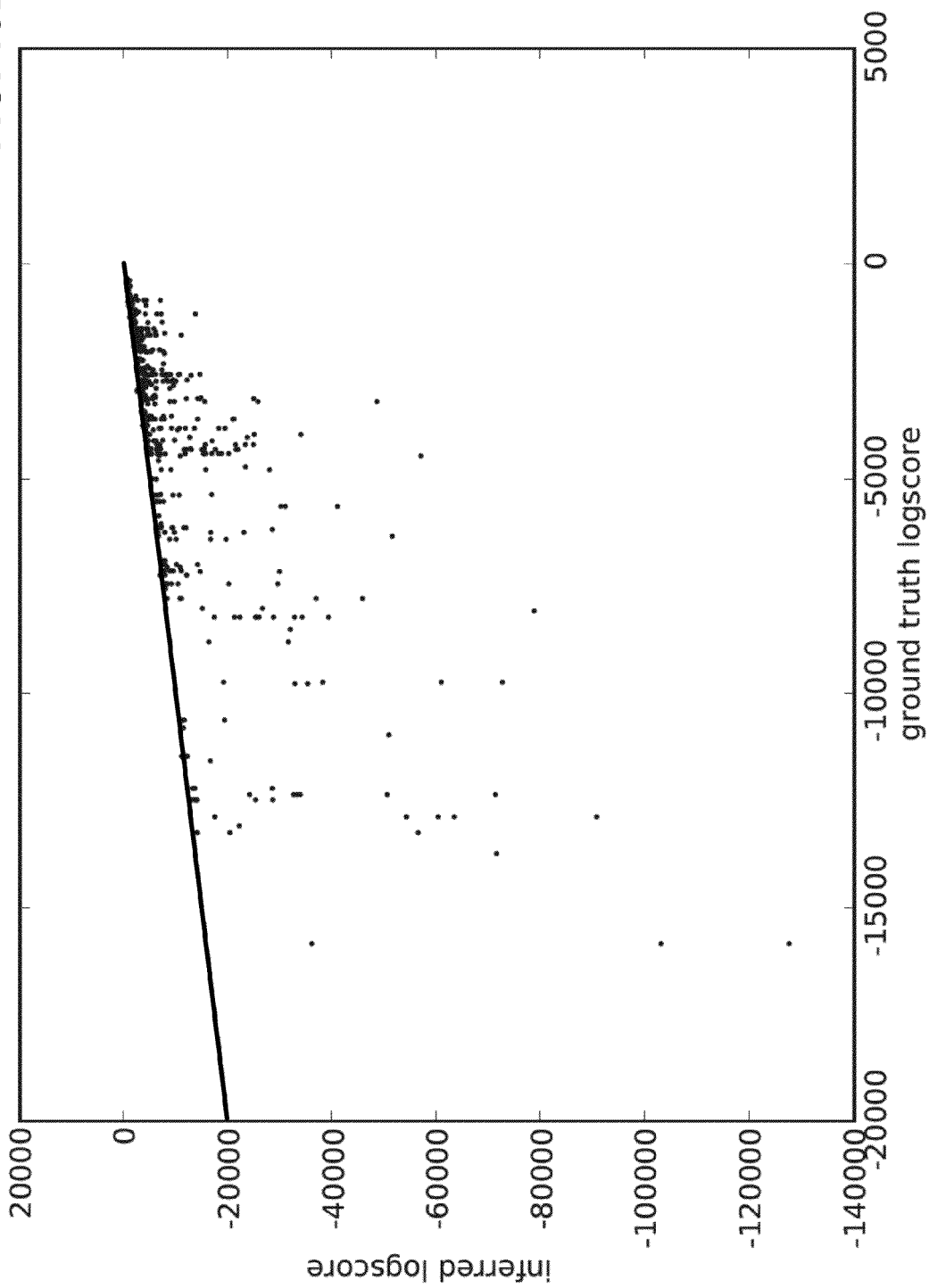

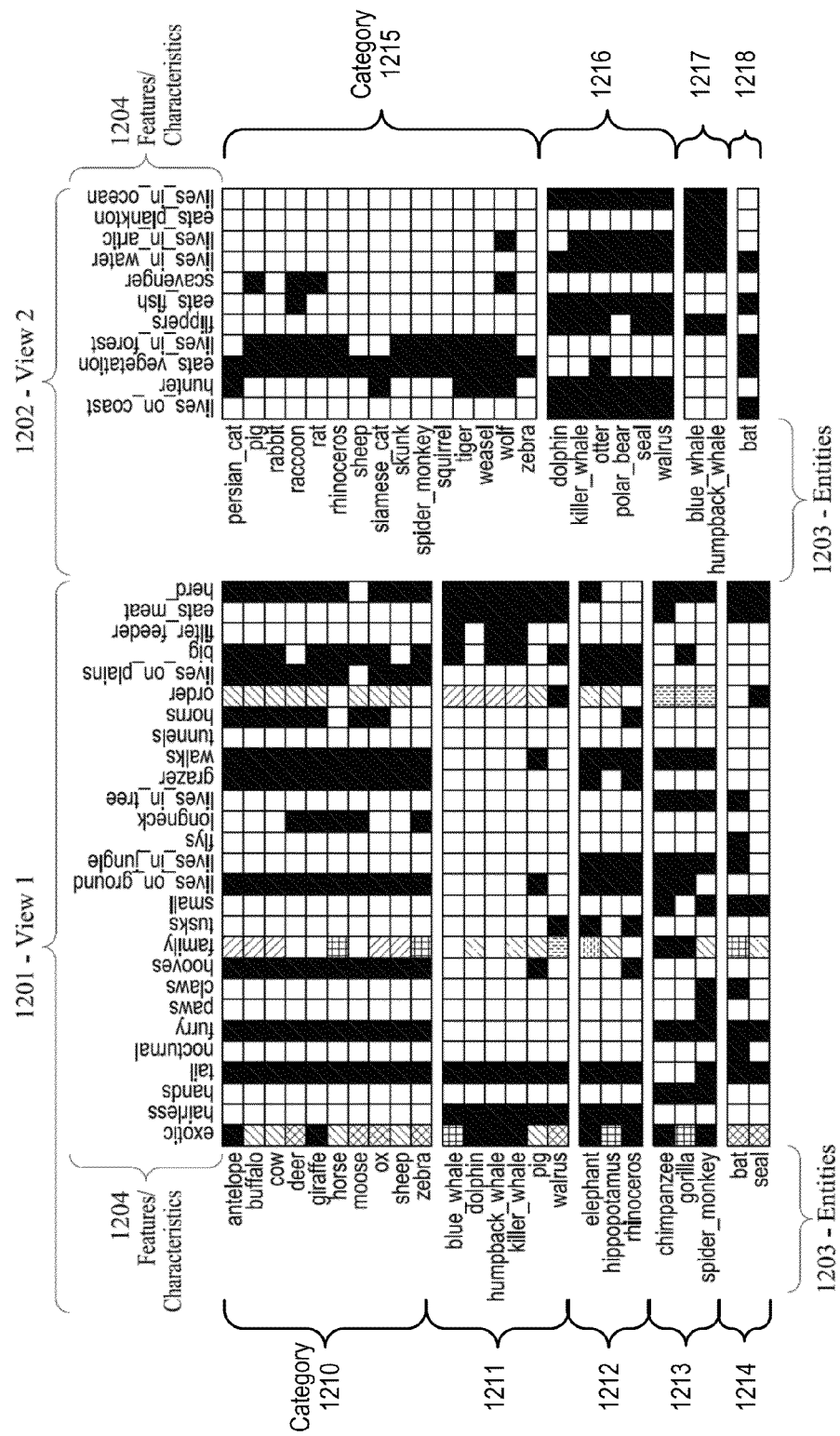
FIG. 12A  Exemplary Cross Categorization

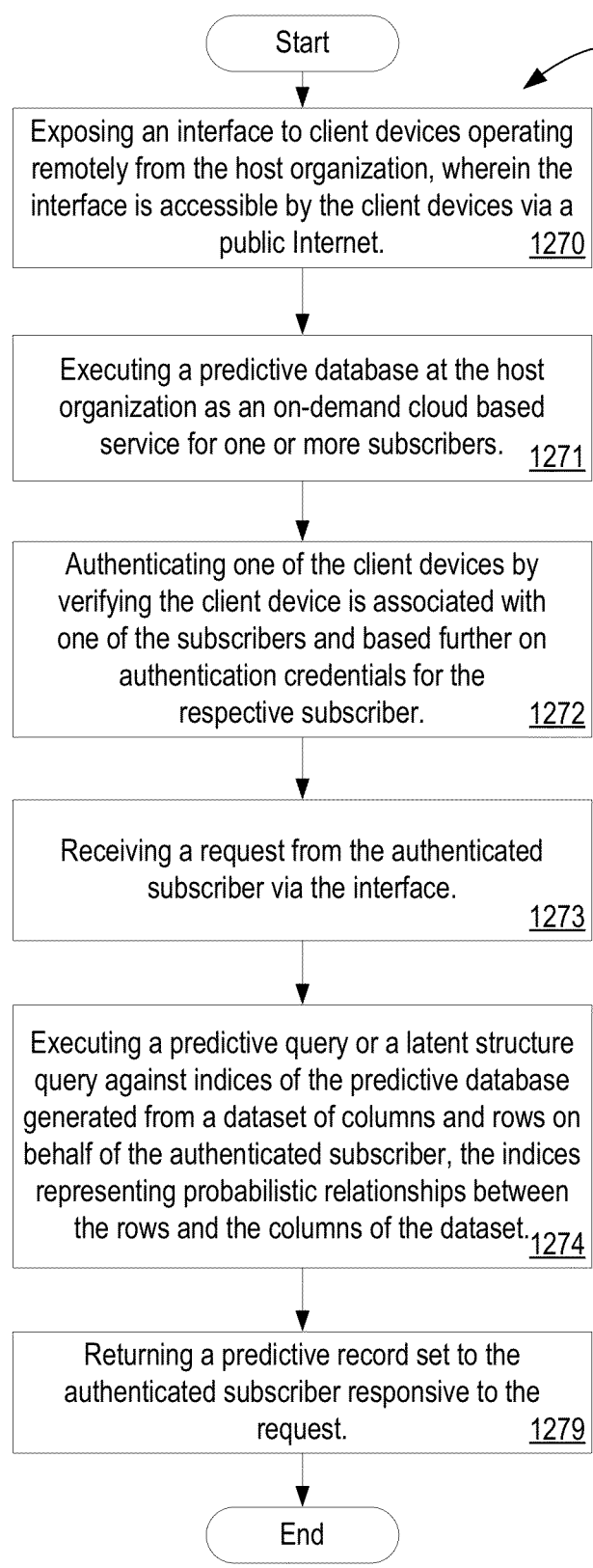

Output: How often does each other column appear with it in the same view?
1302

Related

1401: Input (Column ID)

Output: Which rows most often appear together as a group in the same categories, in the view containing the input column?
1402

Group

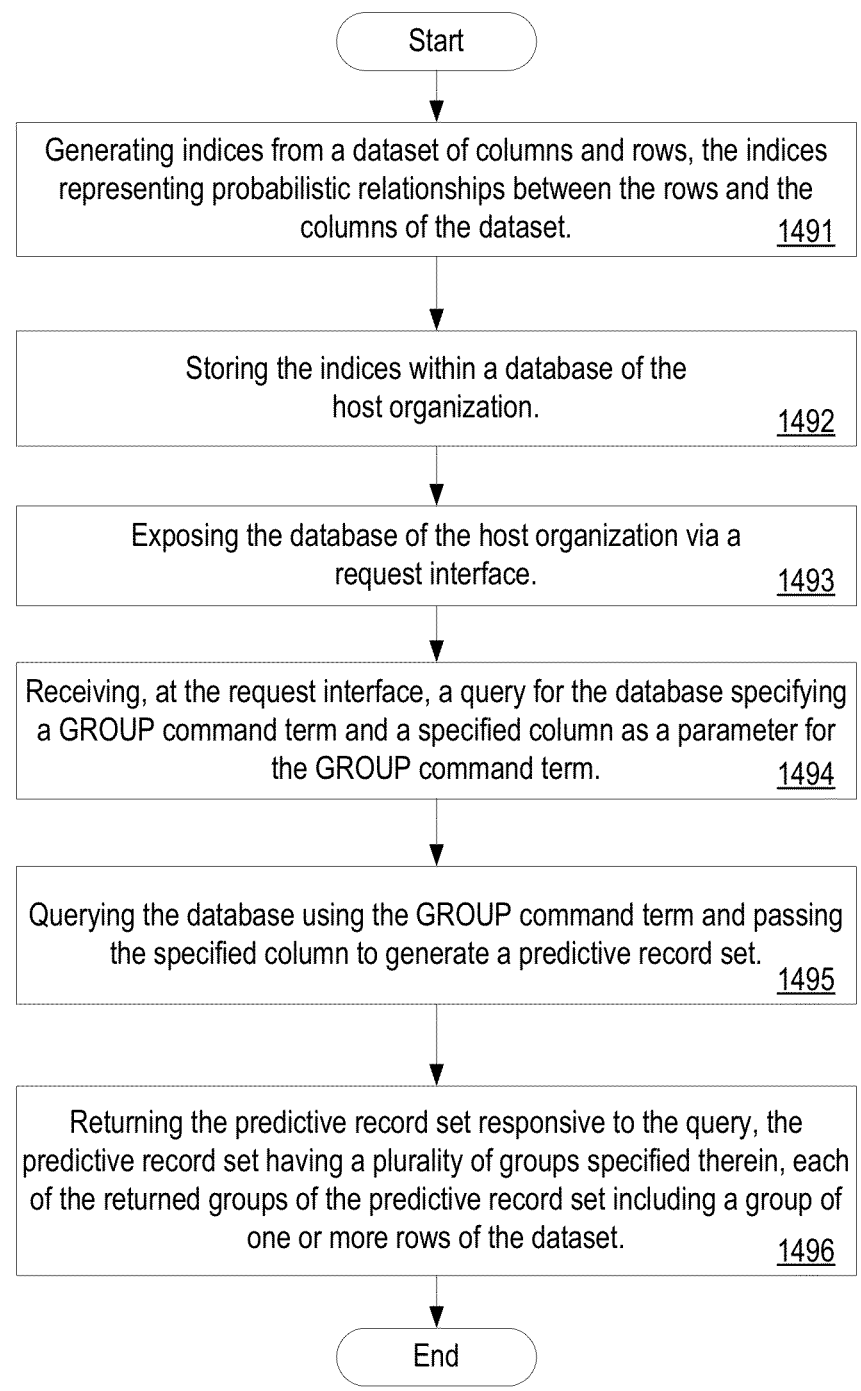

Output: How often does each row appear in the same category as the input row, in the view containing the input column?
1502

Similar

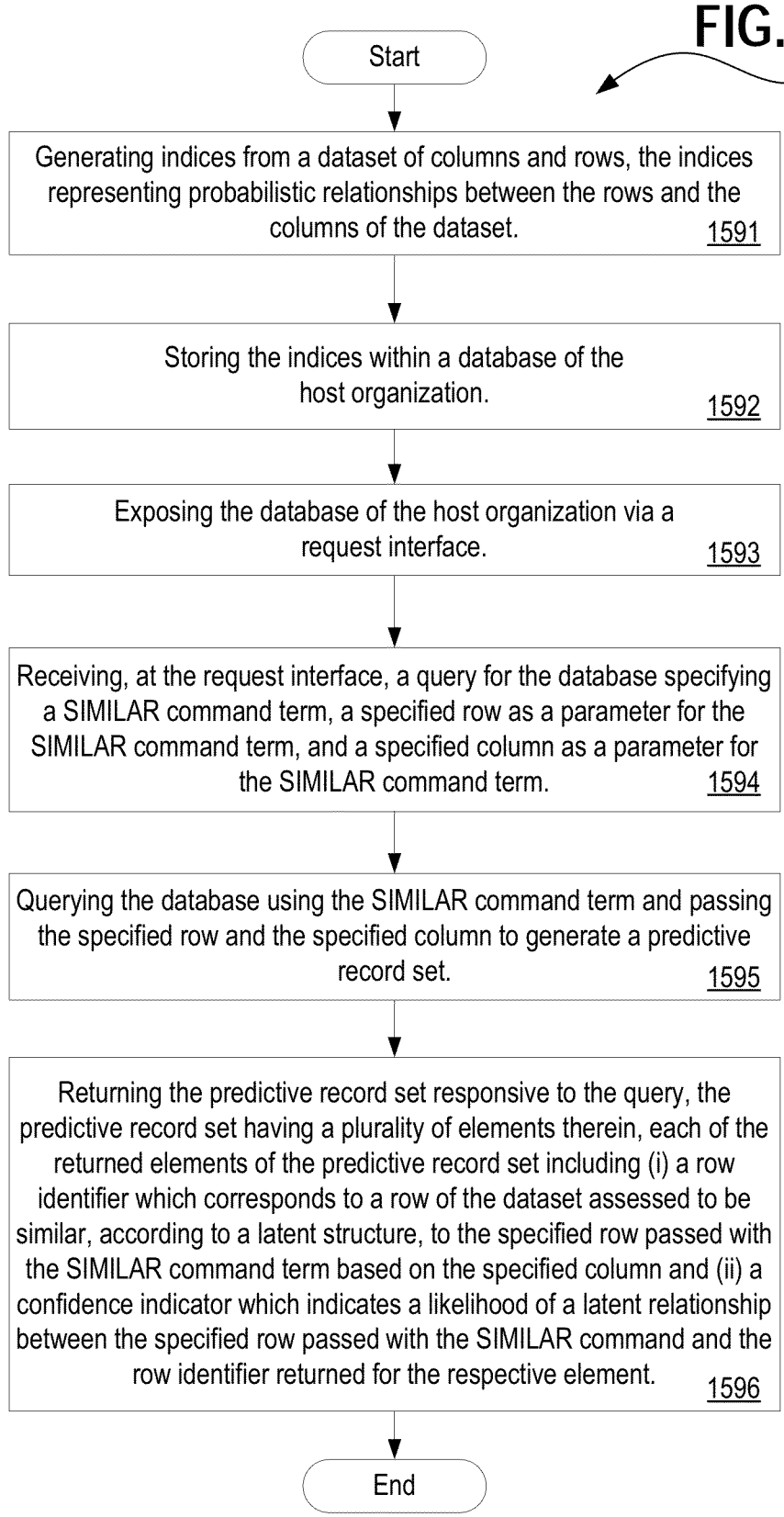

Classification / Regression

Fix a subset of the columns ⌒ 1601: Input

PREDICT a single target column ⌒ 1602: Output

Predict

Fill-in-the-blanks

Fix a subset of the columns ~ 1611: Input

PREDICT the remaining columns ~ 1612: Output

Predict

Synthetic Data Generation

Query

Predictive
Samples

Fix none of the columns ⁓ 1621: Input

PREDICT all of the columns ⁓ 1622: Output

FIG. 16C

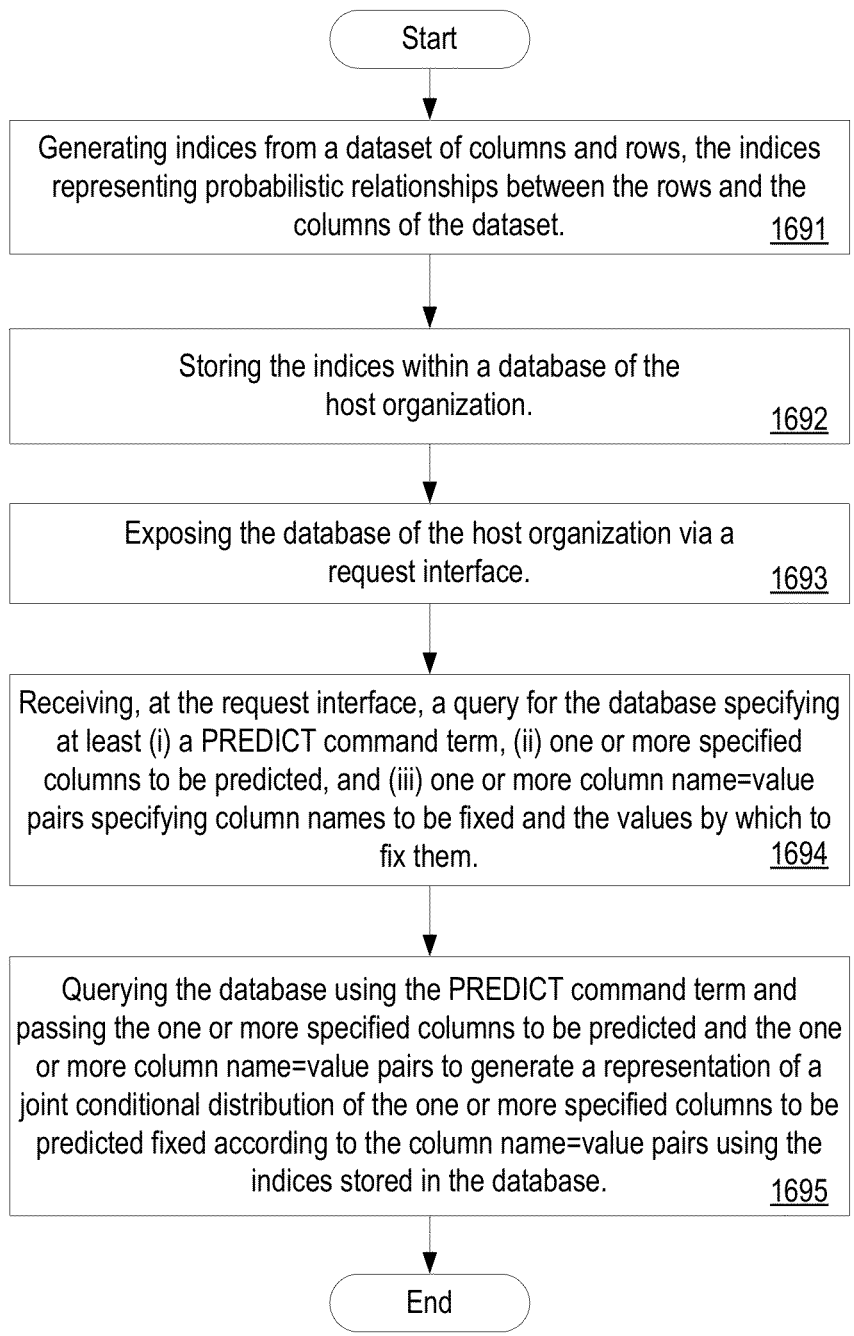

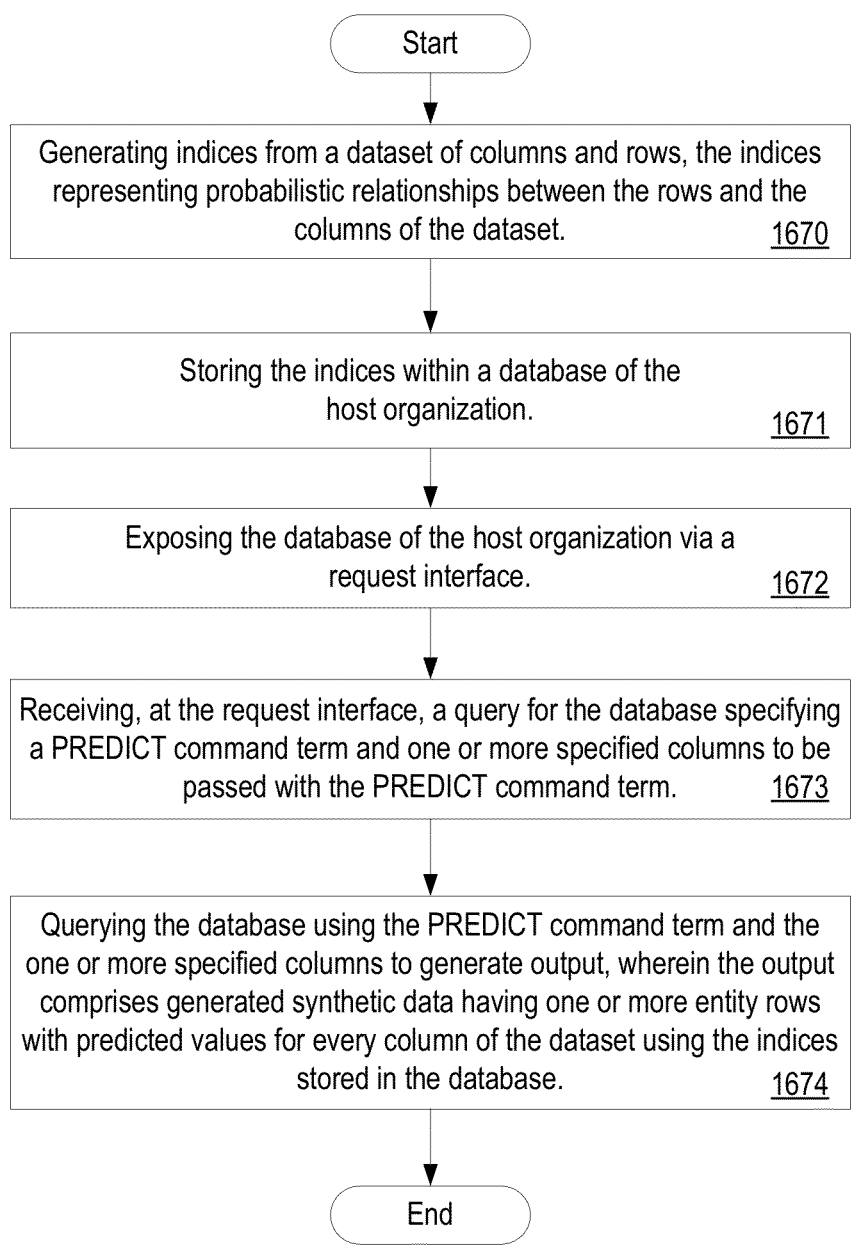

1701 GUI     1703 Known Value     1708 Predicted Value

| Category | Alkalinity | Phenols | Alcohol | Color | Malic acid | OK200_00315 | Flavanoids | Proanthocyanine | Ash | Proline | Magnesium |
|---|---|---|---|---|---|---|---|---|---|---|---|
| 2 | 18.5 | 1.45 | 12.0 | 3.00 | 2.11 | 2.41 | 1.36 | 1.38 | 1.00 | 564 | 94.8 |
| 1 | 16.5 | 2.01 | 13.4 | 1.68 | 1.30 | 1.00 | 4.56 | 1.06 | 2.32 | 902 | 101 |
| 3 | 18.5 | 1.66 | 13.5 | 7.50 | 3.50 | 1.60 | 0.600 | 0.005 | 2.49 | 643 | 96.6 |
| 2 | 18.5 | 2.11 | 12.2 | 4.00 | 1.17 | 3.42 | 2.00 | 1.84 | 1.82 | 510 | 93.6 |
| 3 | 21.7 | 1.62 | 12.2 | 10.5 | 2.00 | 1.30 | 0.820 | 1.82 | 2.28 | 647 | 101 |
| 1 | 16.1 | 3.27 | 14.2 | 0.75 | 1.76 | 2.65 | 2.60 | 1.52 | 2.45 | 1400 | 105 |
| 1 | 16.1 | 2.60 | 13.2 | 4.97 | 2.50 | 2.45 | 2.06 | 1.62 | 2.49 | 735 | 107 |
| 1 | 17.1 | 3.00 | 12.8 | 6.00 | 2.04 | 3.13 | 1.52 | 2.05 | 2.58 | 1300 | 118 |
| 2 | 16.5 | 2.10 | 14.0 | 5.62 | 2.20 | 3.07 | 2.07 | 2.05 | 2.41 | 1105 | 107 |
| 3 | 24.0 | 1.58 | 12.8 | 4.32 | 1.30 | 1.73 | 0.771 | 1.15 | 2.43 | 580 | 101 |
| 1 | 12.4 | 1.93 | 13.7 | 4.50 | 2.42 | 1.25 | 2.02 | 1.18 | 2.45 | 1000 | 104 |
| 3 | 21.0 | 2.30 | 12.4 | 7.56 | 1.83 | 1.04 | 0.620 | 1.04 | 2.45 | 663 | 56.0 |
| 2 | 22.0 | 1.93 | 12.3 | 3.00 | 1.01 | 2.57 | 1.78 | 1.38 | 2.42 | 538 | 80.0 |
| 3 | 21.1 | 1.67 | 12.5 | 6.76 | 2.12 | 1.00 | 1.67 | 1.38 | 2.83 | 600 | 120 |
| 2 | 18.0 | 2.10 | 13.7 | 5.00 | 2.00 | 2.46 | 1.38 | 1.56 | 2.06 | 600 | 98.3 |
| 3 | 24.0 | 1.10 | 12.6 | 7.13 | 2.30 | 1.72 | 1.04 | 0.500 | 2.40 | 648 | 96.0 |
| 2 | 20.3 | 1.50 | 14.6 | 3.00 | 2.00 | 2.83 | 1.10 | 1.36 | 2.07 | 556 | 94.0 |
| 1 | 16.5 | 2.68 | 13.2 | 5.90 | 2.17 | 2.30 | 1.61 | 1.00 | 2.43 | 1130 | 108 |
| 1 | 17.1 | 2.92 | 13.8 | 7.80 | 2.17 | 3.43 | 3.04 | 2.16 | 2.50 | 1400 | 113 |
| 1 | 18.1 | 3.00 | 13.3 | 6.00 | 1.07 | 2.64 | 3.00 | 1.00 | 2.41 | 1120 | 100 |

1710 Optional Input Field for minimum confidence threshold p(k)

NAVIGATION
- Data
- Summary
- Details

Minimum Confidence Threshold

100% filled

[Download]

1709 Max fill, all known values and 100% nulls predicted (e.g., 100% of nulls over a threshold confidence).

FIG. 17C

Feature and Entity Moves Method

1903 GUI

Opportunity Team [2] | Open Activities [1] | Activity History [4] | Products | Quotes [1] | Contact Roles [3]

Opportunity Detail

Opportunity Name    Kent Pharma - $240k Capsule/Wrap        Amount    $240,000.00
Opportunity Owner                                                Close Date    1/31/2013
Account Name                                                       Stage    Proposal/Price Quote
Type    New Business                          Probability (%)    75%
Closing Countdown    7.00                         Opportunity Score    (42)

▷ Description
     Description   Potential big win
     Next Step   Quote sent out, waiting for response

[ Edit ] [ Delete ] [ Clone ▽ ]
[ Add ] [ Add Overlay ]

⟲ Opportunity Team

| Action | Team Member | Member Role | Split Type | Split % | Split Amount | Split Note |
|---|---|---|---|---|---|---|
| Edit\|Del | Scott | Account Manager | Revenue | 100 | $240,000.00 | |
| Edit\|Del | Amy | Partner | | 0 | $0.00 | |

Open Activities    [ New Task ] [ New Event ]

FIG. 19C

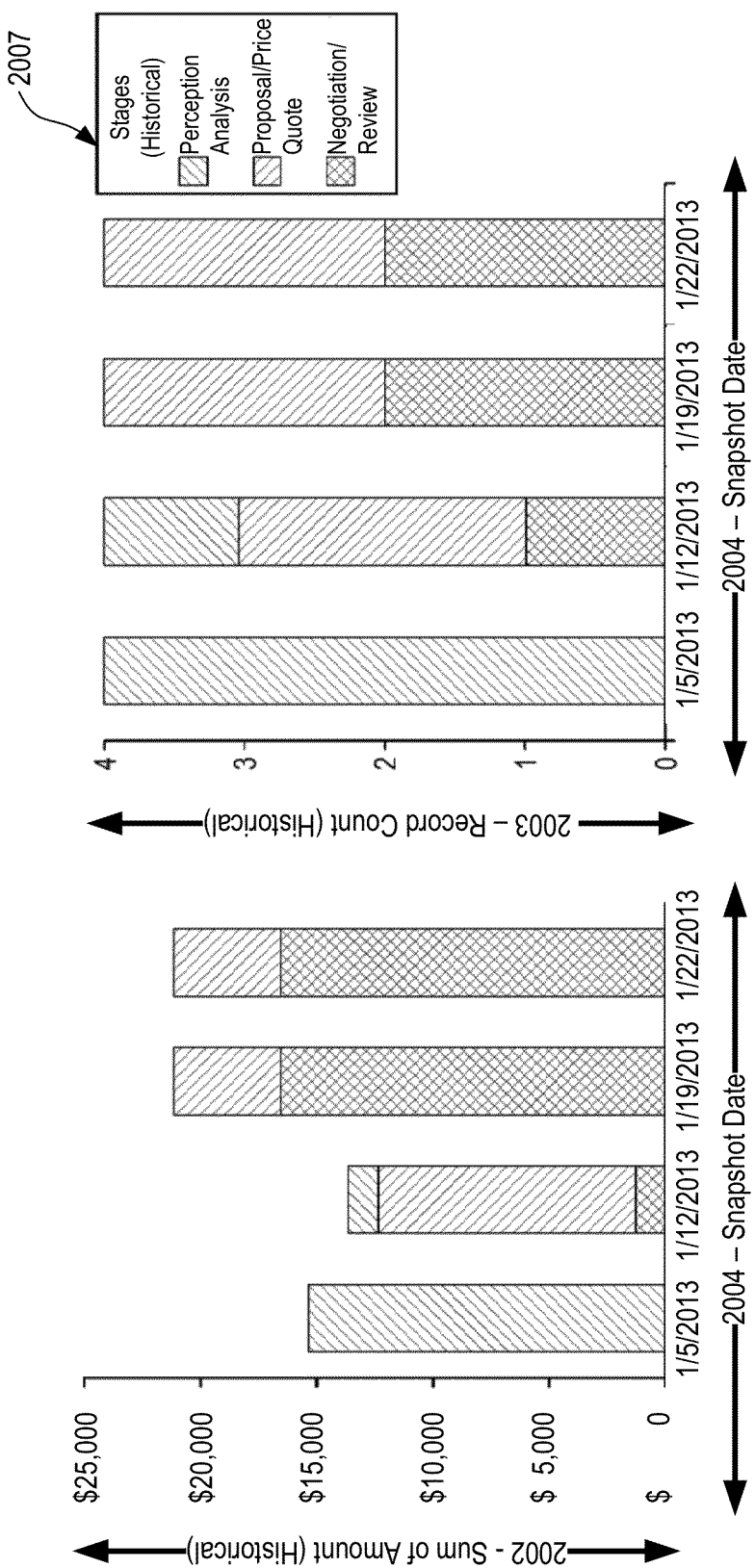

Waterfall Chart using predictive data

Defaults after adding historical field filters

Defaults for Added Custom Filter

Filters [Add ▷]
Show [All opportunities ▷]
Date Field [Close Date ▷] Range [Close Date ▷] From [   ] To [   ]
History [Monthly ▷] Range [Monthly ▷] From [11/1/2012] To [   ]
Amount (Historical) [▷] [Any Selected History ▷] equals [▷] Amount [   ] [▷] [Ok] [Cancel]

[Value]
[Field]

— When in "Field" mode, only current values appear in the picker. — 2029

FIG. 20E

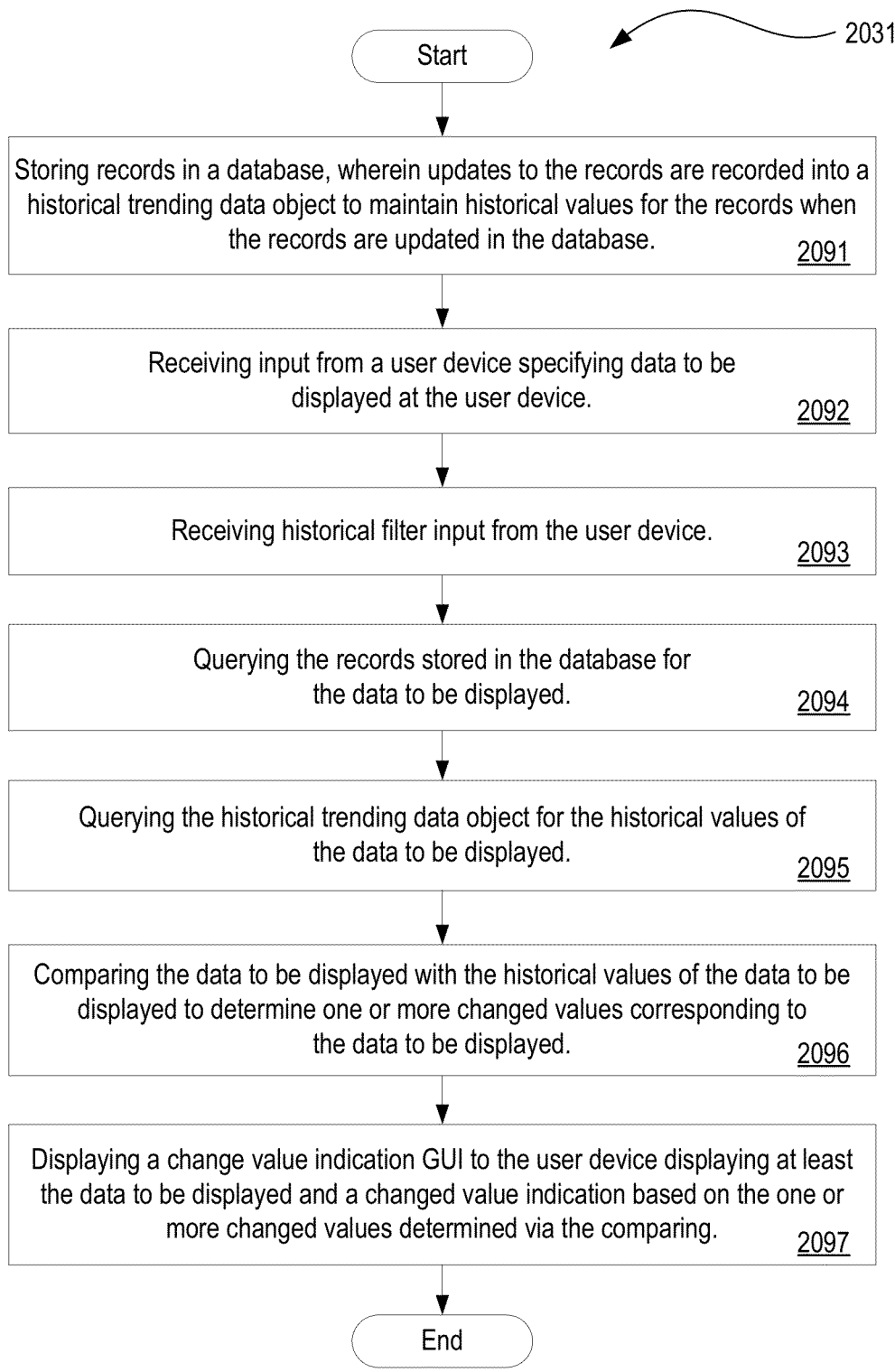

Completeness vs. Accuracy

Opportunity Confidence Breakdown

Opportunity Win Prediction

Predictive Relationships for Opportunity Scoring

Predictive Relationships for Opportunity Scoring

Predictive Relationships for Opportunity Scoring

SYSTEMS, METHODS, AND APPARATUSES FOR IMPLEMENTING A SIMILAR COMMAND WITH A PREDICTIVE QUERY INTERFACE

CLAIM OF PRIORITY

This United States non-provisional utility patent application is related to, and claims priority to, the provisional application entitled "SYSTEMS AND METHODS FOR PREDICTIVE QUERY IMPLEMENTATION AND USAGE IN A MULTI-TENANT DATABASE SYSTEM," filed on Mar. 13, 2013, having an application number of 61/780,503, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments relate generally to the field of computing, and more particularly, to systems and methods for implementing a SIMILAR command with a predictive query interface.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to claimed embodiments.

Client organizations with datasets in their databases may benefit from predictive analysis. Unfortunately, there is no low cost and scalable solution in the marketplace today. Instead, client organizations must hire technical experts to develop customized mathematical constructs and predictive models which are very expensive. Consequently, client organizations without vast financial means are simply priced out of the market and thus do not have access to predictive analysis capabilities for their datasets.

Client organizations that have the financial means to hire technical and mathematical experts to develop the necessary mathematical constructs and predictive models suffer from a common problem with customized solutions. Specifically, the customized solution is tailored to the particular problem at hand at a given point in time, and as such, the customized solution is not able to accommodate changes to the underlying data structure, the customized solution is not able to accommodate changes to the types of data stored within the client's datasets, nor is the customized solution able to scale up to meet increasing and changing demands of the client as their business and dataset grows over time.

The present state of the art may therefore benefit from systems and methods for predictive query implementation and usage in an on-demand and/or multi-tenant database system as described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 8 depicts an exemplary tabular dataset;

FIG. 10B depicts an assessment of convergence, showing inferred versus ground truth;

FIG. 12A depicts an exemplary cross categorization of a small tabular dataset;

FIG. 12E is a flow diagram illustrating a method for implementing predictive query interface as a cloud service in accordance with disclosed embodiments;

FIG. 14C is a flow diagram illustrating a method in accordance with disclosed embodiments;

FIG. 15C is a flow diagram illustrating a method in accordance with disclosed embodiments;

FIG. 16C illustrates usage of the PREDICT command term in accordance with the described embodiments;

FIG. 16E is a flow diagram illustrating a method in accordance with disclosed embodiments;

FIG. 16G is a flow diagram illustrating a method in accordance with disclosed embodiments;

FIG. 17C depicts another view of the Graphical User Interface;

FIG. 19A depicts a specialized GUI to query using historical dates;

FIG. 19B depicts an additional view of a specialized GUI to query using historical dates;

FIG. 19C depicts another view of a specialized GUI to configure predictive queries;

FIG. 20A depicts a pipeline change report in accordance with described embodiments;

FIG. 20E depicts another interface with defaults for an added custom filter;

FIG. 20G is a flow diagram illustrating a method in accordance with disclosed embodiments;

DETAILED DESCRIPTION

Figure 1:
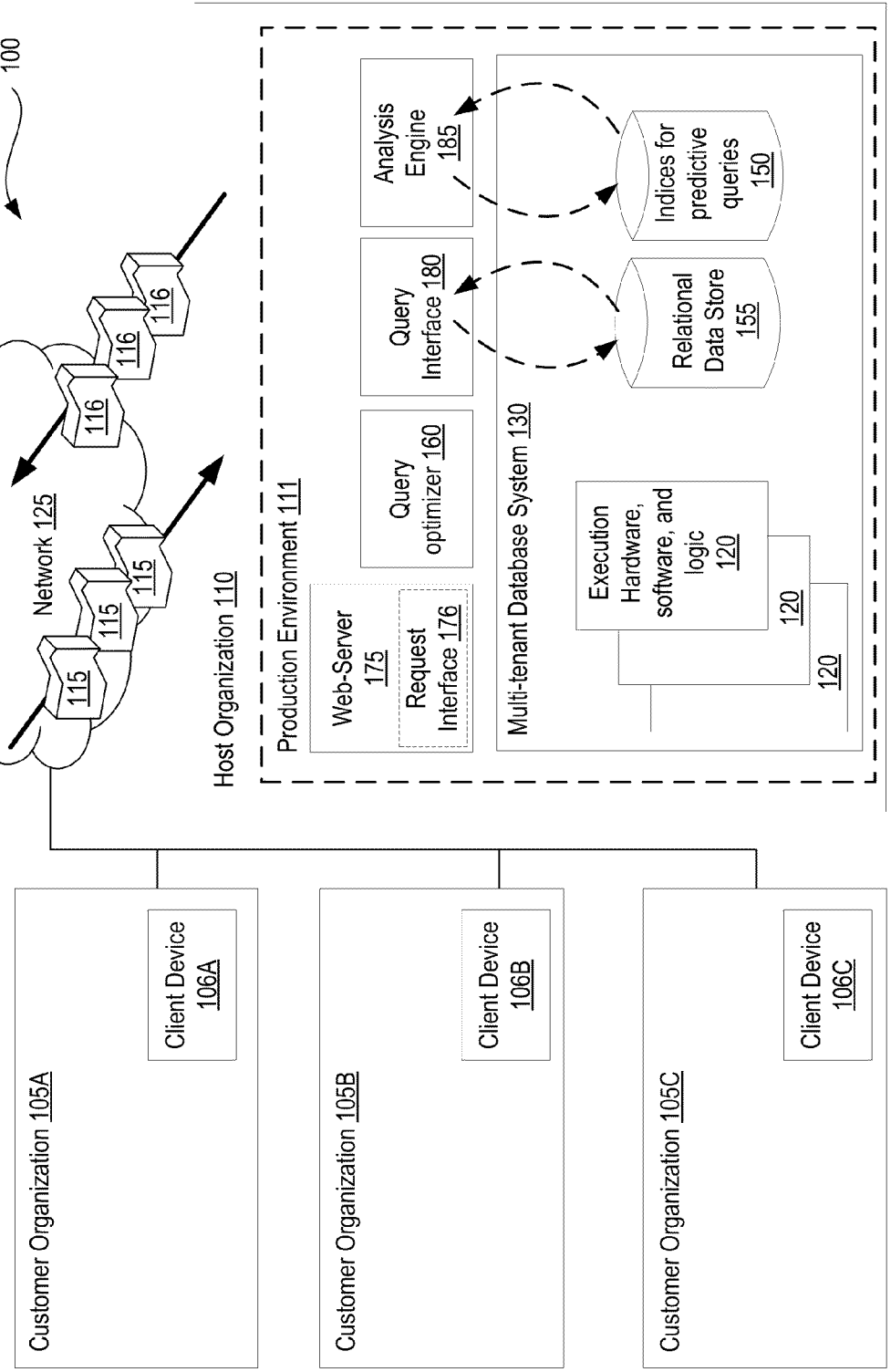
FIG. 1 depicts an exemplary architecture in accordance with described embodiments.

Client organizations who desire to perform predictive analytics and data mining against their datasets must normally hire technical experts and explain the problem they wish to solve and then turn their data over to the hired experts to apply customized mathematical constructs in an attempt to solve the problem at hand.

By analogy, many years ago when computer engineers designed a computer system it was necessary to also figure out how to map data onto a physical disk, accounting for sectors, blocks, rotational speed, etc. Modern programmers simply do not concern themselves with such issues. Similarly, it is highly desirable to utilize a server and sophisticated database technology to perform data analytics for ordinary users without having to hire specialized experts. By doing so, resources may be freed up to focus on other problems. The methodologies described herein advance the art of predictive queries toward that goal by providing systems and methods for predictive query implementation and usage in an on-demand and/or multi-tenant database system. These methodologies move much of the mathematical and technological complexity into a hosted database system and thus out of the view of the users. In doing so, the learning curve to novice users is reduced and thus, the predictive technology is made available to a greater swath of the market place.

Certain machine learning capabilities exist today. For instance, present capabilities may predictively answer questions such as, "Is this person going to buy product x?" But existing technologies are not practical when addressing a wide range of problems. For instance, a large healthcare corporation with vast financial resources may be able to hire technical experts to develop customized analytics to solve a specific problem based on the large healthcare corporations' local proprietary database, but a small company by contrast simply cannot afford to hire such service providers as the cost far outweighs a small company's financial resources to do so. Moreover, as alluded to above, even if an organization invests in such a customized solution, that solution is forever locked to the specific problem solved and cannot scale to new problems, new inquiries, changing data types or data structures, and so forth. As such, the custom developed solution will decay over time as it becomes less aligned to the new and ever changing business objectives of the organization. Consequently, the exemplary small company must forego solving the problem at hand whereas the entity having hired experts to develop a custom solution are forced to re-invest additional time and resources to update and re-tool their customized solution as business conditions, data, and objectives change over time. Neither outcome is ideal.

The services offered by technical experts in the field of analytics and predictive modeling today provide solutions that are customized to the particular dataset of the customer. They do not offer capabilities that may be used by non-experts nor do they offer solutions that are abstracted from a particular underlying dataset. Instead, the models developed require specialized training not just to implement, but to utilize, and such models are anchored to the particular underlying dataset for which they are developed.

Conversely, the methodologies described herein provide a foundational architecture by which the variously described query techniques, interfaces, databases, and other functionality is suitable for use by a wide array of customer organizations and users of varying level of expertise as well as underlying datasets of varying scope.

Salesforce.com provides on-demand cloud services to clients, organizations, and end users, and behind those cloud services is a multi-tenant database system which permits users to have customized data, customized field types, and so forth. The underlying data and data structures are customized by the client organizations for their own particular needs. The methodologies described herein are nevertheless capable of analyzing and querying those datasets and data structures because the methodologies are not anchored to any particular underlying database scheme, structure, or content.

Customer organizations using the described techniques further benefit from the low cost of access made possible by the high scalability of the solutions described. For instance, the cloud service provider may elect to provide the capability as part of an overall service offering at no additional cost, or may elect to provide the additional capabilities for an additional service fee. In either case, customer organizations are not required to invest a large sum up front for a one-time customized solution as is the case with conventional techniques. Because the capabilities may be systematically integrated into a cloud service's computing architecture and because they do not require experts to custom tailor solutions for each particular client organizations' dataset and structure, the scalability brings massive cost savings, thus enabling even small organizations with limited financial resources to benefit from predictive query and latent structure query techniques. Large companies with the financial means may also benefit due to the cost savings available to them and may further benefit from the capability to institute predictive query and latent structure query techniques for a much larger array of inquiry than was previously feasible utilizing conventional techniques.

Theses and other benefits as well as more specific embodiments are described in greater detail below. In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems where are not directly discussed.

In one embodiment, means for predictive query and latent structure query implementation and usage in a multi-tenant database system execute at an application in a computing device, a computing system, or a computing architecture, in which the application is enabled to communicate with a remote computing device over a public Internet, such as remote clients, thus establishing a cloud based computing service in which the clients utilize the functionality of the remote application which implements the predictive and latent structure query and usage capabilities.

FIG. 1 depicts an exemplary architecture 100 in accordance with described embodiments.

In one embodiment, a production environment 111 is communicably interfaced with a plurality of client devices 106A-C through host organization 110. In one embodiment, a multi-tenant database system 130 includes a relational data store 155, for example, to store datasets on behalf of customer organizations 105A-C or users. The multi-tenant database system 130 further stores indices for predictive queries 150, for instance, which are generated from datasets provided by, specified by, or stored on behalf of users and customer organizations 105A-C.

Multi-tenant database system 130 includes a plurality of underlying hardware, software, and logic elements 120 that implement database functionality and a code execution environment within the host organization 110. In accordance with one embodiment, multi-tenant database system 130 implements the non-relational data store—and separately implements a predictive database to store the indices for predictive queries 150. The hardware, software, and logic elements 120 of the multi-tenant database system 1230 are separate and distinct from a plurality of customer organizations (105A, 105B, and 105C) which utilize the services provided by the host organization 110 by communicatively interfacing to the host organization 110 via network 125. In such a way, host organization 110 may implement on-demand services, on-demand database services or cloud computing services to subscribing customer organizations 105A-C.

Host organization 110 receives input and other requests 115 from a plurality of customer organizations 105A-C via network 125 (such as a public Internet). For example, the incoming PreQL queries, predictive queries, API requests, or other input may be received from the customer organizations 105A-C to be processed against the multi-tenant database system 130.

In one embodiment, each customer organization 105A-C is an entity selected from the group consisting of: a separate and distinct remote organization, an organizational group within the host organization 110, a business partner of the host organization 110, or a customer organization 105A-C that subscribes to cloud computing services provided by the host organization 110.

In one embodiment, requests 115 are received at, or submitted to, a web-server 175 within host organization 110. Host organization 110 may receive a variety of requests for processing by the host organization 110 and its multi-tenant database system 130. Incoming requests 115 received at web-server 175 may specify which services from the host organization 110 are to be provided, such as query requests, search request, status requests, database transactions, a processing request to retrieve, update, or store data on behalf of one of the customer organizations 105A-C, and so forth. Web-server 175 may be responsible for receiving requests 115 from various customer organizations 105A-C via network 125 and provide a web-based interface to an end-user client device 106A-C or machine originating such data requests 115.

Query interface 180 provides functionality to pass queries from web-server 175 into the multi-tenant database system 130 for execution against the indices for predictive queries 150 or the relational data store 155. In one embodiment, the query interface 180 implements a PreQL Application Programming Interface (API) or a JavaScript Object Notation (JSON) API interface through which queries may be executed against the indices for predictive queries 150 or the relational data store 155. Query optimizer 160 performs query translation and optimization, for instance, on behalf of other functionality which possesses sufficient information to architect a query or PreQL query yet lacks the necessary logic to actually construct the query syntax. Analysis engine 185 operates to generate queryable indices for predictive queries from tabular datasets or other data provided by, or specified by users.

Host organization 110 may implement a request interface 176 via web-server 175 or as a stand-alone interface to receive requests packets or other requests 115 from the client devices 106A-C. Request interface 176 further supports the return of response packets or other replies and responses 116 in an outgoing direction from host organization 110 to the client devices 106A-C. According to one embodiment, query interface 180 implements a PreQL API interface and/or a JSON API interface with specialized functionality to execute PreQL queries or other predictive queries against the databases of the multi-tenant database system 130, such as the indices for predictive queries at element 150. For instance, query interface 180 may operate to query the predictive database within host organization 110 in fulfillment of such requests 115 from the client devices 106A-C by issuing API calls with PreQL structured query terms such as "PREDICT," "RELATED," "SIMILAR," and "GROUP." Also available are API calls for "UPLOAD" and "ANALYZE," so as to upload new data sets or define datasets to the predictive database 1350 and trigger the analysis engine 185 to instantiate analysis of such data which in turn generates queryable indices in support of such queries.

Figure 2:
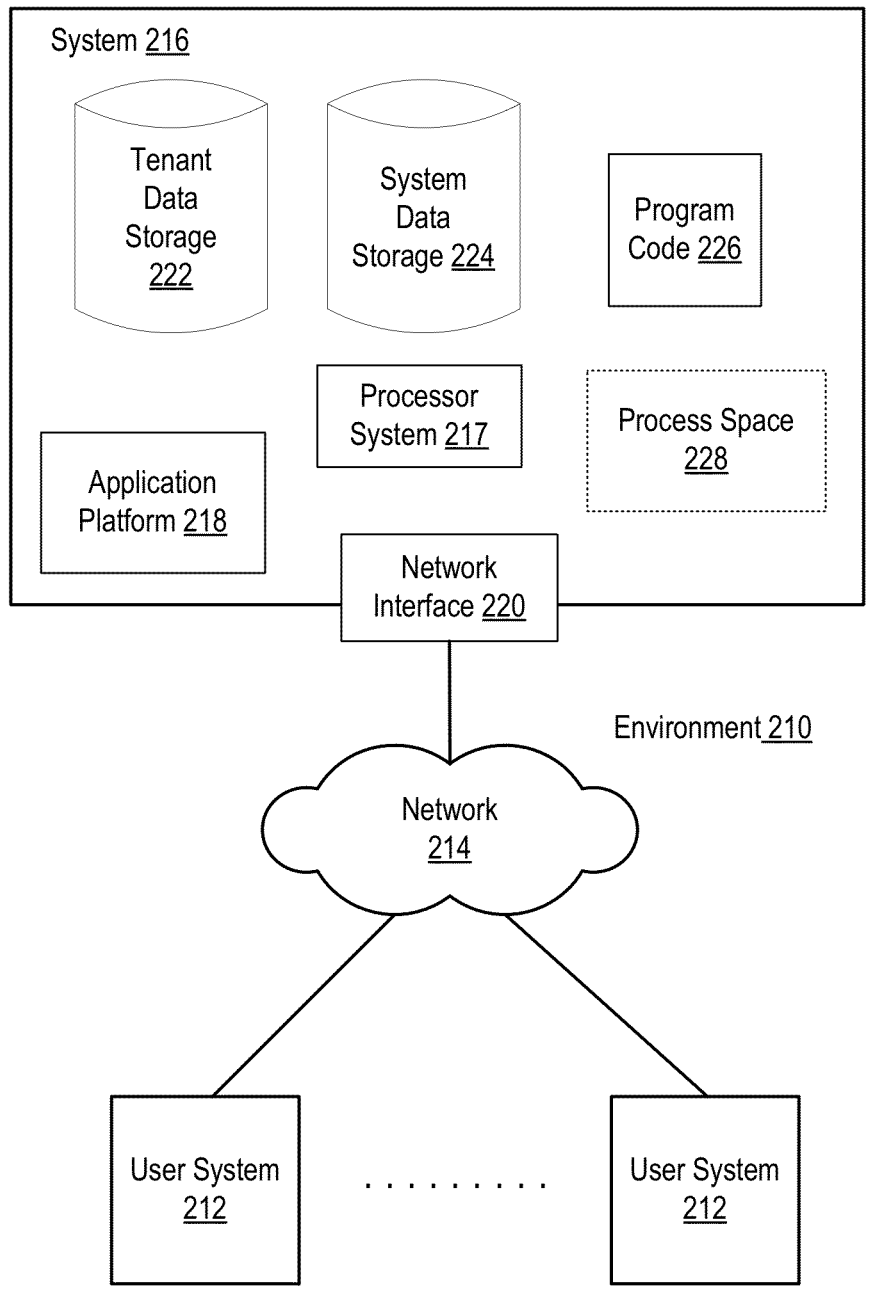
FIG. 2 illustrates a block diagram of an example of an environment in which an on-demand database service might be used.

FIG. 2 illustrates a block diagram of an example of an environment 210 in which an on-demand database service might be used. Environment 210 may include user systems 212, network 214, system 216, processor system 217, application platform 218, network interface 220, tenant data storage 222, system data storage 224, program code 226, and process space 228. In other embodiments, environment 210 may not have all of the components listed and/or may have other elements instead of, or in addition to, those listed above.

Environment 210 is an environment in which an on-demand database service exists. User system 212 may be any machine or system that is used by a user to access a database user system. For example, any of user systems 212 can be a handheld computing device, a mobile phone, a laptop computer, a work station, and/or a network of computing devices. As illustrated in FIG. 2 (and in more detail in FIG. 3) user systems 212 might interact via a network 214 with an on-demand database service, which is system 216.

An on-demand database service, such as system 216, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 216" and "system 216" is used interchangeably herein. A database image may include one or more database objects. A relational database management system (RDMS) or the equivalent may execute storage and retrieval of information against the database object(s). Application platform 218 may be a framework that allows the applications of system 216 to run, such as the hardware and/or software, e.g., the operating system. In an embodiment, on-demand database service 216 may include an application platform 218 that enables creation, managing and executing one or more applications developed by the provider of the on-demand database service, users accessing the on-demand database service via user systems 212, or third party application developers accessing the on-demand database service via user systems 212.

The users of user systems 212 may differ in their respective capacities, and the capacity of a particular user system 212 might be entirely determined by permissions (permission levels) for the current user. For example, where a salesperson is using a particular user system 212 to interact with system 216, that user system has the capacities allotted to that salesperson. However, while an administrator is using that user system to interact with system 216, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 214 is any network or combination of networks of devices that communicate with one another. For example, network 214 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it is understood that the networks that the claimed embodiments may utilize are not so limited, although TCP/IP is a frequently implemented protocol.

User systems 212 might communicate with system 216 using TCP/IP and, at a higher network level, use other common Internet protocols to communicate, such as HTTP, FTP, AFS, WAP, etc. In an example where HTTP is used, user system 212 might include an HTTP client commonly referred to as a "browser" for sending and receiving HTTP messages to and from an HTTP server at system 216. Such an HTTP server might be implemented as the sole network interface between system 216 and network 214, but other techniques might be used as well or instead. In some implementations, the interface between system 216 and network 214 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 216, shown in FIG. 2, implements a web-based customer relationship management (CRM) system. For example, in one embodiment, system 216 includes application servers configured to implement and execute CRM software applications as well as provide related data, code, forms, webpages and other information to and from user systems 212 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 216 implements applications other than, or in addition to, a CRM application. For example, system 216 may provide tenant access to multiple hosted (standard and custom) applications, including a CRM application. User (or third party developer) applications, which may or may not include CRM, may be supported by the application platform 218, which manages creation, storage of the applications into one or more database objects and executing of the applications in a virtual machine in the process space of the system 216.

One arrangement for elements of system 216 is shown in FIG. 2, including a network interface 220, application platform 218, tenant data storage 222 for tenant data 223, system data storage 224 for system data 225 accessible to system 216 and possibly multiple tenants, program code 226 for implementing various functions of system 216, and a process space 228 for executing MTS system processes and tenant-specific processes, such as running applications as part of an application hosting service. Additional processes that may execute on system 216 include database indexing processes.

Several elements in the system shown in FIG. 2 include conventional, well-known elements that are explained only briefly here. For example, each user system 212 may include a desktop personal computer, workstation, laptop, PDA, cell phone, or any wireless access protocol (WAP) enabled device or any other computing device capable of interfacing directly or indirectly to the Internet or other network connection. User system 212 typically runs an HTTP client, e.g., a browsing program, such as Microsoft's Internet Explorer browser, a Mozilla or Firefox browser, an Opera, or a WAP-enabled browser in the case of a smartphone, tablet, PDA or other wireless device, or the like, allowing a user (e.g., subscriber of the multi-tenant database system) of user system 212 to access, process and view information, pages and applications available to it from system 216 over network 214. Each user system 212 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 216 or other systems or servers. For example, the user interface device can be used to access data and applications hosted by system 216, and to perform searches on stored data, and otherwise allow a user to interact with various GUI pages that may be presented to a user. As discussed above, embodiments are suitable for use with the Internet, which refers to a specific global internetwork of networks. However, it is understood that other networks can be used instead of the Internet, such as an intranet, an extranet, a virtual private network (VPN), a non-TCP/IP based network, any LAN or WAN or the like.

According to one embodiment, each user system 212 and all of its components are operator configurable using applications, such as a browser, including computer code run using a central processing unit such as an Intel Pentium® processor or the like. Similarly, system 216 (and additional instances of an MTS, where more than one is present) and all of their components might be operator configurable using application(s) including computer code to run using a central processing unit such as processor system 217, which may include an Intel Pentium® processor or the like, and/or multiple processor units.

According to one embodiment, each system 216 is configured to provide webpages, forms, applications, data and media content to user (client) systems 212 to support the access by user systems 212 as tenants of system 216. As such, system 216 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS may include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It is understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 3:
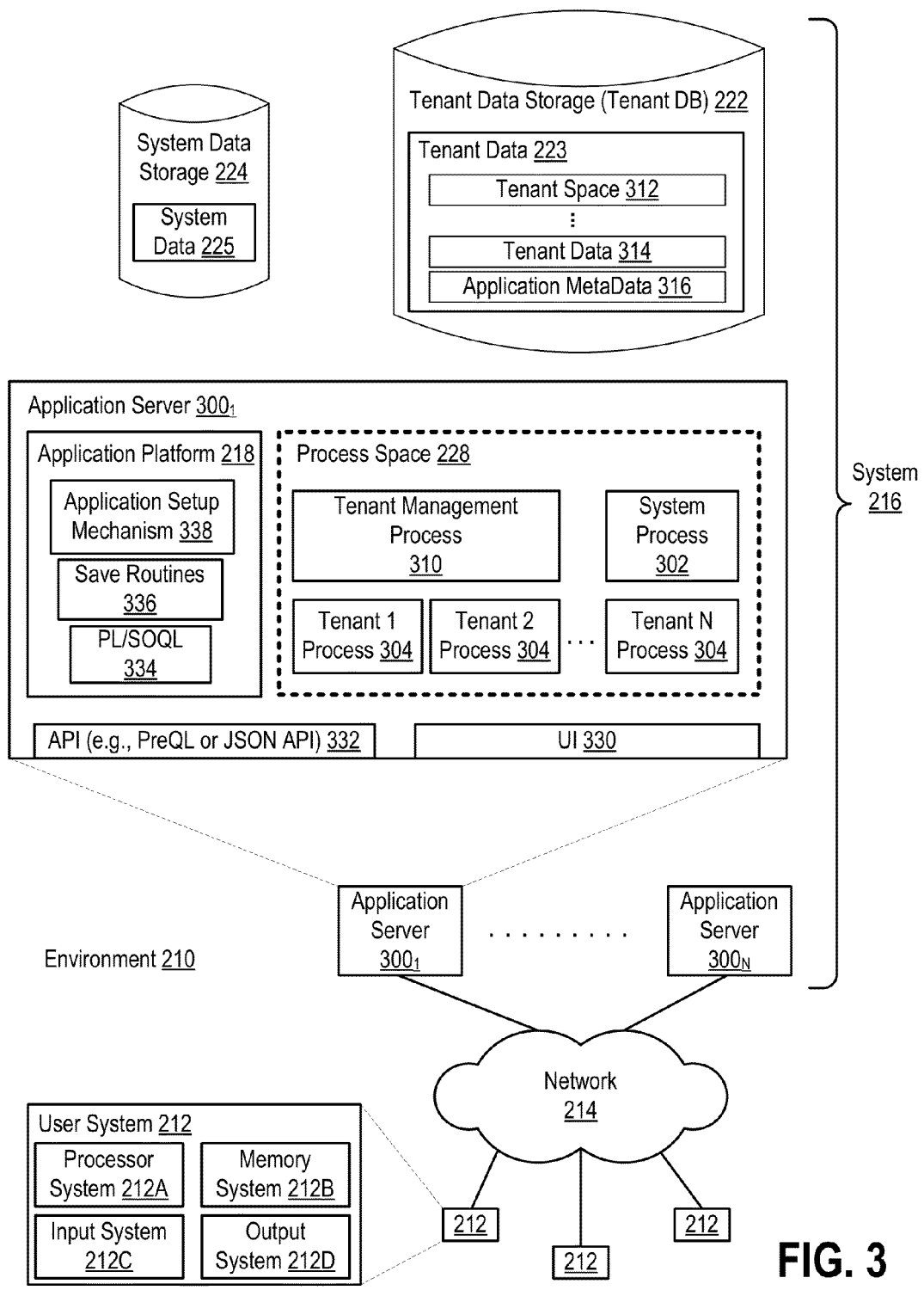
FIG. 3 illustrates a block diagram of an embodiment of elements of FIG. 2 and various possible interconnections between these elements.

FIG. 3 illustrates a block diagram of an embodiment of elements of FIG. 2 and various possible interconnections between these elements. FIG. 3 also illustrates environment 210. However, in FIG. 3, the elements of system 216 and various interconnections in an embodiment are further illustrated. FIG. 3 shows that user system 212 may include a processor system 212A, memory system 212B, input system 212C, and output system 212D. FIG. 3 shows network 214 and system 216. FIG. 3 also shows that system 216 may include tenant data storage 222, tenant data 223, system data storage 224, system data 225, User Interface (UI) 330, Application Program Interface (API) 332 (e.g., a PreQL or JSON API), PL/SOQL 334, save routines 336, application setup mechanism 338, applications servers $300_1$-$300_N$, system process space 302, tenant process spaces 304, tenant management process space 310, tenant storage area 312, user storage 314, and application metadata 316. In other embodiments, environment 210 may not have the same elements as those listed above and/or may have other elements instead of, or in addition to, those listed above.

User system 212, network 214, system 216, tenant data storage 222, and system data storage 224 were discussed above in FIG. 2. As shown by FIG. 3, system 216 may include a network interface 220 (of FIG. 2) implemented as a set of HTTP application servers 300, an application platform 218, tenant data storage 222, and system data storage 224. Also shown is system process space 302, including individual tenant process spaces 304 and a tenant management process space 310. Each application server 300 may be configured to tenant data storage 222 and the tenant data 223 therein, and system data storage 224 and the system data 225 therein to serve requests of user systems 212. The tenant data 223 might be divided into individual tenant storage areas 312, which can be either a physical arrangement and/or a logical arrangement of data. Within each tenant storage area 312, user storage 314 and application metadata 316 might be similarly allocated for each user. For example, a copy of a user's most recently used (MRU) items might be stored to user storage 314. Similarly, a copy of MRU items for an entire organization that is a tenant might be stored to tenant storage area 312. A UI 330 provides a user interface and an API 332 (e.g., a PreQL or JSON API) provides an application programmer interface to system 216 resident processes to users and/or developers at user systems 212. The tenant data and the system data may be stored in various databases, such as one or more Oracle™ databases.

Application platform 218 includes an application setup mechanism 338 that supports application developers' creation and management of applications, which may be saved as metadata into tenant data storage 222 by save routines 336 for execution by subscribers as one or more tenant process spaces 304 managed by tenant management process space 310 for example. Invocations to such applications may be coded using PL/SOQL 334 that provides a programming language style interface extension to API 332 (e.g., a PreQL or JSON API). Invocations to applications may be detected by one or more system processes, which manages retrieving application metadata 316 for the subscriber making the invocation and executing the metadata as an application in a virtual machine.

Each application server 300 may be communicably coupled to database systems, e.g., having access to system data 225 and tenant data 223, via a different network connection. For example, one application server $300_1$ might be coupled via the network 214 (e.g., the Internet), another application server $300_{N-1}$ might be coupled via a direct network link, and another application server $300_N$ might be coupled by yet a different network connection. Transfer Control Protocol and Internet Protocol (TCP/IP) are typical protocols for communicating between application servers 300 and the database system. However, it will be apparent to one skilled in the art that other transport protocols may be used to optimize the system depending on the network interconnect used.

In certain embodiments, each application server 300 is configured to handle requests for any user associated with any organization that is a tenant. Because it is desirable to be able to add and remove application servers from the server pool at any time for any reason, there is preferably no server affinity for a user and/or organization to a specific application server 300. In one embodiment, therefore, an interface system implementing a load balancing function (e.g., an F5 Big-IP load balancer) is communicably coupled between the application servers 300 and the user systems 212 to distribute requests to the application servers 300. In one embodiment, the load balancer uses a least connections algorithm to route user requests to the application servers 300. Other examples of load balancing algorithms, such as round robin and observed response time, also can be used. For example, in certain embodiments, three consecutive requests from the same user may hit three different application servers 300, and three requests from different users may hit the same application server 300. In this manner, system 216 is multi-tenant, in which system 216 handles storage of, and access to, different objects, data and applications across disparate users and organizations.

As an example of storage, one tenant might be a company that employs a sales force where each salesperson uses system 216 to manage their sales process. Thus, a user might maintain contact data, leads data, customer follow-up data, performance data, goals and progress data, etc., all applicable to that user's personal sales process (e.g., in tenant data storage 222). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 216 that are allocated at the tenant level while other data structures might be managed at the user level. Because an MTS might support multiple tenants including possible competitors, the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 216 might also maintain system level data usable by multiple tenants or other data. Such system level data might include industry reports, news, postings, and the like that are sharable among tenants.

In certain embodiments, user systems 212 (which may be client systems) communicate with application servers 300 to request and update system-level and tenant-level data from system 216 that may require sending one or more queries to tenant data storage 222 and/or system data storage 224. System 216 (e.g., an application server 300 in system 216) automatically generates one or more SQL statements or PreQL statements (e.g., one or more SQL or PreQL queries respectively) that are designed to access the desired information.

System data storage 224 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects as described herein. It is understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It is understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 4:
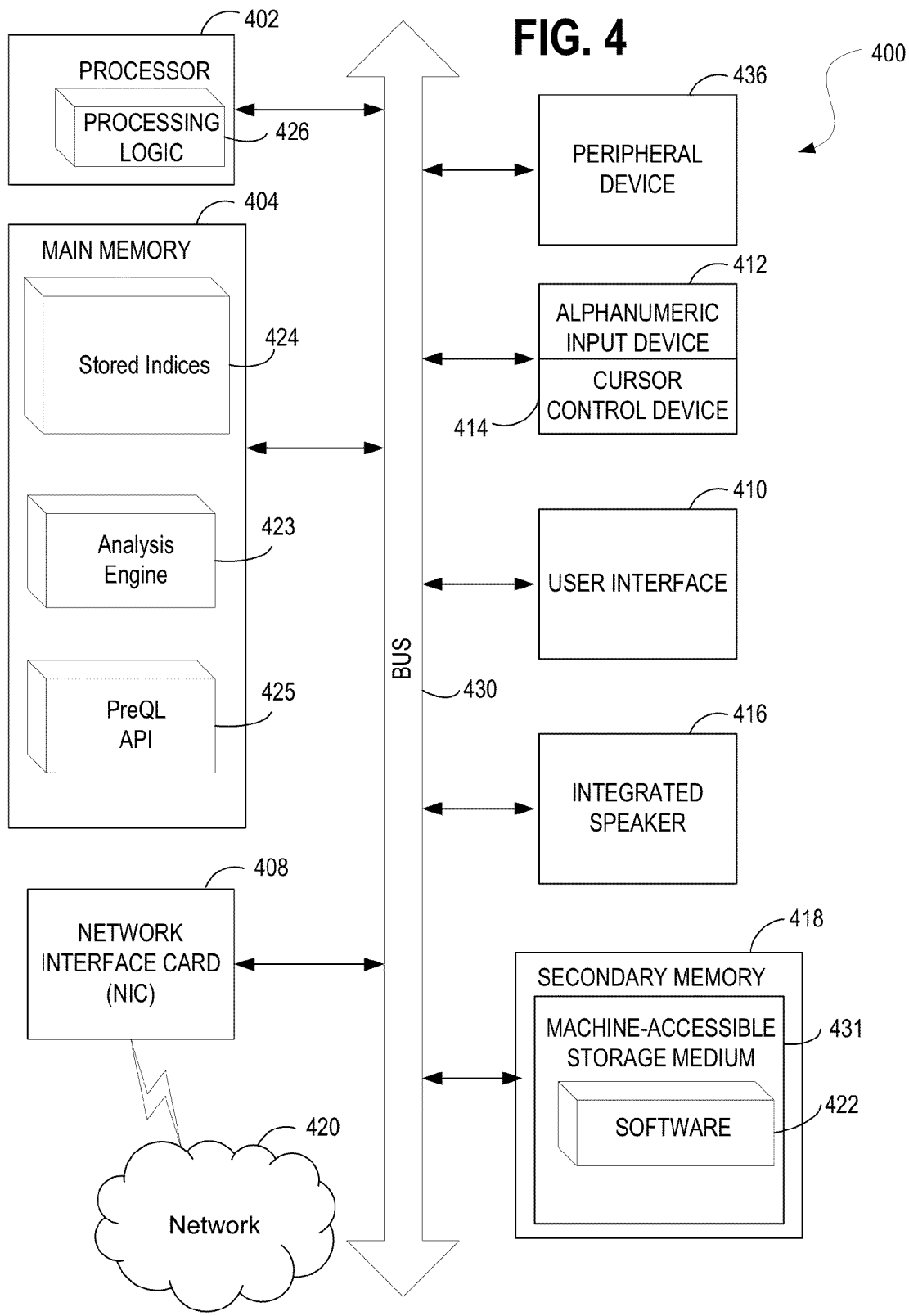
FIG. 4 illustrates a diagrammatic representation of a machine in the exemplary form of a computer system, in accordance with one embodiment.

FIG. 4 illustrates a diagrammatic representation of a machine 400 in the exemplary form of a computer system, in accordance with one embodiment, within which a set of instructions, for causing the machine/computer system 400 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 400 includes a processor 402, a main memory 404 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 418 (e.g., a persistent storage device including hard disk drives and a persistent database and/or a multi-tenant database implementation), which communicate with each other via a bus 430. Main memory 404 includes stored indices 424, an analysis engine 423, and a PreQL API 425. Main memory 404 and its sub-elements are operable in conjunction with processing logic 426 and processor 402 to perform the methodologies discussed herein. The computer system 400 may additionally or alternatively embody the server side elements as described above.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 402 may also be one or more special-purpose processing devices such as an application specific integrated circuit (ASIC), a field programmable gate array (FPGA), a digital signal processor (DSP), network processor, or the like. Processor 402 is configured to execute the processing logic 426 for performing the operations and functionality which is discussed herein.

The computer system 400 may further include a network interface card 408. The computer system 400 also may include a user interface 410 (such as a video display unit, a liquid crystal display (LCD), or a cathode ray tube (CRT)), an alphanumeric input device 412 (e.g., a keyboard), a cursor control device 414 (e.g., a mouse), and a signal generation device 416 (e.g., an integrated speaker). The computer system 400 may further include peripheral device 436 (e.g., wireless or wired communication devices, memory devices, storage devices, audio processing devices, video processing devices, etc.).

The secondary memory 418 may include a non-transitory machine-readable or computer readable storage medium 431 on which is stored one or more sets of instructions (e.g., software 422) embodying any one or more of the methodologies or functions described herein. The software 422 may also reside, completely or at least partially, within the main memory 404 and/or within the processor 402 during execution thereof by the computer system 400, the main memory 404 and the processor 402 also constituting machine-readable storage media. The software 422 may further be transmitted or received over a network 420 via the network interface card 408.

Figure 5A:
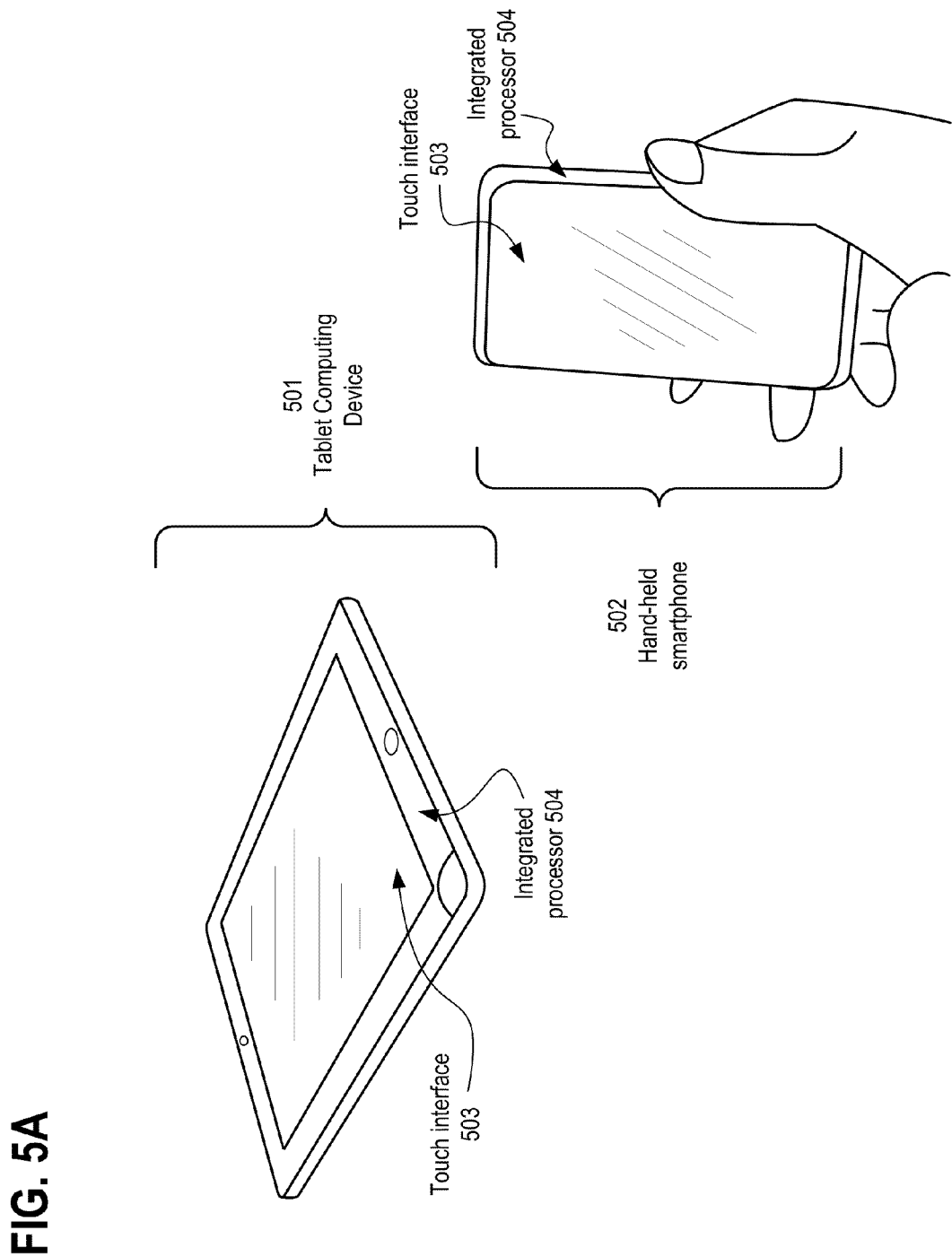
FIG. 5A depicts a tablet computing device and a hand-held smartphone each having a circuitry integrated therein as described in accordance with the embodiments.

FIG. 5A depicts a tablet computing device 501 and a hand-held smartphone 502 each having a circuitry integrated therein as described in accordance with the embodiments. As depicted, each of the tablet computing device 501 and the hand-held smartphone 502 include a touchscreen interface 503 and an integrated processor 504 in accordance with disclosed embodiments.

For example, in one embodiment, a system embodies a tablet computing device 501 or a hand-held smartphone 502, in which a display unit of the system includes a touchscreen interface 503 for the tablet or the smartphone and further in which memory and an integrated circuit operating as an integrated processor are incorporated into the tablet or smartphone, in which the integrated processor implements one or more of the embodiments described herein for use of a predictive and latent structure query implementation through an on-demand and/or multi-tenant database system such as a cloud computing service provided via a public Internet as a subscription service. In one embodiment, the integrated circuit described above or the depicted integrated processor of the tablet or smartphone is an integrated silicon processor functioning as a central processing unit (CPU) and/or a Graphics Processing Unit (GPU) for a tablet computing device or a smartphone.

Although the tablet computing device 501 and hand-held smartphone 502 may have limited processing capabilities, each is nevertheless enabled to utilize the predictive and latent structure query capabilities provided by a host organization as a cloud based service, for instance, such as host organization 110 depicted at FIG. 1.

Figure 5B:
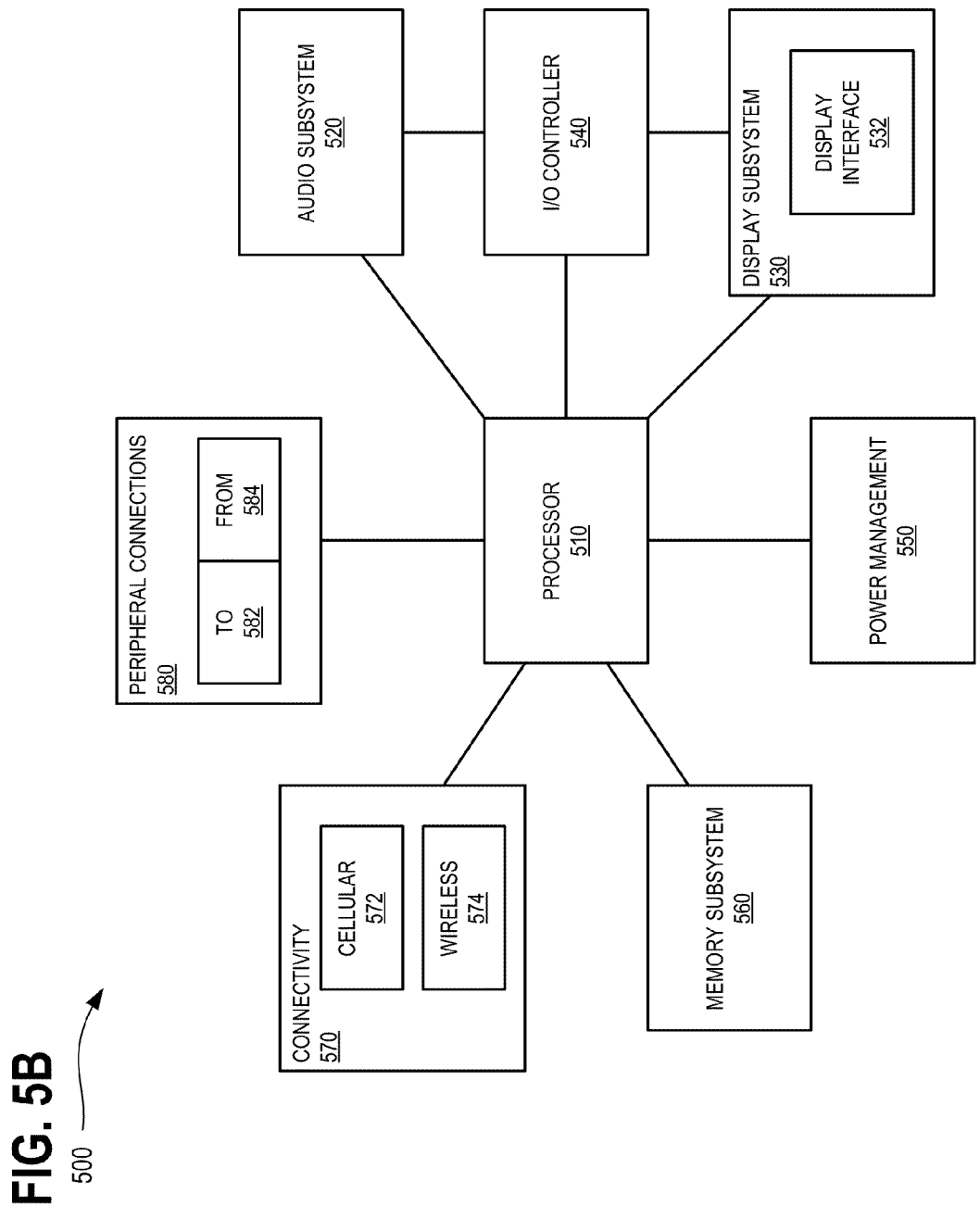
FIG. 5B is a block diagram of an embodiment of tablet computing device, a smart phone, or other mobile device in which touchscreen interface connectors are used.

FIG. 5B is a block diagram 500 of an embodiment of tablet computing device 501, hand-held smartphone 502, or other mobile device in which touchscreen interface connectors are used. Processor 510 performs the primary processing operations. Audio subsystem 520 represents hardware (e.g., audio hardware and audio circuits) and software (e.g., drivers, codecs) components associated with providing audio functions to the computing device. In one embodiment, a user interacts with the tablet computing device or smart phone by providing audio commands that are received and processed by processor 510.

Display subsystem 530 represents hardware (e.g., display devices) and software (e.g., drivers) components that provide a visual and/or tactile display for a user to interact with the tablet computing device or smart phone. Display subsystem 530 includes display interface 532, which includes the particular screen or hardware device used to provide a display to a user. In one embodiment, display subsystem 530 includes a touchscreen device that provides both output and input to a user.

I/O controller 540 represents hardware devices and software components related to interaction with a user. I/O controller 540 can operate to manage hardware that is part of audio subsystem 520 and/or display subsystem 530. Additionally, I/O controller 540 illustrates a connection point for additional devices that connect to the tablet computing device or smart phone through which a user might interact. In one embodiment, I/O controller 540 manages devices such as accelerometers, cameras, light sensors or other environmental sensors, or other hardware that can be included in the tablet computing device or smart phone. The input can be part of direct user interaction, as well as providing environmental input to the tablet computing device or smart phone.

In one embodiment, the tablet computing device or smart phone includes power management 550 that manages battery power usage, charging of the battery, and features related to power saving operation. Memory subsystem 560 includes memory devices for storing information in the tablet computing device or smart phone. Connectivity 570 includes hardware devices (e.g., wireless and/or wired connectors and communication hardware) and software components (e.g., drivers, protocol stacks) to the tablet computing device or smart phone to communicate with external devices. Cellular connectivity 572 may include, for example, wireless carriers such as GSM (global system for mobile communications), CDMA (code division multiple access), TDM (time division multiplexing), or other cellular service standards). Wireless connectivity 574 may include, for example, activity that is not cellular, such as personal area networks (e.g., Bluetooth), local area networks (e.g., WiFi), and/or wide area networks (e.g., WiMax), or other wireless communication.

Peripheral connections 580 include hardware interfaces and connectors, as well as software components (e.g., drivers, protocol stacks) to make peripheral connections as a peripheral device ("to" 582) to other computing devices, as well as have peripheral devices ("from" 584) connected to the tablet computing device or smart phone, including, for example, a "docking" connector to connect with other computing devices. Peripheral connections 580 include common or standards-based connectors, such as a Universal Serial Bus (USB) connector, DisplayPort including MiniDisplayPort (MDP), High Definition Multimedia Interface (HDMI), Firewire, etc.

Figure 6:
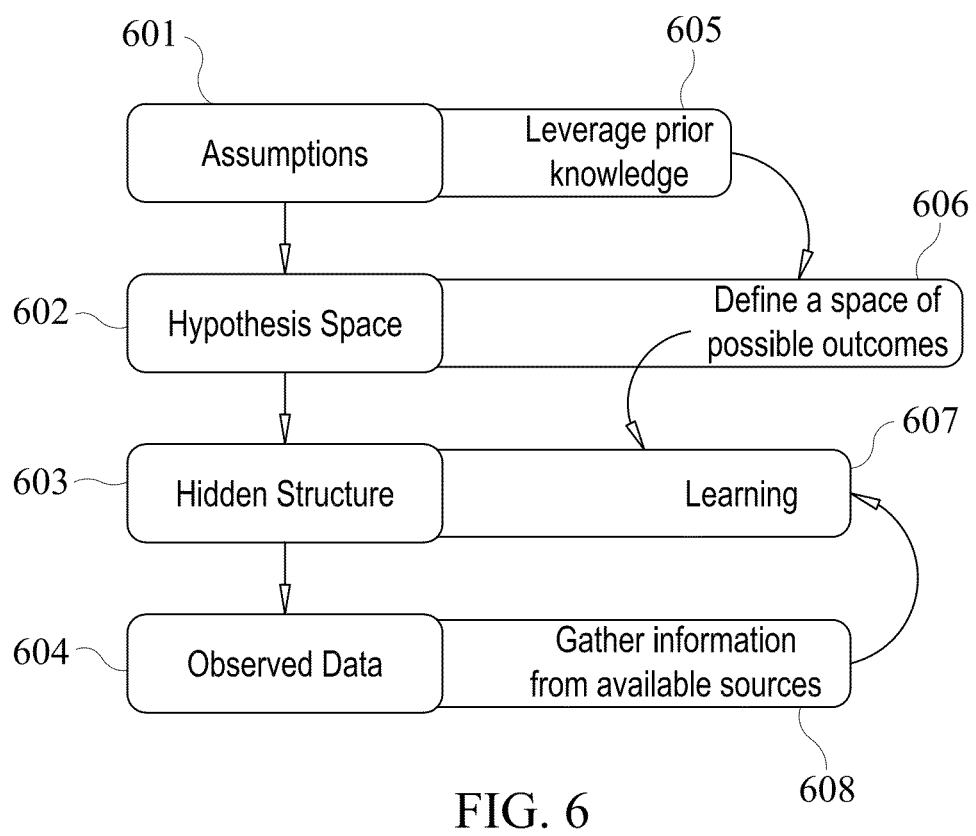
FIG. 6 depicts a simplified flow for probabilistic modeling.

FIG. 6 depicts a simplified flow for probabilistic modeling. Probabilistic modeling requires a series of choices and assumptions. For instance, it is possible to trade off fidelity and detail with tractability. Assumptions define an outcome space which may be considered hypotheses, and in the modeling view, one of these possible hypotheses actually occurs.

For instance, at element 601 the probabilistic modeling flow depicts assumptions which leverage prior knowledge 605. The flow advances to element 602 where there is a hypothesis space which defines a space of possible outcomes 606. The probabilistic modeling flow advances to element 603 which results in hidden structure based on learning 607 derived from the defined space of possible outcomes 606. The flow then advances to element 604 where observed data is utilized by gathering information from available sources 608 which then loops back to learning at element 607 to recursively better inform the probabilistic model.

The hidden structure at 603 is used to generate data. The hidden structure 603 and the resulting generated data may be considered the generative view. Learning 607 uses available sources of information and inferences about the hidden structure which may include certain modeling assumptions ("prior"), as well as data observed ("likelihood"), from which a combination of prior and likelihood may be utilized to draw conclusions ("posterior").

Such assumptions yield hypothesis space and additionally provide a means by which probabilities may be assigned to such assumptions, thus yielding a probability distribution on hypotheses, given actual data observed.

The modeling assumptions implemented by the analysis engine to generate queryable indices define both a hypothesis space as well as a recipe for assigning a probability to each hypothesis given some data. A probability distribution thus results in which each hypothesis is an outcome, for which there can be a great many available and possible outcomes, each with varying probability. There can also be a great many hypotheses and finding the best ones to explain the data is not a straight forward or obvious proposition.

Probabilistic inference thus presents the problem of how to search through the available hypothesis space to find the ones that give the best explanations for the data at hand. The analysis engine described herein implements a range of methods including functionality to solve the math directly, functionality to leverage optimization to find the peak of the hypothesis space, and functionality to implement random walks through the hypothesis space.

The probabilistic modeling makes assumptions 601 and using the assumptions, a hypothesis space 602 is defined. Probabilities are assigned to the hypotheses given data observed and then inference is used to figure out which of those explanatory hypotheses are plausible and which one is the best.

Figure 7:
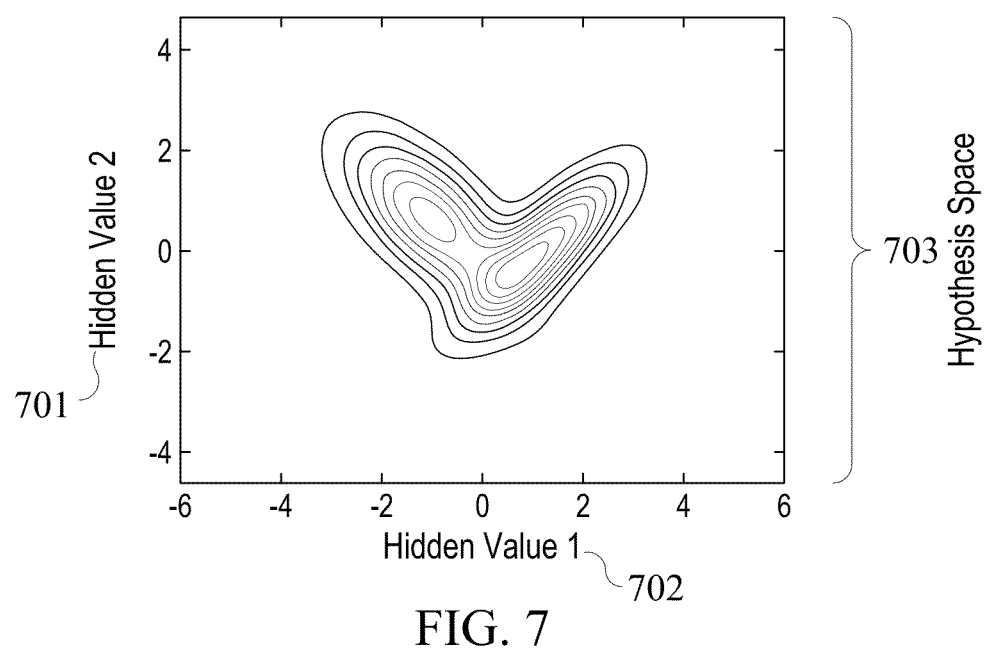
FIG. 7 illustrates an exemplary landscape upon which a random walk may be performed.

FIG. 7 illustrates an exemplary landscape upon which a random walk may be performed. Experts in the field do not agree on how to select the best hypothesis but there are several favored approaches. In simple cases, functionality can use math to solve the equations directly. Other optimization methods are popular such as hill climbing and its relatives. In certain described embodiments, the analysis engine utilizes Monte Carlo methods in which a random walk is taken through the space of hypotheses. Random does not mean inefficient or stupidly navigating without aim, direction, or purpose. In fact, efficiently navigating these huge spaces is a one of the innovations utilized by the analysis engine to improve the path taken by a random walk.

Consider the landscape of the hypothesis space 703 through which a random walk may be performed in which each axis is one dimension in the hypothesis space 703. On the vertical axis at element 701 hidden value 2 is represented and the horizontal axis at element 702, hidden value 1 is represented. Real spaces can have many dimensions, far more than the two dimensions shown here for the sake of simplicity. Height of the surface formed by the random walk method is the probability of the hidden variables, given data and modeling assumptions.

Exploration starts by taking a random step somewhere, anywhere, and if the step is higher then it is kept, but if the step is lower, then it is sometimes kept and other times it is not, electing to stay put instead. The result is extremely useful as it is guaranteed to explore the space in proportion to the true probability values. Over the long run two peaks result as can be seen in example provided, one corresponding to each of the provided dimensions (e.g., 701 and 702 at the two axes depicted). Conversely, simple hill climbing will get caught at the top of one hill and fail to yield the distinct peaks. Such an approach thus explores the whole of the hypothesis space whereas conventional techniques will not. Other innovations include added intelligence about jumps as well as functionality for exploring one or many dimensions at a time.

Figure 8:
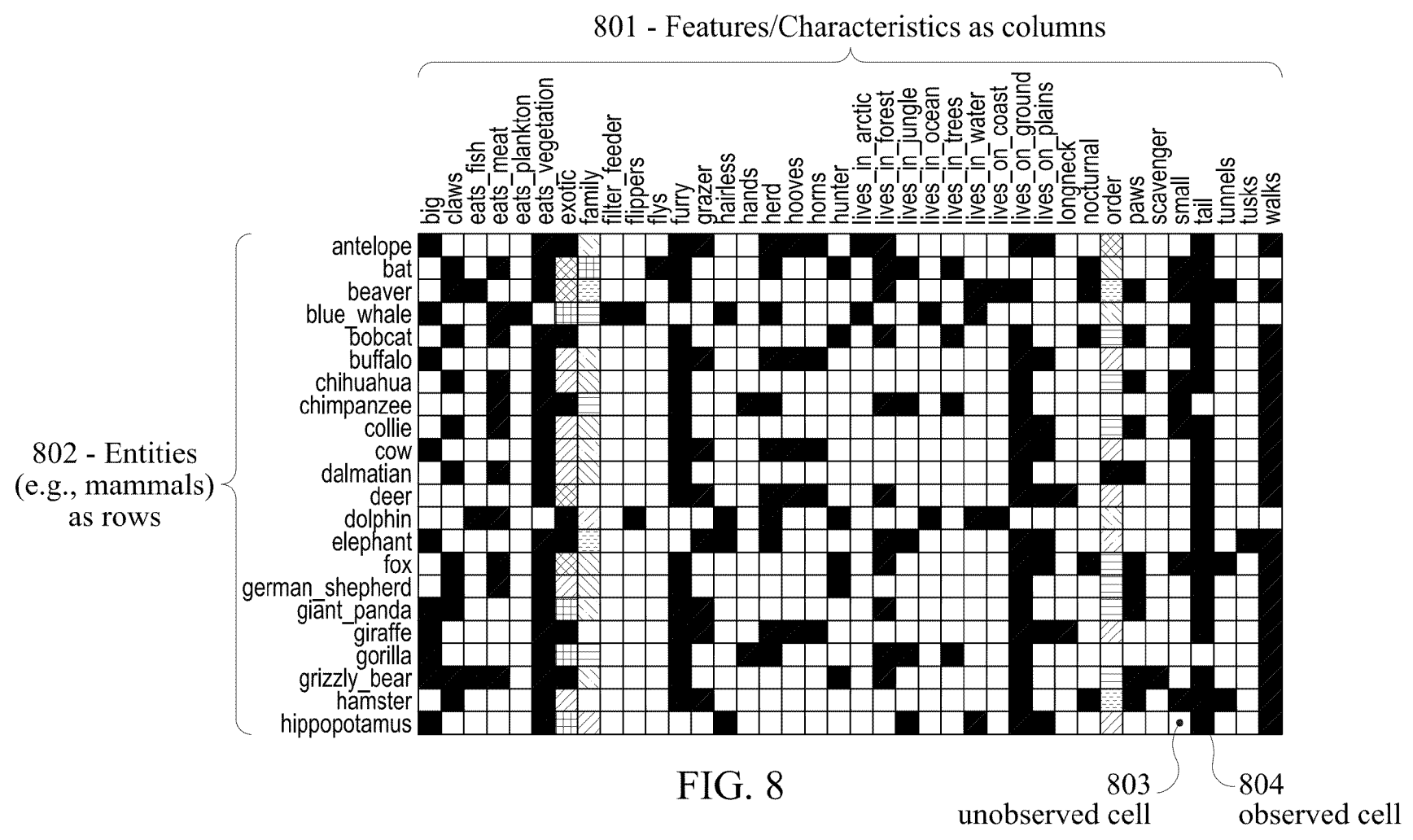

FIG. 8 depicts an exemplary tabular dataset. With tabular data, each row contains information about one particular entity and each of the many rows is independent from one another. Each column contains a single type of information, and such data may be data typed as, for example, numerical, categorical, Boolean, etc. Column types may be mixed and matched within a table and the data type applied or assigned for any given column is uniform amongst all cells or fields within the entire column, but one column's data type does not restrict any particular data type on any other column. Such tabular data is therefore a very good match to a single database table of a relational database which provides a tabular dataset. The tabular data is also a good match to a dataframe in "R."

In the exemplary table depicted, element 802 forms entities, each of the rows being mammals and at element 801, each of the columns are features, characteristics, or variables that describe the mammals. Most of the columns are data-typed as Boolean but some are categorical.

Note that element 804 depicts an observed cell, that is to say, data is provided for that cell in contrast to element 803 which is an unobserved cell for which there is no data available. The unobserved cells 803 thus are null values whereas observed cells have data populated in the field, whether that data is Boolean, categorical, a value, an enumerated element, or whatever is appropriate for the data type of the column. All of the cells depicted as white or blank are unobserved cells.

A co-assignment matrix for dimensions, where:

$$c_{ij}=\Pr[z_i=z_j]$$

results in the probability that dimensions i and j share a common cause and therefore are modeled by the same Dirichlet process mixture. Labels show the consensus dimension groups (probability >0.75). These reflect attributes that share a common cause and thus co-vary, while the remainder of the matrix captures correlations between these discovered causes, for instance, mammals rarely have feathers or fly, ungulates are not predators, and so forth. Each dimension group picks out a different cross-cutting categorization of the rows (e.g. vertebrates, birds, canines, etc.).

Figure 9:
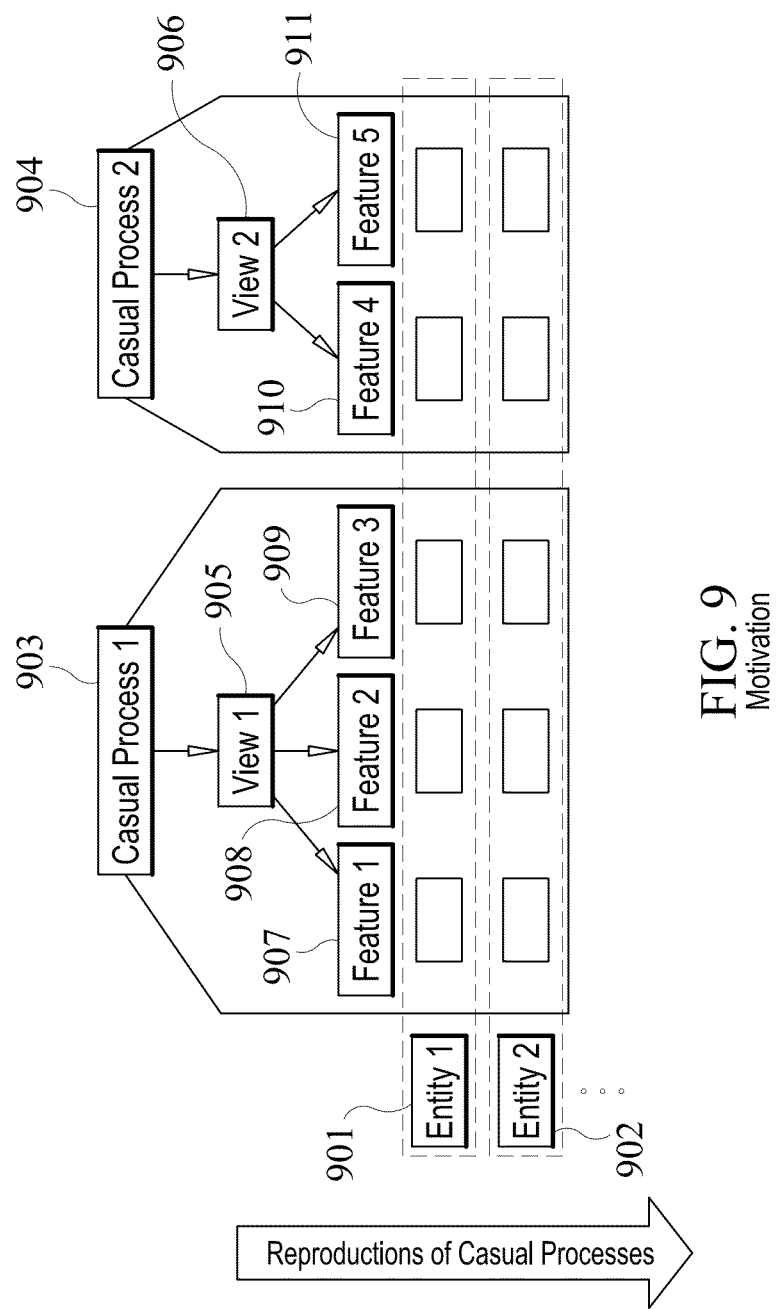
FIG. 9 depicts means for deriving motivation or causal relationships between observed data.

FIG. 9 depicts means for deriving motivation or causal relationships between observed data, such as the data provided in tabular form at FIG. 8. In the exemplary data about mammals and their characteristics, it may be expected that some causal relationships can be appropriately derived. Conversely, if the tabular data is modified such that the price of tea in China is provided, such data, although present and observed, intuitively does not in any way help or hurt the resultant predictions made about mammals based on the observed data. Such extraneous data (e.g., the price of tea in China within a table describing mammals) represents noise and needs to be accommodated because real-world data is very often noisy and poorly structured. The analysis engine needs to find the appropriate motivation for its predictions and not be misled by noisy irrelevant data, despite such data being actually "observed" within the provided dataset. Real-world data simply is not pristine and thus presents a very real problem if a scalable solution is to be utilized which renders appropriate predictions without requiring custom solutions to be developed manually for each and every dataset presented. The analysis engine must therefore employ models which understand that some data simply does not matter to a given hypothesis or predictive relationship. For instance, some columns may not matter or certain columns may carry redundant information. Some columns may therefore be predictively related and may thus be grouped together whereas others are not predictively related, and as such, are grouped separately. These groups of columns are referred to as "views."

Two distinct views are depicted. View 1 at element 905 resulting from casual process 1 (element 903) and view 2 at element 906 resulting from casual process 2 (element 904). Within each view 905 and 906, the rows are grouped into categories. As shown, view 1 corresponds to features 1-3 at elements 907, 908, and 909 and view 2 corresponds to features 4-5 at elements 910 and 911. Each of the "features" of the respective views corresponding to columns of the tabular dataset depicted at FIG. 8 which in the example provided, define characteristics, variables, or features about the respective mammals listed as entities (e.g., rows).

Entities 1-2 are then depicted at elements 901 and 902 and within the views the respective cell or field values are then depicted. Notably, the analysis engine has identified two column groupings, specifically, views 1 and 2 at elements 905 and 906, and thus, different predictive relationships may be identified which are tailored to the particular views.

Figure 10A:
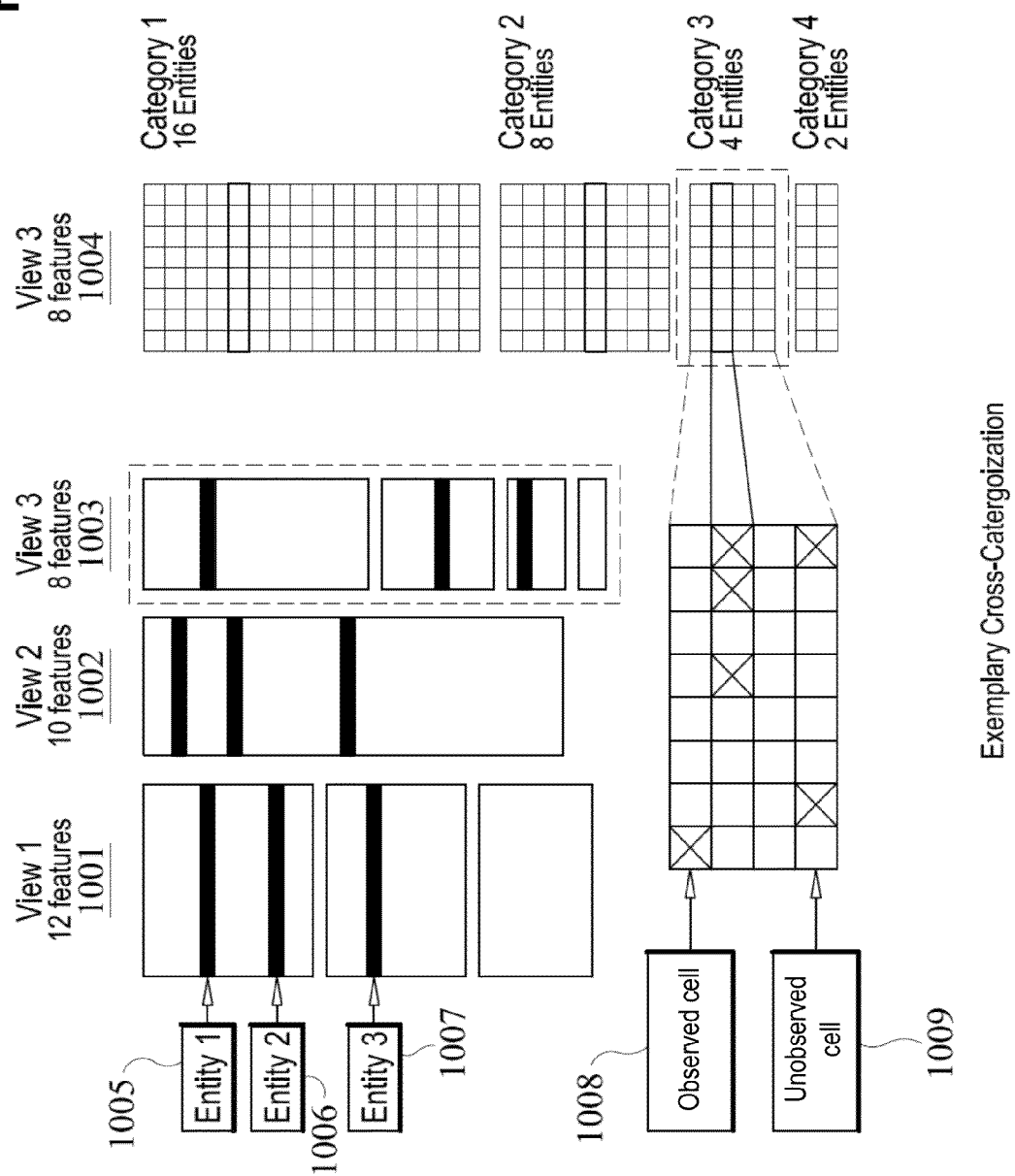
FIG. 10A depicts an exemplary cross-categorization in still further detail.

FIG. 10A depicts an exemplary cross-categorization in still further detail. Utilizing cross-categorization, columns/features are grouped into views and rows/entities are grouped into categories. Views 1-3 are depicted here in which view 1 at element 1001 has 12 features, view 2 at element 1002 has 10 features, and view 3 at element 1003 has 8 features. Again, the features of the respective views correspond to columns from the tabular dataset provided. At view 1 (element 1001) it can be seen that three entities are provided within the three different categories of the view. Entity 1 and 2 at elements 1005 and 1006 are both within the topmost category of view 1, entity 3 at element 1007 is within the middle category, and none of the specifically listed entities (e.g., rows) appear within the bottom category. The blacked out rows represent the entities 1-3 (1005, 1006, 1007) and as can be seen at view 2 (element 1002) the arrangement changes. At view 2 there are only 10 features and just one category which possesses all three of the listed entities (rows) 1005, 1006, and 1007. Then moving to view 3 at element 1003, there are four categories and each of the three blacked out entities (rows) 1005, 1006, and 1007 reside within distinct categories.

Element 1004 provides a zoomed in depiction of view 3, the same as element 1003 but with additional detail depicted. At element 1004 it can thus be seen that each of the categories possesses multiple entities, each with the actual data points corresponding to the cell values in from the table for the columns actually listed by the categories of view 3 at element 1004. For instance, category 1 has 16 total entities, category 2 has 8 entities, category 3 has 4 entities, and category 4 has two entities. Category 3 is then zoomed in still further such that it can be seen which data elements are observed cells 1008 (marked with "X") vs. unobserved cells 1009 (e.g., the blanks representing null values, missing data, unknown data, etc.).

A single cross-categorization is a particular way of slicing and dicing the table or dataset of tabular data. First by column and then by row, providing a particular kind of process to yield a desired structured space. A probability is then assigned to each cross-categorization thus resulting in probability distributions. More complex cross-categorizations yielding more views and more categories are feasible but are in actuality less probable in and of themselves and are therefore typically warranted only when the underlying data really supports them. The more complex cross-categorizations are supported but are not utilized by default.

Probabilistic modeling using clustering techniques, including inference in Dirichlet process mixture models, present difficulty when different dimensions are best explained by very different clusterings. Nevertheless, embodiments of the analysis engine described herein overcome such difficulties through an inference method which automatically discovers the number of independent nonparametric Bayesian models needed to explain the data, using a separate Dirichlet process mixture model for each group in an inferred partition of the dimensions. Unlike a Dirichlet Process mixture (DP mixture), the described implementation is exchangeable over both the rows of a heterogeneous data array (the samples) and the columns (new dimensions), and can therefore model any dataset as the number of samples and dimensions both go to infinity. Efficiency and robustness is improved through use of algorithms described which in certain instances require no preprocessing to identify veridical causal structure provided in raw datasets.

Clustering techniques are widely used in data analysis for problems of segmentation in industry, exploratory analysis in science, and as a preprocessing step to improve performance of further processing in distributed computing and in data compression. However, as datasets grow larger and noisier, the assumption that a single clustering or distribution over clusterings can account for all the variability in the observations becomes less realistic if not wholly infeasible.

From a machine learning perspective, this is an unsupervised version of the feature selection problem: different subsets of measurements will, in general, induce different natural clusterings of the data. From a cognitive science and artificial intelligence perspective, this issue is reflected in work that seeks multiple representations of data instead of a single monolithic representation.

As a limiting case, a robust clustering method is able to ignore an infinite number of uniformly random or perfectly deterministic measurements. The assumption that a single nonparametric model must explain all the dimensions is partly responsible for the accuracy issues a Dirichlet Process mixture often encounters in high dimensional settings. Dirichlet Process mixture based classifiers via class conditional density estimation highlight the problem. For instance, while a discriminative classifier can assign low weight to noisy or deterministic and therefore irrelevant dimensions, a generative model must explain them. If there are enough irrelevancies, it ignores the dimensions relevant to classification in the process. Combined with slow MCMC convergence, these difficulties have inhibited the use of nonparametric Bayesian methods in many applications.

To overcome these limitations, an unsupervised cross-categorization learning technique is utilized for clustering based on MCMC inference in a novel nested nonparametric Bayesian model. This model can be viewed as a Dirichlet Process mixture over the dimensions or columns of Dirichlet process mixture models over sampled data points or rows. Conditioned on a partition of the dimensions, the analysis engine's model reduces to an independent product of DP mixtures, but the partition of the dimensions, and therefore the number and domain of independent nonparametric Bayesian models, is also inferred from the data.

Standard feature selection results in the case where the partition of dimensions has only two groups. The described model utilizes an MCMC approach because both model selection and deterministic approximations seem intractable due to the combinatorial explosion of latent variables, with changing numbers of latent variables as the partition of the dimensions changes.

The hypothesis space captured by the described model is super-exponentially larger than that of a Dirichlet process mixture, with a very different structure than a Hierarchical Dirichlet Process. A generative process, viewed as a model for heterogeneous data arrays with N rows, D columns of fixed type and values missing at random, can be described as follows:

1. For each dimension d∈D:
   (a) Generate hyperparameters $\vec{\lambda}_d$ from an appropriate hyper-prior.
   (b) Generate the model assignment $z_d$ for dimension d from a Chinese restaurant process with hyperparameter α (with α from a vague hyperprior).
2. For each group g in the dimension partition $\{z_d\}$:
   (a) For each sampled datapoint (or row) r∈R, generate a cluster assignment $z_r^g$ from a Chinese restaurant process with hyperparameter $\alpha_g$ (with $\alpha_g$ from a vague hyperprior).
   (b) For each cluster c in the row partition for this group of dimensions $\{z_d^g\}$:
      i. For each dimension d, generate component model parameters $\vec{\theta}_c^d$ from an appropriate prior $\vec{\lambda}_d$.
      ii. For each data cell $x_{(r,d)}$ in this component ($z_r^{24}$=c for d∈D), generate its value from appropriate likelihood and $\vec{\theta}_c^d$.

In probability theory, the Chinese restaurant process is a discrete-time stochastic process, whose value at any positive-integer time n is a partition $B_n$ of the set $\{1, 2, 3, \ldots, n\}$ whose probability distribution is determined as follows: At time n=1, the trivial partition $\{\{1\}\}$ is obtained with probability 1 and at time n+1 the element n+1 is either: (a) added to one of the blocks of the partition $B_n$, where each block is chosen with probability |b|/(n+1) where |b| is the size of the block, or alternatively (b) added to the partition $B_n$ as a new singleton block, with probability 1/(n+1). The random partition so generated is exchangeable in the sense that relabeling $\{1, \ldots, n\}$ does not change the distribution of the partition, and it is consistent in the sense that the law of the partition of n−1 obtained by removing the element n from the random partition at time n is the same as the law of the random partition at time n−1.

The model encodes a very different inductive bias than the Indian buffet process (IBP) adaptation of the Chinese restaurant process, discovering independent systems of categories over heterogeneous data vectors, as opposed to features that are typically additively combined. It is also instructive to contrast the asymptotic capacity of the model with that of a Dirichlet Process mixture. The Dirichlet Process mixture has arbitrarily large asymptotic capacity as the number of samples goes to infinity. Stated differently, the Dirichlet Process mixture can model any distribution over finite dimensional vectors given enough data. However, if the number of dimensions (or features) is taken to infinity, it is no longer asymptotically consistent. That is, if a sequence of datasets is generated by sampling the first $K_1$ dimensions from a mixture and then append $K_2 \gg K_1$ dimensions that are constant valued (e.g. the price of tea in China), it will eventually be forced to model only those dimensions, ignoring the statistical structure in the first $K_1$. In contrast, the model implemented via the analysis engine according to the described embodiments has asymptotic capacity both in terms of the number of samples and the number of dimensions, and is infinitely exchangeable with respect to both quantities.

As a consequence, the model implemented via the analysis engine is self-consistent over the subset of variables measured, and can thus enjoy considerable robustness in the face of noisy, missing, and irrelevant measurements or confounding statistical signals. This is especially helpful in demographic settings and in high-throughput biology, where noisy, or coherently co-varying but orthogonal, measurements are the norm, and in which each data vector arises from multiple, independent, generative processes in the real-world.

The algorithm and model implemented via the analysis engine builds upon a general-purpose MCMC algorithm for probabilistic programs scaling linearly per iteration in the number of rows and columns and including inference over all hyperparameters.

FIG. 10B depicts an assessment of convergence, showing inferred versus ground truth providing joint score for greater than 1000 MCMC runs (200 iterations each) with varying dataset sizes (up to 512 by 512, requiring 1-10 minutes each) and true dimension groups. A strong majority of points fall near the ground truth dashed line, indicating reasonable convergence; perfect linearity is not expected, partly due to posterior uncertainty.

Massively parallel implementations exploit the conditional independencies in the described model. Because the described method is essentially parameter free (e.g. with improper uniform hyperpriors), robust to noisy and/or irrelevant measurements generated by multiple interacting causes, and supports arbitrarily sparsely observed, heterogeneous data, it may be broadly applicable in exploratory data analysis. Additionally, the performance of the utilized MCMC algorithm suggests that the described approach to nesting latent variable models in a Dirichlet process over dimensions may be applied to generate robust, rapidly converging, cross-cutting variants of a wide variety of nonparametric Bayesian techniques.

The predictive and latent structure query capability and associated APIs make use of a predictive database that finds the causes behind data and uses these causes to predict and explain the future in a highly automated fashion heretofore unavailable, thus allowing any developer to carry out scientific inquires against a dataset without requiring custom programming and consultation with mathematicians and other such experts. Such causes are revealed by latent structure and relationships learned by the analysis engine.

The predictive and latent structure query capability works by searching through the massive hypothesis space of all possible relationships present in a dataset, using an advanced Bayesian machine learning algorithm and thus offers developers: state of the art inference performance and predictive accuracy on a very wide range of real-world datasets, with no manual parameter tuning whatsoever; scalability to very large datasets, including very high-dimensional data with hundreds of thousands or millions of columns or rows; completely flexible predictions (e.g., able to predict the value of any subset of columns, given values for any other subset) without any retraining or adjustment as is necessary with conventional techniques when the data or the queries change. The predictive and latent structure query capability further provides quantification of the uncertainty associated with its predictions, since the system is built around a fully Bayesian probability model. For instance, a user may be presented with confidence indicators or scores of a resulting query, rankings, sorts, and so forth, according to the quality of a prediction rendered.

Described applications built on top of predictive and latent structure query capability range from predicting heart disease, to understanding health care expenditures, to assessing business opportunities and scoring a likelihood to successfully "close" such business opportunities (e.g., to successfully commensurate a sale, contract, etc.).

As noted previously, one of the problems with real-world data is that it tends to be messy with different kinds of data mixed together. For instance, structured and unstructured data is commonly blended together, data may be carelessly updated and thus filled with errors, data elements (e.g., cell or field values) are very often missing resulting in null values or unknown data points, and real-world data is nearly always lacking in documentation and is therefore not well understood, even by an organization that has collected and maintained such data, and therefore the data is not being exploited to its maximum benefit for that organization. Users of the data may also be be measuring the wrong thing, or may be measuring the same thing in ten different ways.

Such issues arise for various reasons. Perhaps there was never a DBA (Data Base Administrator) for the organization, or the DBA left, and ten years of sedimentary layers of data has since built up. Or the individuals responsible for data entry and maintenance simply have induced errors through natural human behavior and mistakes. All of these are very realistic and common problems with "real-world" data found in production databases for various organizations, in contrast to pristine and small datasets that may be found in a laboratory or test setting.

The analysis engine described herein which generates the queryable indices in support of the predictive queries must therefore accommodate "real-world" data as it actually exists in the wild. The analysis engine makes sense of data as it exists in real businesses and does not require a pristine dataset or data that conforms to idealistic constructs of what data looks like. The analysis engine generates indices which may be queried for many different questions about many different variables, in real time. The analysis engine is capable of getting at the hidden structures in such data, that is, which variables matter and what are the segments or groups within the data. At the same time, the analysis engine yields predictive relationships that are trustworthy, that is, through the models utilized by the analysis engine, misleading and erroneous relationships and predictions of a low predictive quality are avoided. Preferably, the analysis engine does not reveal things that are not true and does not report ghost patterns that may exist in a first dataset or sample, but do not hold up overall. Such desirable characteristics are exceedingly difficult to attain with customized statistical analysis and customized predictive modeling, and wholly unheard of in any automated system available to the marketplace today.

When making predictions, it is helpful to additionally let the users know whether they can trust the result. That is to say, how confident is the system is in the result by way of a quantitative measure such as a confidence indicator, confidence score, confidence interval, etc. Sometimes, it may be necessary for the system to literally respond by indicating: "I do not know" rather than providing a predicted result of low confidence quality or a result that is below a minimum confidence threshold set by the user. Accordingly, the system may return a result that indicates to the user that an answer is, for example, 1 or between 1 and 10 or between negative infinity and positive infinity, each to quantitatively define how confidence the system is in its result.

With probabilities, the system can advise the user that it is, for example, 90% confident that the answer given is real, accurate, and correct, or the system may alternatively return a result indicating that it simply lacks sufficient data, and thus, there is not enough known by which to render a prediction.

According to certain embodiments, the analysis engine utilizes a specially customized probabilistic model based upon foundational cross categorization modeling applied to tabular data. Conventionally available cross categorization models provide a good start but may nevertheless be improved. For instance, with conventionally available cross categorization models it is not possible to run equations. Conversely, the analysis engine implementation described herein overcomes this deficiency in the conventional arts by enabling such equation execution. Additionally, conventionally available cross categorization models relied upon matching data with the chosen model to understand hidden structure, much like building a probabilistic index, but requiring the model to be matched to the particular dataset to be analyzed proved so complex that users of such conventional cross categorization models required advanced mathematics knowledge and probability theory understanding merely to select and implement the appropriate model for any given dataset, rendering lay persons wholly incapable of realistically using such models. If an available tool is so complex that it cannot be utilized by a large segment of the population, then that tool is for all practical purposes, inaccessible to a large segment of the population, regardless of its existence and availability.

The analysis engine along with the supporting technologies described herein (e.g., such as the cloud computing interface and PreQL structured query language) aims to solve this problem by providing a service which includes distributed processing, job scheduling, persistence, check-pointing, and a user-friendly API or front-end interface which accepts lay users' questions and queries via the PreQL query structure which in turn drastically lowers the learning curve and eliminates specially required knowledge necessary to utilize such services. Other specialized front end GUIs and interfaces are additionally described to solve for particular use cases on behalf of users and provide other simple interfaces to complex problems of probability, thus lowering the complexity even further for those particular use cases.

Certain examples of specially implemented use cases include an interface to find similar entities so as to enable users to ask questions against a dataset such as: "What resolved support cases are most like this one?" Or alternatively: "Which previously-won sales opportunities does this present opportunity resemble?" Such an interface thus enables users to query their own dataset for answers that may help them solve a current problem, based on similar past solutions or win a current sales opportunity based on past wins that have a similar probabilistic relationship to the current opportunity profile.

Specific use case implementations additionally assist users in predicting unknown values. This may be for data that is missing from an otherwise populated dataset, such as null values, or to predict values that are unknowable because they remain in the future. For instance, interfaces may assist the user to predict an answer and associated confidence score or indication for questions such as "Will an opportunity be won?" Or "How much will this opportunity be worth if won?" Or "How much will I sell this quarter?"

Other use cases may help guide a users' decision making and behavior by asking questions such as "What should I do next to advance this opportunity?" Or "What additional products should I suggest for this customer?" These tools may be helpful to salespersons directly but also to sales managers, and other business individuals affected by the sales process.

Notably, an indication of predictive quality can be provided along with predictions to such questions or simply predictive values provided for missing data. These indications of predictive quality may be referred to as confidence scores, predictive quality indicators, and other names, but generally speaking, they are a reflection of the probability that a given event or value is likely to occur or likely to be true. There are many perspectives, but probability may be described as a statement, by an observer, about a degree of belief in an event, past, present, or future. Timing does not matter. Thus, probability may be considered as a statement of belief, as follows: "How likely is an event to occur" or "How likely is a value to be true for this dataset?"

Probability is needed because we cannot be 100% certain about what will happen, or in some instances, what has happened, and as such, the prediction is uncertain. What is uncertainty then? An observer, as noted above, does not know for sure whether an event will occur, notwithstanding the degree of belief in such an event having occurred, occurring, or to occur in the future.

Probabilities are assigned relative to knowledge or information context. Different observers can have different knowledge, and assign different probabilities to same event, or assign different probabilities even when both observers have the same knowledge. Probability, as used herein, may be defined as a number between "0" (zero) and "1" (one), in which 0 means the event is certain to not occur on one extreme of a continuum and where 1 means the event is certain to occur on the other extreme of the same continuum. Both extremes are interesting because they represent a complete absence of uncertainty.

A probability ties belief to one event. A probability distribution ties beliefs to every possible event, or at least, every event to be considered with a given model. Choosing the outcome space is an important modeling decision. Summed over all outcomes in space is a total probability which must be a total of "1," that is to say, one of the outcomes must occur, according to the model. Probability distributions are convenient mathematical forms that help summarize the system's beliefs in the various probabilities, but choosing a standard distribution is a modeling choice in which all models are wrong, but some are useful.

Consider for example, a Poisson distribution which is a good model when some event can occur 0 or more times in a span of time. The outcome space is the number of times the event occurs. The Poisson distribution has a single parameter, which is the rate, that is, the average number of times. Its mathematical form has some nice properties, such as, defined for all the non-negative integers that sum to 1.

Standard distributions are well known and there are many examples besides the Poisson distribution. Each such standard distribution encompasses a certain set of assumptions, such as a particular outcome space, a particular way of assigning probabilities to outcomes, etc. If you work with them, you'll start to understand why some are nice and some are frustrating if not outright detrimental to the problem at hand.

But distributions can be even more interesting. The analysis engine utilizes distributions which move beyond the standard distributions with specially customized modeling thus allowing for a more complex outcome space and thus further allowing for more complex ways of assigning probabilities to outcomes. For instance, a mixture distribution combines many simpler distributions to form a more complex one. A mixture of Gaussians to model any distribution may be employed, while still assigning probabilities to outcomes, yielding a more involved mathematical relationship.

With more complex outcome spaces, a Mondrian process defines a distribution on k-dimensional trees, providing means for dividing up a square or a cube. The outcome space is defined by all possible trees and resulting divisions look like the famous painting for which the process is named. The resulting outcome space is more structured than what is offered by the standard distributions. conventional cross categorization models do not use the Mondrian process, but they do use a structured outcome space. The analysis engine described herein utilizes the Mondrian process in select embodiments.

No matter how complex the resulting outcome space is, the analysis engine is capable of always assigning a valid probability to each and every outcome within the defined outcome space, and each probability assigned represents the degree of "belief" or the analysis engine's assessment of probabilistic quality according to the models applied as to the likelihood of the given outcome, and in which the sum of all probabilities across all possible outcomes for the space is "1."

Probabilistic models are utilized because they allow computers to "reason" automatically and systematically, according to the models utilized, even in the presence of uncertainty. Probability is the currency by which the analysis engine combines varying sources of information to reach the best possible answer in a systematic manner even when the information is vague, or uncertain, or ambiguous, as is very often the case with real-world data.

Unbounded categorical data types are additionally used to model categorical columns where new values that are not found in the dataset can show up. For example, most sales opportunities for database services will be replacing one of a handful of common existing systems, such as an Oracle implementation, but a new opportunity might be replacing a new system which has not been seen in the data ever before. The prior non-existence of the new value within in the dataset does not mean that is invalid, and as such, the new value is allowed to be entered for a typed column with a limited set of allowed values (e.g., an enumerated set) even though it is a previously unseen value. In terms of modeling, the system makes the following inferences: "Where a small number of values in an unbounded categorical data type have been seen heretofore, it is unlikely that a new value will be seen in the future;" and "where a large number of values in an unbounded categorical data type have been seen heretofore, it is more likely that a brand new value will be seen in the future."

Figure 11:
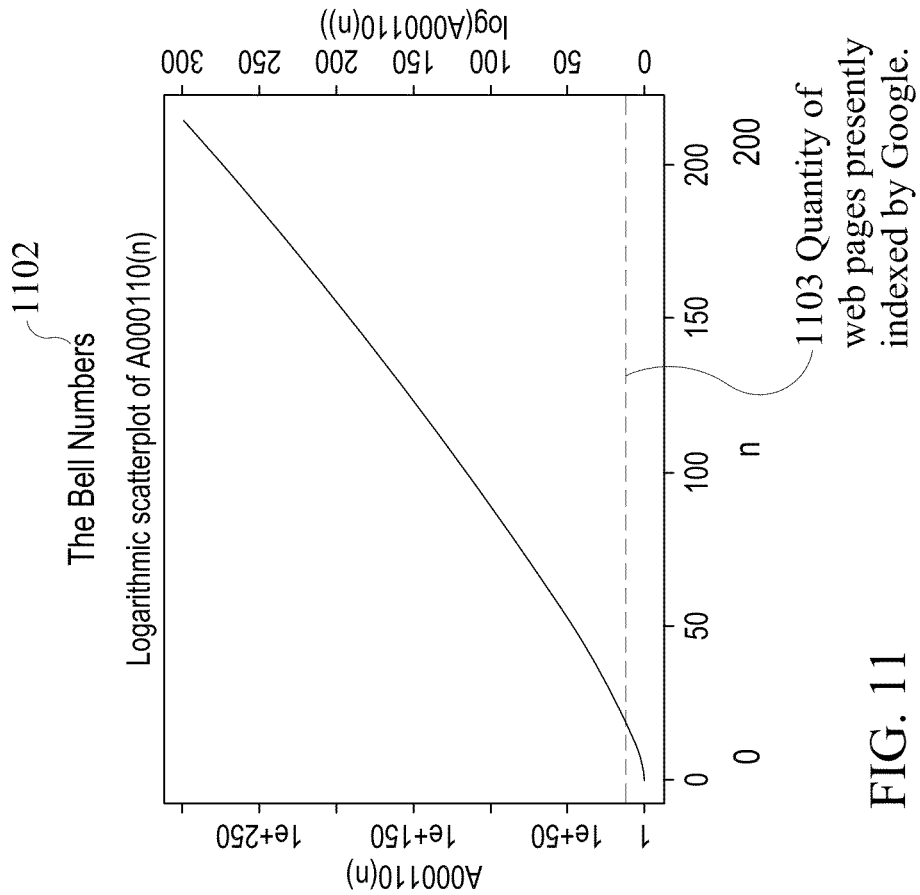
FIG. 11 depicts a chart and graph of the Bell number series.

FIG. 11 depicts a chart 1101 and graph 1102 of the Bell number series. The Bell numbers define the number of partitions for n labeled objects which, as can be seen from the graph 1102 on the right, grow very, very fast. A handful of objects are exemplified in the chart 1101 on the right. The graph 1102 plots n through 200 resulting in 1e+250 or a number with 250 zeros. Now consider the massive datasets available in a cloud computing multi-tenant database system which may easily result in datasets of interest with thousands of columns and millions of rows. Such datasets will not merely result in the Bell numbers depicted above, but rather, potentially the Bell's "squared," placing us firmly into the scale of numbers wholly inconceivable by human intellect and experience.

These numbers are so massive that it may be helpful to consider them in the following context. The hashed line at element 1103 near the bottom of the graph 1102 represents the approximate total quantity of web pages presently indexed by Google. Google only needs to search through the 17th bell number or so. The total space, however, so unimaginably massive that it simply is not possible to explore it exhaustively. Moreover, because the probability landscape is both vast and rugged rather than smooth or concave, brute force processing will not work and simple hill climbing methodologies are not sufficient either.

FIG. 12A depicts an exemplary cross categorization of a small tabular dataset. Here, the exemplary cross categorization consists of view 1 at element 1201 and view 2 at element 1202. Each of the views 1201 and 1202 include both features or characteristics 1204 (depicted as the columns) and entities 1203 (depicted as the rows). Segmenting each of the views 1201 and 1202 by whitespace between the entities 1203 (e.g., rows) are categories 1210, 1211, 1212, 1213, and 1214 within view 1 at element 1201 and categories 1215, 1216, 1217, and 1218 within view 2 at element 1202. Refer back to FIG. 10A for more examples and explanation about views and categories.

Views 1201 and 1202 pick out a subset of the features 1204 (e.g., columns) available for a dataset and the respective categories 1210-1218 within each view 1201 and 1202 pick out a subset of the entities 1203 (e.g. rows). Each column contains a single kind of data so each vertical strip within a category contains typed data such as numerical, categorical, etc. With such an exemplary cross categorization breakdown, the basic standardized distributions may be utilized more effectively.

In certain embodiments, each collection of points is modeled with a single simple distribution. Basic distributions that work well for each data type may be pre-selected and each selected basic distribution is only responsible for explaining a small subset of the actual data, for which it is particularly useful. Then using the mixture distribution discussed above, the basic distributions are combined such that many simple distributions are utilized to make a more complex one. The structure of the cross-categorization is used to chop up the data table into a bunch of pieces and each piece is modeled using the simple distribution selected based on applicable data type(s), yielding a big mixture distribution of the data.

Referring back to the tabular dataset describing certain mammals as depicted at FIG. 8, it can now be seen at FIG. 12A what the tabular data looks like after being subjected to a simplified cross categorization model as shown here with two views 1201 and 1202.

View 1202 on the right includes the habitat and feeding style features 1204 (columns) and the entities 1203 (rows) are divided into four categories 1215-1218 of land mammals (Persian cat through Zebra), sea predators (dolphin through walrus), baleen whales (blue whale and humpback whale only), and the outlier amphibious beaver (e.g., both land and water living; we do not suggest that mammal beavers have gills).

View 1201 on the left has another division in which the primates are grouped together, large mammals are grouped, grazers are grouped, and then a couple of data oddities at the bottom have been grouped together (bat and seal). Even with a small dataset it is easy to imagine different ways of dividing the data up. But data is ambiguous and there is no perfect or obviously correct division. For all the groupings that seemingly fit correctly, certain groupings may seem awkward or poor fitting. The systematic process of applying various models and assumptions makes tradeoffs and compromises, which is why even experts cannot agree on a single approach. Nevertheless, the means described herein permits use of a variety of available models such that these tradeoffs and compromises may be exploited systematically by the analysis engine to an extent and scale that a human expert simply cannot.

For instance, results by the analysis engine are not limited to a single cross-categorization model or breakdown. Instead, a collection of categorization models are utilized and such a collection when used together help to reveal the hidden structure of the data. For instance, if all the resulting categorizations were the same despite the use of varying categorization models, then there simply was no ambiguity in the data. But such a result does not occur with real-world data, despite being a theoretical possibility. Conversely, if all the resulting categorizations are all completely different, then the analysis engine did not find any structure in the data, which sometimes happens, and will therefore require some additional post-processing to get at the uncertainty, such as feeding in additional noise. Typically, however, something in between occurs, and some interesting hidden structure is revealed to the analysis engine from the data through the application of the collection of categorization models selected and utilized.

The specially customized cross-categorization implementations represent the processing and logic core of the analysis engine which, due to its use and complexity, is intentionally hidden from end users. Rather than accessing the analysis engine core directly, users are instead exposed to less complex interfaces via APIs, PreQL, JSON, and other specialized utility GUIs and interfaces which are implemented, for example, by the query interface depicted at element 180 of FIG. 1. Notwithstanding this layer of abstraction from analysis engine's core, users nevertheless benefit from the functionality described without having to possess a highly specialized understanding of mathematics and probability.

According to certain embodiments, the analysis engine further applies inference and search to the probability landscape developed, in certain instances by utilizing Monte Carlo methodologies. For instance, as exemplified by the Bell numbers, the space to be navigated may be massive. One approach therefore is to simply start somewhere, anywhere, and then compute the probability for the event, outcome, or value at that location within the available space. Next, another location within the space is selected and the probability again computed. Then in an iterative fashion, a determination is made whether to keep the new location or instead keep the earlier found location by comparing the probabilities, and then looping such that a new location is found, probability calculated, compared, and then selected or discarded, and so forth, until a certain amount of time or processing has expired or until a sufficient quality of result is attained (e.g., such as a probability or confidence score over a threshold, etc.).

Figure 12B:
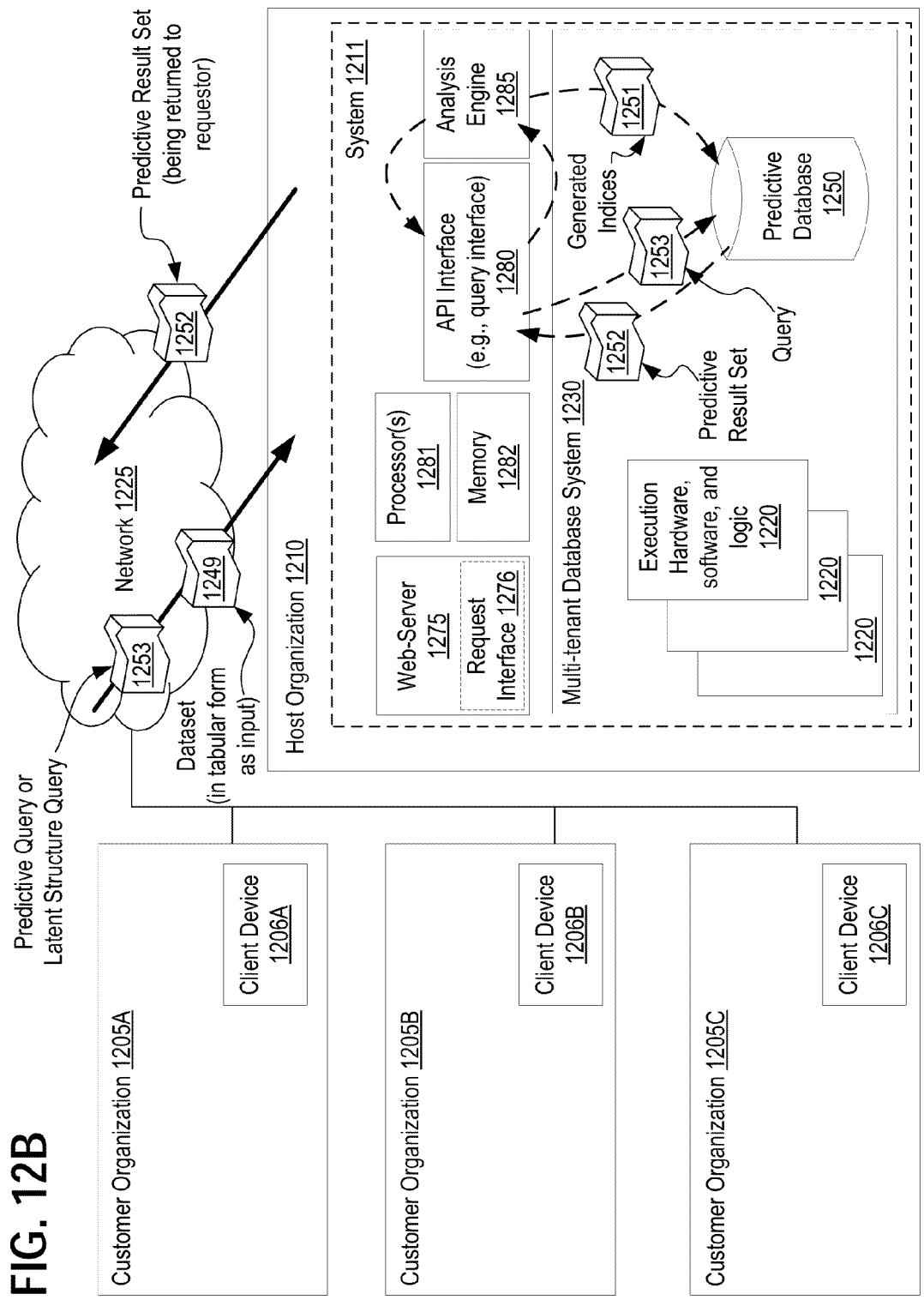
FIG. 12B depicts an exemplary architecture having implemented data upload, processing, and predictive query API exposure in accordance with described embodiments.

FIG. 12B depicts an exemplary architecture having implemented data upload, processing, and predictive query API exposure in accordance with described embodiments. In particular, customer organizations 1205A, 1205B, and 1205C are depicted, each with a client device 1206A, 1206B, and 1206C capable of interfacing with host organization 1210 via network 1225, including sending requests and receiving responses. Within host organization 1210 is a request interface 1276 which may optionally be implemented by web-server 1275. The host organization further includes processor(s) 1281, memory 1282, an API interface 1280, analysis engine 1285, and a multi-tenant database system 1230. Within the multi-tenant database system 1230 are execution hardware, software, and logic 1220 that are shared across multiple tenants of the multi-tenant database system 1230 as well as a predictive database 1250 capable of storing indices generated by the analysis engine to facilitate the return of predictive result sets responsive to predictive queries or latent structure queries executed against the predictive database 1250.

According to one embodiment, the host organization 1210 operates a system 1211 having at least a processor 1281 and a memory 1282 therein, the system 1211 being enabled to receive tabular datasets as input, process the dataset according to the methodologies described herein, then execute predictive and latent structure query requests received against indices stored by the predictive database 1250.

In accordance with one embodiment there is a system 1211 that is to operate within a host organization 1210, in which the system includes at least: a processor 1281 to execute instructions stored in memory 1282 of the system 1211; a request interface 1276 to receive as input a dataset 1249 in a tabular form, the dataset 1249 having plurality of rows and a plurality of columns; an analysis engine 1285 to process the dataset 1249 and generate indices 1251 representing probabilistic relationships between the rows and the columns of the dataset 1249; a predictive database 1250 to store the generated indices 1251; the request interface 1276 to further receive a request for a predictive and/or latent structure query 1253 against the indices stored in the predictive database 1250; an Application Programming Interface (API) 1280 to query the indices stored in the predictive database 1250 for a predictive result set 1252 based on the request; and in which the request interface 1276 is to return the predictive result set 1252 responsive to the request received.

In one embodiment, such a system 1211 further includes a web-server 1275 to implement the request interface 1276. In such an embodiment, the web-server 1275 is to receive as input, a plurality of access requests from one or more client devices 1206A-C from among a plurality of customer organizations 1205A-C communicably interfaced with the host organization 1210 via a network 1225. According to such an embodiment, the system 1211 further includes a multi-tenant database system 1230 with predictive database functionality to implement the predictive database; and further in which each customer organization 1205A-C is an entity selected from the group consisting of: a separate and distinct remote organization, an organizational group within the host organization, a business partner of the host organization, or a customer organization that subscribes to cloud computing services provided by the host organization.

Figure 12C:
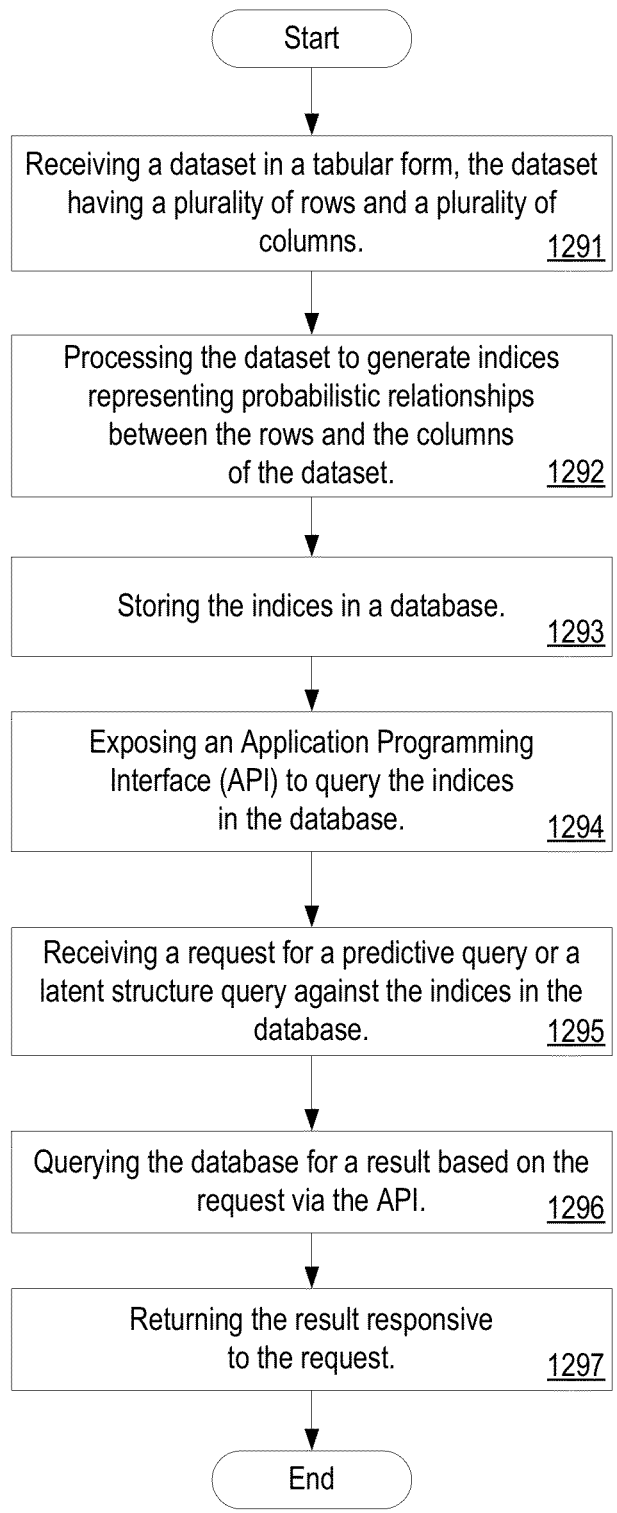
FIG. 12C is a flow diagram illustrating a method for implementing data upload, processing, and predictive query API exposure in accordance with disclosed embodiments.

FIG. 12C is a flow diagram illustrating a method 1221 for implementing data upload, processing, and predictive query API exposure in accordance with disclosed embodiments. Method 1221 may be performed by processing logic that may include hardware (e.g., circuitry, dedicated logic, programmable logic, microcode, etc.), software (e.g., instructions run on a processing device to perform various operations such transmitting, sending, receiving, executing, generating, calculating, storing, exposing, querying, processing, etc., in pursuance of the systems, apparatuses, and methods for implementing data upload, processing, and predictive query API exposure, as described herein. For example, host organization 110 of FIG. 1, machine 400 of FIG. 4, or system 1211 of FIG. 12B may implement the described methodologies. Some of the blocks and/or operations listed below are optional in accordance with certain embodiments. The numbering of the blocks presented is for the sake of clarity and is not intended to prescribe an order of operations in which the various blocks must occur.

At block 1291, processing logic receives a dataset in a tabular form, the dataset having a plurality of rows and a plurality of columns.

At block 1292, processing logic processes the dataset to generate indices representing probabilistic relationships between the rows and the columns of the dataset.

At block 1293, processing logic stores the indices in a database.

At block 1294, processing logic exposes an Application Programming Interface (API) to query the indices in the database.

At block 1295, processing logic receives a request for a predictive query or a latent structure query against the indices in the database.

At block 1296, processing logic queries the database for a result based on the request via the API.

At block 1297, processing logic returns the result responsive to the request. For instance, a predictive record set may be returned having therein one or more predictions or other elements returned, such as a predictive record set describing group data, similarity data, and/or related data.

According to another embodiment of method 1221, processing the dataset includes learning a joint probability distribution over the dataset to identify and describe the probabilistic relationships between elements of the dataset.

According to another embodiment of method 1221, the processing is triggered automatically responsive to receiving the dataset, and in which learning the joint probability distribution is controlled by a default set of configuration parameters.

According to another embodiment of method 1221, learning the joint probability distribution is controlled by specified configuration parameters, the specified configuration parameters including one or more of: a maximum period of time for processing the dataset; a maximum number of iterations for processing the dataset; a minimum number of iterations for processing the dataset; a maximum amount of customer resources to be consumed by processing the dataset; a maximum subscriber fee to be expended processing the dataset; a minimum threshold predictive quality level to be attained by the processing of the dataset; a minimum improvement to a predictive quality measure required for the processing to continue; and a minimum or maximum number of the indices to be generated by the processing.

According to another embodiment of method 1221, processing the dataset to generate indices includes iteratively learning joint probability distributions over the dataset to generate the indices.

According to another embodiment, the method 1221 further includes: periodically determining a predictive quality measure of the indices generated by the processing of the dataset; and terminating processing of the dataset when the predictive quality measure attains a specified threshold.

According to another embodiment, the method 1221 further includes: receiving a query requesting a prediction from the indices generated by processing the dataset; and executing the query against the generated indices prior to terminating processing of the dataset.

According to another embodiment, the method 1221 further includes: returning a result responsive to the query requesting the prediction; and returning a notification with the result indicating processing of the dataset has not yet completed or a notification with the result indicating the predictive quality measure is below the specified threshold, or both.

According to another embodiment of method 1221, the predictive quality measure is determined by comparing a known result corresponding to observed and present values within the dataset with a predictive result obtained by querying the indices generated by the processing of the dataset.

According to another embodiment of method 1221, the predictive quality measure is determined by comparing ground truth data from the data set with one or more predictive results obtained by querying the indices generated by the processing of the dataset.

According to another embodiment of method 1221, processing the dataset includes at least one of: learning a Dirichlet Process Mixture Model (DPMM) of the dataset; learning a cross categorization of the dataset; learning an Indian buffet process model of the dataset; and learning a mixture model or a mixture of finite mixtures model of the dataset.

According to another embodiment of method 1221, receiving the dataset includes at least one of the following: receiving the dataset as a table having the columns and rows; receiving the dataset as data stream; receiving a spreadsheet document and extracting the dataset from the spreadsheet document; receiving the dataset as a binary file created by a database; receiving one or more queries to a database and responsively receiving the dataset by executing the one or more queries against the database and capturing a record set returned by the one or more queries as the dataset; receiving a name of a table in a database and retrieving the table from the database as the dataset; receiving search parameters for a specified website and responsively querying the search parameters against the specified website and capturing search results as the dataset; and receiving a link and authentication credentials for a remote repository and responsively authenticating with the remote repository and retrieving the dataset via the link.

According to another embodiment of method 1221, each of the plurality of rows in the dataset corresponds to an entity; in which each of the plurality of columns corresponds to a characteristic for the entities; and in which a point of intersection between each respective row and each of the plurality of columns forms a cell to store a value at the point of intersection.

According to another embodiment of method 1221, each entity represents a person, a place, or a thing; and in which each characteristic represents a characteristic, feature, aspect, quantity, range, identifier, mark, trait, or observable fact; in which each cell stores a data typed value at the point of intersection between each respective row and each of the plurality of columns, the value representing the characteristic for the entity's row that intersects a column corresponding to the characteristic; and in which the value of every cell is either null, different, or the same as any other value of any other cell.

According to another embodiment of method 1221, each of the plurality of columns has a specified data type.

According to another embodiment of method 1221, each data type corresponds to one of: Boolean; a categorical open set; a categorical closed set; a set-valued data type defining a collection of values, a collection of identifiers, and/or a collection of strings within a document; a quantity count; floating point numbers; positive floating point numbers; strings;

latitude and longitude pairs; vectors; positive integers; a text file; and a data file of a specified file type.

According to another embodiment of method 1221, receiving a dataset in a tabular form includes: receiving relational database objects having multiple tables with inter-relationships across the multiple tables; and in which processing the dataset includes generating indices from the columns and the rows amongst the multiple tables while conforming to the inter-relationships amongst the multiple tables.

For instance, the generative process by which the analysis engine creates the indices may first divide the features/columns into kinds, and then for each kind identified, the analysis engine next divides the entities/rows into categories. The analysis engine utilizes models that provides kinds for which each of the features provide predictive information about other features within the same kind and for which each category contains entities that are similar according to the features in the respective kind as identified by the model.

PreQL structured queries allow access to the queryable indices generated by the analysis engine through its modeling via specialized calls, including: "RELATED," "SIMILAR," "GROUP," and "PREDICT."

According to another embodiment of method 1221, the processing further includes executing Structured Query Language (SQL) operations against two more of the multiple tables to form the dataset; in which the SQL operations include at least one of an SQL transform operation, an SQL aggregate operation, and an SQL join operation.

According to another embodiment of method 1221, the indices are stored within a predictive database system of a host organization; and in which the method further includes: receiving a plurality of access requests for indices stored within the predictive database system of the host organization, each of the access requests originating from one or more client devices of a plurality of customer organizations, in which each customer organization is selected from the group consisting of: a separate and distinct remote organization, an organizational group within the host organization, a business partner of the host organization, or a customer organization that subscribes to cloud computing services provided by the host organization.

According to another embodiment of method 1221, the predictive database system is operationally integrated with a multi-tenant database system provided by the host organization, the multi-tenant database system having elements of hardware and software that are shared by a plurality of separate and distinct customer organizations, each of the separate and distinct customer organizations being remotely located from the host organization having the predictive database system and the multi-tenant database system operating therein.

According to another embodiment of method 1221, receiving a dataset includes receiving the dataset at a host organization providing on-demand cloud based services that are accessible to remote computing devices via a public Internet; and in which storing the indices in a database includes storing the indices in a predictive database system operating at the host organization via operating logic stored in memory of the predictive database system and executed via one or more processors of the predictive database system.

According to another embodiment of method 1221, storing the indices in the database includes storing the indices in a predictive database; and in which exposing the API to query the indices includes exposing a Predictive Query Language (PreQL) API.

According to another embodiment of method 1221, receiving the request for a predictive query or a latent structure query against the indices in the database includes receiving a PreQL query specifying at least one command selected from the group of PreQL commands including: PREDICT, RELATED, SIMILAR, and GROUP.

According to a particular embodiment there is a non-transitory computer readable storage medium having instructions stored thereon that, when executed by a processor in a host organization, the instructions cause the host organization to perform operations including: receiving a dataset in a tabular form, the dataset having a plurality of rows and a plurality of columns; processing the dataset to generate indices representing probabilistic relationships between the rows and the columns of the dataset; storing the indices in a database; exposing an Application Programming Interface (API) to query the indices in the database; receiving a request for a predictive query or a latent structure query against the indices in the database; querying the database for a prediction based on the request via the API; and returning the prediction responsive to the request.

The non-transitory computer readable storage medium may embody and cause to be performed, any of the methodologies described herein.

In another embodiment, processing of the tabular dataset is triggered manually or automatically upon receipt of the tabular dataset as input at the host organization. When triggered manually, an "UPLOAD" command may be issued to pass the tabular dataset to the analysis engine or to specify a target dataset to the analysis engine for analysis from which the predictive indices are generated. In yet another embodiment, an "ANALYZE" command may be issued to instruct the analysis engine to initiate analysis of a specified dataset. In certain embodiments, the UPLOAD and ANALYZE command terms are used but are hidden from the user and are instead issued by interfaces provided to the user to reduce complexity of the system for the user.

Functionality of the analysis engine which generates the indices from the tabular datasets is computationally intensive and is thus, is well suited for a distributed computing structure provided by a cloud based multi-tenant database system architecture.

According to the described embodiments, the resulting database appears to its users much like a traditional database. But instead of selecting columns from existing rows, users may issue predictive query requests via a structured query language. Such a structured language, rather than SQL may be referred to as Predictive Query Language ("PreQL"). PreQL is not to be confused with PQL which is short for the "Program Query Language."

PreQL is thus used to issue queries against the database to predict values, events, or outcomes according to models applied to the dataset at hand by the analysis engine and its corresponding functionality. Such a PreQL query offers the same flexibility as SQL-style queries. When exploring structure, users may issue PreQL queries seeking notions of similarity that are hidden or latent in the overall data without advanced knowledge of what those similarities may be. Users may issue predictive queries seeking notions of relatedness amongst the columns without having to know those relations beforehand. Users may issue predictive queries seeking notions of groupings amongst entities within the dataset without having to know or define such groupings or rules for such groupings before hand. And when used within a multi-tenant database system against a massive cloud based database and its dataset, such features are potentially transformative in the computing arts.

Figure 12D:
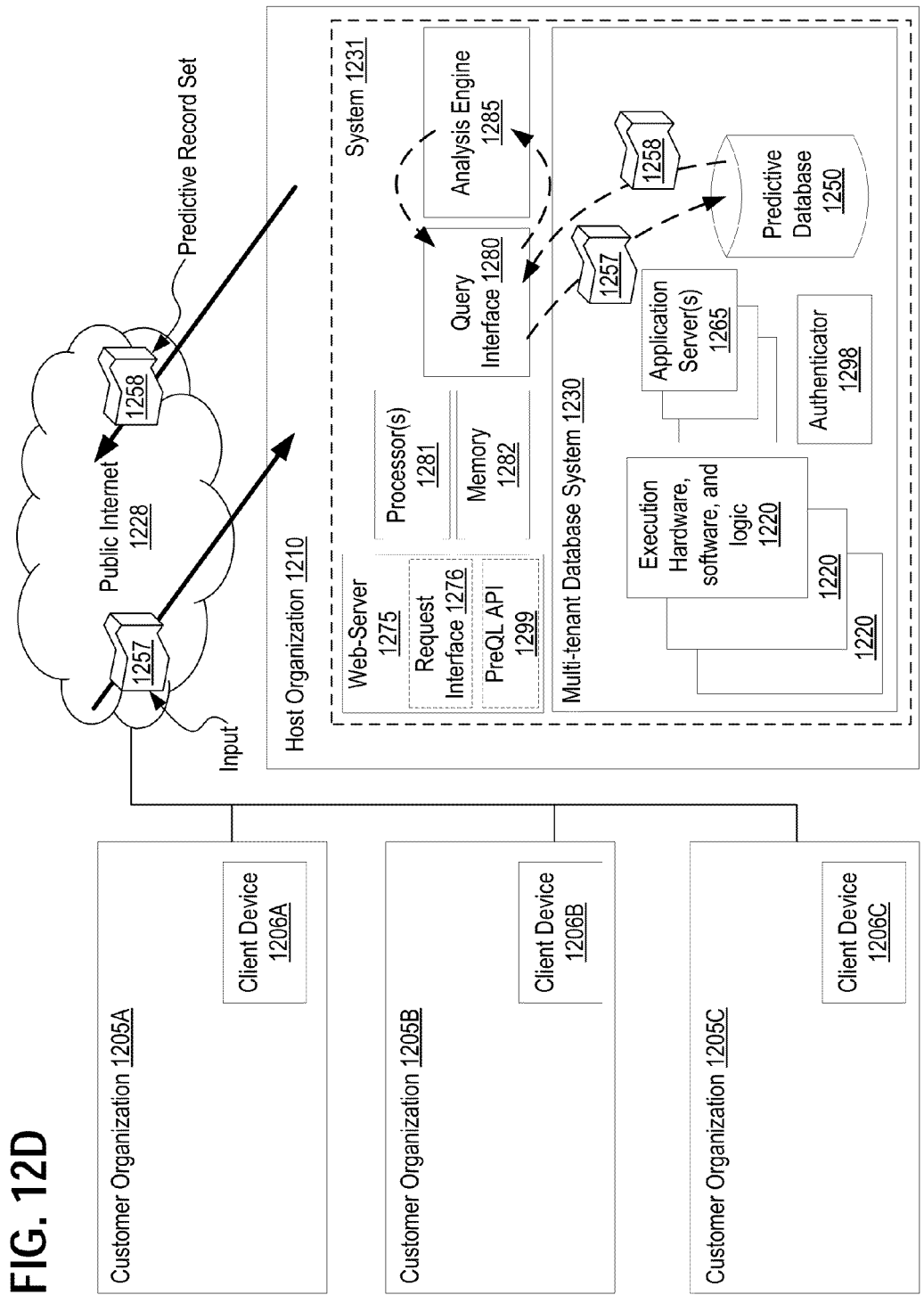
FIG. 12D depicts an exemplary architecture having implemented predictive query interface as a cloud service in accordance with described embodiments.

FIG. 12D depicts an exemplary architecture having implemented predictive query interface as a cloud service in accordance with described embodiments. In particular, customer organizations 1205A, 1205B, and 1205C are depicted, each with a client device 1206A, 1206B, and 1206C capable of interfacing with host organization 1210 via public Internet 1228, including sending queries (e.g., input 1257) and receiving responses (e.g., predictive record set 1258). Within host organization 1210 is a request interface 1276 which may optionally be implemented by web-server 1275. The host organization further includes processor(s) 1281, memory 1282, a query interface 1280, analysis engine 1285, and a multi-tenant database system 1230. Within the multi-tenant database system 1230 are execution hardware, software, and logic 1220 that are shared across multiple tenants of the multi-tenant database system 1230, authenticator 1298, one or more application servers 1265, as well as a predictive database 1250 capable of storing indices generated by the analysis engine 1285 to facilitate the return of the predictive record set (1258) responsive to predictive queries and/or latent structure queries (e.g., requested via input 1257) executed against the predictive database 1250.

According to one embodiment, the host organization 1210 operates a system 1231, in which the system 1231 includes at least: a processor 1281 to execute instructions stored in memory 1282 of the system 1231; a request interface 1276 exposed to client devices 1206A-C that operate remotely from the host organization 1210, in which the request interface 1276 is accessible by the client devices 1206A-C via a public Internet 1228; and a predictive database 1250 to execute as an on-demand cloud based service for one or more subscribers, such as those operating the client devices 1206A-C or are otherwise affiliated with the various customer organizations 1205A-C to which such services are provided. According to such an embodiment, such a system 1231 further includes an authenticator 1298 to verify that client devices 1206A-C are associated with a subscriber and to further verify authentication credentials for the respective subscriber; in which the request interface is to receive as input, a request from the subscriber; the system 1231 further including one or more application servers 1265 to execute a query (e.g., provided as input 1257 via the public Internet 1228) against indices of the predictive database 1250 generated from a dataset of columns and rows on behalf of the subscriber, in which the indices represent probabilistic relationships between the rows and the columns of the dataset; and in which the request interface 1276 of the system 1231 is to further return a predictive record set 1258 to the subscriber responsive to the request.

According to another embodiment, such a system 1231 further includes a web-server 1275 to implement the request interface, in which the web-server 1275 is to receive as input 1257, a plurality of access requests from one or more client devices 12066A-C from among a plurality of customer organizations 1205A-C communicably interfaced with the host organization via a network traversing at least a portion of the public Internet 1228, in which each customer organization 105A-C is an entity selected from the group consisting of: a separate and distinct remote organization, an organizational group within the host organization, a business partner of the host organization, or a customer organization that subscribes to cloud computing services provided by the host organization 1210. According to such an embodiment, a multi-tenant database system 1230 at the host organization 1210 with predictive database functionality is to implement the predictive database.

According to another embodiment, system 1231 includes an analysis engine 1285 to process the dataset and to generate the indices representing probabilistic relationships between the rows and the columns of the dataset, and further in which the predictive database 1250 is to store the generated indices. According to another embodiment of the system 1231, a Predictive Query Language Application Programming Interface (PreQL API 1299) is exposed to the subscribers at the request interface 1276, in which the PreQL API 1299 accepts PreQL queries (e.g., as input 1257) having at least at least one command selected from the group of PreQL commands including: PREDICT, RELATED, SIMILAR, and GROUP, subsequent to which the PreQL API 1299 executes the PreQL queries against the predictive database and returns a predictive record set 1258.

In such a way, use of the PreQL structure queries permits programmatic queries into the indices generated and stored within the predictive database in a manner similar to a programmer making SQL queries into a relational database. Rather than a "SELECT" command term, a variety of predictive PreQL based command terms are instead utilized, such as the "PREDICT" or "SIMILAR" or "RELATED" or "GROUP" statements. For instance, an exemplary PreQL statement may read as follows: "PREDICT IS_WON, DOLLAR_AMOUNT FROM OPPORTUNITY WHERE STAGE='QUOTE'." So in this example, "QUOTE" is the fixed column, "FROM" is the dataset from which an opportunity is to be predicted, the "PREDICT" command term is the call into the appropriate function, "IS_WON" is the value to be predicted, that is to say, the functionality is to predict whether a given opportunity is likely or unlikely to be won where the "IS_WON" may have completed data for some rows but be missing for other rows due to, for example, pending or speculative opportunities, etc. "DOLLAR_AMOUNT" is the fixed value.

In certain embodiments, the above query is implemented via a specialized GUI interface which accepts inputs from a user via the GUI interface and constructs, calls, and returns data via the PREDICT functionality on behalf of the user without requiring the user actually write or even be aware of the underlying PreQL structure query made to the analysis engine's core.

Another exemplary PreQL statement may read as follows: SELECT ID; FROM Opportunity WHERE SIMILAR/Stage/001>0.8 ORDER BY SIMILAR/Stage LIMIT 100. In this example, a particular ID is being pulled from the "Opportunity" table in the database and then the SIMILAR command term is used to find identify the entities or rows similar to the ID specified, so long as they have a confidence quality indicator equal to or greater than "0.8," and finally the output is ordered by stage and permitted to yield output of up to 100 total records. This particular example utilizes a mixture of both SQL and PreQL within the query (e.g., the "SELECT" command term is a SQL command and the "SIMILAR" command term is specific to PreQL).

FIG. 12E is a flow diagram illustrating a method for implementing predictive query interface as a cloud service in accordance with disclosed embodiments. Method 1222 may be performed by processing logic that may include hardware (e.g., circuitry, dedicated logic, programmable logic, microcode, etc.), software (e.g., instructions run on a processing device to perform various operations such transmitting, sending, receiving, executing, generating, calculating, storing, exposing, authenticating, querying, processing, returning, etc., in pursuance of the systems, apparatuses, and methods for implementing predictive query interface as a cloud service, as described herein. For example, host organization 110 of FIG. 1, machine 400 of FIG. 4, or system 1231 of FIG. 12D may implement the described methodologies. Some of the blocks and/or operations listed below are optional in accordance with certain embodiments. The numbering of the blocks presented is for the sake of clarity and is not intended to prescribe an order of operations in which the various blocks must occur.

At block 1270, processing logic exposes an interface to client devices operating remotely from the host organization, in which the interface is accessible by the client devices via a public Internet.

At block 1271, processing logic executes a predictive database at the host organization as an on-demand cloud based service for one or more subscribers.

At block 1272, processing logic authenticates one of the client devices by verifying the client device is associated with one of the subscribers and based further on authentication credentials for the respective subscriber.

At block 1273, processing logic receives a request from the authenticated subscriber via the interface.

At block 1274, processing logic executes a predictive query or a latent structure query against indices of the predictive database generated from a dataset of columns and rows on behalf of the authenticated subscriber, the indices representing probabilistic relationships between the rows and the columns of the dataset.

At block 1279, processing logic returns a predictive record set to the authenticated subscriber responsive to the request.

According to another embodiment of method 1222, executing the query includes executing a Predictive Query Language (PreQL) query against the predictive database.

According to another embodiment of method 1222, executing the PreQL query includes querying the predictive database by specifying at least one command selected from the group of PreQL commands including: PREDICT, RELATED, SIMILAR, and GROUP.

According to another embodiment of method 1222, receiving the request includes receiving the PreQL query from the authenticated subscriber via a Predictive Query Language (PreQL) API exposed directly to the authenticated subscriber via the interface.

According to another embodiment of method 1222, receiving the request includes: presenting a web form to the authenticated subscriber; receiving inputs from the authenticated subscriber via the web form; generating a PreQL query on behalf of the authenticated subscriber based on the inputs; querying the predictive database via a Predictive Query Language (PreQL) API by specifying at least one command selected from the group of PreQL commands including: PREDICT, RELATED, SIMILAR, and GROUP.

According to another embodiment of method 1222, the authenticated subscriber accesses the on-demand cloud based service via a web-browser provided by a third party different than the host organization; and in which the authenticated subscriber submits the request to the host organization and receives the predictive record set from the host organization without installing any software from the host organization on the client device.

According to another embodiment, method 1222 further includes: receiving the dataset from the authenticated subscriber prior to receiving the request from the authenticated subscriber; and processing the dataset on behalf of the authenticated subscriber to generate the indices, each of the indices representing probabilistic relationships between the rows and the columns of the dataset.

According to another embodiment of method 1222, receiving the dataset includes at least one of: receiving the dataset as a table having the columns and rows; receiving the dataset as data stream; receiving a spreadsheet document and extracting the dataset from the spreadsheet document; receiving the dataset as a binary file created by a database; receiving one or more queries to a database and responsively receiving the dataset by executing the one or more queries against the database and capturing a record set returned by the one or more queries as the dataset; receiving a name of a table in a database and retrieving the table from the database as the dataset; receiving search parameters for a specified website and responsively querying the search parameters against the specified website and capturing search results as the dataset; and receiving a link and authentication credentials for a remote repository and responsively authenticating with the remote repository and retrieving the dataset via the link.

According to another embodiment of method 1222, processing the dataset on behalf of the authenticated subscriber includes learning a joint probability distribution over the dataset to identify and describe the probabilistic relationships between elements of the dataset.

According to another embodiment of method 1222, the processing is triggered automatically responsive to receiving the dataset, and in which learning the joint probability distribution is controlled by specified configuration parameters, the specified configuration parameters including one or more of: a maximum period of time for processing the dataset; a maximum number of iterations for processing the dataset; a minimum number of iterations for processing the dataset; a maximum amount of customer resources to be consumed by processing the dataset; a maximum subscriber fee to be expended processing the dataset; a minimum threshold confidence quality level to be attained by the processing of the dataset; a minimum improvement to a confidence quality measure required for the processing to continue; and a minimum or maximum number of the indices to be generated by the processing.

According to another embodiment of method 1222, processing the dataset includes iteratively learning joint probability distributions over the dataset to generate the indices; and in which the method further includes: periodically determining a predictive quality measure of the indices generated by the processing of the dataset; and terminating processing of the dataset when the confidence quality measure attains a specified threshold.

According to another embodiment, method 1222 further includes: returning a notification with the predictive record set indicating processing of the stored dataset has not yet completed or a notification with the predictive record set indicating the confidence quality measure is below the specified threshold, or both.

According to another embodiment of method 1222, the confidence quality measure is determined by comparing a known result corresponding to known and non-null values within the dataset with a predictive record set obtained by querying the indices generated by the processing of the dataset.

According to another embodiment of method 1222, the host organization includes a plurality of application servers; in which the processing further includes distributing the generation of the indices and storing of the indices amongst multiple of the application servers; in which executing the query against indices of the predictive database includes querying multiple of the generated indices among multiple of the application servers to which the indices were distributed and stored; and aggregating results returned by the querying of the multiple of the generated indices.

According to another embodiment of method 1222, querying the generated indices in parallel yields different results from different versions of the indices at the multiple of the application servers to which the indices were distributed and stored.

According to another embodiment, method 1222 further includes: aggregating the different results; and returning one predictive record set responsive to an executed latent structure query or one prediction responsive to an executed predictive query.

According to another embodiment of method 1222, a greater quantity of the generated indices corresponds to an improved prediction accuracy; and in which a greater quantity of the application servers to which the indices are distributed and stored corresponds to an improved response time for executing the query.

According to another embodiment, method 1222 further includes: receiving a specified data source from the authenticated subscriber; and periodically updating the indices based on the specified data source.

According to another embodiment of method 1222, periodically updating the indices includes one of: initiating a polling mechanism to check for changes at the specified data source and retrieving the changes when detected for use in updating the indices; receiving push notifications from the specified data source indicating changes at the specified data source have occurred and accepting the changes for use in updating the indices; and in which the updating of the indices occurs without requiring an active authenticated session for the subscriber.

According to another embodiment, method 1222 further includes: executing Structured Query Language (SQL) operations against two or more tables within the host organization which are accessible to the authenticated subscriber, in which the SQL operations include at least one of an SQL transform operation, an SQL aggregate operation, and an SQL join operation; capturing the output of the SQL operations as the dataset of rows and columns; and processing the dataset to generate the indices representing the probabilistic relationships between the rows and the columns of the dataset.

According to another embodiment of method 1222, the authenticated subscriber specifies the two or more tables as input and in which the host organization generates a query to perform the SQL operations and automatically initiates processing against the dataset on behalf of the authenticated subscriber.

According to another embodiment, method 1222 further includes: generating the indices representing probabilistic relationships between the rows and the columns of the dataset by learning at least one of: learning a Dirichlet Process Mixture Model (DPMM) of the dataset; learning a cross categorization of the dataset; learning an Indian buffet process model of the dataset; and learning a mixture model or a mixture of finite mixtures model of the dataset.

According to another embodiment of method 1222, each of the plurality of rows in the dataset corresponds to an entity; in which each of the plurality of columns corresponds to a characteristic for the entities; and in which a point of intersection between each respective row and each of the plurality of columns forms a cell to store a value at the point of intersection.

According to another embodiment of method 1222, each entity represents a person, a place, or a thing; and in which each characteristic represents a characteristic, feature, aspect, quantity, range, identifier, mark, trait, or observable fact; in which each cell stores a data typed value at the point of intersection between each respective row and each of the plurality of columns, the value representing the characteristic for the entity's row that intersects a column corresponding to the characteristic; and in which the may be pre-selected value of every cell is either null, different, or the same as any other value of any other cell.

According to another embodiment, there is a non-transitory computer readable storage medium having instructions stored thereon that, when executed by a processor in a host organization, the instructions cause the host organization to perform operations including: exposing an interface to client devices operating remotely from the host organization, in which the interface is accessible by the client devices via a public Internet; executing a predictive database at the host organization as an on-demand cloud based service for one or more subscribers; authenticating one of the client devices by verifying the client device is associated with one of the subscribers and based further on authentication credentials for the respective subscriber; receiving a request from the authenticated subscriber via the interface; executing a query against indices of the predictive database generated from a dataset of columns and rows on behalf of the authenticated subscriber, the indices representing probabilistic relationships between the rows and the columns of the dataset; and returning a predictive record set to the authenticated subscriber responsive to the request.

Figure 13A:
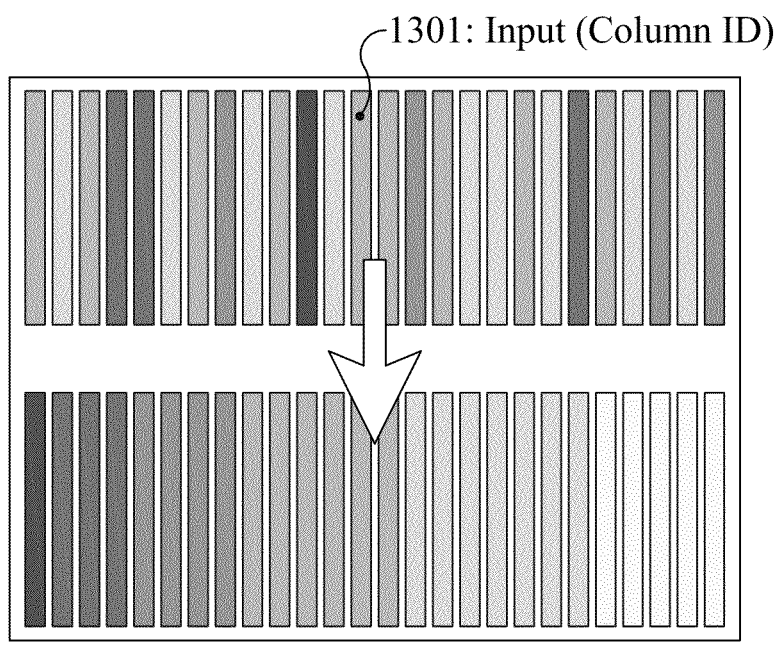
FIG. 13A illustrates usage of the RELATED command term in accordance with the described embodiments.

FIG. 13A illustrates usage of the RELATED command term in accordance with the described embodiments. Specialized queries are made feasible once the analysis engine generates the indices from the tabular dataset(s) provided as described above. For instance, users can ask the predictive database: "For a given column, what are the other columns that are predictively related to it?" In the language of the queryable indices, this translates to: "How often does each other column appear within the same view" as is depicted at element 1302. In terms of the cross-categorizations, the analysis engine tabulates how often each of the other columns appears in the same view as the input column, thus revealing what matters and what does not matter. All that a user needs to provide as input is a column ID 1301 with the use of the RELATED command term.

Additional predictive functionality as provided by the RELATED command term enables users to query for columns that are related to a specified column according to the probabilistic models. For example, given a table with columns or variables in it, the analysis engine divides the columns or variables into groups and because of the distributions there are multiple ways in which to divide up the columns or variables. Take height for example. Giving the height column to an API call for the RELATED command term, a user can query: "How confident can I be about the probability of the relationship existing in all the other columns with the height column specified?" The RELATED command term will then return for the specified height column, a confidence indicator for every other column in the dataset which was not specified. So for example, the RELATED functionality may return for its confidence indicator to the height column, "Weight=1.0," meaning that the analysis engine, according to the dataset, is extremely confident that there is a relationship between weight and height.

Such a result is somewhat intuitive and expected, but other results may be less intuitive and thus provide interesting results for exploration and additional investigation. Continuing with the "height" example for the specified column to a RELATED command term API call, the analyses engine may return "Age=0.8" meaning that the analyses engine has determined Age to be highly correlated from a probabilistic standpoint for the dataset analyzed, but not perfectly certain as was the case with weight. The lesser confidence indicator score may be due to, for instance, noisy data which precludes an absolute positive result.

Perhaps also returned for the specified "height" column is "hair color=0.1" meaning there is realistically no correlation whatsoever between a person's height and their hair color, according to the dataset utilized. Thus, the RELATED functionality permits a user to query for what matters for a given column, such as the height column, and the functionality returns all the columns with a scoring of how related the columns are to the specified column, based on their probability. While it may be intuitive for humans to understand that height and weight are related, the analysis engine generates such a result systematically without human input and more importantly, can be applied to datasets for which such relationships are not intuitive or easily understood by a human viewing the data. This is especially true with larger datasets in which relationships are sure to exist, but for which the relationships are not defined by the data structure itself. The analysis engine learns the underlying latent structure and latent relationships which in turn help to reveal hidden structure to even lay users wishing to explore their data in ways that historically were simply not feasible.

Figure 13B:
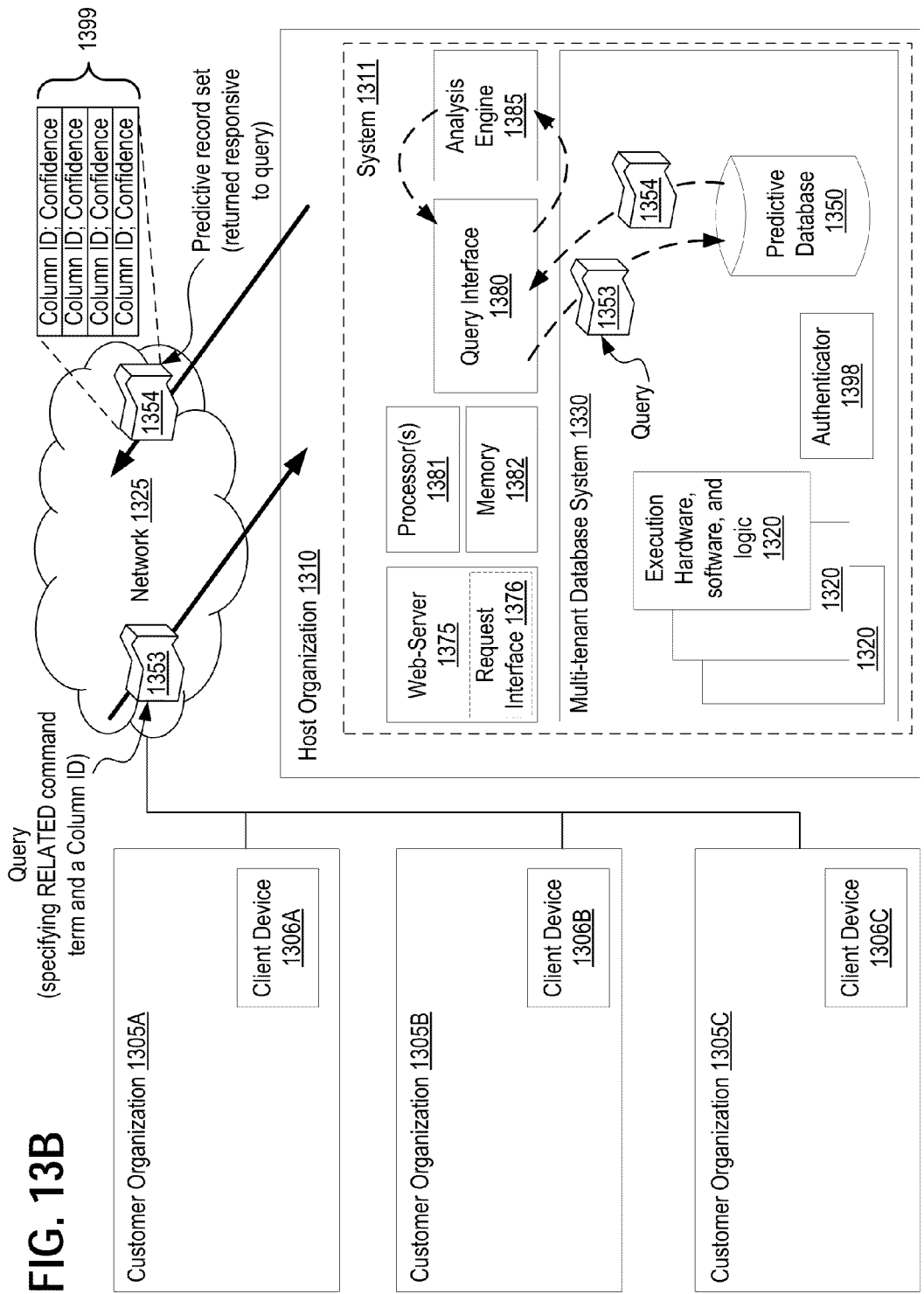
FIG. 13B depicts an exemplary architecture in accordance with described embodiments.

FIG. 13B depicts an exemplary architecture in accordance with described embodiments. In particular, customer organizations 1305A, 1305B, and 1305C are depicted, each with a client device 1306A, 1306B, and 1306C capable of interfacing with host organization 1310 via network 1325, including sending queries and receiving responses. Within host organization 1310 is a request interface 1376 which may optionally be implemented by web-server 1375. The host organization further includes processor(s) 1381, memory 1382, a query interface 1380, analysis engine 1385, and a multi-tenant database system 1330. Within the multi-tenant database system 1330 are execution hardware, software, and logic 1320 that are shared across multiple tenants of the multi-tenant database system 1330, authenticator 1398, and a predictive database 1350 capable of storing indices generated by the analysis engine to facilitate the return of predictive record sets responsive to queries executed against the predictive database 1350.

According to one embodiment, the host organization 1310 operates a system 1311 having at least a processor 1381 and a memory 1382 therein, the system 1311 being enabled to generate indices from a dataset of columns and rows via the analysis engine 1385, in which the indices represent probabilistic relationships between the rows and the columns of the dataset. Such a system 1311 further includes the predictive database 1350 to store the indices; a request interface 1376 to expose the predictive database, for example, to users or to the client devices 1306A-C, in which the request interface 1376 is to receive a query 1353 for the predictive database specifying a RELATED command term and a specified column as a parameter for the RELATED command term; a query interface 1380 to query the predictive database 1350 using the RELATED command term and pass the specified column to generate a predictive record set 1354; and in which the request interface 1376 is to further return the predictive record set 1354 responsive to the query. In such an embodiment, the predictive record set 1354 includes a plurality of elements 1399 therein, each of the returned elements including a column identifier and a confidence indicator for the specified column passed with the RELATED command term. In such an embodiment, the confidence indicator indicates whether a latent relationship exists between the specified column passed with the RELATED command and the column identifier returned for the respective element 1399.

According to one embodiment, the predictive database 1350 is to execute as an on-demand cloud based service at the host organization 1310 for one or more subscribers. In such an embodiment, the system further includes an authenticator 1398 to verify that client devices 1306A-C are associated with a subscriber and to further verify authentication credentials for the respective subscriber.

According to one embodiment, the request interface 1376 exposes a Predictive Query Language Application Programming Interface (PreQL API) directly to authenticated users, in which the PreQL API is accessible to the authenticated users via a public Internet. For example, network 1325 may operate to link the host organization 1310 with subscribers over the public Internet.

According to one embodiment, such a system 1311 includes a web-server 1375 to implement the request interface 1376 in which the web-server 1375 is to receive as input, a plurality of access requests from one or more client devices 1306A-C from among a plurality of customer organizations 1305A-C communicably interfaced with the host organization via a network. In such an embodiment, a multi-tenant database system 1330 with predictive database functionality implements the predictive database 1350.

Figure 13C:
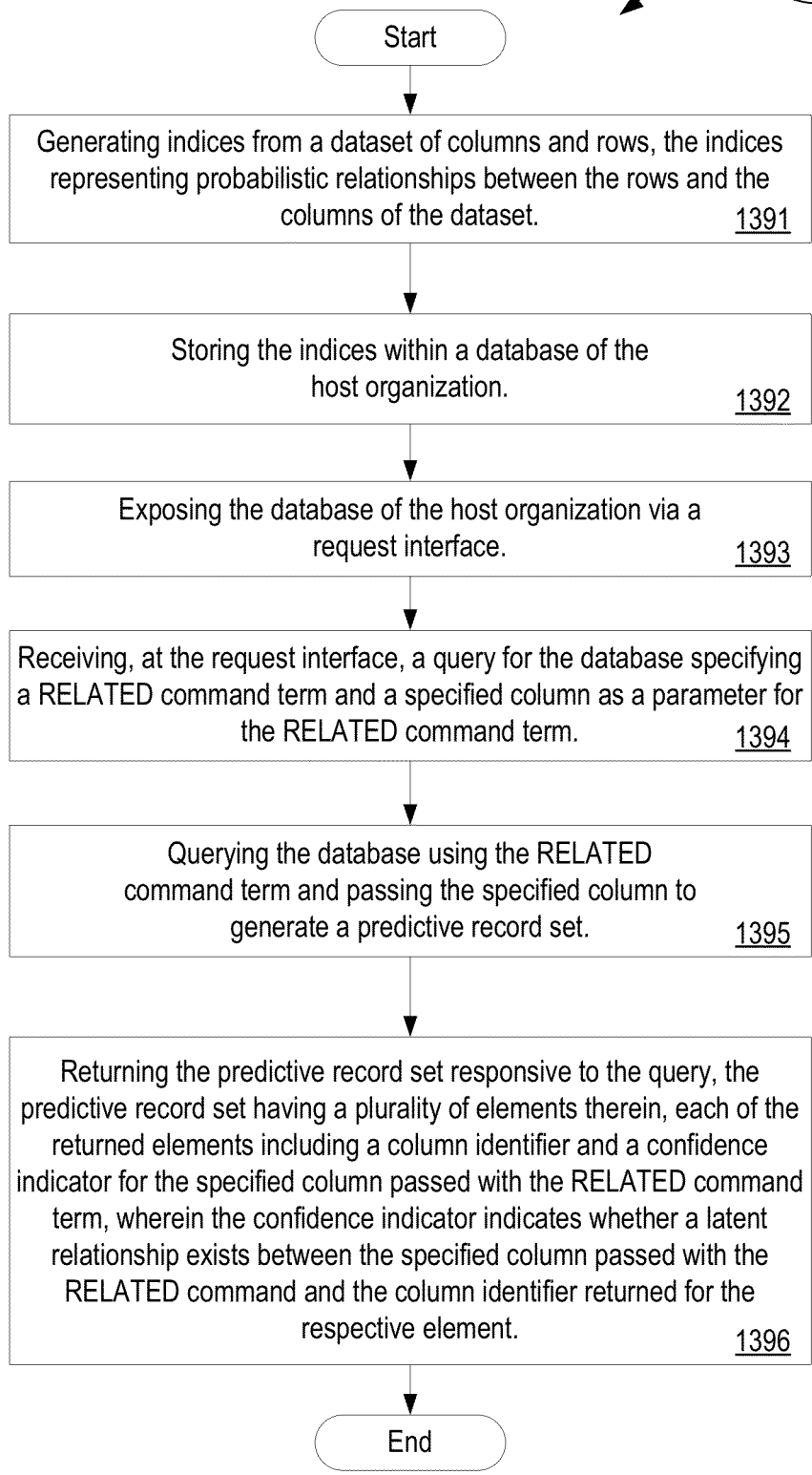
FIG. 13C is a flow diagram illustrating a method in accordance with disclosed embodiments.

FIG. 13C is a flow diagram illustrating a method 1321 in accordance with disclosed embodiments. Method 1321 may be performed by processing logic that may include hardware (e.g., circuitry, dedicated logic, programmable logic, microcode, etc.), software (e.g., instructions run on a processing device to perform various operations such transmitting, sending, receiving, executing, generating, calculating, storing, exposing, querying, processing, etc., in pursuance of the systems, apparatuses, and methods for implementing a RELATED command with a predictive query interface, as described herein. For example, host organization 110 of FIG. 1, machine 400 of FIG. 4, or system 1311 of FIG. 13B may implement the described methodologies. Some of the blocks and/or operations listed below are optional in accordance with certain embodiments. The numbering of the blocks presented is for the sake of clarity and is not intended to prescribe an order of operations in which the various blocks must occur.

At block 1391, processing logic generates indices from a dataset of columns and rows, the indices representing probabilistic relationships between the rows and the columns of the dataset.

At block 1392, processing logic stores the indices within a database of the host organization.

At block 1393, processing logic exposes the database of the host organization via a request interface.

At block 1394, processing logic receives, at the request interface, a query for the database specifying a RELATED command term and a specified column as a parameter for the RELATED command term.

At block 1395, processing logic queries the database using the RELATED command term and passes the specified column to generate a predictive record set.

At block 1396, processing logic returns the predictive record set responsive to the query, the predictive record set having a plurality of elements therein. In such an embodiment, each of the returned elements include a column identifier and a confidence indicator for the specified column passed with the RELATED command term, in which the confidence indicator indicates whether a latent relationship exists between the specified column passed with the RELATED command and the column identifier returned for the respective element.

According to another embodiment, method 1321 further includes: passing a minimum confidence threshold with the RELATED command term. In such an embodiment, returning the predictive record set includes returning only the elements of the predictive record set having a confidence indicator in excess of the minimum confidence threshold.

According to another embodiment, method 1321 further includes: passing a record set limit with the RELATED command term to restrict a quantity of elements returned with the predictive record set.

According to another embodiment of method 1321, the elements of the predictive record set are returned ordered by descending order according to a confidence indicator for each of the elements of the predictive record set or are returned ordered by ascending order according to the confidence indicator for each of the elements of the predictive record set.

According to another embodiment of method 1321, the predictively related columns included with each element returned within the predictive record set are based further on a fraction of times the predictively related columns occur in a same column grouping as the specified column passed with the RELATED command term.

According to another embodiment of method 1321, the predictive record set having a plurality of elements therein includes each of the returned elements including all of the columns and a corresponding predicted value for every one of the columns; and in which the method further includes returning a confidence indicator for each of the corresponding predicted values ranging from 0 indicating a lowest possible level of confidence in the respective predicted value to 1 indicating a highest possible level of confidence in the respective predicted value.

According to another embodiment, method 1321 further includes: identifying one or more of the predictively related columns from the predictive record set generated responsive to the querying the database using the RELATED command term based on a minimum threshold for the predictively related columns; and inputting the identified one or more of the predictively related columns into a second query specifying a PREDICT command term or a GROUP command term to restrict a second predictive record set returned from the second query.

According to another embodiment of method 1321, querying the database using the RELATED command term includes the database estimating mutual information between the specified column passed with the RELATED command term and the column identifier returned for the respective element of the predictive record set.

According to another embodiment of method 1321, exposing the database of the host organization includes exposing a Predictive Query Language Application Programming Interface (PreQL API) directly to authenticated users, in which the PreQL API is accessible to the authenticated users via a public Internet.

According to another embodiment of method 1321, querying the database using the RELATED command term includes passing a PreQL query to the database, the PreQL query having a query syntax of: the RELATED command term as a required term; an optional FROM term specifying one or more tables, datasets, data sources, and/or indices to be queried when the optional FROM term is specified and in which a default value is used for the one or more tables, datasets, data sources, and/or indices to be queried when the optional FROM term is not specified; and a TARGET term specifying the column to be passed with the RELATED command term. For example, if the FROM term goes unspecified, then the system may determine a source based on context of the user. For instance, the user may be associated with a particular organization having only one data source, or having a primary data source, or the last assessed or most frequently accesses data source may be assumed, or a default may be pre-configured as a user preference, and so forth.

According to another embodiment of method 1321, the query syntax for the PreQL query further provides one or more of: an optional CONFIDENCE term that, when provided, specifies the minimum acceptable confidence indicator to be returned with the predictive record set; an optional COUNT term that, when provided, specifies a maximum quantity of elements to be returned within the predictive record set; and an optional ORDER BY term that, when provided, specifies whether the elements of the predictive record are to be returned in ascending or descending order according to a confidence indicator for each of the elements returned with the predictive record set.

According to another embodiment of method 1321, querying the database using the RELATED command term includes passing a JavaScript Object Notation (JSON) structured query to the database, the JSON structured query having a query syntax of: the RELATED command term as a required term; an optional one or more tables, datasets, data sources, and/or indices to be queried or a default value for the one or more tables, datasets, data sources, and/or indices to be queried when not specified; the column to be passed with the RELATED command term; an optional specification of a minimum acceptable confidence to be returned with the predictive record set according to a confidence indicator; an optional specification of a maximum quantity of elements to be returned within the predictive record set; and an optional specification of whether the elements of the predictive record are to be returned in ascending or descending order according to a confidence indicator for each of the elements returned with the predictive record set.

According to another embodiment of method 1321, exposing the database of the host organization includes exposing a web form directly to authenticated users, in which the web form is accessible to the authenticated users via a public Internet; in which the host organization generates a latent structure query for submission to the database based on input from the web form; and in which querying the database using the RELATED command term includes querying the database using the latent structure query via a Predictive Query Language Application Programming Interface (PreQL API) within the host organization, the PreQL API being indirectly exposed to authenticated users through the web form.

According to another embodiment of method 1321, querying the database using the RELATED command term includes executing a Predictive Query Language (PreQL) structured query against the database for the RELATED command term; and in which the method further includes executing one or more additional PreQL structured queries against the database, each of the one or more additional PreQL structured queries specifying at least one command selected from the group of PreQL commands including: PREDICT, RELATED, SIMILAR, and GROUP.

According to another embodiment, method 1321 further includes: receiving the dataset from an authenticated subscriber and subsequently receiving the query for the database from the authenticated subscriber; and processing the dataset on behalf of the authenticated subscriber to generate the indices.

According to another embodiment of method 1321, each of the plurality of rows in the dataset corresponds to an entity; in which each of the plurality of columns corresponds to a characteristic for the entities; and in which a point of intersection between each respective row and each of the plurality of columns forms a cell to store a value at the point of intersection.

According to a particular embodiment, there is a non-transitory computer readable storage medium having instructions stored thereon that, when executed by a processor in a host organization, the instructions cause the host organization to perform operations including: generating indices from a dataset of columns and rows, the indices representing probabilistic relationships between the rows and the columns of the dataset; storing the indices within a database of the host organization; exposing the database of the host organization via a request interface; receiving, at the request interface, a query for the database specifying a RELATED command term and a specified column as a parameter for the RELATED command term; querying the database using the RELATED command term and passing the specified column to generate a predictive record set; and returning the predictive record set responsive to the query, the predictive record set having a plurality of elements therein, each of the returned elements including a column identifier and a confidence indicator for the specified column passed with the RELATED command term, in which the confidence indicator indicates whether a latent relationship exists between the specified column passed with the RELATED command and the column identifier returned for the respective element.

Figure 14A:
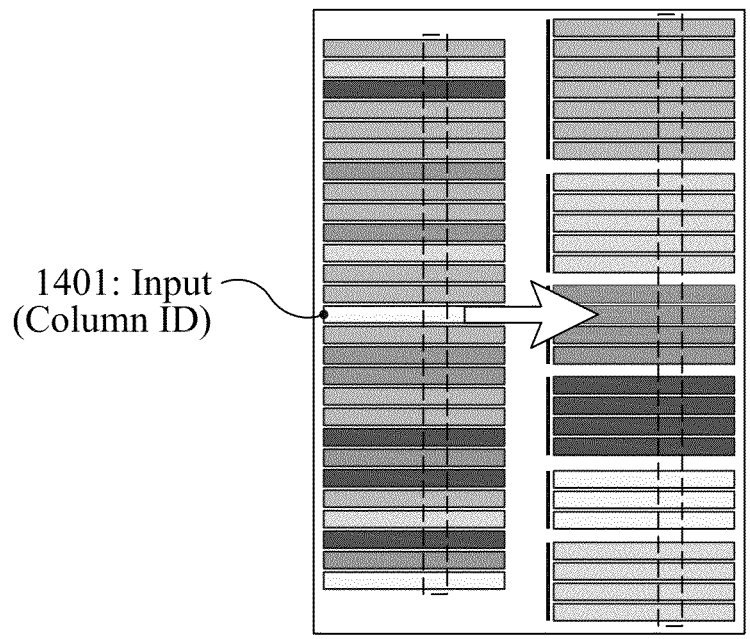
FIG. 14A illustrates usage of the GROUP command term in accordance with the described embodiments.

FIG. 14A illustrates usage of the GROUP command term in accordance with the described embodiments. Using the GROUP command term users can ask: "What rows go together." Such a feature can be conceptualized as clustering, except that there's more than one way to cluster the dataset. Consider the mammals example used above in which a column ID 1401 is provided as input. Responsive to such a query, a predictive dataset will be returned as output 1402 having groups in the context of the column provided. More particularly, the output 1402 will indicate which rows most often appear together as a group in the same categories in the view that contains the input column.

Sometimes rows tend to group up on noisy elements in a dataset when the analysis engine applies its modeling to generate the indices; yet these noisy elements sometimes result in groupings that are not actually important. Using the GROUP command term functionality a user knows that each column will appear in exactly one of the groups as a view and so the analysis engine permits a user specified column to identify the particular "view" that will be utilized. The GROUP functionality therefore implements a row centric operation like the SIMILAR functionality, but in contrast to an API call for SIMILAR where the user specifies the row and responsively receives back a list of other rows and corresponding scores based on their probabilities of being similar, the GROUP functionality requires no row to be specified or fixed by the user. Instead, only a column is required to be provided by the user when making a call to specifying GROUP command term.

Calling the GROUP functionality with a specified or fixed column causes the functionality to return the groupings of the ROWS that seem to be related or correlated in some way based on analysis engine's modeling.

Figure 14B:
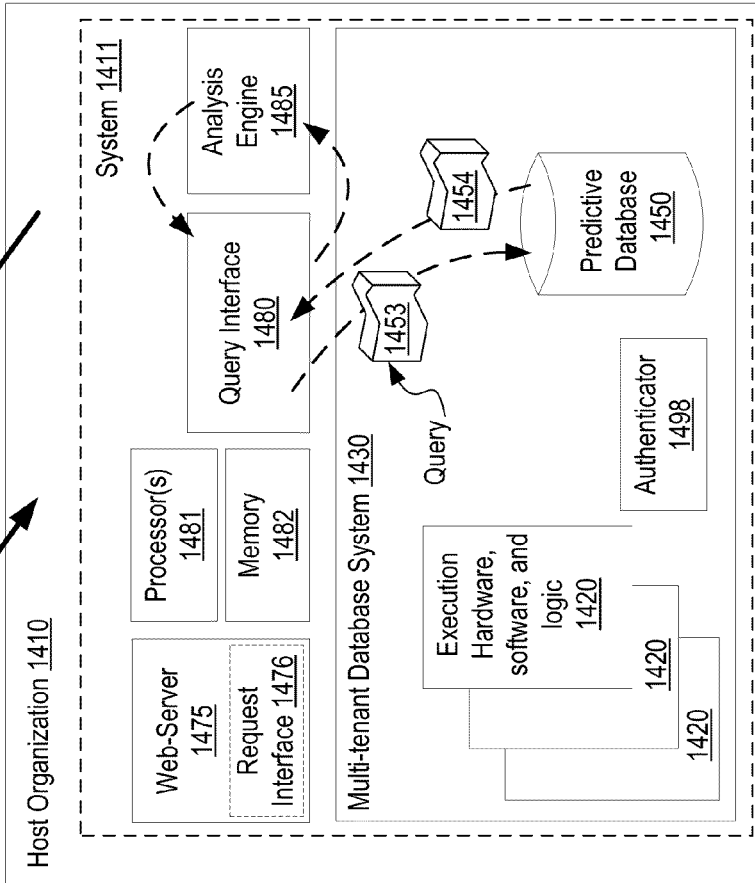
FIG. 14B depicts an exemplary architecture in accordance with described embodiments.

FIG. 14B depicts an exemplary architecture in accordance with described embodiments. In particular, customer organizations 1405A, 1405B, and 1405C are depicted, each with a client device 1406A, 1406B, and 1406C capable of interfacing with host organization 1410 via network 1425, including sending queries and receiving responses. Within host organization 1410 is a request interface 1476 which may optionally be implemented by web-server 1475. The host organization further includes processor(s) 1481, memory 1482, a query interface 1480, analysis engine 1485, and a multi-tenant database system 1430. Within the multi-tenant database system 1430 are execution hardware, software, and logic 1420 that are shared across multiple tenants of the multi-tenant database system 1430, authenticator 1498, and a predictive database 1450 capable of storing indices generated by the analysis engine to facilitate the return of predictive record sets responsive to queries executed against the predictive database 1450 by a query interface.

According to one embodiment, the host organization 1410 operates a system 1411 having at least a processor 1481 and a memory 1482 therein, in which the system 1411 includes an analysis engine 1485 to generate indices from a dataset of columns and rows, in which the indices represent probabilistic relationships between the rows and the columns of the dataset. Such a system 1411 further includes the predictive database 1450 to store the indices; a request interface 1476 to expose the predictive database, for example, to users or to the client devices 1406A-C, in which the request interface 1476 is to receive a query 1453 for the predictive database specifying a GROUP command term and a specified column as a parameter for the GROUP command term; a query interface 1480 to query the predictive database 1450 using the GROUP command term and passing the specified column to generate a predictive record set 1454; and in which the request interface 1476 is to further return the predictive record set 1454 responsive to the query 1453, in which the predictive record set includes a plurality of groups 1499 specified therein, each of the returned groups 1499 of the predictive record set including a group of one or more rows of the dataset. For example, in the predictive record set 1454 depicted there are four groups returned, Group_A 1456; Group_B 1457; Group_C 1458; and Group_D 1459, each of which includes a set of {rows}.

FIG. 14C is a flow diagram illustrating a method in accordance with disclosed embodiments.

Method 1421 may be performed by processing logic that may include hardware (e.g., circuitry, dedicated logic, programmable logic, microcode, etc.), software (e.g., instructions run on a processing device to perform various operations such transmitting, sending, receiving, executing, generating, calculating, storing, exposing, querying, processing, etc., in pursuance of the systems, apparatuses, and methods for implementing a GROUP command with a predictive query interface, as described herein. For example, host organization 110 of FIG. 1, machine 400 of FIG. 4, or system 1411 of FIG. 14B may implement the described methodologies. Some of the blocks and/or operations listed below are optional in accordance with certain embodiments. The numbering of the blocks presented is for the sake of clarity and is not intended to prescribe an order of operations in which the various blocks must occur.

At block 1491, processing logic generates indices from a dataset of columns and rows, the indices representing probabilistic relationships between the rows and the columns of the dataset.

At block 1492, processing logic stores the indices within a database of the host organization.

At block 1493, processing logic exposes the database of the host organization via a request interface.

At block 1494, processing logic receives, at the request interface, a query for the database specifying a GROUP command term and a specified column as a parameter for the GROUP command term.

At block 1495, processing logic queries the database using the GROUP command term and passes the specified column to generate a predictive record set.

At block 1496, processing logic returns the predictive record set responsive to the query, the predictive record set having a plurality of groups specified therein, each of the returned groups of the predictive record set including a group of one or more rows of the dataset.

According to another embodiment of method 1421, all of the rows of the dataset are partitioned by assigning every row of the dataset to exactly one of the plurality of groups returned with the predictive record set without overlap of any single row being assigned to more than one of the plurality of groups.

According to another embodiment of method 1421, the rows of the dataset are segmented by assigning rows of the dataset to at most one of the plurality of groups without overlap of any single row being assigned to more than one of the plurality of groups; in which the segmentation results in one or more rows of the dataset remaining unassigned to any of the plurality of groups due to a confidence indicator for the corresponding one or more rows remaining unassigned falling below a minimum threshold.

According to another embodiment of method 1421, a confidence indicator returned with each of the one or more rows specified within each of the plurality of groups returned with the predictive record set ranges from a minimum of 0 indicating a lowest possible confidence in the prediction that the respective row belongs to the group specified to a maximum of 1 indicating a highest possible confidence in the prediction that the respective row belongs to the group specified.

According to another embodiment of method 1421, the column passed with the GROUP command term provides the context of a latent structure in which the one or more rows of each specified group are assessed for similarity to any other rows within the same group.

According to another embodiment of method 1421, the predictive record set having a plurality of groups specified therein includes a listing of row identifiers from the dataset or the indices and a corresponding confidence indicator for each of the row identifiers specified.

According to another embodiment of method 1421, each row corresponds to a registered voter and in which the groupings specified by the predictive record define naturally targetable voting blocs with each voting bloc predicted to be likely to react similarly to a common campaign message, a common campaign issue, and/or common campaign advertising.

According to another embodiment of method 1421, each row corresponds to a economic market participant and in which the groupings specified by the predictive record define naturally targetable advertising groups with economic market participants of each advertising group predicted to react similarly to a common advertising campaign directed thereto.

According to another embodiment of method 1421, each row corresponds to an economic market participant and in which the grouping specified by the precictive record define naturally targetable advertising groups with economic market participants of each advertising group predicted to react similarly to a common advertising campaign directed thereto.

According to another embodiment, method 1421 further includes: indicating a most stereotypical row within each of the respective groups returned with the predictive record set, in which the most stereotypical row does not exist as a row of the dataset, the most stereotypical row having synthesized data based on actual rows within the dataset for the specified group to which the most stereotypical row corresponds.

According to another embodiment, method 1421 further includes: passing a minimum confidence threshold with the GROUP command term; and in which returning the predictive record set includes returning only rows of the groups in the predictive record set having a confidence indicator in excess of the minimum confidence threshold.

According to another embodiment of method 1421, exposing the database of the host organization includes exposing a Predictive Query Language Application Programming Interface (PreQL API) directly to authenticated users, in which the PreQL API is accessible to the authenticated users via a public Internet.

According to another embodiment of method 1421, querying the database using the GROUP command term includes passing a PreQL query to the database, the PreQL query having a query syntax of: the GROUP command term as a required term; a COLUMN term as a required term, the COLUMN term specifying the column to be passed with the GROUP command term; and an optional FROM term specifying one or more tables, datasets, data sources, and/or indices to be queried when the optional FROM term is specified and in which a default value is used for the one or more tables, datasets, data sources, and/or indices to be queried when the optional FROM term is not specified.

According to another embodiment of method 1421, the query syntax for the PreQL query further provides: an optional CONFIDENCE term that, when provided, specifies the minimum acceptable confidence indicator for the rows to be returned with the groups of the predictive record set.

According to another embodiment of method 1421, querying the database using the GROUP command term includes passing a JavaScript Object Notation (JSON) structured query to the database, the JSON structured query having a query syntax of: the GROUP command term as a required term; an optional one or more tables, datasets, data sources, and/or indices to be queried or a default value for the one or more tables, datasets, data sources, and/or indices to be queried when not specified, the column to be passed with the GROUP command term; and an optional specification of a minimum acceptable confidence for the rows of the groups to be returned with the predictive record set according to a confidence indicator corresponding to each of the rows.

According to another embodiment of method 1421, exposing the database of the host organization includes exposing a web form directly to authenticated users, in which the web form is accessible to the authenticated users via a public Internet; in which the host organization generates a latent structure query for submission to the database based on input from the web form; and in which querying the database using the GROUP command term includes querying the database using the latent structure query via a Predictive Query Language Application Programming Interface (PreQL API) within the host organization, the PreQL API being indirectly exposed to authenticated users through the web form.

According to another embodiment of method 1421, querying the database using the GROUP command term includes executing a Predictive Query Language (PreQL) structured query against the database for the GROUP command term; and in which the method further includes executing one or more additional PreQL structured queries against the database, each of the one or more additional PreQL structured queries specifying at least one command selected from the group of PreQL commands including: PREDICT, GROUP, GROUP, and GROUP.

According to another embodiment, method 1421 further includes: receiving the dataset from an authenticated subscriber and subsequently receiving the query for the database from the authenticated subscriber; and processing the dataset on behalf of the authenticated subscriber to generate the indices.

According to another embodiment of method 1421, each of the plurality of rows in the dataset corresponds to an entity; in which each of the plurality of columns corresponds to a characteristic for the entities; and in which a point of intersection between each respective row and each of the plurality of columns forms a cell to store a value at the point of intersection.

According to another embodiment, there is a non-transitory computer readable storage medium having instructions stored thereon that, when executed by a processor in a host organization, the instructions cause the host organization to perform operations including: generating indices from a dataset of columns and rows, the indices representing probabilistic relationships between the rows and the columns of the dataset; storing the indices within a database of the host organization; exposing the database of the host organization via a request interface; receiving, at the request interface, a query for the database specifying a GROUP command term and a specified column as a parameter for the GROUP command term; querying the database using the GROUP command term and passing the specified column to generate a predictive record set; and returning the predictive record set responsive to the query, the predictive record set having a plurality of groups specified therein, each of the returned groups of the predictive record set including a group of one or more rows of the dataset.

Figure 15A:
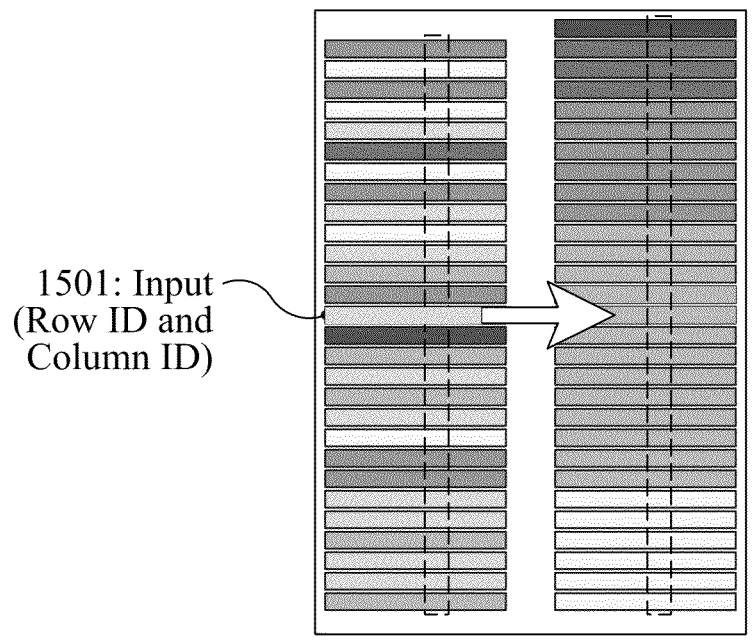
FIG. 15A illustrates usage of the SIMILAR command term in accordance with the described embodiments.

FIG. 15A illustrates usage of the SIMILAR command term in accordance with the described embodiments. Using the SIMILAR command term users can ask: "Which rows are most similar to a given row?" Rows can be similar in one context but dissimilar in another. For instance, killer whales and blue whales are a lot alike in some respects, but very different in others. Input 1501 specifies both a Row ID and a Column ID to be passed with the SIMILAR command term. The input column (or column ID) provides the context of the latent structure in which the specified row is to be assessed for similarity to the similar rows returned by the elements of the predictive record set. Responsive to such a query, a predictive dataset will be returned as output 1502 identifying how often each row appears in the same category as the input row in the view containing the input column.

The SIMILAR command term functionality accepts an entity (e.g., row or row ID) and then returns what other rows are most similar to the row specified. Like the RELATED command term examples, the SIMILAR command term functionality returns the probability that a row specified and any respective returned row actually exhibits similarity. For instance, rather than specifying column, a user may specify "Fred" as a row or entity within the dataset. The user then queries via the SIMILAR command term functionality: "What rows are scored based on probability to be the most like Fred?" The API call will then return all rows from the dataset along with corresponding confidence scores or return only rows above or below a specified threshold. For instance, perhaps rows above 0.8 are the most interesting or the rows below 0.2 are most interesting, or both, or a range. Regardless, the SIMILAR command term functionality is capable of scoring every row in the dataset according to its probabilistic similarity to the specified row, and then returning the rows and their respective scores according to the user's constraints or the constraints of an implementing GUI, if any such constraints are given.

Because the analysis engine determines these relationships using its own modeling, there is more than one way to evaluate for such an inquiry. Thus, in addition to accepting the entity (e.g., row or row ID) being assessed for similarity, the user also provides to the API call for the SIMILAR command term which COLUMN (or column ID) is to be used by the analysis engine as a disambiguation means to determine how the row's similarity is to be assessed. Thus, API calls specifying the SIMILAR command term require both a row and a column to be fixed. In such a way, providing, specifying, or fixing the column variable provides disambiguation information to the analysis engine by which to enter the indices. Otherwise there may be too many possible ways to score the returned rows as the analysis engine would lack focus or an entry point by which to determine how the user presenting the query cares about the information for which similarity is sought.

Figure 15B:
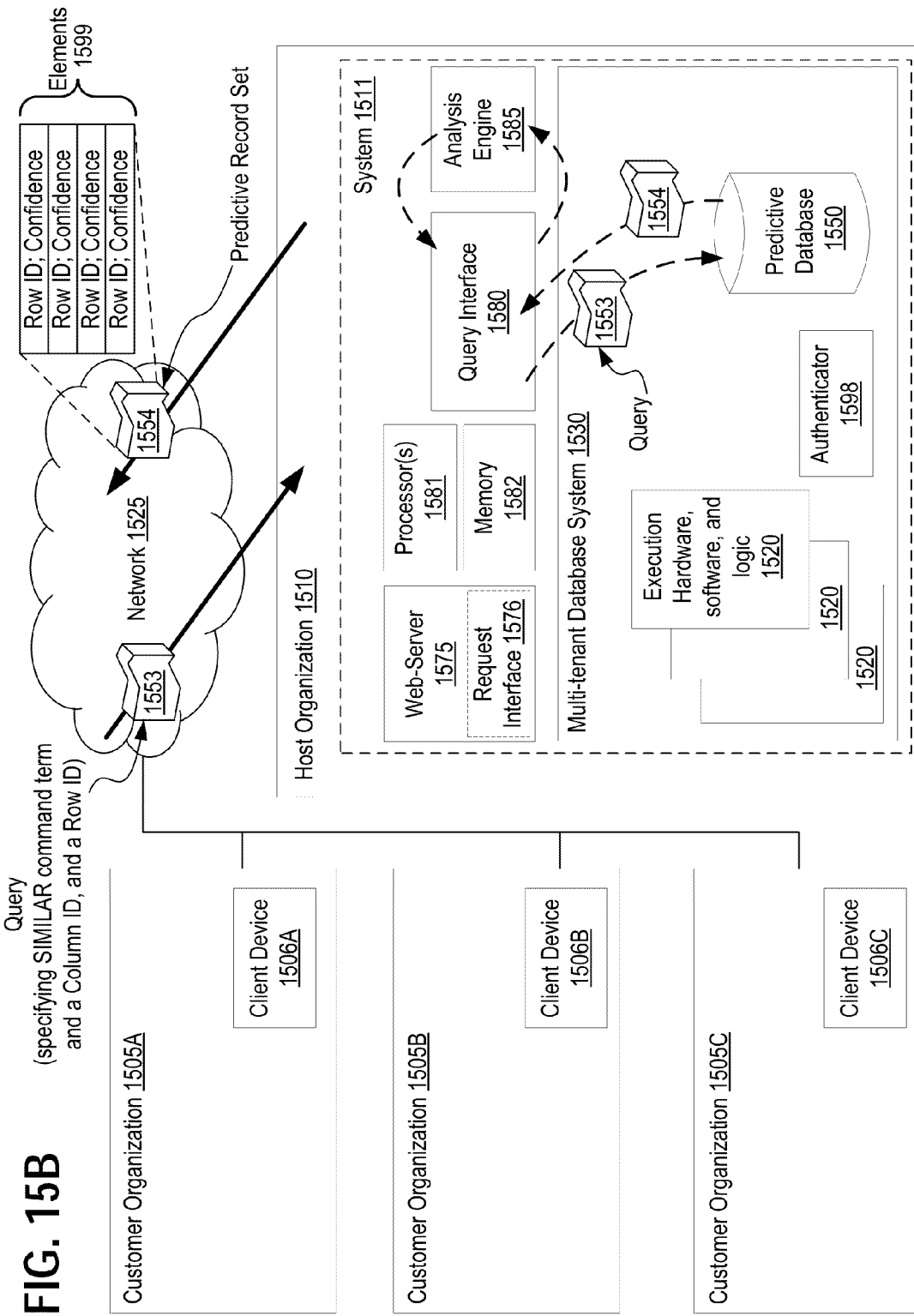
FIG. 15B depicts an exemplary architecture in accordance with described embodiments.

FIG. 15B depicts an exemplary architecture in accordance with described embodiments. In particular, customer organizations 1505A, 1505B, and 1505C are depicted, each with a client device 1506A, 1506B, and 1506C capable of interfacing with host organization 1510 via network 1525, including sending queries and receiving responses. Within host organization 1510 is a request interface 1576 which may optionally be implemented by web-server 1575. The host organization further includes processor(s) 1581, memory 1582, a query interface 1580, analysis engine 1585, and a multi-tenant database system 1530. Within the multi-tenant database system 1530 are execution hardware, software, and logic 1520 that are shared across multiple tenants of the multi-tenant database system 1530, authenticator 1598, and a predictive database 1550 capable of storing indices generated by the analysis engine to facilitate the return of predictive record sets responsive to queries executed against the predictive database 1550.

According to one embodiment, the host organization 1510 operates a system 1511 having at least a processor 1581 and a memory 1582 therein, in which the system 1511 includes an analysis engine 1585 to generate indices from a dataset of columns and rows, in which the indices represent probabilistic relationships between the rows and the columns of the dataset. Such a system 1511 further includes the predictive database 1550 to store the indices; a request interface 1576 to expose the predictive database, for example, to users or to the client devices 1506A-C, in which the request interface 1576 is to receive a query 1553 for the predictive database 1550 specifying a SIMILAR command term, a specified row as a parameter for the SIMILAR command term, and a specified column as a parameter for the SIMILAR command term. In such a system, a query interface 1580 is to query the predictive database 1550 using the SIMILAR command term and pass the specified row and the specified column to generate a predictive record set. For instance, the SIMILAR command term and its operands (column ID and row ID) may be executed against the predictive database 1550.

In such a system 1511, the request interface 1576 is to further return the predictive record set 1554 responsive to the query 1553, in which the predictive record set 1554 includes a plurality of elements 1599, each of the returned elements of the predictive record set 1554 including (i) a row identifier which corresponds to a row of the dataset assessed to be similar, according to a latent structure, to the specified row passed with the SIMILAR command term based on the specified column and (ii) a confidence indicator which indicates a likelihood of a latent relationship between the specified row passed with the SIMILAR command and the row identifier returned for the respective element 1599.

FIG. 15C is a flow diagram illustrating a method in accordance with disclosed embodiments. Method 1521 may be performed by processing logic that may include hardware (e.g., circuitry, dedicated logic, programmable logic, microcode, etc.), software (e.g., instructions run on a processing device to perform various operations such transmitting, sending, receiving, executing, generating, calculating, storing, exposing, querying, processing, etc., in pursuance of the systems, apparatuses, and methods for implementing a SIMILAR command with a predictive query interface, as described herein. For example, host organization 110 of FIG. 1, machine 400 of FIG. 4, or system 1511 of FIG. 15B may implement the described methodologies. Some of the blocks and/or operations listed below are optional in accordance with certain embodiments. The numbering of the blocks presented is for the sake of clarity and is not intended to prescribe an order of operations in which the various blocks must occur.

At block 1591, processing logic generates indices from a dataset of columns and rows, the indices representing probabilistic relationships between the rows and the columns of the dataset.

At block 1592, processing logic stores the indices within a database of the host organization.

At block 1593, processing logic exposes the database of the host organization via a request interface.

At block 1594, processing logic receives, at the request interface, a query for the database specifying a SIMILAR command term, a specified row as a parameter for the SIMILAR command term, and a specified column as a parameter for the SIMILAR command term.

At block 1595, processing logic queries the database using the SIMILAR command term and passes the specified row and the specified column to generate a predictive record set.

At block 1596, processing logic returns the predictive record set responsive to the query, the predictive record set having a plurality of elements therein, each of the returned elements of the predictive record set including (i) a row identifier which corresponds to a row of the dataset assessed to be similar, according to a latent structure, to the specified row passed with the SIMILAR command term based on the specified column and (ii) a confidence indicator which indicates a likelihood of a latent relationship between the specified row passed with the SIMILAR command and the row identifier returned for the respective element.

According to another embodiment of method 1521, the column passed with the SIMILAR command term provides the context of the latent structure in which the specified row is assessed for similarity, according to the latent structure, to the similar rows returned by the elements of the predictive record set.

According to another embodiment of method 1521, the row of the dataset assessed to be similar included with each element returned within the predictive record set is based further on a fraction of times the similar row occurs in a same row grouping as the specified row according to the column passed with the SIMILAR command term.

According to another embodiment of method 1521, querying the database using the SIMILAR command term and passing the specified row includes passing in a row identifier for the specified row from the dataset or the indices.

According to another embodiment of method 1521, querying the database using the SIMILAR command term and passing the specified row includes passing a complete row with the SIMILAR command term listing name=value pairs corresponding to all columns for other rows in the dataset or the indices.

According to another embodiment of method 1521, passing the complete row includes passing one or more null or blank values as the value in the name=value pairs.

According to another embodiment, method 1521 further includes: returning one of: (i) a most similar row compared to the specified row passed with the SIMILAR command term responsive to the query based on the predictive record set returned and a confidence indicator for each of the similar rows returned with the predictive record set; (ii) a least similar row compared to the specified row passed with the SIMILAR command term responsive to the query based on the predictive record set returned and a confidence indicator for each of the similar rows returned with the predictive record set; and (iii) a related product in a recommender system responsive to a search by an Internet user, in which the related product corresponds to the one of the similar rows returned with the predictive record set.

According to another embodiment of method 1521, querying the database using the SIMILAR command term includes the database estimating mutual information based at least in part on the specified row to determine a measure of mutual dependence between the value of the specified row in the indices and a value of another row present within the indices and corresponding to the column specified.

According to another embodiment of method 1521, the rows of the dataset correspond to a plurality of documents stored as records in the dataset from which the indices are generated; in which passing the specified row includes passing one of the plurality of documents as the specified row; and in which querying the database using the SIMILAR command term and passing the document as the specified row causes the database to carry out a content based search using the document's contents.

According to another embodiment, method 1521 further includes: passing a minimum confidence threshold with the SIMILAR command term; and in which returning the predictive record set includes returning only the elements of the predictive record set having a confidence indicator in excess of the minimum confidence threshold.

According to another embodiment, method 1521 further includes: passing an optional COUNT term that, when provided, specifies a maximum quantity of elements to be returned within the predictive record set.

According to another embodiment of method 1521, the elements of the predictive record set are returned ordered by descending order according to a confidence indicator for each of the elements of the predictive record set or are returned ordered by ascending order according to the confidence indicator for each of the elements of the predictive record set.

According to another embodiment, method 1521 further includes: identifying one or more of the similar rows from the predictive record set generated responsive to the querying the database using the SIMILAR command term based on a minimum confidence threshold for the similar rows; and inputting the identified one or more of the similar rows into a second query specifying a GROUP command term to restrict a second predictive record set returned from the second query.

According to another embodiment of method 1521, exposing the database of the host organization includes exposing a Predictive Query Language Application Programming Interface (PreQL API) directly to authenticated users, in which the PreQL API is accessible to the authenticated users via a public Internet.

According to another embodiment of method 1521, querying the database using the SIMILAR command term includes passing a PreQL query to the database, the PreQL query having a query syntax of: the SIMILAR command term as a required term; a ROW term as a required term, the ROW term specifying the row to be passed with the SIMILAR command term; a COLUMN term as a required term, the COLUMN term specifying the column to be passed with the SIMILAR command term; and an optional FROM term specifying one or more tables, datasets, data sources, and/or indices to be queried when the optional FROM term is specified and in which a default value is used for the one or more tables, datasets, data sources, and/or indices to be queried when the optional FROM term is not specified.

According to another embodiment of method 1521, the query syntax for the PreQL query further provides one or more of: an optional CONFIDENCE term that, when provided, specifies the minimum acceptable confidence indicator to be returned with the predictive record set; an optional COUNT term that, when provided, specifies a maximum quantity of elements to be returned within the predictive record set; and an optional ORDER BY term that, when provided, specifies whether the elements of the predictive record are to be returned in ascending or descending order according to a confidence indicator for each of the elements returned with the predictive record set.

According to another embodiment of method 1521, querying the database using the SIMILAR command term includes passing a JavaScript Object Notation (JSON) structured query to the database, the JSON structured query having a query syntax of: the SIMILAR command term as a required term; an optional one or more tables, datasets, data sources, and/or indices to be queried or a default value for the one or more tables, datasets, data sources, and/or indices to be queried when not specified; the row to be passed with the SIMILAR command term; in which the column is to be passed with the SIMILAR command term; an optional specification of a minimum acceptable confidence to be returned with the predictive record set according to a confidence indicator; an optional specification of a maximum quantity of elements to be returned within the predictive record set; and in which an optional specification of whether the elements of the predictive record are to be returned in ascending or descending order according to a confidence indicator for each of the elements returned with the predictive record set.

According to another embodiment of method 1521, exposing the database of the host organization includes exposing a web form directly to authenticated users, in which the web form is accessible to the authenticated users via a public Internet; in which the host organization generates a latent structure query for submission to the database based on input from the web form; and in which querying the database using the SIMILAR command term includes querying the database using the latent structure query via a Predictive Query Language Application Programming Interface (PreQL API) within the host organization, the PreQL API being indirectly exposed to authenticated users through the web form.

According to another embodiment of method 1521, querying the database using the SIMILAR command term includes executing a Predictive Query Language (PreQL) structured query against the database for the SIMILAR command term; and in which the method further includes executing one or more additional PreQL structured queries against the database, each of the one or more additional PreQL structured queries specifying at least one command selected from the group of PreQL commands including: PREDICT, SIMILAR, SIMILAR, and GROUP.

According to another embodiment, method 1521 further includes: receiving the dataset from an authenticated subscriber and subsequently receiving the query for the database from the authenticated subscriber; and processing the dataset on behalf of the authenticated subscriber to generate the indices.

According to another embodiment of method 1521, each of the plurality of rows in the dataset corresponds to an entity; in which each of the plurality of columns corresponds to a characteristic for the entities; and in which a point of intersection between each respective row and each of the plurality of columns forms a cell to store a value at the point of intersection.

According to another embodiment, there is a non-transitory computer readable storage medium having instructions stored thereon that, when executed by a processor in a host organization, the instructions cause the host organization to perform operations including: generating indices from a dataset of columns and rows, the indices representing probabilistic relationships between the rows and the columns of the dataset; storing the indices within a database of the host organization; exposing the database of the host organization via a request interface; receiving, at the request interface, a query for the database specifying a SIMILAR command term, a specified row as a parameter for the SIMILAR command term, and a specified column as a parameter for the SIMILAR command term; querying the database using the SIMILAR command term and passing the specified row and the specified column to generate a predictive record set; and returning the predictive record set responsive to the query, the predictive record set having a plurality of elements therein, each of the returned elements of the predictive record set including (i) a row identifier which corresponds to a row of the dataset assessed to be similar, according to a latent structure, to the specified row passed with the SIMILAR command term based on the specified column and (ii) a confidence indicator which indicates a likelihood of a latent relationship between the specified row passed with the SIMILAR command and the row identifier returned for the respective element.

Figure 16A:
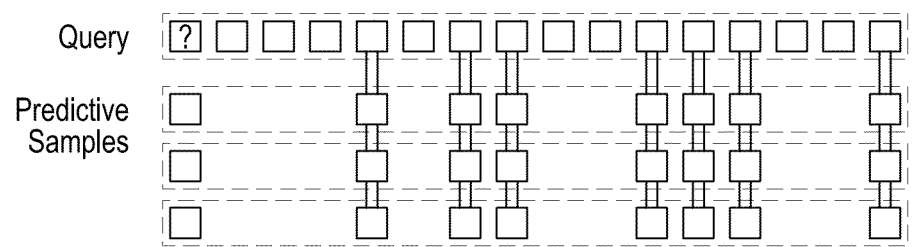
FIG. 16A illustrates usage of the PREDICT command term in accordance with the described embodiments.

FIG. 16A illustrates usage of the PREDICT command term in accordance with the described embodiments. More particularly, the embodiment shown illustrates use of classification and/or regression to query the indices using the PREDICT command term in which the input 1601 to the PREDICT command term fixes a subset of the columns and further in which the output 1602 predicts a single target column. As can be seen from the example, the left most column is to be predicted (e.g., the output 1602 of the PREDICT command term) and several columns are provided to the PREDICT command term as input 1601 (e.g., fifth, seventh, eight, eleventh, twelfth, thirteenth, and sixteenth columns).

With the cross-categorizations technique having been used to create the indices a prediction request presented via the PREDICT command term is treated as a new row for the dataset and the analysis engine assigns that new row to categories in each cross-categorization. Next, using the selected standardized distributions for each category, the values requested are predicted. Unlike conventional predictive analytics, the analysis engine and use of the PREDICT command term provides for flexible predictive queries without customized implementation of models specific to the dataset being analyzed, thus allowing the user of the PREDICT command term to specify as many or as few columns as they desire and further allowing the analysis engine to predict as many or as few elements according to the user's request.

For instance, consider classification or regression in which all but one of the columns are used to predict a single target column. The analysis engine can render the prediction using a single target column or can render the prediction using a few target columns at the user's discretion. For instance, certain embodiments permit a user to query the indices via the PRE- DICT command term to ask a question such as: "Will an opportunity close AND at what amount?" Such capabilities do not exist within conventionally available means.

Using the PREDICT command term, calling an appropriate API for the PREDICT functionality enables users to predict any chosen sub-set of data to predict any column or value. It is not required that an entire dataset be utilized to predict only a single value, as is typical with custom implemented models.

When using the PREDICT command term, the user provides or fixes the value of any column and then the PREDICT API call accepts the fixed values and those the user wants to predict. The PREDICT command term functionality then queries the indices (e.g., via the analysis engine or through the PreQL interface or query interface, etc.) asking: "Given a row that has these values fixed, as provided by the user, then what will the distribution be?" For instance, the functionality may fix all but one column in the dataset and then predict the last one, the missing column, as is done with customized models. But the PREDICT command term functionality is far more flexible than conventional models that are customized to a specific dataset. For instance, a user can change the column to be predicted at a whim whereas custom implemented models simply lack this functionality as they lack the customized mathematical constructs to predict for such unforeseen columns or inquiries. That is to say, absent a particular function having been pre-programmed, the conventional models simply cannot perform this kind of varying query because conventional models are hard-coded to solve for a particular column. Conversely, the methodologies described herein are not hard-coded or customized for any particular column or dataset, and as such, a user is enabled to explore their data by making multiple distinct queries or adapt their chosen queries simply by changing the columns to be predicted as their business needs change over time even if the underlying data and data structures of the client organization do not remain constant.

Perhaps also the user does not know all the columns to fix. For instance, the dataset may contain only limited observed values about one user yet have lots of data about another user. For instance, an ecommerce site may know little about a non-registered passerby user but knows lots of information about a registered user with a rich purchase history. In such an example, the PREDICT command term functionality permits fixing or filling in only the stuff that is known without having to require all the data for all users, as some of the data is known to be missing, and thus, the PREDICT command term easily accommodates missing data and null values that exist in a user's real-world data set. In such a way, the PREDICT command term functionality can still predict missing data elements using the data that is actually known.

Another capability using the PREDICT command term functionality is to specify or fix all the data in a dataset that is known, that is, all non-null values, and then fill in everything else. In such a way, a user can say that what is observed in the dataset is known, and for the data that is missing, render predictions. The PREDICT functionality will thus increase the percentage of filled or completed data in a dataset by utilizing predicted data for missing or null-values by accepting predictions having a predictive quality over a user's specified confidence, or accept all predicted values by sufficiently lowering the minimum confidence threshold required by the user. This functionality is also implemented by a specialized GUI interface as is described herein.

Another functionality using PREDICT is to fill in an empty set. So maybe data is wholly missing for a particular entity row (or rows), and using the PREDICT command term functionality, synthetic data may be generated that represents new rows with the new data in those rows representing plausible, albeit synthetic data.

In other embodiments, PREDICT can be used to populate data elements that are not known but should be present or may be present, yet are not filled in within the data set, thus allowing the PREDICT functionality to populate such data elements.

Another example is to use PREDICT to attain a certainty or uncertainty for any element and to display or return the range of plausible values for the element.

Figure 16B:
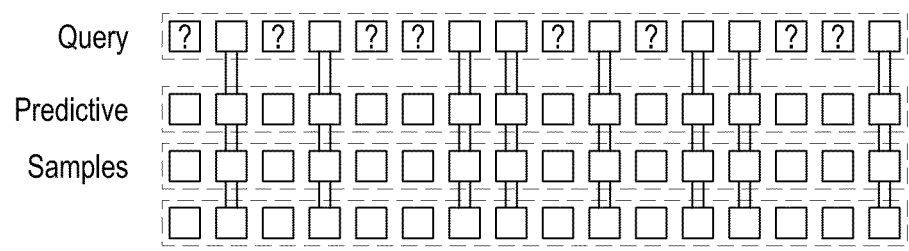
FIG. 16B illustrates usage of the PREDICT command term in accordance with the described embodiments.

FIG. 16B illustrates usage of the PREDICT command term in accordance with the described embodiments. More particularly, the embodiment shown illustrates use of a "fill-in-the-blanks" technique in which missing data or null values within a tabular dataset are filled with predicted values by querying previously generated indices using the PREDICT command term in which the input 1611 to the PREDICT command term fixes a subset of the columns and further in which the output 1612 predicts all of the missing columns or missing elements (e.g., null values) within the remaining missing columns.

For example, a user can take an incomplete row (such as the topmost row depicted with the numerous question marks) and via the PREDICT command term, the user can predict all of the missing values to fill in the blanks. At the extreme, the user can specify as the dataset to be analyzed a table with many missing values across many rows and many columns and then via the PREDICT command term the user can render a table where all of the blanks have been filled in with values corresponding to varying levels of confidence quality.

Specialized tools for this particular use case are discussed below in which UI functionality allows the user to trade off confidence quality (e.g., via a confidence score or a confidence indicator) to populate more or less data within such a table such that more data (or all the data) can be populated by degrading confidence or in the alternative, some but not all can be populated, above a given confidence quality threshold which is configurable by the user, and so forth. A use case specialized GUI is additionally provided and described for this particular use case in more detail below. According to certain embodiments, such a GUI calls the PREDICT command term via an API on behalf of the user, but nevertheless utilizes the analysis engine's functional core consistent with the methodologies described herein to issue PREDICT command term based PreQL queries.

FIG. 16C illustrates usage of the PREDICT command term in accordance with the described embodiments. More particularly, the embodiment shown illustrates use of synthetic data generation techniques in which data that is not actually present within any column or row of the original dataset, but is nevertheless consistent with the original dataset, is returned as synthetic data. Synthetic data generation again utilizes the PREDICT command term as the only input 1621 with none of the columns being fixed. Output 1622 results in all of the columns being predicted for an existing dataset rendering a single synthetic row or rendering multiple synthetic rows, as required by the user.

Such functionality may thus be utilized to fill in an empty set as the output 1622 by calling the PREDICT command term with no fixed columns as the input 1621. Take for example, an entity, real or fictitious, for which the entity row data is wholly missing. By querying the indices using the PREDICT command term the analysis engine will generate data that represents the empty set by providing new entity rows in which the generated synthetic data within the rows provides plausible data, albeit synthetic data. That is to say, the predicted values for such rows are not pulled from the dataset as actually observed data but nevertheless represent data that plausibly may have been observed within the dataset. A confidence quality indicator may, as before, also be utilized to better tune the output 1622 to the user's particular needs.

The synthetic row generated by the analysis engine responsive to the PREDICT command term call will output 1622 one or more entity rows that exhibit all of the structure and predictive relationships as are present in the real data actually observed and existing within the dataset analyzed by the analysis engine. Such a capability may enable a user to generate and then test a dataset that is realistic, but in no way compromises real-world data of actual individuals represented by the entity rows in the dataset without forcing the user seeking such data to manually enter or guess at what such data may look like. This may be helpful in situations where a dataset is needed for test purposes against very sensitive information such as financial data for individuals, HIPAA (Health Insurance Portability and Accountability Act) protected health care data for individuals, and so forth.

Figure 16D:
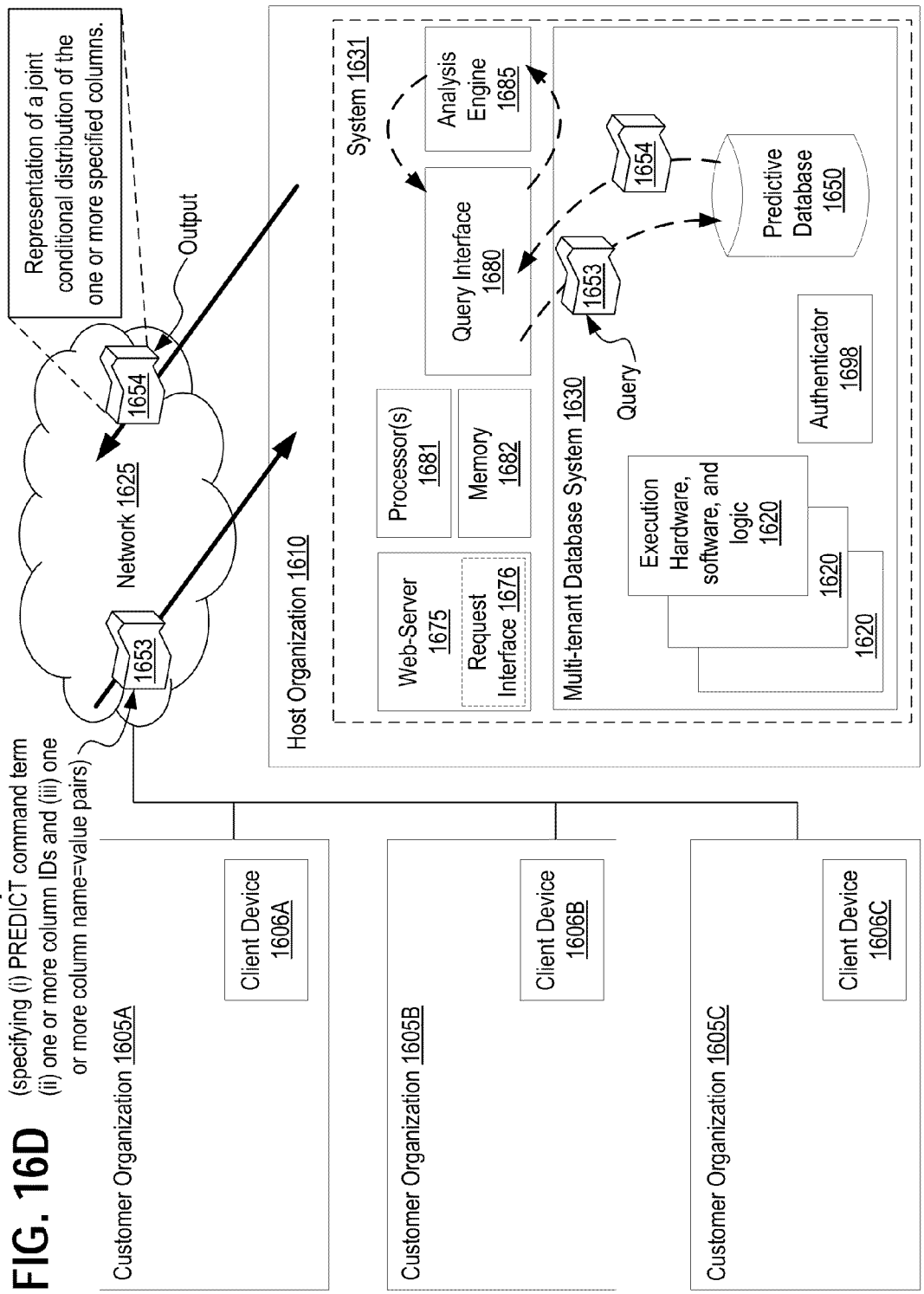
FIG. 16D depicts an exemplary architecture in accordance with described embodiments.

FIG. 16D depicts an exemplary architecture in accordance with described embodiments. In particular, customer organizations 1605A, 1605B, and 1605C are depicted, each with a client device 1606A, 1606B, and 1606C capable of interfacing with host organization 1610 via network 1625, including sending queries and receiving responses. Within host organization 1610 is a request interface 1676 which may optionally be implemented by web-server 1675. The host organization further includes processor(s) 1681, memory 1682, a query interface 1680, analysis engine 1685, and a multi-tenant database system 1630. Within the multi-tenant database system 1630 are execution hardware, software, and logic 1620 that are shared across multiple tenants of the multi-tenant database system 1630, authenticator 1698, and a predictive database 1650 capable of storing indices generated by the analysis engine to facilitate the return of predictive record sets responsive to queries executed against the predictive database 1650.

According to one embodiment, the host organization 1610 operates a system 1631 having at least a processor 1681 and a memory 1682 therein, in which the system 1631 includes an analysis engine 1685 to generate indices from a dataset of columns and rows, in which the indices represent probabilistic relationships between the rows and the columns of the dataset. Such a system 1631 further includes the predictive database 1650 to store the indices; a request interface 1676 to expose the predictive database, for example, to users or to the client devices 1606A-C, in which the request interface 1676 is to receive a query 1653 for the database 1650 specifying at least (i) a PREDICT command term, (ii) one or more specified columns to be predicted, and (iii) one or more column name=value pairs specifying column names to be fixed and the values by which to fix them. According to such a system, a query interface 1680 is to query 1653 the predictive database 1650 using the PREDICT command term and passing the one or more specified columns to be predicted and the one or more column name=value pairs to generate a representation of a joint conditional distribution of the one or more specified columns to be predicted fixed according to the column name=value pairs using the indices stored in the database 1650. For instance, the PREDICT command term and its operands (the one or more column IDs and the one or more column name=value pairs) may be executed against the predictive database 1650.

In such a system 1631, the request interface 1676 is to further return the representation of a joint conditional distribution of the one or more specified columns as output 1654 responsive to the query 1653.

FIG. 16E is a flow diagram 1632 illustrating a method in accordance with disclosed embodiments. Method 1632 may be performed by processing logic that may include hardware (e.g., circuitry, dedicated logic, programmable logic, microcode, etc.), software (e.g., instructions run on a processing device to perform various operations such transmitting, sending, receiving, executing, generating, calculating, storing, exposing, querying, processing, etc., in pursuance of the systems, apparatuses, and methods for implementing a PREDICT command with a predictive query interface, as described herein. For example, host organization 110 of FIG. 1, machine 400 of FIG. 4, or system 1631 of FIG. 16D may implement the described methodologies. Some of the blocks and/or operations listed below are optional in accordance with certain embodiments. The numbering of the blocks presented is for the sake of clarity and is not intended to prescribe an order of operations in which the various blocks must occur.

At block 1691, processing logic generates indices from a dataset of columns and rows, the indices representing probabilistic relationships between the rows and the columns of the dataset.

At block 1692, processing logic stores the indices within a database of the host organization.

At block 1693, processing logic exposes the database of the host organization via a request interface.

At block 1694, processing logic receives, at the request interface, a query for the database specifying at least (i) a PREDICT command term, (ii) one or more specified columns to be predicted, and (iii) one or more column name=value pairs specifying column names to be fixed and the values by which to fix them.

For instance, the one or more column name=value pairs passed with the PREDICT command term according to (iii) above may take the form of, by way of example only, column_abc='string_xyz' or alternatively, {column_abc='string_xyz'} or alternatively, column_abc|'string_xyz' and so forth. Other syntax is permissible according to the API and/or query interface accepting the query. Moreover, multiple such column name=value pairs may be passed.

At block 1695, processing logic queries the database using the PREDICT command term and passes the one or more specified columns to be predicted and the one or more column name=value pairs to generate a representation of a joint conditional distribution of the one or more specified columns to be predicted fixed according to the column name=value pairs using the indices stored in the database.

Processing logic may additionally return the representation of a joint conditional distribution of the one or more specified columns as output, for instance, within a predictive record set responsive to the query.

According to another embodiment, method 1632 further includes: generating a predictive record set responsive to the querying; in which the predictive record set includes a plurality of elements therein, each of the elements specifying a value for each of the one or more specified columns to be predicted; and in which the method further includes returning the predictive record set responsive to the query.

According to another embodiment of method 1632, exposing the database of the host organization includes exposing a Predictive Query Language Application Programming Interface (PreQL API) directly to authenticated users, in which the PreQL API is accessible to the authenticated users via a public Internet.

According to another embodiment of method 1632, querying the database using the PREDICT command term includes passing a PreQL query to the database, the PreQL query having a query syntax of: the PREDICT command term as a required term; a required TARGET term specifying the one or more specified columns to be predicted; a required WHERE term that specifies the column names to be fixed and the values by which to fix them as the one or more column name=value pairs, in which the required WHERE term restricts output of the query to a predictive record set having returned elements that are probabilistically related to the one or more columns to be fixed and the corresponding values by which to fix them as specified; and an optional FROM term specifying one or more tables, datasets, data sources, and/or indices to be queried, when the optional FROM term is specified.

According to another embodiment of method 1632, querying the database using the PREDICT command term includes passing a JavaScript Object Notation (JSON) structured query to the database, the JSON structured query having a query syntax of: the PREDICT command term as a required term; required specification of the one or more specified columns to be predicted; required specification of the column names to be fixed and the values by which to fix them as the one or more column name=value pairs restricting output of the query to a predictive record set having returned elements that are probabilistically related to the one or more columns to be fixed and the corresponding values by which to fix them as specified via the one or more column name=value pairs; and an optional specification of one or more tables, datasets, data sources, and/or indices to be queried.

According to another embodiment of method 1632, exposing the database of the host organization includes exposing a web form directly to authenticated users, in which the web form is accessible to the authenticated users via a public Internet.

According to another embodiment of method 1632, the host organization generates a predictive query for submission to the database based on input from the web form; and in which querying the database using the PREDICT command term includes querying the database using the predictive query via a Predictive Query Language Application Programming Interface (PreQL API) within the host organization, the PreQL API being exposed indirectly to the authenticated users through the web form.

According to another embodiment, method 1632 further includes: returning a predictive record set specifying a predicted value for each of the columns originally in the dataset.

According to another embodiment, method 1632 further includes: returning a synthetic data set responsive to the querying, in which the synthetic data includes synthetic rows having data therein which is consistent with the rows and the columns originally with the dataset according to the indices' probabilistic relationships between the rows and the columns but does not include any original record of the dataset.

According to another embodiment of method 1632, returning the synthetic dataset includes at least one of: anonymizing financial records from the dataset; anonymizing medical records from the dataset; and anonymizing Internet user records from the dataset.

According to another embodiment, method 1632 further includes: returning distributions based on the probabilistic relationships between the rows and the columns of the dataset using the indices; and in which the distributions returned include synthetic data from the indices which are mathematically derived from the columns and rows of the dataset but contain information about data that was not in any original record of the dataset and further in which the indices from which the distributions are derived are not constrained to the scope of the data of the original records of the dataset.

According to another embodiment, method 1632 further includes returning at least one of: a confidence score for the distributions, in which the confidence score ranges from 0 to 1 with 0 indicating no confidence in the predicted value and with 1 indicating a highest possible confidence in the predicted value; and confidence intervals indicating a minimum and maximum value between which there is a certain confidence a value lies.

According to another embodiment of method 1632, returning the distributions based on the probabilistic relationships, further includes: passing an optional record count term with the PREDICT command term when querying the database, the optional record count term specifying a quantity of records to be returned responsive to the querying; and determining a required quantity of processing resources necessary to return the quantity of records specified by the record count.

According to another embodiment of method 1632, returning the distributions based on the probabilistic relationships, further includes: passing a minimum accuracy threshold with the PREDICT command term when querying the database; and determining a required population of samples to be returned to satisfy the minimum accuracy threshold as a lower bound.

According to another embodiment of method 1632, querying the database using the PREDICT command term includes executing a Predictive Query Language (PreQL) structured query against the database for the PREDICT command term; and in which the method further includes executing one or more additional PreQL structured queries against the database, each of the one or more additional PreQL structured queries specifying at least one command selected from the group of PreQL commands including: PREDICT, RELATED, SIMILAR, and GROUP.

According to another embodiment, method 1632 further includes: receiving the dataset from an authenticated subscriber and subsequently receiving the query for the database from the authenticated subscriber; and processing the dataset on behalf of the authenticated subscriber to generate the indices.

According to another embodiment of method 1632, each of the plurality of rows in the dataset corresponds to an entity; in which each of the plurality of columns corresponds to a characteristic for the entities; and in which a point of intersection between each respective row and each of the plurality of columns forms a cell to store a value at the point of intersection.

According to another embodiment there is a non-transitory computer readable storage medium having instructions stored thereon that, when executed by a processor in a host organization, the instructions cause the host organization to perform operations including: generating indices from a dataset of columns and rows, the indices representing probabilistic relationships between the rows and the columns of the dataset; storing the indices within a database of the host organization; exposing the database of the host organization via a request interface; receiving, at the request interface, a query for the database specifying at least (i) a PREDICT command term, (ii) one or more specified columns to be predicted, and (iii) one or more column name=value pairs specifying column names to be fixed and the values by which to fix them; and querying the database using the PREDICT command term and passing the one or more specified columns to be predicted and the one or more column name=value pairs to generate a representation of a joint conditional distribution of the one or more specified columns to be predicted fixed according to the column name=value pairs using the indices stored in the database.

Figure 16F:
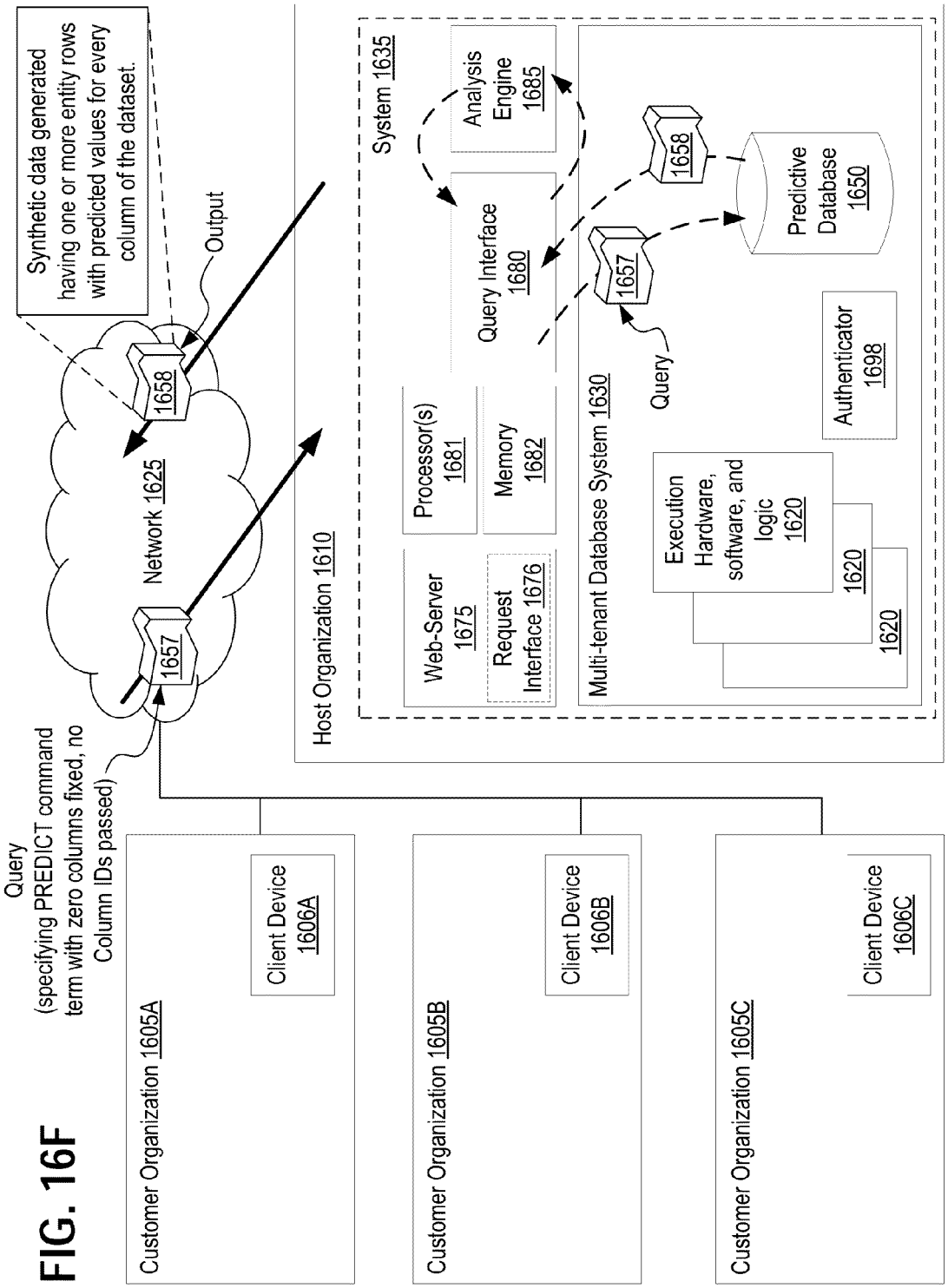
FIG. 16F depicts an exemplary architecture in accordance with described embodiments.

FIG. 16F depicts an exemplary architecture in accordance with described embodiments. The embodiment depicted here is identical to that of FIG. 16D except that the query 1657 specifying the PREDICT command term is utilized with zero columns fixed, that is, there are no column IDs passed with the PREDICT command term whatsoever. Consequently, the output 1658 returned responsive to the query 1657 provides synthetic data generated having one or more entity rows with predicted values for every column of the dataset.

According to one embodiment, the host organization 1610 operates a system 1635 having at least a processor 1681 and a memory 1682 therein, in which the system 1635 includes an analysis engine 1685 to generate indices from a dataset of columns and rows, in which the indices represent probabilistic relationships between the rows and the columns of the dataset. Such a system 1635 further includes the predictive database 1650 to store the indices; a request interface 1676 to expose the predictive database, for example, to users or to the client devices 1606A-C, in which the request interface 1676 is to receive a query 1657 for the predictive database 1650 specifying a PREDICT command term and with zero columns fixed such that no column IDs are passed with the PREDICT command term. In such a system, a query interface 1680 is to query 1657 the predictive database 1650 using the PREDICT command term without any specified columns to generate as output 1658, generated synthetic data having one or more entity rows with predicted values for every column of the dataset. In such a system 1611, the request interface 1676 is to further return the generated synthetic data having one or more entity rows with predicted values for every column of the dataset as output 1658 responsive to the query 1657.

FIG. 16G is a flow diagram 1633 illustrating a method in accordance with disclosed embodiments. Method 1633 may be performed by processing logic that may include hardware (e.g., circuitry, dedicated logic, programmable logic, microcode, etc.), software (e.g., instructions run on a processing device to perform various operations such transmitting, sending, receiving, executing, generating, calculating, storing, exposing, querying, processing, etc., in pursuance of the systems, apparatuses, and methods for implementing a PREDICT command with a predictive query interface, as described herein. For example, host organization 110 of FIG. 1, machine 400 of FIG. 4, or system 1635 of FIG. 16F may implement the described methodologies. Some of the blocks and/or operations listed below are optional in accordance with certain embodiments. The numbering of the blocks presented is for the sake of clarity and is not intended to prescribe an order of operations in which the various blocks must occur.

At block 1670, processing logic generates indices from a dataset of columns and rows, the indices representing probabilistic relationships between the rows and the columns of the dataset.

At block 1671, processing logic stores the indices within a database of the host organization.

At block 1672, processing logic exposes the database of the host organization via a request interface.

At block 1673, processing logic receives, at the request interface, a query for the database specifying a PREDICT command term and one or more specified columns to be passed with the PREDICT command term.

At block 1674, processing logic queries the database using the PREDICT command term and the one or more specified columns to generate output, in which the output includes generated synthetic data having one or more entity rows with predicted values for every column of the dataset using the indices stored in the database.

Processing logic may additionally return the generated synthetic data as output, for instance, within a predictive record set responsive to the query.

According to another embodiment, method 1633 further includes: returning the generated synthetic data having one or more entity rows with predicted values for every column of the dataset as a synthetic data set responsive to the querying, in which the generated synthetic data includes synthetic rows having data therein which is consistent with the rows and the columns originally with the dataset according to the indices' probabilistic relationships between the rows and the columns but does not include any original record of the dataset.

According to another embodiment of method 1633, returning the synthetic dataset includes at least one of: anonymizing financial records from the dataset; anonymizing medical records from the dataset; and anonymizing Internet user records from the dataset.

According to another embodiment there is a non-transitory computer readable storage medium having instructions stored thereon that, when executed by a processor in a host organization, the instructions cause the host organization to perform operations including: generating indices from a dataset of columns and rows, the indices representing probabilistic relationships between the rows and the columns of the dataset; storing the indices within a database of the host organization; exposing the database of the host organization via a request interface; receiving, at the request interface, a query for the database specifying a PREDICT command term and with zero columns fixed such that no column IDs are passed with the PREDICT command term; and querying the database using the PREDICT command term and the one or more specified columns to generate output, in which the output includes generated synthetic data having one or more entity rows with predicted values for every column of the dataset using the indices stored in the database.

Figure 17A:
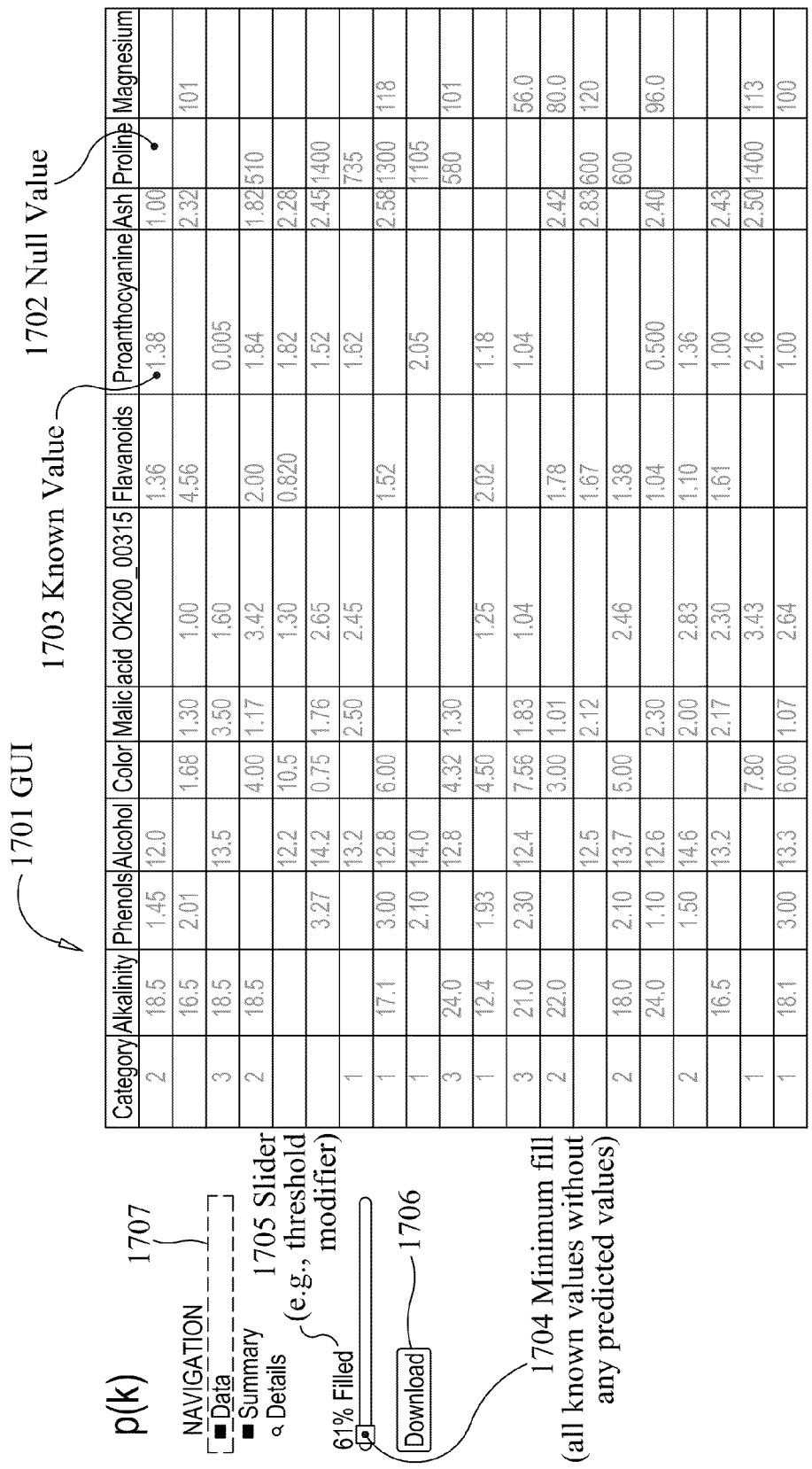
FIG. 17A depicts a Graphical User Interface (GUI) to display and manipulate a tabular dataset having missing values by exploiting a PREDICT command term.

FIG. 17A depicts a Graphical User Interface (GUI) 1701 to display and manipulate a tabular dataset having missing values by exploiting a PREDICT command term. More particularly, a GUI is provided at a display interface to a user which permits the user to upload or specify a dataset having columns and rows and then display the dataset as a table and subject it to manipulation by populating missing values (e.g., null-values) with predicted values. At element 1707 the user specifies the data to be analyzed and displayed via the GUI 1701. For instance, the user may browse a local computing device for a file, such as an excel spreadsheet, and then upload the file to the system for analysis, or the user may alternatively specify a dataset which is accessible to the host organization which is providing the GUI 1701. For instance, the host organization is a cloud based service provider and where the user's dataset already resides within the cloud, the user can simply specify that dataset as the data source via the action at element 1707.

In the example depicted at FIG. 17A, the displayed table provided by the user is 61% filled. The table is only partially filled because the user's dataset provided has many missing data elements. The presently displayed values in grayscale depict known values, such as the known value "1.38" at the topmost row in the Proanthocyanine column depicted by element 1703. Two columns to the right at the Proline column there is a null value displayed at the topmost row displayed simply as an empty cell as depicted by element 1702.

In this initial depiction, all known values 1703 are depicted and correspond to actual observed data within the underlying dataset. According to this embodiment, the slider 1705 which operates as a threshold modifier is all the way to the left hand side and represents the minimum fill 1704 given that all known values are displayed without any predicted values being displayed. Accordingly, the confidence of all values displayed may be considered to be 100% given that all values are actually observed within the dataset provided and no values are predicted. The slider control may be utilized as a threshold modifier to control the fill percentage of the table which in turn alters the necessary confidence thresholds to attain a user specified fill percentage or alternatively, the slider control may be utilized as a threshold modifier to control the user's acceptable level of uncertainty, and thus, as the user's specified acceptable level of uncertainty changes, the percentage of fill of the table will increase or decrease according to available predictive values that comply with the user's specified acceptable level of uncertainty. In other embodiments, acceptable level of uncertainty may be specified via, for example, a text entry box, or other control means.

The user may click the download 1706 action to download the displayed table in a variety of formats, however, such a table will correspond to the source table that was just specified or uploaded via the data 1707 action.

No values are predicted, but the user may simply move the slider to increase the data fill for the missing values, causing the GUI's functionality to utilize the predict function on behalf of the user. Just above the slider the user is informed of the current state of the minimum fill 1704, which according to the example displayed, is the 61% as noted above, but will change as the slider is moved.

Figure 17B:
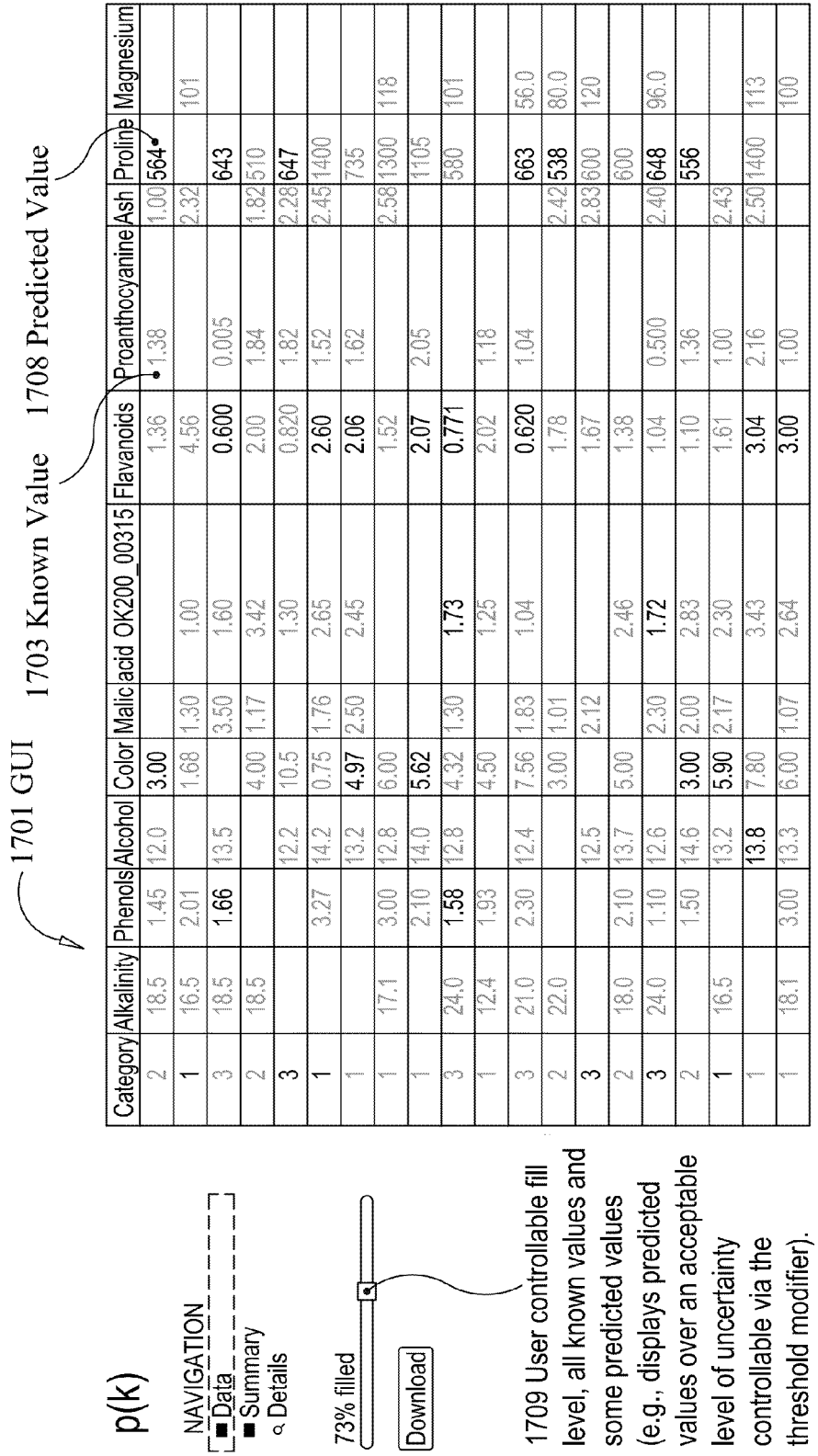
FIG. 17B depicts another view of the Graphical User Interface.

FIG. 17B depicts another view of the Graphical User Interface. Here, the displayed table has populated some but not all of the null values (e.g., missing data) with predicted values. For instance, the previously empty cell in the topmost row at the Proline column corresponding to null value within the user's underlying dataset is now populated with predicted value "564" as depicted by element 1708. Notably, the value 564 does not reside at this location within the user's underlying dataset and was not observed within the user's underlying dataset. Rather, the GUI 1701 has instituted a PREDICTED command term call on the user's behalf to retrieve the predicted value 1708 result displayed here. In this example, all of the values in gray scale are known values and all of the values of the table displayed in solid black are predicted values that have replaced previously unknown null values of the same dataset.

The slider now shows 73% fill as depicted by element 1709 and some but not all missing values are now populated with predicted values. The fill level is user controllable simply by moving the slider back and forth to cause the GUI 1701 to populate missing data values with predicted values or to remove predicted values as the user's specified acceptable level of uncertainty is increased or decreased respectively.

Not depicted on this example is a user configurable minimum confidence threshold which may be set via a text box, dropdown, slider, etc. Such a GUI element permits the user to specify the minimum confidence required for a predicted value to be displayed at the GUI 1701. In one embodiment having the minimum confidence threshold additionally causes a maximum fill value to be displayed and the slider at element 1709 is then limited to the maximum fill as limited by the minimum confidence threshold.

This is because as the fill percentage increases it is necessary to degrade the confidence quality of the predicted values populating the null values. Conversely, as the fill percentage decreases the confidence quality may be increased.

Thus, if a user dictates a perfect (e.g., 100%) confidence quality, then it is unlikely that any null values can be filled because it is unlikely to predict with 100% confidence any missing value. All of the actually observed values will, however, continue to be displayed as they are known from the underlying dataset with 100% confidence. Conversely, if the same user dictates a very low confidence (e.g., 25%), then it is very likely that most, if not all missing values can be predicted as the 25% requirement is a low threshold in terms of confidence quality. It is feasible with some datasets that all or nearly all of the null values may be predicted with a relatively high (e.g., 80%) confidence depending on the quality of the underlying dataset, the size of the population in the underlying dataset, etc. Regardless, the GUI 1701 permits the user to experiment with their own dataset in a highly intuitive manner without even having to understand how the PREDICT command term operates, what inputs it requires, how to make the PreQL or JSON API call, and so forth. Such a GUI 1701 therefore can drastically lower the learning curve of lay users wishing to utilize the predictive capabilities provided by the analysis engine's core.

FIG. 17C depicts another view of the Graphical User Interface. Here the GUI 1701 retains its previously depicted known values 1703 and predicted values 1708 but the user controllable slider has been moved all the way to the right to a 100% maximum fill as depicted by element 1709, such that all known values remain in the table display but 100% of the null values in the dataset are also populated and displayed at the GUI 1701.

Additionally shown is a minimum confidence threshold action at element 1710 as an optional input field for specifying the minimum confidence threshold that was noted previously (e.g., via a dropdown, text box, slider, radio buttons, etc.). Some tables can be displayed at 100% with a minimum confidence threshold greater than zero whereas others will require that if the minimum confidence threshold is specified at 1710, then it may need to be at or near zero if the underlying quality of the dataset is poor. These determinations will fall out of the dataset according to the probabilistic interrelatedness of the data elements and the presence or absence of noise.

Nevertheless, the minimum confidence threshold is specified at 1710 permits a lay user to experiment with their dataset in a highly intuitive manner. If the user specifies a minimum confidence threshold at 1710 that does not permit a 100% fill, then the max % filled or fill percentage will indicate the extent of fill feasible according to the minimum confidence threshold set by the user at 1710 when the slider is moved all the way to the right.

Because the table is displayed at 100% fill, all null or missing values are predicted, but it may be necessary to degrade the confidence somewhat to attain the 100% fill, in which case the optional minimum confidence threshold at 1710 may remain unset, grayed out, deactivated, or simply not displayed to the user.

According to certain embodiments, the chosen fill level or acceptable level of uncertainty, as selected by the user via the slider bar (or controlled via the optional minimum confidence threshold at 1710) can be "saved" by clicking the download action to capture the displayed dataset. The displayed copy can be saved as a new version or saved over the original version of the table at the discretion of the user, thus resulting in the predictive values provided being saved or input to the cell locations within the user's local copy. Metadata can additionally be used to distinguish the predicted values from actual known and observed values such that subsequent use of the dataset is not corrupted or erroneously influenced by the user's experimental activities using the GUI 1701.

The control slider at element 1709 is feasible because when a user asks for a value to be predicted, such as a missing value for "income," what is actually returned to the GUI functionality making the PREDICT command term API call is the respective persons' income distribution as predicted by the analysis engine modeling in order to generate the indices which are then queried by the PREDICT command term. The returned distribution for a predicted value permits the GUI to select a value to be displayed as well as restrict the display according to confidence quality. In other embodiments, a confidence indicator is returned rather than a distribution.

By using such a GUI interface or such a concept in general, the user is given control over accuracy and confidence. In such a way, the user can manipulate how much data is to be filled in and to what extent the confidence quality threshold applies, if at all. Behind the scenes and out of view from the user, the GUI 1701 makes PREDICT command term API calls against an analyzed dataset specified by the user. The analysis engine takes the user's dataset, such as a table with a bunch of typed columns, and then renders a prediction for every single cell having a null value at the request of the GUI 1701. For each cell that is missing, the GUI 1701 is returned a distribution or a confidence indicator from the PREDICT command term API calls and when the slider is manipulated by a user, functionality of the GUI's slider looks at the distributions for the null values, looks at variances for the distributions of the null values, and then displays its estimates as the predicted values shown in the examples. Thus, for any given cell having a predicted result in place of the missing null value, the GUI 1701 by exploiting the PREDICT command term functionality represents to the user a value for the null value on the basis of having seen multiple other known values or observed values in the underlying dataset. The GUI 1701 itself does not perform the analysis of the dataset but merely benefits from the data returned from the PREDICT command term API calls as noted above.

According to one embodiment, starting with nothing more than raw data in a tabular form, such as data in a spreadsheet or data stored within one or more tables of a relational database, an UPLOAD command term API call is first made by the GUI to upload or insert the data into the predictive database upon which the analysis engine operates to analyze the data, either automatically or responsive to an ANALYZE command term API call. For example, where the user is paying service fees for access to the functionality the GUI may indicate pricing to the user upon uploading of the data and request acceptance prior to triggering the analyzing by the analysis engine. In other instances the analysis engine simply performs the analysis automatically. Regardless, upon uploading the data specified by the user, the data looks just like all other tabular data, but once uploaded and analyzed by the analysis engine, a probabilistic model is executed against the data and the analysis engine learns through its modeling how the rows and the columns can interact with each other through which various probabilistic relationships and causations are built and represented within the generated indices as is described herein. For instance, a generated statistical index figures out how and which columns are related to another to learn, for instance, that a particular subset of columns are likely to share a causal origin.

The difficult problem is that the analysis engine must perform its analysis using real world data provided by the user rather than pristine and perfect datasets and most do so without knowing in advance the underlying structure of the data to be analyzed. With data that exists in the real world, some columns are junk, some columns are duplicates, some columns are heterogeneous (e.g., not consistently data typed), some columns are noisy with only sparsely populated data or populated with noisy erroneous data, etc. The analysis engine through its statistical index and other modeling identifies the appropriate relationships and causations despite the absence of perfectly pristine data or a standardized data structure.

Through the statistical index and other modeling, a distribution of indices results in a model that is stored as queryable indices in support of the predictive queries including those utilized by the described GUI 1701. Other specialized GUIs and API tools which also utilize the PREDICT command term as well as other predictive PreQL queries include business opportunity scoring, next best offer identification, etc. These and other examples are described in additional detail later in the specification.

Figure 17D:
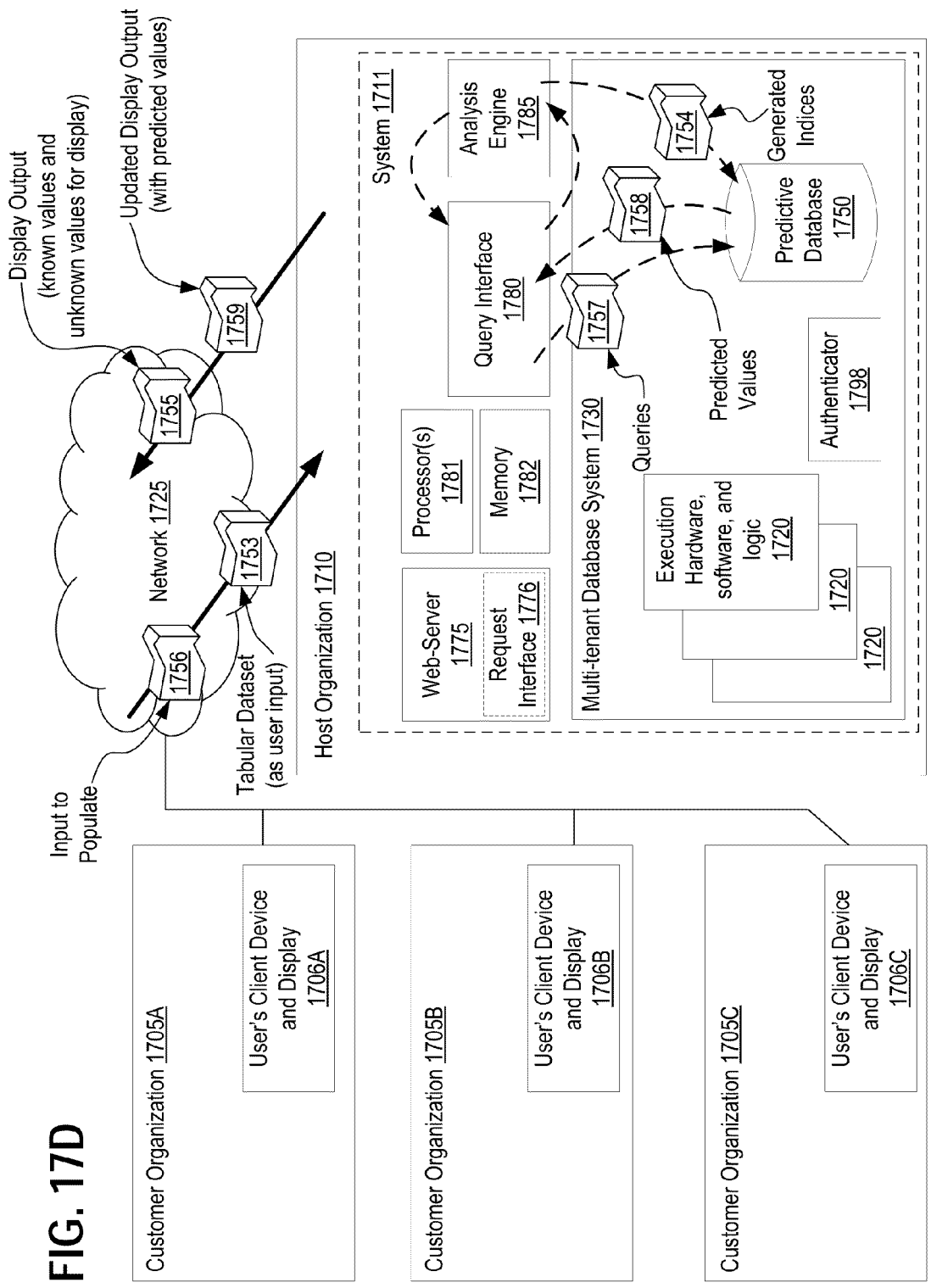
FIG. 17D depicts an exemplary architecture in accordance with described embodiments.

FIG. 17D depicts an exemplary architecture in accordance with described embodiments. In particular, customer organizations 1705A, 1705B, and 1705C are depicted, each with a user's client device and display 1706A, 1706B, and 1706C capable of interfacing with host organization 1710 via network 1725, including sending input, queries, and requests and responsively receiving responses including output for display. Within host organization 1710 is a request interface 1776 which may optionally be implemented by web-server 1775. The host organization further includes processor(s) 1781, memory 1782, a query interface 1780, analysis engine 1785, and a multi-tenant database system 1730. Within the multi-tenant database system 1730 are execution hardware, software, and logic 1720 that are shared across multiple tenants of the multi-tenant database system 1730, authenticator 1798, and a predictive database 1750 capable of storing indices generated by the analysis engine 1785 to facilitate the return of predictive record sets responsive to queries executed against the predictive database 1750.

According to one embodiment, the host organization 1710 operates a system 1711 having at least a processor 1781 and a memory 1782 therein, in which the system 1711 includes a request interface 1776 to receive a tabular dataset 1753 from a user as input, in which the tabular dataset includes data values organized as columns and rows. The user may provide the tabular dataset 1753 as a file attachment or specify the location for the tabular dataset 1753. Such a system 1711 further includes an analysis engine 1785 to identify a plurality of null values within the tabular dataset 1753 received from the user or specified by the user, in which the null values are dispersed across multiple rows and multiple columns of the tabular dataset. In such an embodiment, the analysis engine 1785 further generates indices 1754 from the tabular dataset of columns and rows, in which the indices represent probabilistic relationships between the rows and the columns of the tabular dataset 1753. The request interface 1776 is to return the tabular dataset as display output 1755 to the user, the display output 1755 including the data values depicted as known values and the null values depicted as unknown values; the request interface 1776 is to further receive input to populate 1756 from the user. Such input may be, for example, input via a slider control, a user specified minimum confidence threshold, etc. The input to populate 1756 received from the user specifies that at least a portion of the unknown values within the displayed tabular dataset are to be populated with predicted values 1758 retrieved from the indices stored within the predictive database 1750. Such predicted values 1758 may be returned from the indices stored within the predictive database 1750 responsive to queries 1757 constructed and issued against the predictive database 1750 by the analysis engine 1785 and/or query interface 1780.

For example, in such a system the query interface 1780 may query the indices (e.g., via queries 1757) for the predicted values 1758 subsequent to which the request interface 1776 returns the predicted values 1758 as updated display output 1759 to the user via the user's client device and display 1706A-C. For example, the updated display output then presents at the user's client device and display 1706A-C now depicting predicted values in place of the previously depicted unknown values corresponding to missing data or null value entries within the original tabular dataset 1753 provided or specified by the user.

According to another embodiment, the system 1711 further includes a predictive database 1750 to store the indices generated by the analysis engine. In such an embodiment, the predictive database 1750 is to execute as an on-demand cloud based service at the host organization 1710 for one or more subscribers.

In another embodiment, the system 1711 further includes an authenticator 1798 to verify the user (e.g., a user at one of the user's client device and display 1706A-C) as a known subscriber. The authenticator 1798 then further operates to verify authentication credentials presented by the known subscriber.

In another embodiment, the system 1711 further includes a web-server 1775 to implement the request interface; in which the web-server 1775 is to receive as input; a plurality of access requests from one or more client devices from among a plurality of customer organizations communicably interfaced with the host organization via a network; a multi-tenant database system with predictive database functionality to implement the predictive database; and in which each customer organization is an entity selected from the group consisting of: a separate and distinct remote organization, an organizational group within the host organization, a business partner of the host organization, or a customer organization that subscribes to cloud computing services provided by the host organization.

Figure 17E:
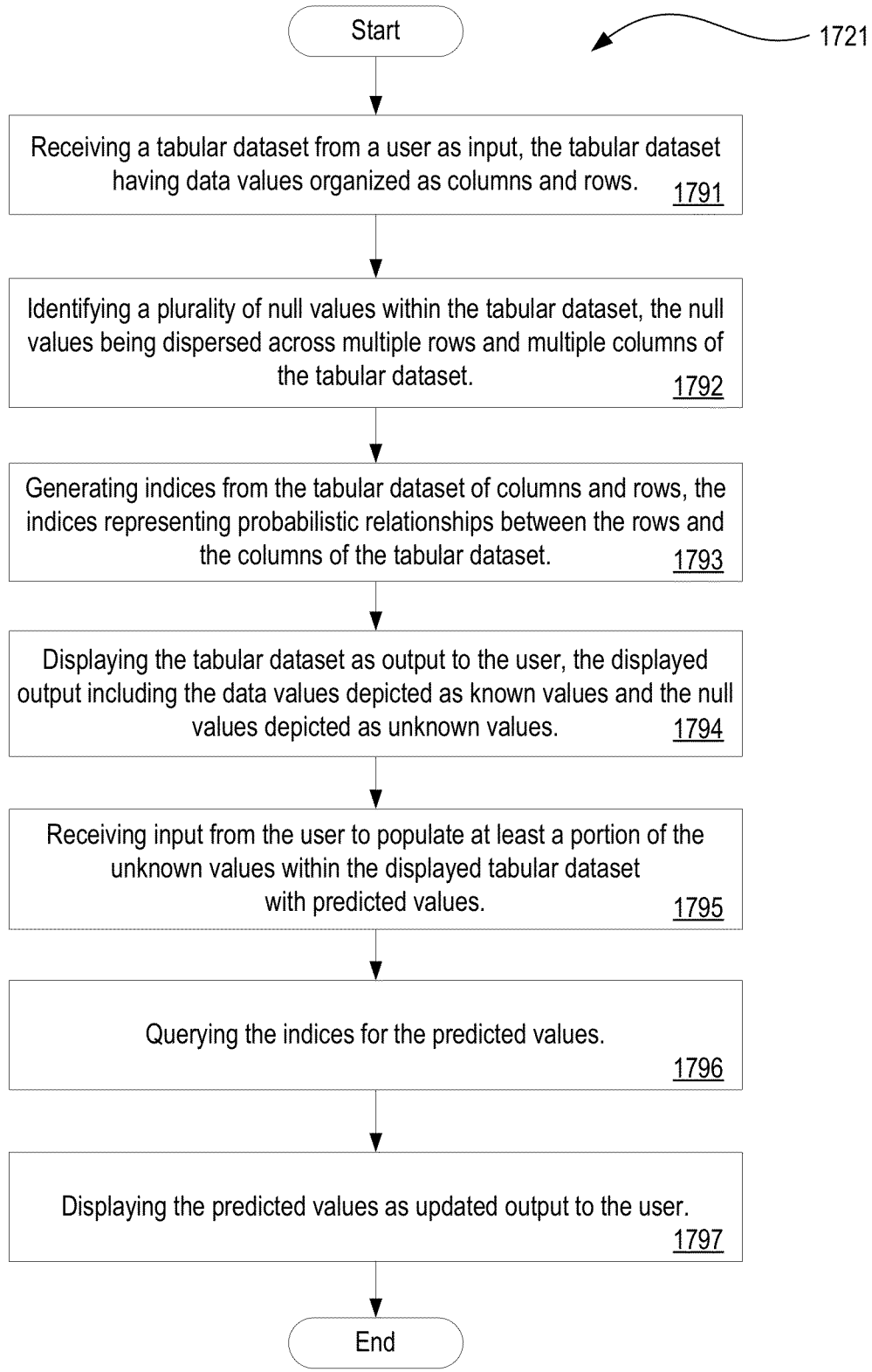
FIG. 17E is a flow diagram illustrating a method in accordance with disclosed embodiments.

FIG. 17E is a flow diagram illustrating a method in accordance with disclosed embodiments. Method 1721 may be performed by processing logic that may include hardware (e.g., circuitry, dedicated logic, programmable logic, microcode, etc.), software (e.g., instructions run on a processing device to perform various operations such transmitting, sending, receiving, executing, generating, calculating, storing, exposing, querying, processing, etc., in pursuance of the systems, apparatuses, and methods for displaying a tabular dataset and predicted values to a user display, as described herein. For example, host organization 110 of FIG. 1, machine 400 of FIG. 4, or system 1711 of FIG. 17D may implement the described methodologies. Some of the blocks and/or operations listed below are optional in accordance with certain embodiments. The numbering of the blocks presented is for the sake of clarity and is not intended to prescribe an order of operations in which the various blocks must occur.

At block 1791, processing logic receives a tabular dataset from a user as input, the tabular dataset having data values organized as columns and rows.

At block 1792, processing logic identifies a plurality of null values within the tabular dataset, the null values being dispersed across multiple rows and multiple columns of the tabular dataset.

At block 1793, processing logic generates indices from the tabular dataset of columns and rows, the indices representing probabilistic relationships between the rows and the columns of the tabular dataset.

At block 1794, processing logic displays the tabular dataset as output to the user, the displayed output including the data values depicted as known values and the null values depicted as unknown values.

At block 1795, processing logic receives input from the user to populate at least a portion of the unknown values within the displayed tabular dataset with predicted values.

At block 1796, processing logic queries the indices for the predicted values.

At block 1797, processing logic displays the predicted values as updated output to the user.

Notably, blank values represented by the "unknown values" or "null values" within a dataset may occur anywhere within a tabular dataset and yet permit a user to intuitively explore the dataset by having the analysis engine's core analyze and seamlessly enable users to fill in values wherever data is missing according to various criteria, such as minimum confidence thresholds, a user configurable slider mechanism such as the one presented via the GUIs of FIGS. 17A-C, and so forth. Microsoft's Excel program is very good at calculating the next column over or the next row down based on an algorithm, but such conventional spreadsheet programs cannot tolerate missing values or holes within the dataset across different rows and different columns, especially when there are multiple unknown values within a single row or multiple missing values within a single column.

The tabular dataset analyzed and displayed back to the user does not operate by copying a known algorithm to another cell location based on a relational position in the manner that an Excel spreadsheet may operate. Rather, the population and display of missing or unknown values to a user is based on querying for and receiving predicted values for the respective cell location which is then displayed to the user within the tabular dataset displayed back to the user. This is made possible through the analysis and generation of probabilistic based indices from the originally received dataset. Conventional solutions such as Excel spreadsheets simply do not perform such analysis nor do they generate such indices, and as such, they cannot render predicted values for multiple missing cells spread across multiple rows and columns of the dataset.

According to one embodiment, predictions for all of the missing cells are determined for an entire tabular dataset received, and then as the user selects a particular certainty level (e.g., such as a minimum confidence level, etc.) the display is then updated with the values that meet the criteria. For instance, cells with missing values having a predicted value with a corresponding confidence indicator in excess of a default threshold or a user specified threshold may then be displayed to the user.

According to another embodiment of method 1721, generating indices from the tabular dataset of columns and rows further includes storing the indices within a database of the host organization; and in which querying the indices for the predicted values includes querying the database for the predicted values.

According to another embodiment of method 1721, receiving input from the user to populate at least a portion of the unknown values within the displayed tabular dataset with predicted values includes receiving input from the user to populate all unknown values within the displayed tabular dataset with predicted values; in which querying the indices for the predicted values includes querying the indices for a predicted value for every null value identified within the tabular dataset; and in which displaying the predicted values as updated output to the user includes replacing all unknown values by displaying corresponding predicted values.

According to another embodiment of method 1721, the plurality of null values within the tabular dataset are not restricted to any row or column of the tabular dataset; and in which displaying the predicted values as updated output to the user replaces the unknown values displayed with the tabular dataset without restriction to any row or column and without changing the indices upon which the predicted values are based.

According to another embodiment of method 1721, querying the indices for the predicted values includes querying the indices for each and every one of the identified plurality of null values within the tabular dataset; in which the method further includes receiving the predicted values for each and every one of the identified plurality of null values within the tabular dataset responsive to the querying; and in which displaying the predicted values as updated output to the user includes displaying the received predicted values.

According to another embodiment of method 1721, querying the indices for the predicted values includes: generating a Predictive Query Language (PreQL) query specifying a PREDICT command term for each and every one of the identified plurality of null values within the tabular dataset; issuing each of the generated PreQL queries to a Predictive Query Language Application Programming Interface (PreQL API); and receiving a predicted result for each and every one of the identified plurality of null values within the tabular dataset responsive to the issued PreQL queries.

According to another embodiment of method 1721, displaying the tabular dataset further includes: displaying the known values using black text within cells of a spreadsheet; displaying the unknown values as blank cells within the spreadsheet; and displaying the predicted values using colored or grayscale text within the cells of the spreadsheet.

According to another embodiment of method 1721, displaying the predicted values as updated output to the user includes displaying the updated output within a spreadsheet or table at a Graphical User Interface (GUI); in which the known values are displayed as populated cells within the spreadsheet or table at the GUI in a first type of text; in which predicted values are displayed as populated cells within the spreadsheet or table at the GUI in a second type of text discernable from the first type of text corresponding to the known values; and in which any remaining unknown values are displayed as empty cells within the spreadsheet or table at the GUI.

According to another embodiment of method 1721, displaying the tabular dataset as output to the user and displaying the predicted values as updated output to the user includes displaying the tabular dataset and the predicted values within a spreadsheet or table at a Graphical User Interface (GUI); in which the GUI further includes a slider interface controllable by the user to specify an acceptable degree of uncertainty for the spreadsheet or table; and in which receiving input from the user to populate at least a portion of the unknown values within the displayed tabular dataset with predicted values includes receiving the acceptable degree of uncertainty as input from the user via the slider interface.

According to another embodiment, method 1721 further includes: displaying a minimum fill percentage for the GUI, wherein the minimum fill percentage corresponds to a percentage of known values within the tabular dataset from a sum of all null values and all known values for the tabular dataset.

According to another embodiment of method 1721, the slider interface controllable by the user to specify the acceptable degree of uncertainty for the spreadsheet or table is restricted to a range encompassing the minimum fill percentage and a maximum degree of uncertainty necessary to completely populate the displayed tabular dataset.

For instance, completely populating the displayed tabular dataset will result in a 100% fill percentage but does not necessarily require the user to specify an acceptable degree of uncertainty equal to 100%. Rather, it may be feasible that the displayed tabular dataset attains a 100% fill percentage (e.g., every single null or unknown value is populated with a predictive result) at a user specified acceptable degree of uncertainty of, by way of example, 50%. Regardless of which acceptable degree of uncertainty the user specifies, as the acceptable degree of uncertainty is increased, a greater portion of the table will be filled, and as the acceptable degree of uncertainty is decreased, a lesser portion of the table will be filled, thus permitting the user to dynamically explore how predictive confidence affects the displayed results in a highly intuitive manner.

According to another embodiment, method 1721 further includes: populating the spreadsheet or table of the GUI to a 100% fill percentage responsive to input by the user specifying a maximum acceptable degree of uncertainty via the slider interface; and populating all null values by degrading a required confidence for each of the predicted values until a predicted value is available for every one of the plurality of null values within the tabular dataset.

Unknown values correspond to data that is simply missing from the tabular dataset, whereas known values may be defined as those values that are truly certain because the data was actually observed. Thus, an initial presentment of the tabular dataset back to the user as output may include all values that are truly certain, that is, the initial output may simply display back all values actually observed within the original tabular dataset in a table or spreadsheet type format. Unknown values will therefore still be missing. However, such a display may be displayed at 100% confidence because only known data is displayed. This level of fill or this extent of population for the displayed output therefore corresponds to the minimum fill percentage, a value which may also be displayed to the user.

At the opposite end of the spectrum, the user may request to see a fully populated table, despite the originally presented tabular dataset having unknown values. This may be accomplished by presenting the users all predicted values having greater than zero certainty, and thus defined as fully filling in the displayed table or fully populating the displayed table. When fully filling the table, any blanks identified will be provided with a predicted value for display regardless of confidence for the predicted value. Thus, all values between a "0" certainty and "1" certainty are displayed. Such a view is available to the user, however, the display may additionally indicate that certainty for certain predicted values is poor or indicate a confidence score for the predicted value with a lowest confidence quality, and so forth. In alternative embodiments, a user may specify a minimum confidence quality threshold and then displayed values will be restricted on the basis of the user specified minimum confidence quality threshold. Where a user specified minimum confidence quality threshold is specified as being greater than zero the maximum fill percentage may fall below 100% as there are likely cells that are not capable of being predicted with a confidence in excess of the user specified minimum confidence quality threshold.

Thus, in accordance with another embodiment, method 1721 further includes: displaying a user controllable minimum confidence threshold at a Graphical User Interface (GUI) displaying the tabular dataset as output to the user within a spreadsheet or table; receiving a user specified minimum confidence threshold as input via the user controllable minimum confidence threshold; and in which displaying the predicted values as updated output to the user includes displaying only the predicted values at the GUI having a corresponding confidence indicator equal to or greater than the user specified minimum confidence threshold.

In certain embodiments, queries are constructed and then issued for every missing cell or unknown value within the tabular dataset and predictions are then responsively returned. Taking one of those missing values, a confidence indicator may be returned as a value or a distribution may be returned which allows for further analysis. Take for example, a particular missing cell which is then used to query for a predicted true|false value. The query may return the results of an exemplary 100 predictions. Perhaps 75 of the predictions return true whereas 25 of the predictions return false. It may therefore be said that the value being predicted has a 75% certainty of being true. That 75% certainty may then be compared against a threshold to determine whether or not to display the value. There are, however, many other ways of computing a certainty or a confidence indicator besides this basic example. In a more complex example, say the results of a prediction for a true|false value were 50-50, with the prediction results coming back as 50 true and 50 false. In such a case, although the result is 50% certain to be true and 50% certain to be false, the middle of the road 50-50 result is also maximally uncertain. In other words, the 50-50 result is the least certain result possible, and thus, corresponds to maximal uncertainty.

Predictions are not limited to simply true|false. Take for example a null value for an RGB field in which there is a closed set with three color possibilities; red, green and blue. Here the prediction may return 100 exemplary guesses or predictions, as before, but now attempting to predict the color value as one of red, green, or blue. Thus, the results may have a small percentage of the results as red, a much larger percentage as green, and some medium percentage as blue. With such a result, the predicted value for the unknown cell may therefore be returned as green with the certainty being the proportion of attempted predictions that returned green out of all guesses. Thus, if 100 attempts were made to determine the RGB value and 43 of those came back green, then it may be determined that certainty is 43 percent to be green. Again, many other examples and interpretations of a returned distribution are feasible. In certain situations the analysis engine simply returns a value or score representative of confidence or certainty in the result whereas in other situations, distributions are returned representative of many attempts made to render the predicted value.

According to another embodiment, method 1721 further includes: displaying a user controllable minimum confidence threshold at a Graphical User Interface (GUI) displaying the tabular dataset as output to the user within a spreadsheet or table; and displaying a maximum fill percentage for the GUI, in which the maximum fill percentage corresponds to a sum of all known values and all null values returning a predicted value with a confidence indicator in excess of the user controllable minimum confidence threshold as a percentage of a sum of all null values and all known values.

According to another embodiment, method 1721 further includes: receiving a confidence indicator for every one of the plurality of null values within the tabular dataset responsive to querying the indices for the predicted values; and in which displaying the predicted values as updated output to the user includes displaying selected ones of the predicted values that correspond to a confidence quality in excess of a default minimum confidence threshold or a user specified minimum confidence threshold when present.

According to one embodiment, queries are issued for every unknown value responsive to which predicted values are returned and then ranked or ordered according to their corresponding confidence indicators. When the slider is at 100 percent fill per the user input the display is updated to show all cells with either known values or predicted values regardless of the confidence for the predicted values. Conversely, if the user's minimum threshold input field is set to 100% then only the known values will be displayed. Dropping the certainty threshold to 75% will then render display output having all known values (which are by nature 100% certain) along with any predicted value having a certainty indicator of at least 75%, and so forth. In such a way, the user may intuitively manipulate the controls to explore and interact with the data.

According to another embodiment, method 1721 further includes: receiving a distribution for every one of the plurality of null values within the tabular dataset responsive to querying the indices for the predicted values; calculating a credible interval for each distribution received; and in which displaying the predicted values as updated output to the user includes displaying selected ones of the predicted values that correspond to a calculated credible interval in excess of a minimum threshold.

A credible interval (or a Bayesian confidence interval) is an interval in the domain of a posterior probability distribution used for interval estimation. The generalization to multivariate problems is the credible region. For example, in an experiment that determines the uncertainty distribution of parameter t, if the probability that t lies between 35 and 45 is 0.95, then $35<=t<=45$ is a 95% credible interval.

According to another embodiment of method 1721, displaying the tabular dataset further includes: displaying the known values as a first text type within cells of a spreadsheet; querying the indices for a predicted value corresponding to every one of the unknown values; and in which displaying the predicted values as updated output to the user includes displaying the predicted values as a second text type within the cells of the spreadsheet, in which the second text type has a displayed opacity in proportion to a confidence indicator for the predicted value displayed.

According to another embodiment of method 1721, displaying the tabular dataset as output to the user includes displaying the known values as black text within cells of a spreadsheet; and in which displaying the predicted values as updated output to the user includes displaying the predicted values as grayscale text with the predicted values having a higher confidence indicator being displayed at darker grayscales than the predicted values having a lower confidence indicator.

For example, in place of using a slider, all values may be provided to the user as display output. For instance, known values may be depicted in pure-black text and then predicted values may be distinguished by displaying them as grayscale text with their intensity or their opacity being proportional to their certainty. In such a way, a predicted value having high confidence may be displayed in dark gray but not quite black text and conversely, a predicted value having low confidence may still be displayed, but in light gray text.

According to another embodiment, method 1721 further includes: displaying a prediction difficulty score for every column of the tabular dataset displayed as output to the user on a per-column basis, in which the prediction difficulty score is calculated for each column of the tabular dataset by: (i) identifying all unknown values within the column; (ii) querying the indices for a predicted value corresponding to each of the unknown values identified within the column; (iii) receiving a confidence indicator for each of the unknown values identified within the column; and (iv) calculating the prediction difficulty score for the column based on the confidence indicators received for the unknown values identified within the column.

According to another embodiment of method 1721, the method further includes: displaying a maximum fill percentage for every column of the tabular dataset displayed as output to the user on a per-column basis, in which the maximum fill percentage is based on a quantity of the unknown values identified within the respective column having confidence indicators exceeding a minimum confidence quality threshold.

For example, taking each column in the original tabular dataset there will be an indication to the user regarding how much of the particular column may be populated using predicted values or a combination of known and predicted values while conforming to a minimum confidence threshold. Thus, to attain a 100% fill for a particular column it may necessary to lower the minimum confidence drastically. As certainty is decreased more of each column is capable of being filled by replacing unknown values with predicted values. Certain columns are likely to be more easily predicted and thus, they may reach 100% fill for a given certainty while other columns at the same certainty will remain partially unfilled. Regardless, such a display to the user enables simple and intuitive exploration of the data by the user with a minimal learning curve and without a deep technical understanding of the probability techniques causing the predicted data values to be rendered.

According to one embodiment there is a non-transitory computer readable storage medium having instructions stored thereon that, when executed by a processor in a host organization, the instructions cause the host organization to perform operations including: receiving a tabular dataset from a user as input, the tabular dataset having data values organized as columns and rows; identifying a plurality of null values within the tabular dataset, the null values being dispersed across multiple rows and multiple columns of the tabular dataset; generating indices from the tabular dataset of columns and rows, the indices representing probabilistic relationships between the rows and the columns of the tabular dataset; displaying the tabular dataset as output to the user, the displayed output including the data values depicted as known values and the null values depicted as unknown values; receiving input from the user to populate at least a portion of the unknown values within the displayed tabular dataset with predicted values; querying the indices for the predicted values; and displaying the predicted values as updated output to the user.

Figure 18:
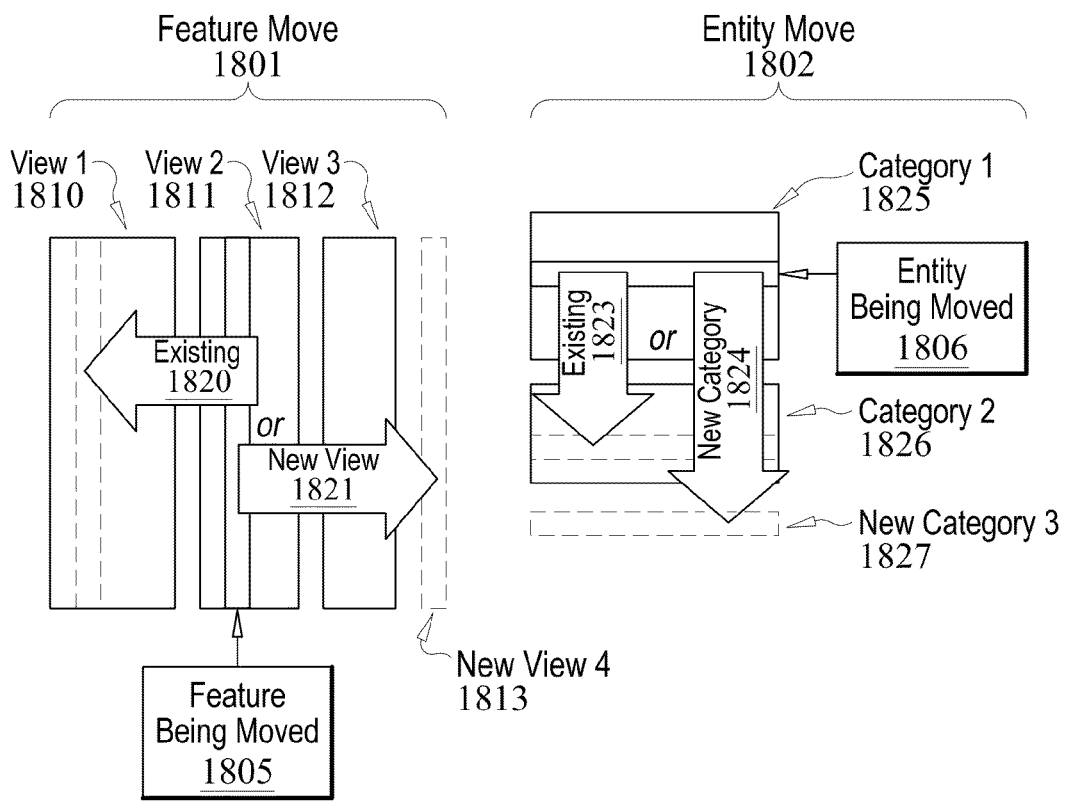
FIG. 18 depicts feature moves and entity moves within indices generated from analysis of tabular datasets.

FIG. 18 depicts feature moves 1801 and entity moves 1802 within indices generated from analysis of tabular datasets. On the left a feature move 1801 is depicted among the three views shown: view 1 at element 1810, view 2 at element 1811, and view 3 at element 1812. As depicted, feature 1805 (e.g., such as a column, characteristic, etc.) can be moved either to another existing 1820 view as is done via the arrow pointing left to move feature 1805 from view 2 at element 1811 to view 1 at element 1810, or alternatively, the feature 1805 may be moved to a new view 1821, as is happening to feature 1805 as depicted by the right facing arrow to move feature 1805 to the new view 4 at element 1813.

On the right an entity move 1802 is depicted among the two categories shown: category 1 at element 1825 and category 2 at element 1826. As depicted, an entity 1806 (e.g., such as a row) can be moved either to another existing 1823 category as is depicted by the arrow pointing down to move entity 1806 from category 1 at element 1825 to category 2 at element 1826, or alternatively, the entity 1806 may be moved to a new category 1824, as is happening to entity 1806 as depicted by the longer downward facing arrow to move entity 1806 to the new category 3 at element 1827.

Figure 19A:
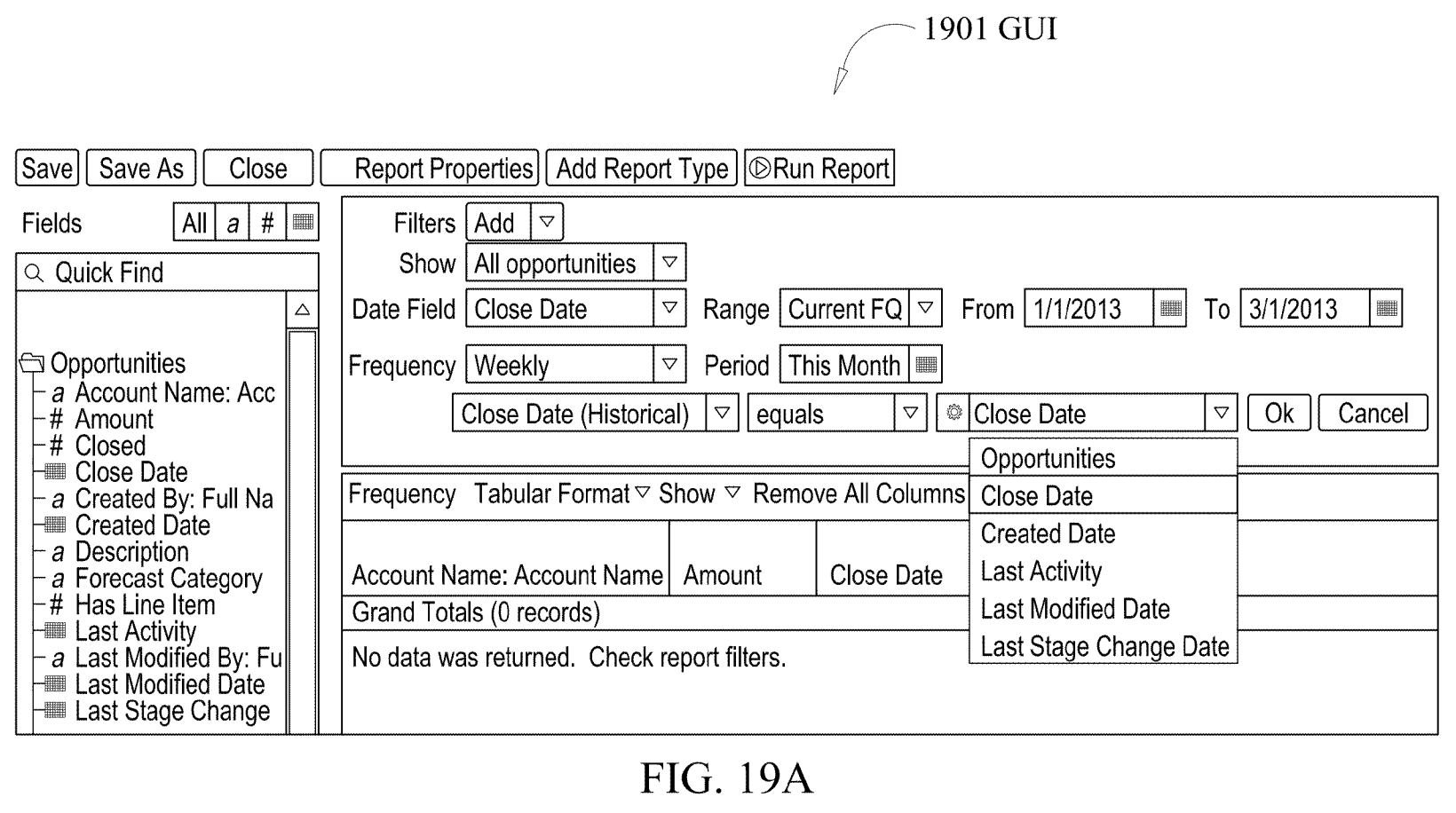

FIG. 19A depicts a specialized GUI 1901 to query using historical dates. The specialized GUI 1901 implementation depicted here enables users to filter on a historical value by comparing a historical value versus a current value in a multi-tenant database system. Filtering for historical data is enabled via the GUI's "Close date (Historical)" drop down box or similar means (e.g., a calendar selector, etc.) in which the GUI 1901 displays current fields related to historical fields.

The GUI 1901 enables users to filter historical data by comparing a historical value versus a constant in a multi-tenant database system. The GUI 1901 utilizes the analysis engine's predictive capabilities by constructing and issuing the appropriate API calls on behalf of the user without requiring users of the GUI to understand how the API calls are constructed or even which command terms or parameters need to be specified to yield the appropriate output, and in such a way, the GUI 1901 provides a highly intuitive interface for users without a steep learning curve.

The GUI 1901 executes the necessary queries or API calls and then consumes the data which is then presented back to the end users via a display interface for the GUI 1901, such as a client device 106A-C as illustrated in FIG. 1. Consider for example, a salesperson looking at the sales information in a particular data set. The GUI 1901 interface can take the distributions provided by the analysis engine and produce a visual indication for ranking the information according to a variety of customized solutions and use cases.

For example, SalesCloud is an industry leading CRM application that is currently used by 135,000 enterprise customers. Such customers understand the value of storing their data in the Cloud and appreciate a web based GUI 1901 interface to view and act on their data. Such customers frequently utilize report and dashboard mechanisms provided by the cloud based service. Presenting these various GUIs as tabbed functionality enables salespeople and other end users to explore their underlying dataset in a variety of ways to learn how their business is performing in real-time. These users may also rely upon partners to extend the provided cloud based service capabilities through additional GUIs that make use of the APIs and interfaces that are described herein.

A cloud based service that offers customers the opportunity to learn from the past and draw data driven insights is highly desirable as such functionality may help these customers make intelligent decisions about the future for their business based on their existing dataset. GUI 1901 provides such an interface.

The customized GUIs utilize the analysis engine's predictive functionality to implement reports which rely upon predictive results which may vary per customer organization or be tailored to a particular organizations needs via programmatic parameters and settings exposed to the customer organization to alter the configuration and operation of the GUIs and the manner in which they execute API calls against the analysis engine's functionality.

For instance, a GUI 1901 may be provided to compute and assign an opportunity score based on probability for a given opportunity reflecting the likelihood of that opportunity to close as a win or loss. The data set to compute this score consists of all the opportunities that have been closed (either won/loss) in a given period of time, such as 1, 2, or 3 years or a lifetime of an organization, etc., and such a duration may be configured using the date range controls of GUI 1901 to specify the date range, even if that range is in the past.

Additional data elements from the customer organization's dataset may also be utilized, such as an accounts table as an input. Machine learning techniques implemented via the analysis engine's core, such as SVN, Regression, Decision Trees, PGM, etc., are then used to build an appropriate model to render the opportunity score and then the GUI 1901 depicts the information to the end user via the interface.

Figure 19B:
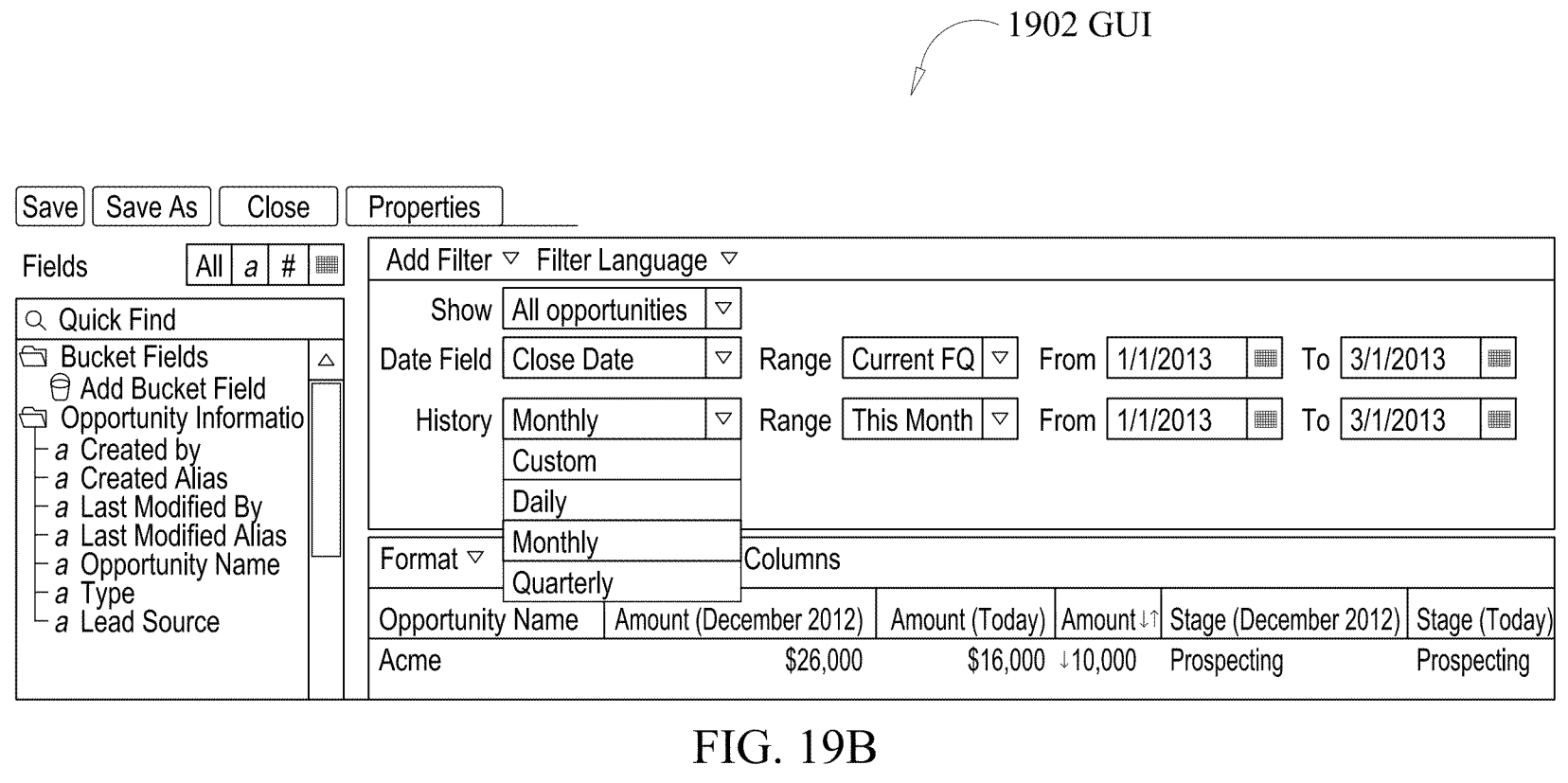

FIG. 19B depicts an additional view of a specialized GUI 1902 to query using historical dates. The specialized GUI 1902 implementation depicted here enables users to determine the likelihood of an opportunity to close using historical trending data. For instance, GUI 1902 permits users to easily configure the predictive queries using the "history" selector for picking relative or absolute dates.

With this GUI 1902 users are enabled to look at how an opportunity has changed over time, independent of stage, etc. The user can additionally look at how that opportunity has matured from when it was created until when it was closed. For instance, GUI 1902 has set a historical data of Jan. 1, 2013 through Mar. 1, 2013 using the date configuration controls and the table at the bottom depicts that the amount of the opportunity has decreased by $10,000 but the stage was and still is in a "prospecting" phase.

The GUI 1902 additionally enables users to determine the likelihood of an opportunity to close at a given stage using historical trending data. Where GUI 1901 above operates independent of stage of the sales opportunity, GUI 1902 focuses on the probability of closing at a given stage as a further limiting condition for the closure. Thus, customers are enabled to use the historical trending data to know exactly when the stage has changed and then additionally predict what factors were involved to move from stage 1 to 2, from stage 2 to 3 and so forth.

The GUIs additionally permit the users to predict an opportunity to close on the basis of additional social and marketing data provided at the interface or specified by the user. For example, the dataset of the customer organization or whomever is utilizing the system may be expanded on behalf of the end user beyond the underlying dataset by incorporating such social and marketing data which is then utilized by the analysis engine to further influence and educate the predictive models. For instance, certain embodiments pull information from an exemplary website such as "data.com," and then the data is associated with each opportunity in the original dataset by the analysis engine where feasible to discover further relationships, causations, and hidden structure which can then be presented to the end user. Other data sources are equally feasible, such as pulling data from social networking sites, search engines, data aggregation service providers, etc.

In one embodiment, social data is retrieved and a sentiment is provided to the end-user via the GUI to depict how the given product is viewed by others in a social context. Thus, a salesperson can look at a customer's LinkedIn in profile and with information from data.com or other sources the salesperson can additionally be given sentiment analysis in terms of social context for the person that the salesperson is actually trying to sell to. For instance, such data may reveal whether the target purchaser has commented about other products or perhaps has complained about other products, etc. Each of these data points and others may help influence the model employed by the analysis engine to further improve a rendered prediction.

In another embodiment, determining the likelihood for an opportunity to close is based further on industry specific data retrieved from sources external to an initially specified dataset. For instance, rather than using socially relevant data for social context of sentiment analysis, industry specific data can be retrieved and input to the predictive database upon which analysis engine performs its modeling as described above, and from which further exploration can then be conducted by users of the dataset now having the industry specific data integrated therein.

According to other embodiments, datasets are explored beyond the boundaries of any particular customer organization having data within the multi-tenant database system. For instance, in certain embodiments, benchmark predictive scores are generated based on industry specific learning using cross-organizational data stored within the multi-tenant database system. For example, data mining may be performed against telecom specific customer datasets, given their authorization or license to do so. Such cross-organization data to render a much larger multi-tenant dataset can then be analyzed via the analysis engine's models and provide insights, relationships, causations, and additional hidden structure that may not be present within a single customer organizations' dataset. For instance, if a customer is trying to close a $100 k deal in the NY-NJ-Virginia tri-city area, the probability for that deal to close in 3 months may be 50%, according to such analysis, because past transactions have shown that it takes up to six months to close a $100 k telecom deal in NY-NJ-Virginia tri-city area when viewed in the context of multiple customer organizations' datasets. Many of the insights realized through such a process may be non-intuitive, yet capable of realization through application of the techniques described herein.

With industry specific data present within a given dataset it is possible to delve even deeper into the data and identify benchmarks using such data for a variety of varying domains across multiple different industries. For instance, based on such data predictive analysis may review that, in a given region it takes six months to sell sugar in the Midwest and it takes three months to sell laptops in the East Coast, and so forth.

Then, if a new opportunity arises and a vendor is trying to, for example, sell watches in California, the vendor can utilize such information to gain a better understanding of the particular regional market based on the predictions and confidence levels given.

FIG. 19C depicts another view of a specialized GUI 1903 to configure predictive queries. The analysis engine's predictive functionality can additionally reveal information for a vertical sector as well as for the region. When mining a customer organization's dataset a relationship may be discovered that, where customers bought items "a," those customers also bought item "b." These kinds of matching relationships are useful, but can be further enhanced. For instance, using the predictive analysis of the analysis engine it is additionally possible to identify the set of factors that led to a particular opportunity score.

As depicted here, the GUI 1903 presents a 42% opportunity at the user interface but when the user cursors over (e.g., a mouse over event, etc.) the opportunity score, the GUI 1903 then displays sub-detail having additional elements that make up that opportunity score. The GUI 1903 again constructs and issues the necessary API calls on behalf of the user such that an appropriate predictive command term is selected and executed against the indices to pull the opportunity score and relevant display information to the user including the sub-detail relationships and causations considered relevant.

The GUI 1903 can additionally leverage the PREDICT and ANALYZE command terms by triggering the appropriate function for a given opportunity as specified by the user at the GUI 1903 to return the raw data needed by the GUI 1903 to create a histogram for the opportunity. Thus, not only can the user be given a score, but the user may additionally be given the relevant factors and guidance on how to interpret the information so as to assist the user with determining an appropriate call to action given the information provided.

Moreover, as the end-users, such as salespersons, see the data and act upon it, a feedback loop is created through which further data is input into the predictive database upon which additional predictions and analysis are carried out in an adaptive manner. For example, as the analysis engine learns more about the dataset associated with the exemplary user or salesperson, the underlying models may be refreshed on a recurring basis by re-performing the analysis of the dataset so as to re-calibrate the data using the new data obtained via the feedback loop. Such new data may describe whether sales opportunities closed with a sale or loss, identify the final amount, timing, resources involved, and so forth, all of which help to better inform the models and in turn render better predictions for other queries going forward.

Figure 19D:
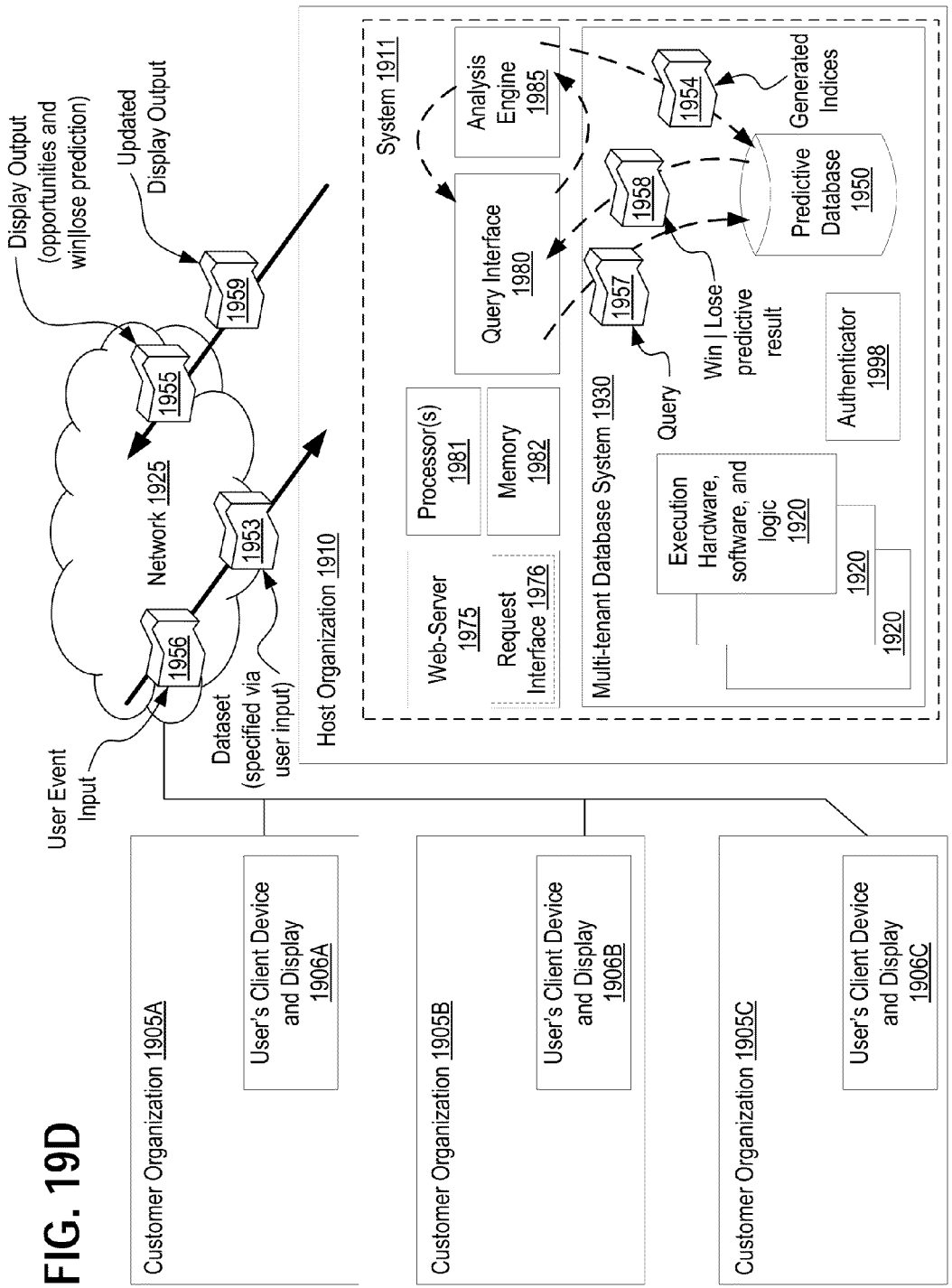
FIG. 19D depicts an exemplary architecture in accordance with described embodiments.

FIG. 19D depicts an exemplary architecture in accordance with described embodiments. In particular, customer organizations 1905A, 1905B, and 1905C are depicted, each with a user's client device and display 1906A, 1906B, and 1906C capable of interfacing with host organization 1910 via network 1925, including sending input, queries, and requests and responsively receiving responses including output for display. Within host organization 1910 is a request interface 1976 which may optionally be implemented by web-server 1975. The host organization further includes processor(s) 1981, memory 1982, a query interface 1980, analysis engine 1985, and a multi-tenant database system 1930. Within the multi-tenant database system 1930 are execution hardware, software, and logic 1920 that are shared across multiple tenants of the multi-tenant database system 1930, authenticator 1998, and a predictive database 1950 capable of storing indices generated by the analysis engine 1985 to facilitate the return of predictive record sets responsive to queries executed against the predictive database 1950.

According to one embodiment, the host organization 1910 operates a system 1911 having at least a processor 1981 and a memory 1982 therein, in which the system 1911 includes a request interface 1976 to receive input from a user device 1906A-C specifying a dataset 1953 of sales data for a customer organization 1905A-C, in which the sales data specifies a plurality of sales opportunities; an analysis engine 1985 to generate indices 1954 from rows and columns of the dataset 1953, the indices representing probabilistic relationships between the rows and the columns of the dataset 1953; a predictive database 1950 to store the indices 1954; the analysis engine 1985 to select one or more of the plurality of sales opportunities specified within the sales data; a query interface 1980 to query 1957 the indices 1954 for a win or lose predictive result 1958 for each of the selected one or more sales opportunities; and in which the request interface 1976 is to further return the win or lose predictive result 1958 for each of the selected one or more sales opportunities as display output 1955 to the user device 1906A-C.

The request interface 1976 may additionally receive user event input 1956 from a user device 1906A-C indicating one of the displayed one or more sales opportunities or their corresponding win or lose predictive result 1958, responsive to which the user interface may provide additional drill-down sub-detail. For instance, if a user of a touchscreen touches one of the displayed opportunities or clicks on one of them then the user interface may communicate such input to the request interface 1976 causing the host organization to provide updated display output 1959 with additional detail for the specified sales opportunity, such as relevant characteristics, etc.

According to another embodiment, the system 1911 further includes a predictive database 1950 to store the indices generated by the analysis engine. In such an embodiment, the predictive database 1950 is to execute as an on-demand cloud based service at the host organization 1910 for one or more subscribers.

In another embodiment, the system 1911 further includes an authenticator 1998 to verify the user (e.g., a user at one of the user's client device and display 1906A-C) as a known subscriber. The authenticator 1998 then further operates to verify authentication credentials presented by the known subscriber.

In another embodiment, the system 1911 further includes a web-server 1975 to implement the request interface; in which the web-server 1975 is to receive as input, a plurality of access requests from one or more client devices from among a plurality of customer organizations communicably interfaced with the host organization via a network; a multi-tenant database system with predictive database functionality to implement the predictive database; and in which each customer organization is an entity selected from the group consisting of: a separate and distinct remote organization, an organizational group within the host organization, a business partner of the host organization, or a customer organization that subscribes to cloud computing services provided by the host organization.

Figure 19E:
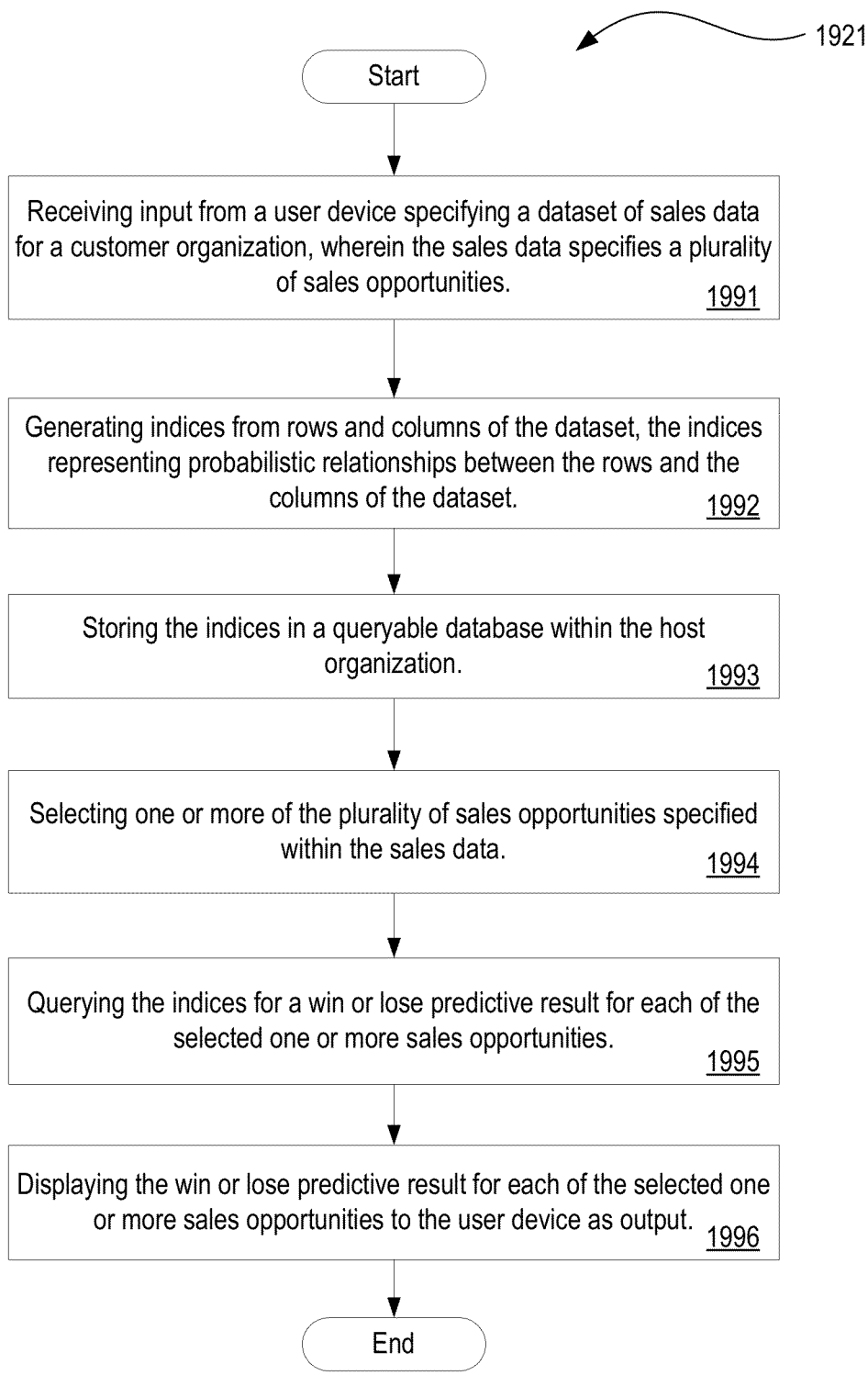
FIG. 19E is a flow diagram illustrating a method in accordance with disclosed embodiments.

FIG. 19E is a flow diagram illustrating a method in accordance with disclosed embodiments. Method 1921 may be performed by processing logic that may include hardware (e.g., circuitry, dedicated logic, programmable logic, microcode, etc.), software (e.g., instructions run on a processing device to perform various operations such transmitting, sending, receiving, executing, generating, calculating, storing, exposing, querying, processing, etc., in pursuance of the systems, apparatuses, and methods for rendering scored opportunities using a predictive query interface, as described herein. For example, host organization 110 of FIG. 1, machine 400 of FIG. 4, or system 1911 of FIG. 19D may implement the described methodologies. Some of the blocks and/or operations listed below are optional in accordance with certain embodiments. The numbering of the blocks presented is for the sake of clarity and is not intended to prescribe an order of operations in which the various blocks must occur.

At block 1991, processing logic receives input from a user device specifying a dataset of sales data for a customer organization, in which the sales data specifies a plurality of sales opportunities.

At block 1992, processing logic generates indices from rows and columns of the dataset, the indices representing probabilistic relationships between the rows and the columns of the dataset.

At block 1993, processing logic stores the indices in a queryable database within the host organization.

At block 1994, processing logic selects one or more of the plurality of sales opportunities specified within the sales data.

At block 1995, processing logic queries the indices for a win or lose predictive result for each of the selected one or more sales opportunities.

At block 1996, processing logic displays the win or lose predictive result for each of the selected one or more sales opportunities to the user device as output.

The User Interface (UI) or Graphical User Interface (GUI) consumes data and predictive results returned from the predictive interface to display the predicted results to the user in a highly intuitive fashion along with other data such as scored sales opportunities, the quality of predictions, and what factors or characteristics are probabilistically relevant to the sales opportunities and other metrics displayed.

According to another embodiment of method 1921, querying the indices for a win or lose predictive result for each of the selected one or more sales opportunities includes: generating a Predictive Query Language (PreQL) query specifying a PREDICT command term for each of the selected one or more sales opportunities; issuing each of the generated PreQL queries to a Predictive Query Language Application Programming Interface (PreQL API); and receiving the win or lose predictive result for each of the selected one or more sales opportunities responsive to the issued PreQL queries.

According to another embodiment of method 1921, the dataset of sales data includes closed sales opportunities for which a win or lose result is known and recorded within the dataset of sales data for each closed sales opportunity; in which the dataset of sales data further includes open sales opportunities for which a win or lose result is unknown and corresponds to a null value within the dataset of sales data for each open sales opportunity; and in which each of the plurality of selected sales opportunities are selected from the open sales opportunities.

According to another embodiment of method 1921, querying the indices for a win or lose predictive result for each of the selected one or more sales opportunities includes: constructing a query specifying the selected sales opportunity, in which the query specifies a PREDICT command term and includes operands for the PREDICT command term including at least a row corresponding to the selected sales opportunity and a column corresponding to the win or lose result; and receiving the win or lose predictive result for the row corresponding to the selected sales opportunity responsive to issuing the constructed query.

According to another embodiment, method 1921 further includes: querying the indices for a predicted sales amount for each of the selected one or more sales opportunities; and displaying the predicted sales amount with the win or lose predictive result for each of the selected one or more sales opportunities to the user device as output.

According to another embodiment of method 1921, querying the indices for a predicted sales amount includes: constructing a query for each of the selected sales opportunities, in which each query specifies a PREDICT command term and includes operands for the PREDICT command term including at least a row corresponding to the selected sales opportunity and a column corresponding to a sales amount; and receiving the predicted sales amount result for the row corresponding to the selected sales opportunity responsive to issuing the constructed query.

Querying the predictive query interface returns the predictive result being sought (e.g., win or lose prediction, predicted close amount, predicted close date, etc.), but additionally relevant is the quality of that prediction, that is to say, the probability or likelihood that a rendered prediction will come true. The predictive query interface may return a distribution, an interval, or other value depending on the configuration and the structure of the query issued. For instance, a confidence quality indicator may be returned indicating a value between zero and a hundred, providing a quantitative metric by which to assess the quality of the prediction.

Providing predicted win or lose results for existing sales opportunities along with a measure of quality for the prediction rendered is helpful to a salesperson who must evaluate which sales opportunities to target. Naturally, the salesperson is incentivized to spend time and resources on the opportunities that are more likely to result in success. Thus, the output may aid a salesperson in evaluating which sales opportunities are likely to close and therefore which may be worked in an effort to make sales quota and maximize their commissions.

According to another embodiment, method 1921 further includes: receiving a confidence indicator for each of the win or lose predictive results; and displaying the confidence indicator with the output to the user device with each of the win or lose predictive results displayed for the one or more sales opportunities selected.

According to another embodiment, method 1921 further includes: receiving a confidence indicator for each of the selected one or more sales opportunities with the win or lose predictive results responsive to the querying; and displaying the confidence indicators received as output to the user device concurrently with displaying the win or lose predictive result for each of the selected one or more sales opportunities.

Certain embodiments may utilize a benchmark or threshold, such as 70% or some other default or user configured value to establish the minimum confidence quality required for sales opportunities to be returned to the user display. A second threshold may be required for those embodiments which further display a recommendation to the user display.

According to another embodiment of method 1921, selecting one or more of the plurality of sales opportunities includes selecting all sales opportunities in a pre-close sales stage and having an unknown win or lose result; identifying the one or more of the plurality of sales opportunities having a win or lose predictive result in excess of a minimum confidence indicator threshold; and in which displaying the win or lose predictive result to the user device as output includes displaying the one or more of the plurality of sales opportunities identified as having the win or lose predictive result in excess of the minimum confidence indicator threshold.

For any given sales opportunity there may be multiple sales stages and a sales opportunity may be in an open state or a closed stage (e.g., an open state may be a pre-close state or any stage prior to closure of the opportunity). The sales opportunity may also be in any of a number of interim stages, especially for sales teams that deal with large customers and handle large sales transactions. Such stages make up the sales life cycle. For example, there may be a discovery stage in which a salesperson works to determine what the right product is for a given customer, a pricing or quote stage where pricing is determined and discounts are negotiated, and so forth.

For large transactions, the sales life cycle may last three months, six months, sometimes nine months, largely depending on the size and complexity of a sales opportunity. Very complex transactions can span many years, for instance, where a customer is considering a multi-billion dollar commitment, such as for aircraft engines. Smaller less complex transactions, such as a contract for database software, may move along more quickly.

According to another embodiment, method 1921 further includes: displaying a recommendation as output to the user device, in which the recommendation specifies at least one of the plurality of sales opportunities in a pre-close sales stage; in which the recommendation specifies for the output (i) the at least one of the plurality of sales opportunities in a pre-close sales stage by sales opportunity name as specified by the dataset of sales data; and in which the recommendation further specifies for the output, one or more of: (ii) the win or lose predictive result indicating a sales win; (iii) a confidence indicator for the win or lose predictive result indicating the sales win; and (iv) a predicted sales amount; and (v) a predicted sales opportunity close date.

Close dates may be predicted and provided as output which can be highly relevant for the purposes of sales forecasting. For instance, if a salesperson states to management that a deal will close in fiscal Q1 but the prediction returns a high confidence sales close date of fiscal Q3, then it may be appropriate to either adjust the sales forecast or change strategy for a given sales opportunity (e.g., increase urgency, improve pricing terms, discounts, etc.).

User Interfaces additionally provide means by which a user may change default values, specify relevant historical date ranges upon which predictions and queries are to be based, specify the scope of a dataset to be utilized in making predictions, and so forth.

For instance, a user administrative page equivalent to those described above at FIGS. 19A, 19B, and 19C provide reporting capabilities through which a user may specify the input sources (e.g., the dataset of sales data for a customer organization), restrictions, filters, historical data, and other relevant data sources such as social media data, updated sales data, and so forth.

According to another embodiment of method 1921, the recommendation is determined based on weightings assigned to the output specified at (i) through (iv); and in which the weightings are assigned by defaults and are custom configurable via a Graphical User Interface (GUI) displayed at the user device.

According to another embodiment of method 1921, selecting one or more of the plurality of sales opportunities includes selecting sales opportunities in a closed sales stage and having a known win or lose result; querying the indices for a win or lose predictive result for each of the selected one or more sales opportunities in a closed sales stage and having the known win or lose result, in which the win or lose predictive result ignores the known win or lose result; determining predictive accuracy for each of the plurality of sales opportunities selected by comparing the known win or lose result against the win or lose predictive result; and displaying the determined predictive accuracy for each of the plurality of sales opportunities selected as output to the user device with the win or lose predictive result displayed.

According to another embodiment, method 1921 further includes: receiving date range input from a GUI displayed at the user device, the date range input specifying a historical date range upon which the win or lose predictive result is based.

According to another embodiment of method 1921, receiving input from a user device specifying a dataset of sales data for a customer organization includes at least one of: receiving the dataset as a table having the columns and rows; receiving the dataset as data stream; receiving a spreadsheet document and extracting the dataset from the spreadsheet document; receiving the dataset as a binary file created by a database; receiving one or more queries to a database and responsively receiving the dataset by executing the one or more queries against the database and capturing a record set returned by the one or more queries as the dataset; receiving a name of a table in a database and retrieving the table from the database as the dataset; receiving search parameters for a specified website and responsively querying the search parameters against the specified website and capturing search results as the dataset; and receiving a link and authentication credentials for a remote repository and responsively authenticating with the remote repository and retrieving the dataset via the link.

According to another embodiment, method 1921 further includes: receiving entity selection input from a GUI displayed at the user device, the entity selection input specifying one of the win or lose predictive results displayed to the user device as output; displaying sub-detail for one of the sales opportunities as updated output to the user device responsive to the entity selection input; and in which the sub-detail includes one or more features probabilistically related to the win or lose predictive results displayed.

According to another embodiment of method 1921, the entity selection input includes one of a mouse over event, a cursor over event, a click event, a touchscreen selection event, or a touchscreen position event corresponding to one of the win or lose predictive results displayed; and in which displaying sub-detail includes displaying the sub-detail within a graphical overlay positioned on top of and at least partially covering the win or lose predictive results displayed initially.

According to another embodiment, method 1921 further includes: constructing a query to retrieve the one or more features probabilistically related to the win or lose predictive results displayed; in which the query includes a RELATED command term and at least one operand for the RELATED command term specifying a column corresponding to a win or lose result column.

For example, it may be determined that a sales opportunity sponsor turns out to be probabilistically related to the win or lose of a sale. Thus, the UI additionally provides functionality to track available sponsors, such as satisfied customers or high level executives that can speak with a potential customer in an effort to improve the likelihood of success for a given sales opportunity.

The User Interface may additionally construct and issue a SIMILAR command term to the predictive database to return and display sales opportunities that are most like a particular sales opportunity being evaluated by the salesperson. Such data may help the salesperson to draw additional insights from other similar sales opportunities which did or did not result in a successful win.

By understanding what factors affect a particular sales opportunity, a salesperson may focus specifically on influencing those factors in an effort to increase the likelihood of a successful close for a particular sales opportunity. For instance, if a conversation between the customer and the company's CEO proves to be helpful in certain types of transactions, then that may be a worthwhile resource expenditure. Conversely, if a given type of pricing structure turns out to be favorable for certain customer types, products, or industries, then that may be a worthy consideration to increase the likelihood of success for a given sales opportunity. Exploration of such characteristics may be done through the user interface, including manipulating values as "what if" scenarios and then updating the predictive results to the user display based on the "what if" scenario parameters.

According to another embodiment of method 1921, displaying the sub-detail includes: displaying column names for the one or more features probabilistically related to the win or lose predictive results displayed; and displaying data values from the dataset corresponding to row and column intersects for the column names and an entity row corresponding to the one sales opportunity for the sub-detail displayed.

Social media data is one type of auxiliary data. A variety of data sources may be specified to further enhance the predictive results including, for example: contacts, accounts, account phases, account task, account contact person, account sponsor or referral, and so forth.

Social media data is available from sources including Radian 6 and Buddy Media offered by salesforce.com. Such sources provide aggregated and structured data gleaned from social media sources such as Facebook, Twitter, LinkedIn, and so forth. Using these sources, it may be possible to associate an individual, such as John Doe, with a particular sales opportunity and then enhance the indices with data that is associated with John Doe within the social networking space. For example, perhaps John Doe has tweeted about a competitor's product or the products offered by the salesperson. Or there may be a news feed which mentions the product or the company or the sales opportunity targeted, or there may be customer reviews which are contextually relevant, and so forth. Such data points can be integrated by specifying the appropriate sources at the UI which will in turn cause the analysis engine to perform additional analysis to update the indices and if such data points are probabilistically relevant, then their relationship will affect the predictive results and be discoverable through the user interface.

In certain embodiments, benchmarking capabilities are provided which enable a user to analyze supplemental data sources based on, for example, a manufacturing industry versus a high tech industry, or data which is arranged by customers in geographical region, and so forth. While such data is not typically maintained by a customer organization, it can be sourced and specified as additional supplemental data through the user interface upon which the analysis engine's core can update the indices and further improve the predictive results or yield further insights into a customer organization's data that may not otherwise be feasible.

In one embodiment, such supplemental data sources are provided through the User Interface as part of an existing cloud based subscription or upon the payment of an additional fee. For example, a customer may purchase a data package which enables them to integrate industry benchmarking data to perform analysis for the customer organization's specific sales opportunities in view of aggregated benchmarking data for a collection of potential sales customers or for a collection of potential verticals, and so forth. Once this additional data is specified and analyzed and the indices are updated, the user may then explore the data and its affect upon their predictive results through the UI provided.

In one embodiment, historical data is tracked and the scope of historical data that may be analyzed, viewed, and otherwise explored by a user is based on subscription terms. For instance, a cloud based service subscriber may expose the relevant user interface to all customers for free, but then limit the scope of data that may be analyzed to only an exemplary three months, whereas paying subscribers get a much deeper and fuller dataset, perhaps two years worth of historical analysis. Certain embodiments operate on a dataset specified by the customer explicitly, whereas other embodiments may default to a particular dataset on behalf of the customer based on the system's knowledge of that customer's data already stored at a host organization. Notably, conventional databases do not track and expose a historical view of data stored in a database. Change logs and roll backs are enabled on most databases, but conventional databases do not expose such data to queries because they are not intended for such a purpose. Conversely, the user interface described here permits the user to specify a historical date range which then enables the user to explore how data has changed over time or query the database in the perspective of a past date, resulting in query results returning the data as they were at the past date, rather than as they exist in the present. The methodologies described herein use a separate object to that database updates may be fully committed and further so that change and audit logs may be flushed without losing the historical data.

According to another embodiment, method 1921 further includes: receiving additional input from the user device specifying a social media data source; updating the indices based on the social media data source specified; and displaying updated win or lose predictive results for each of the selected one or more sales opportunities to the user device as output with characteristics derived from the social media data source determined to be relevant to the updated win or lose predictive results.

According to another embodiment of method 1921, the social media data source corresponds to a social media data aggregator which listens to social media networks and provides aggregated social media data as structured output.

According to another embodiment, method 1921 further includes: receiving a user event input from a GUI displayed at the user device, the user event input specifying one of the win or lose predictive results displayed to the user device as output; displaying sub-detail for one of the sales opportunities as updated output to the user device responsive to the user event input; and in which the sub-detail includes one or more features probabilistically related to the win or lose predictive results displayed.

According to another embodiment of method 1921, the one or more features probabilistically related to the win or lose predictive results displayed includes one or more name=value pairs derived from the social media data source specified and having affected the updated win or lose predictive results for each of the selected one or more sales opportunities.

According to another embodiment there is a non-transitory computer readable storage medium having instructions stored thereon that, when executed by a processor in a host organization, the instructions cause the host organization to perform operations including: receiving input from a user device specifying a dataset of sales data for a customer organization, in which the sales data specifies a plurality of sales opportunities; generating indices from rows and columns of the dataset, the indices representing probabilistic relationships between the rows and the columns of the dataset; storing the indices in a queryable database within the host organization; selecting one or more of the plurality of sales opportunities specified within the sales data; querying the indices for a win or lose predictive result for each of the selected one or more sales opportunities; and displaying the win or lose predictive result for each of the selected one or more sales opportunities to the user device as output.

FIG. 20A depicts a pipeline change report 2001 in accordance with described embodiments. On the left, a pipeline change report showing historical sum of amounts 2002 across snapshot dates 2004 is depicted and on the right a pipeline change report showing historical record counts 2003 across snapshot dates 2004 is depicted, thus presenting a user with their open pipeline for the current month (e.g., the month of January 2013 here) arranged by sales stage inclusive of such stages on the historical dates charted. For instance, such stages may include: perception analysis, proposal/price quote, and negotiation/review, etc.

The pipeline change report 2001 enables users to see their data in an aggregated fashion. Each stage may consist of multiple opportunities and each is capable of being duplicated because each of the opportunities may change according to the amounts or according to the stage, etc. Thus, if a user is looking at the last four weeks, then one opportunity may change from $500 to $1500 and thus be duplicated.

The cloud computing architecture executes functionality which runs across all the data for all tenants. Thus, for any cases, leads, and opportunities, the database maintains a historical trending data object (HTDO) into which all audit data is retained such that a full and rich history can later be provided to the user at their request to show the state of any event in the past, without corrupting the current state of the data stored on behalf of database tenants while allowing database updates to be committed. Thus, while the underlying data must be maintained in its correct state for the present moment, a user may nevertheless utilize the system to display the state of a particular opportunity as it historically stood, regardless of whether the data requested is for the state of the opportunity last week, or as it transitioned through the past quarter, and so forth.

All of the audit data from history objects for various categories of data is then aggregated into a historical trending data object. The historical trending data object is then queried by the different historical report types across multiple tenants to retrieve the necessary audit trail data such that any event at any time in the past can be re-created for the sake of reporting, predictive analysis, and exploration. The historical audit data may additionally be subjected to the analysis capabilities of the analysis engine (e.g., element 185 of FIG. 1) by including the historical audit data within a historical dataset for the sake of providing further predictive capabilities on that data. For instance, while historical data is known for the various opportunities, a future state can be predicted for those same opportunities to aid the salespersons in focusing their efforts appropriately.

Figure 20B:
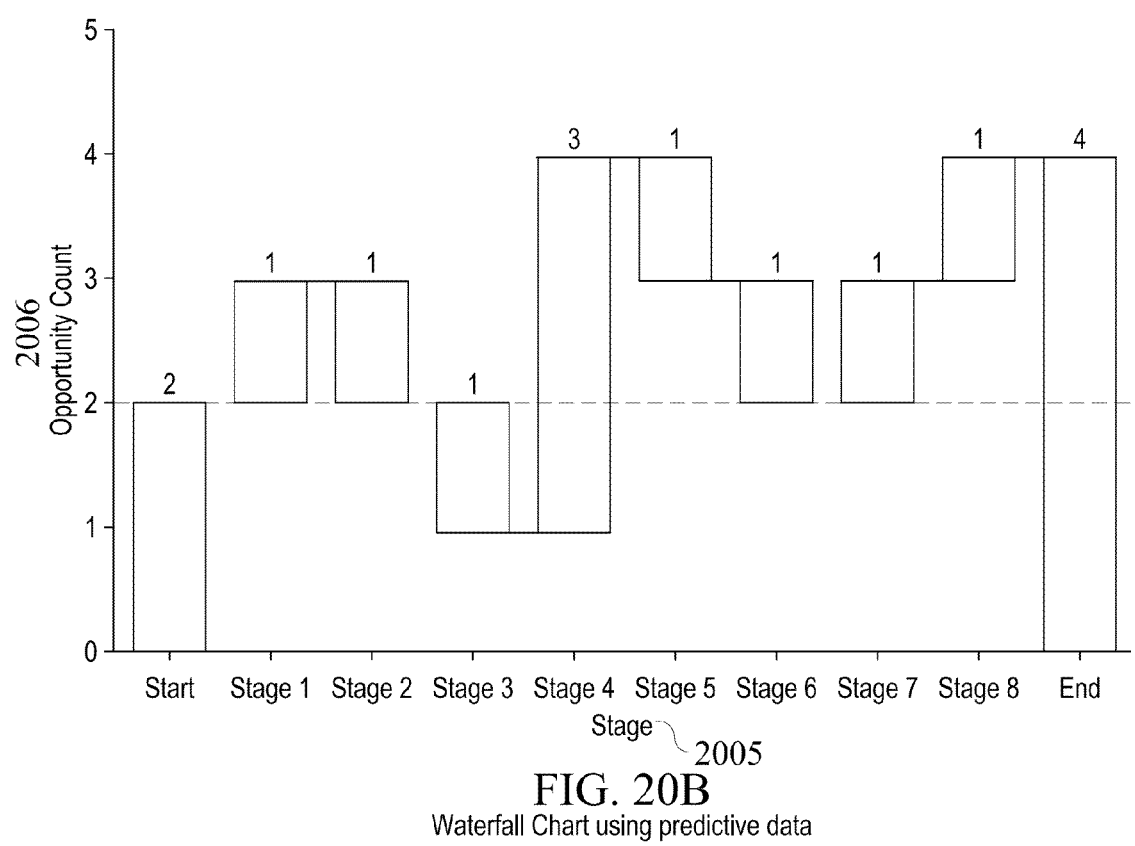
FIG. 20B depicts a waterfall chart using predictive data in accordance with described embodiments.

FIG. 20B depicts a waterfall chart using predictive data in accordance with described embodiments. Opportunity count 2006 defines the vertical axis and stages 2005 define the horizontal axis from "start" to "end" traversing stages 1 through 8. For instance, the waterfall chart may depict a snapshot of all opportunities presently being worked broken out by stage. The opportunity counts change up and down by stage to reflect the grouping of the various opportunities into the various defined stages. The waterfall chart may be used to look at two points by defining opportunities between day one and day two or as is shown via the example here. The waterfall chart may be used to group all opportunities into different stages in which every opportunity is mapped according to its present stage, thus allowing a user to look into the past and understand what the timing was for these opportunities to actually come through to closure.

Historical data and the audit history saved to the historical trending data object are enabled through snapshots and field history. Using the historical trending data object the desired data can then be queried. The historical trending data object may be implemented as one table with indexes on the table from which any of the desired data can then be retrieved. The various specialized GUIs and use cases are populated using the opportunity data retrieved from the historical trending data object's table.

Figure 20C:
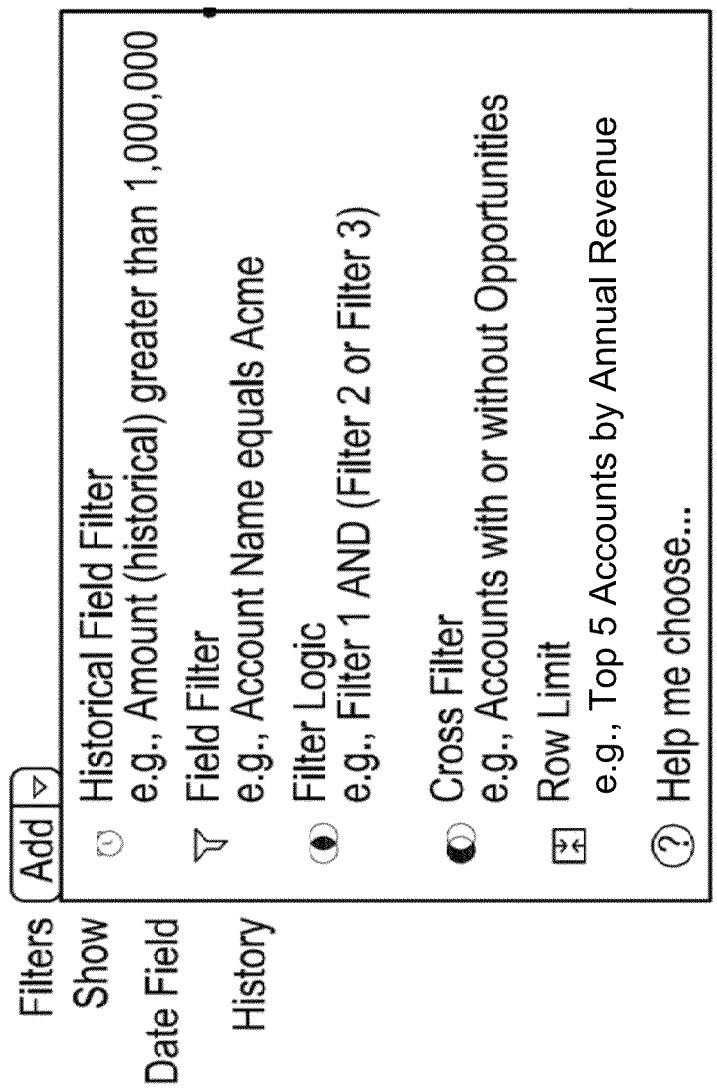
FIG. 20C depicts an interface with defaults after adding a first historical field.

FIG. 20C depicts an interface with defaults after adding a first historical field. Element 2011 depicts the addition of a historical field filter which includes various options including to filter by historical amounts (e.g., values in excess of $1 million), to filter by a field (e.g., account name equals Acme), to filter by logic (e.g., filter 1 AND (filter 2 OR filter 3)), to cross filter (e.g., accounts with or without opportunities), to row limit (e.g., show only the top 5 accounts by annual revenue), and finally, a "Help me choose" option.

The interface enables the user to filter historical data by comparing historical values versus current values stored within in the multi-tenant system.

Figure 20D:
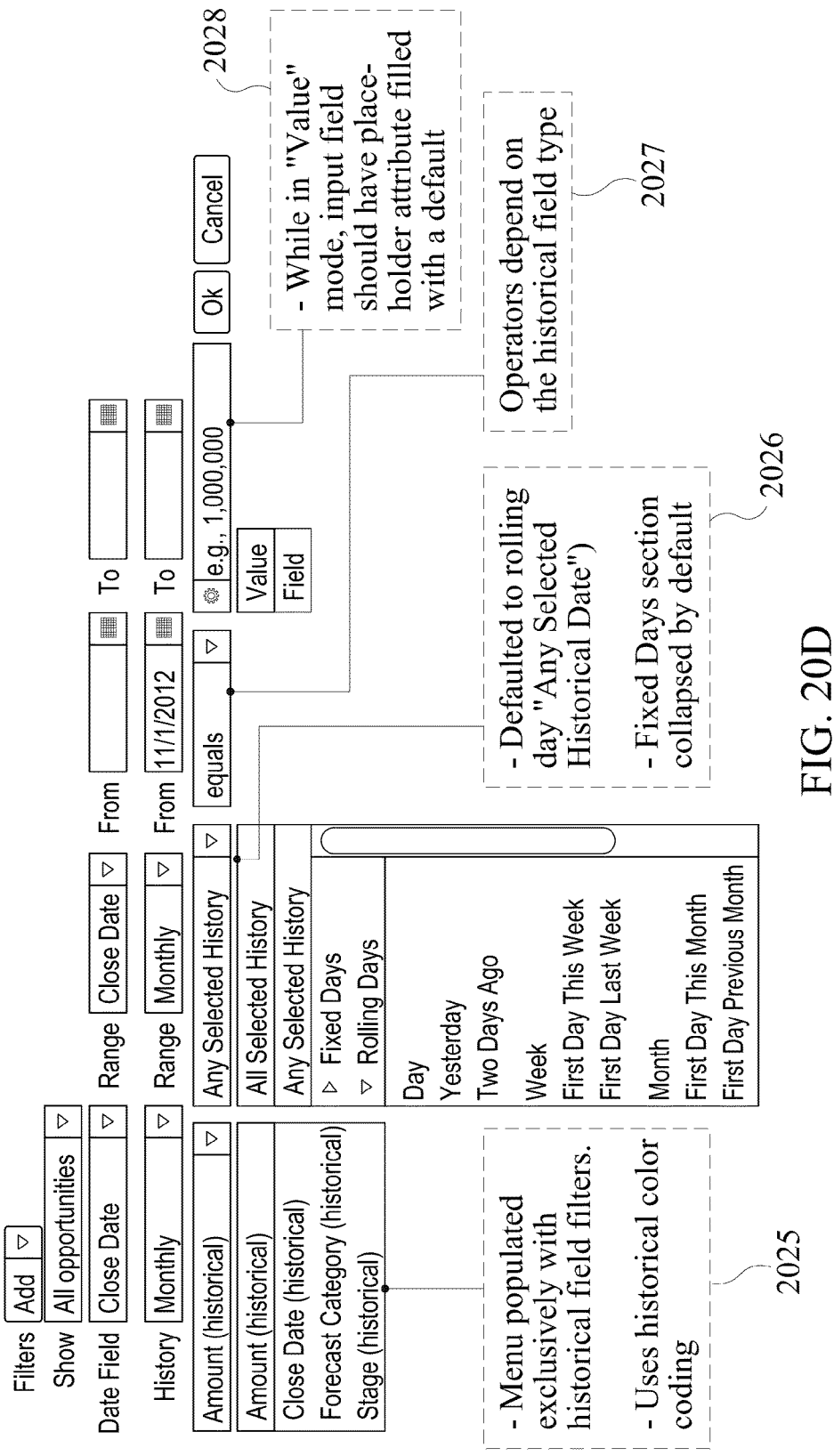
FIG. 20D depicts in additional detail an interface with defaults for an added custom filter.

FIG. 20D depicts in additional detail an interface with defaults for an added custom filter. These specialized filtering implementations enable users to identify how the data has changed on a day to day basis or week to week basis or over a month to month basis, etc. The users can therefore can see the data that is related to the user's opportunities not just for the present time, but with this feature, the users can identify opportunities based on a specified time such as absolute time or relative time, so that they can see how the opportunity has changed over time. In this embodiment, time as a dimension is used to then provide a decision tree for the customers to pick either absolute date or a range of dates. Customers can pick an absolute date, such as Jan. 1, 2013 or a relative date such as the first day of the current month or the first day of the last month, and so forth.

Menus may be populated exclusively with historical field filters and may use historical color coding as depicted by element 2025. At element 2026 the selection has defaulted to rolling day in which "Any Selected Historical Date" may be selected. Alternatively, fixed days may be selected, but this option is collapsed by default in the depicted interface. Element 2027 sets forth a variety of operators that may be selected by a user depending on the historical field type chosen, and element 2028 provides a default amount value (e.g., $1,000,000) as a placeholder attribute that is alterable by the user.

The custom filter interface depicted enables a sales manager or salesperson to see how an opportunity has changed today versus the first day of this month or last month, etc. Through the custom filter interface, a user can take a step back in time, thinking back where they were a week ago or a month ago and identify the opportunity by creating a range of dates and displaying what opportunities were created during those dates.

For example, a salesperson wanting such information may have had ten opportunities and on Feb. 1, 2013, the salesperson's target buyer expresses interest in a quote, causing the stage to change from prospecting to quotation. Conversely, another target buyer says they want to buy immediately, causing the state to change from quotation to sale/charge/close. The custom filter interface therefore provides a decision tree based on the various dates that are created, guiding a user through the input and selection process by only revealing the appropriate selections and filters for the dates initially selected. The result is that the functionality can give the salesperson a view of all the opportunities that are closing in the month of January, or February, or within a given range, within a quarter or year, and so forth, in a highly intuitive manner.

Querying by date necessitates the user to traverse the decision tree to identify the user's desired date then enabling the user to additionally pick the number of snap shots, from which the finalized result set is determined, for instance, from Feb. 1, 2013 to Feb. 6, 2013.

Additionally enabled is the ability to filter historical data by comparing historical values versus a constant in the multi-tenant system, referred to as a historical selector. Based on the opportunity or report type, the customer has the ability to filter on historical data using a custom historical filter. The interface provides the ability for the customer to look at all of the filters on the left that they can use to restrict a value or a field, thus allowing customers to filter on historical column data for any given value. Thus, a customer may look at all of the open opportunities for a given month or filter the data set according to current column data rather than historical. Thus, for a given opportunity a user at the interface can fill out the amount, stage, close date, probability, forecast category, or other data elements and then as the salesperson speaks with the target buyer, the state is changed from prospecting to quoting, to negotiation based on the progress that is made with the target buyer, and eventually to a state of won/closed or lost, etc. Filtering on elements such as probability of close and forecast category will trigger predictive queries to render the predictions upon which filtering and other comparisons by the interface are made.

Take for example, a target buyer asking to decrease the amount of the deal and a salesperson trying to increase the amount. All of the data including changing amounts for the opportunity and state changes for the opportunity is stored in the historical trending data object which provides the audit trail.

As the current data is updated within the current tables past values become inaccessible to the customer. However, the historical trending data object provides a queryable audit trail through which such historical values may be retrieved at the behest of the interface and its users. According to one embodiment, the historical data is processed with granularity of one day, and thus, a salesperson can go back in time and view how the data has changed overtime with within the data each of the exemplary four stages for the customer historical date range specified. In such a way, the user is presented with a highly intuitive interface by which to explore the historical data accessible to them.

In other embodiments, filter elements are provided to the user to narrow or limit the search according to desired criteria, such as industry, geography, deal size, products in play, etc. Such functionality thus aids sales professionals with improving sales productivity and streamlining business processes.

According to one embodiment, the historical trending data object is implemented via a historical data schema in which historical data is stored in a table such as that depicted at Table 1 below:

TABLE 1

| column name | data type | nullable | notes |
|---|---|---|---|
| organization_id | char(15) | no | |
| key_prefix | char(3) | no | key prefix of historical data itself |
| historical_entity_data_id | char(15) | no | |
| parent_id | char(15) | no | FK to the parent record |
| transaction_id | char(15) | no | generated key used to uniquely identify transaction that changed the parent record. Main purpose is to reconcile multiple changes that may occur in one transaction (custom field versus standard field, for example may be written separately) and enable asynchronous fixer operations (if used). |
| division | number | no | |
| currency_iso_code | char(3) | no | |
| deleted | char(1) | no | |
| row_version | number | no | |
| standard audit fields | | | |
| valid_from | date | no | with valid_to, defines time period the data is valid. The time periods (valid_from, valid_to) for each snapshot of the same parent do not overlap. Gaps are allowed. |
| valid_to | date | no | default to 3000/1/1 for current data |
| val0 . . . val800 | varchar(765) | yes | flex fields for storing historic values | set with the daily granular reporting. In other embodiments, all changes are tracked and time-stamped such that any change, no matter the frequency, can be revealed.

In addition to revealing how opportunities have changed over time on behalf of salespersons, such metrics may be useful to other disciplines also, such as a service manager running a call center that receives hundreds of cases from sales agents and needs to evaluate the best means by which to close the calls. Likewise, campaign managers running a marketing campaign can evaluate the best means by which to close on the various leads and opportunities unveiled through the marketing effort as well as peer back into history to see how events influenced the results of past opportunities.

FIG. 20E depicts another interface with defaults for an added custom filter. Here in the "amount" selector a "field" mode has been selected rather than value as in the prior example depicted at FIG. 20D. Element 2029 indicates that when in "field" mode, only current values will appear in the picker, thus permitting the user to select from among those values that actually exist within the date range restricted data set, instead of entering a value. The interface is not limited to "amount" but rather, operates for any columns within a dataset and then permits filtering by value or by "field" mode in which the picker lists only those values which exist in one or more fields for the specified column. For instance, by selecting "stage" the picker may depict each stage of a four stage process, assuming at least one opportunity existed in Indices utilized in the above Table 1 include: organization_id, key_prefix, historic_entity_data_id. PK includes: organization_id, key_prefix, system_modstamp (e.g., providing time stamping or a time stamped record, etc.). Unique, find, and snapshot for given date and parent record: organization_id, key_prefix, parent_id, valid_to, valid_from. Indices organization_id, key_prefix, valid_to to facilitate data clean up. Such a table is additionally counted against users' storage requirements according to certain embodiments. For example, usage may be capped at a pre-configured number of records per user or may be alterable based on pricing plans for the user's organization. Alternatively, when available slots are running low, old slots may be cleaned. Historical data management, row limits, and statistics may be optionally utilized. For new history the system may assume an average 20 byte per column and 60 effective columns (50 effective data columns+PK+audit fields) for the new history table, and thus, row size is 1300 bytes. For row estimates the system may assume that historical trending will have usage patterns similar to entity history. By charging historical trending storage usage to a customer's applicable resource limits, users and organizations will balance the depth of desired historical availability against their resource constraints and pricing.

Sampling of production data revealed recent growth in row count for entity history is approximately 2.5 B (billion) rows/year. Since historical trending will store a single row for any number of changed fields, an additional factor of 0.78 can be applied. By restricting the total quantity of custom historical trending data objects per organization, an expected row count for historical trending may be limited to approximately 1.2 B rows per year in the worst case scenario, with pricing structures being used to influence the total collective growth amongst all tenants of the database.

Historical data may be stored for a default number of years. Where two years is provided as an initial default, the size of the historical trending table is expected to stay around 2.4 B rows. Custom value columns are to be handled by custom indexes similar to custom objects. To prevent unintentional abuse of the system, for example, by using automated scripts, each organization will have a history row limit for each object. Such a limit may be between approximately 1 and 5 million rows per object which is sufficient to cover storage of current data as well as history data based on analyzed usage patterns of production data with only very few organizations occasionally having so many objects that they may hit the configurable limit. Such limits may be handled on a case by cases basis while enabling reasonable limits for the overwhelming user population. The customized table may additionally be custom indexed to help query performance for the various users into the historical trending data object.

Figure 20F:
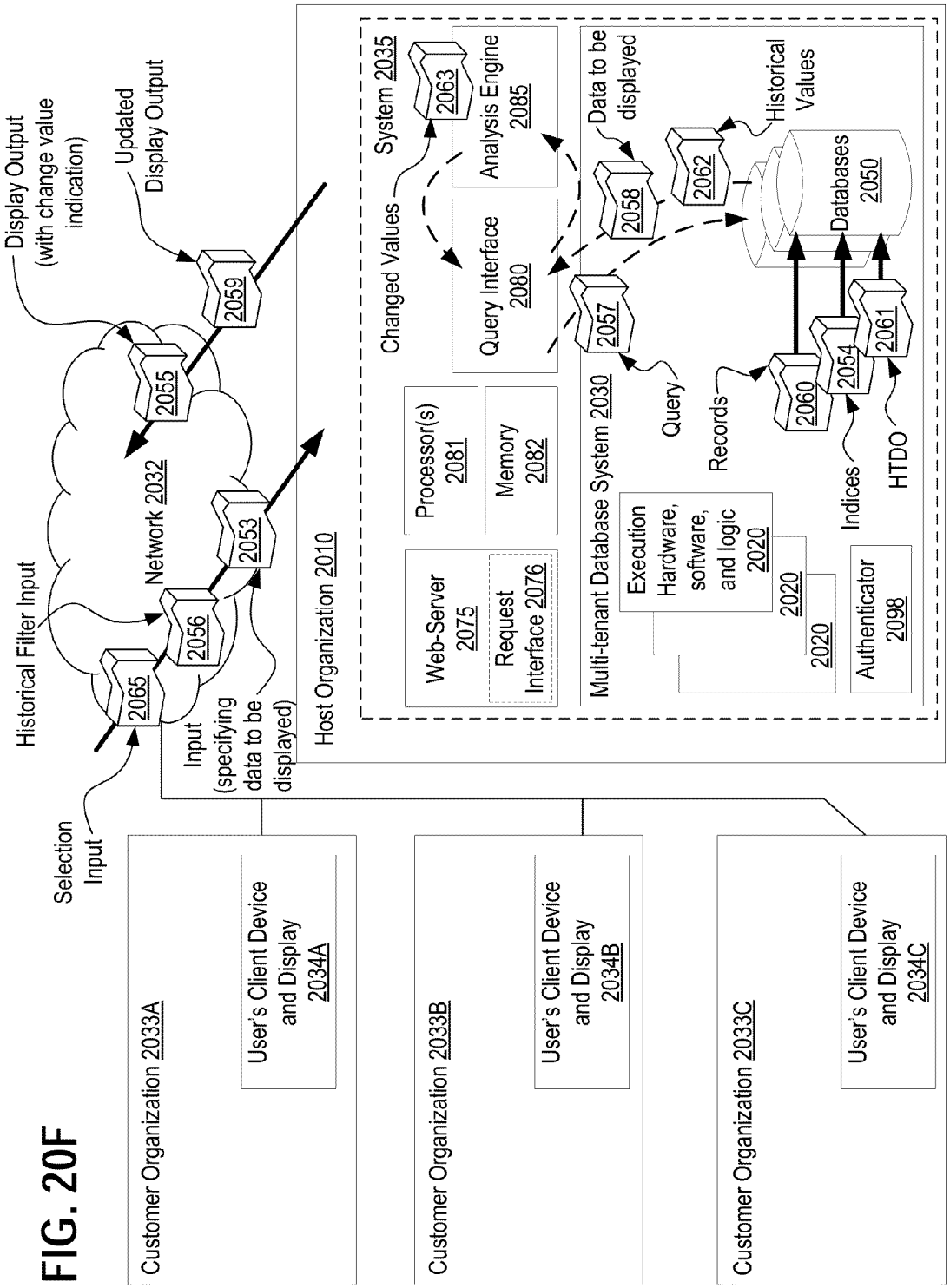
FIG. 20F depicts an exemplary architecture in accordance with described embodiments.

FIG. 20F depicts an exemplary architecture in accordance with described embodiments. In particular, customer organizations 2033A, 2033B, and 2033C are depicted, each with a user's client device and display 2034A, 2034B, and 2034C capable of interfacing with host organization 2010 via network 2032, including sending input, queries, and requests and responsively receiving responses including output for display. Within host organization 2010 is a request interface 2076 which may optionally be implemented by web-server 2075. The host organization further includes processor(s) 2081, memory 2082, a query interface 2080, analysis engine 2085, and a multi-tenant database system 2030. Within the multi-tenant database system 2030 are execution hardware, software, and logic 2020 that are shared across multiple tenants of the multi-tenant database system 2030, authenticator 2098, and databases 2050 which may include, for example, a database for storing records, such as a relational database, a database for storing historical values, such as an object database capable of hosting the historical trending data object, and a predictive database capable of storing indices 2054 generated by the analysis engine 2085 to facilitate the return of predictive results responsive to queries executed against such a predictive database.

According to one embodiment, the host organization 2010 operates a system 2035 having at least a processor 2081 and a memory 2082 therein, in which the system 2035 includes a database 2050 to store records 2060, in which updates to the records 2060 are recorded into a historical trending data object (HTDO) 2061 to maintain historical values for the records when the records 2060 are updated in the database 2050. According to such an embodiment, the system 2035 further includes a request interface 2076 to receive input 2053 from a user device 2034A-C specifying data to be displayed at the user device 2034A-C and further in which the request interface 2076 is to receive historical filter input 2056 from the user device 2034A-C. In such an embodiment, the system 2035 further includes a query interface 2080 to query 2057 the records 2060 stored in the database 2050 for the data to be displayed 2058 and further in which the query interface 2080 is to query 2057 the historical trending data object 2061 for the historical values 2062 of the data to be displayed 2058. The system 2035 further includes an analysis engine 2085 to compare the data to be displayed with the historical values of the data to be displayed to determine one or more changed values 2063 corresponding to the data to be displayed. The request interface 2076 of the system 2035 is then to further return, as display output 2055 to the user device 2034A-C, at least the data to be displayed 2058 and a changed value indication based on the one or more changed values 2063 determined via the comparing.

The request interface 2076 may additionally receive selection input 2065 via a change value indication GUI at the user device 2034A-C, in which the selection input 2065 requests additional sub-detail for the one or more changed values, responsive to which the request interface 2076 and/or web-server 2075 may provide additional drill-down sub-detail. For instance, if a user of a touchscreen touches or gestures to one of the changed values indicated then the user interface may communicate such input to the request interface 2076 causing the host organization 2010 to provide updated display output 2059 with additional detail for the specified changed value (e.g., present and past state, difference, direction of change, predictive win/loss result change for a sales opportunity, etc.).

According to another embodiment of the system 2035, the databases 2050 are to execute as on-demand cloud based services at the host organization 2010 for one or more subscribers; and in which the system further includes an authenticator 2098 to verify the user as a known subscriber and to further verify authentication credentials presented by the known subscriber.

According to another embodiment of the system 2035, a web-server 2075 is to implement the request interface 2076 and is to interact with a change value indication GUI caused to be displayed at the user device 2034A-C by the request interface 2076 and/or web-server 2075. In such an embodiment, the web-server 2075 is to receive as input, a plurality of access requests from one or more client devices from among a plurality of customer organizations communicably interfaced with the host organization via a network 2032.

The system 2035 may further include a multi-tenant database system with predictive database functionality to implement the predictive database; and further in which each customer organization is an entity selected from the group consisting of: a separate and distinct remote organization, an organizational group within the host organization, a business partner of the host organization, or a customer organization that subscribes to cloud computing services provided by the host organization.

FIG. 20G is a flow diagram illustrating a method in accordance with disclosed embodiments. Method 2031 may be performed by processing logic that may include hardware (e.g., circuitry, dedicated logic, programmable logic, microcode, etc.), software (e.g., instructions run on a processing device to perform various operations such transmitting, sending, receiving, executing, generating, calculating, storing, exposing, querying, processing, etc., in pursuance of the systems, apparatuses, and methods for implementing change value indication and historical value comparison at a user interface, as described herein. For example, host organization 110 of FIG. 1, machine 400 of FIG. 4, or system 2035 of FIG. 20F may implement the described methodologies. Some of the blocks and/or operations listed below are optional in accordance with certain embodiments. The numbering of the blocks presented is for the sake of clarity and is not intended to prescribe an order of operations in which the various blocks must occur.

At block 2091, processing logic stores records in a database, in which updates to the records are recorded into a historical trending data object to maintain historical values for the records when the records are updated in the database.

At block 2092, processing logic receives input from a user device specifying data to be displayed at the user device.

At block 2093, processing logic receives historical filter input from the user device.

At block 2094, processing logic queries the records stored in the database for the data to be displayed.

At block 2095, processing logic queries the historical trending data object for the historical values of the data to be displayed.

At block 2096, processing logic compares the data to be displayed with the historical values of the data to be displayed to determine one or more changed values corresponding to the data to be displayed.

At block 2097, processing logic displays a change value indication GUI to the user device displaying at least the data to be displayed and a changed value indication based on the one or more changed values determined via the comparing.

The User Interface (UI) or Graphical User Interface (GUI) and the change value indication GUI in particular consumes data stored in the database, consumes historical data stored within the historical trending data object, and consumes predictive results returned from the predictive interface to display results to the user in a highly intuitive fashion.

The problem with conventional database interfaces is that they view data stored within the database in its present state, which is, of course, the objective of a database that stores records. Nevertheless, it is sometimes beneficial to have a view of the data as it was on some historical date in the past, or have a view of how the data has changed between two historical dates or between a past state on a particular historical date and a current state as the data exists today.

Recovering data in the database to a prior state is not a workable solution as this will overwrite the data in its present state with erroneous past state data. Accordingly, the change value indication GUI provides an intuitive means by which a user can explore their data, even as it existed in a past state. Such capabilities allow a user to step back in time and view the data, such as the current state of a sales opportunity or other such records, as it existed on a specified day, without corrupting the up-to-date date in its present state as stored within a database.

Moreover, the described methodologies negate the need for a user to define complex data schemas or write custom code to track historical data. For instance, there is no need to engage IT support to expose the necessary data or employ programmers to write customized software to track such information. Instead, a host organization operating as a cloud based service provides the necessary functionality to the user and exposes it through an intuitive UI, such as the change value indication GUI described.

Further still, users are not required to construct complicated SQL queries, but rather, may explore and view historical data records and values through the GUI interface. When the change value indication GUI is coupled with predictive queries, the GUI constructs the necessary PreQL queries on behalf of the user and exposes predictive results to the GUI, thus further expanding data exploration capabilities for the user.

According to another embodiment of method 2031, the records stored in the database maintain a present state for the data; and in which the historical values for the records recorded into the historical trending data object maintain one or more past states for the data without corrupting the present state of the data.

According to another embodiment of method 2031, storing the records in the database includes storing one or more tables in the database, each of the one or more tables having a plurality of columns establishing characteristics of entities listed in the table and a plurality of entity rows recorded in the table as records; and in which updates to the records include any one of: (i) modifying any field at an intersect of the plurality of columns and the plurality of entity rows, and (ii) adding or deleting a record in the database.

According to another embodiment of method 2031, updates to the records includes: receiving an update to a record stored in the database; recording present state data for the record stored in the database into the historical trending data object as past state data; modifying the present state data of the record in the database according to the update received; committing the update to the database; and committing the past state data to the historical trending data object.

According to another embodiment of method 2031, the historical values for the records maintained in the historical trending data object are time stamped; and in which multiple updates to a single record stored in the database are distinctly maintained within the historical trending data object and differentiated based at least on the time stamp. In certain embodiments, every update to a record within the database is stored as a new row within the historical trending data object.

The computing hardware of the host organization thus stores every change that occurs within the database records on behalf of users as raw data within the historical trending data object and when users engage the GUI interface, appropriate queries are constructed on behalf of the user to query and retrieve the necessary information to display changed values, to display differences in values, to display changes over time for a given field, and so forth. For example, a user may specify two points in time, such as today and last month, from which the necessary functions are built by the GUI's or web-server's functionality to query and display the results to the user via the change value indication GUI, including computed differences or modified values, along with highlighting to emphasize determined changes in values.

For example, the change value indication GUI may display undesirable changes as red text, with red directional arrows, or with red highlighting. Such undesirable changes may be a reduction in a sales opportunity amount, a reduction in probability of a predictive win|lose result (e.g., a predictive result for an IS_WON field having a null value), an increase in the predicted sales opportunity close date, and so forth. Desirable changes may be displayed using green text, arrows, or highlighting, and changes that are neutral may simply use gray or black text, arrows, or highlighting. Different colors than those described may be substituted.

According to another embodiment of method 2031, the changed value indication includes at least one of: colored or highlighted text displayed at the change value indication GUI for the one or more changed values; directional arrows displayed at the change value indication GUI for the one or more changed values, the directional arrows indicating an existence of change or a direction of change; a computed difference between the data to be displayed and the one or more changed values; and a present state and a past state displayed concurrently for the data to be displayed based on the one or more changed values.

According to another embodiment of method 2031, displaying a change value indication GUI to the user device includes displaying both the data to be displayed and the one or more changed values determined via the comparing in addition to the changed value indication.

According to another embodiment of method 2031, the data to be displayed includes a plurality of sales opportunities stored as the records in the database; and in which displaying the change value indication GUI to the user device includes displaying the plurality of sales opportunities to the user device with the changed value indication depicting changes to one or more of the plurality of sales opportunities in a current state versus a past state.

According to another embodiment, method 2031 further includes: determining a first win or lose predictive result for each of the sales opportunities in the current state; determining a second win or lose predictive result for each of the sales opportunities in the past state; and depicting any change between the first and second win or lose predictive results via the changed value indication GUI.

According to another embodiment of method 2031, determining the first and second win or lose predictive results includes constructing a predictive query specifying a PREDICT command term and issuing the predictive query against a predictive database via a Predictive Query Language (PreQL) interface.

According to another embodiment of method 2031, the change value indication GUI depicts a graph or chart of the one or more changed values over time based on the historical values of the data to be displayed.

The change value indication GUI permits users to customize reports via a variety of filters including both normal filters that filter results of present state data stored within the database as well as historical filters. Utilizing the GUI, users may add a new filter for a report and specify, for example, a historical field filter along with logical comparators (e.g., equal to, less than, greater than, is true, is false, is null, etc). The user may additionally specify historical dates for use in filtering. For instance, results may be requested as they existed on a given historical date, or two dates may be specified which will then yield changed values between the two dates, be they both historical dates or a historical date compared to a present date (e.g., today). A date range is sometimes appropriate, for instance, to show how a sales amount has changed over time on a month by month, week by week, or day by day basis, and so forth.

According to another embodiment of method 2031, the historical filter input includes at least one of: a historical date; a historical date range; a historical close date for a closed sales opportunity; a value or string recorded in the historical trending data object; a field or record present in the historical trending data object; a logical operand or comparator for a value or string recorded in the historical trending data object; and a predictive result threshold or range for null values present in the historical trending data object.

According to another embodiment of method 2031, displaying the change value indication GUI to the user device further includes at least one of: displaying all changed values for the data to be displayed determinable from the historical trending data object; displaying all changed values within a date range specified via the historical filter input; and displaying a graph of the one or more changed values with a daily, weekly, monthly, or quarterly change interval as specified via the change value indication GUI.

According to another embodiment of method 2031, the historical trending data object is to maintain the historical values is active by default and exposed to users via the change value indication GUI as part of a cloud computing service.

According to another embodiment of method 2031, the historical trending data object is limited to a historical capacity established based on subscription fees paid by the users for access to the cloud computing service, the historical capacity increasing in proportion to the subscription fees paid by the users, with zero subscription fee users having access to a minimum default historical capacity.

Such a model encourages users to maintain their existing data within the cloud at the host organization because users are able to benefit from enhanced capabilities which are not provided by conventional solutions. Even where users do not pay additional fees, they are still exposed to the capability in a limited fashion and can decide later whether or not they wish to expand the scope of their historical data exploration and retention capabilities.

According to another embodiment, method 2031 further includes: displaying additional sub-detail for the one or more changed values responsive to selection input received at the change value indication GUI; in which the selection input includes one of a mouse over event, a cursor over event, a click event, a touchscreen selection event, or a touchscreen position event corresponding the change value indication displayed; and in which displaying sub-detail includes displaying the sub-detail within a graphical overlay positioned on top of and at least partially covering the change value indication displayed initially.

For example, having returned the display output to the user's display, the user may further explore the results by clicking, gesturing, pressing, or hovering on an item, which then triggers the change value indication GUI to render additional results contextually relevant to the user's actions without requiring the user to construct alternative or additional filtering.

According to another embodiment of method 2031, the one or more changed values correspond to at least one of: (i) a change in a win or lose predictive result indicating whether a sales opportunity is probabilistically predicted to result in a win or a loss; (ii) a change in a confidence indicator for the win or lose predictive result; (iii) change in a predicted sales amount; (iv) a change in a predicted sales opportunity close date; and in which sub-detail corresponding to any one of (i) through (iv) is further displayed to the user device via the change value indication GUI responsive to selection input received at the change value indication GUI.

The ability to compare historical results enables a pipeline comparison (e.g., refer to the pipeline change report 2001 at FIG. 20A). Such a report enables users to explore how products, sales opportunities, or other natural business flows change over time, for instance, how the business pipeline looks today versus yesterday, or today versus last quarter, or how the business pipeline looked at the end of last quarter versus the same quarter of the prior year, and so forth. Such a report may depict sales opportunities charted against sales stages, sales by product, forecast, category, predictive results for yet to be observed values, volumes, revenues, and any other business metric for which data is recorded in the database or capable of prediction via the predictive database.

According to another embodiment of method 2031, displaying the change value indication GUI to the user includes: displaying a first pipeline chart to the user device defined by quantity of sales opportunities on a first axis against a plurality of available sales stages for the sales opportunities on a second axis on a historical date specified via the change value indication GUI based on the historical values maintained within the historical trending data object; and displaying a second pipeline chart concurrently with the first pipeline chart, the second pipeline chart depicting the quantity of sales opportunities against the plurality of available sales stages on a second historical date or a current date as specified via the change value indication GUI.

According to another embodiment of method 2031, the change value indication GUI further displays a recommended forecasting adjustment based on predictive analysis of the historical values maintained within the historical trending data object by an analysis engine.

According to another embodiment of method 2031, the change value indication depicts the one or more changed values using red text or highlighting, green text or highlighting, and gray text or highlighting; in which the red text or highlighting represents a negative change of a present state versus a past state determined via the comparing; in which the green text or highlighting represents a positive change of a present state versus a past state determined via the comparing; and in which the gray text or highlighting represents a neutral change of a present state versus a past state determined via the comparing.

According to another embodiment there is a non-transitory computer readable storage medium having instructions stored thereon that, when executed by a processor in a host organization, the instructions cause the host organization to perform operations including: storing records in a database, in which updates to the records are recorded into a historical trending data object to maintain historical values for the records when the records are updated in the database; receiving input from a user device specifying data to be displayed at the user device; receiving historical filter input from the user device; querying the records stored in the database for the data to be displayed; querying the historical trending data object for the historical values of the data to be displayed; comparing the data to be displayed with the historical values of the data to be displayed to determine one or more changed values corresponding to the data to be displayed; and displaying a change value indication GUI to the user device displaying at least the data to be displayed and a changed value indication based on the one or more changed values determined via the comparing.

Figure 21A:
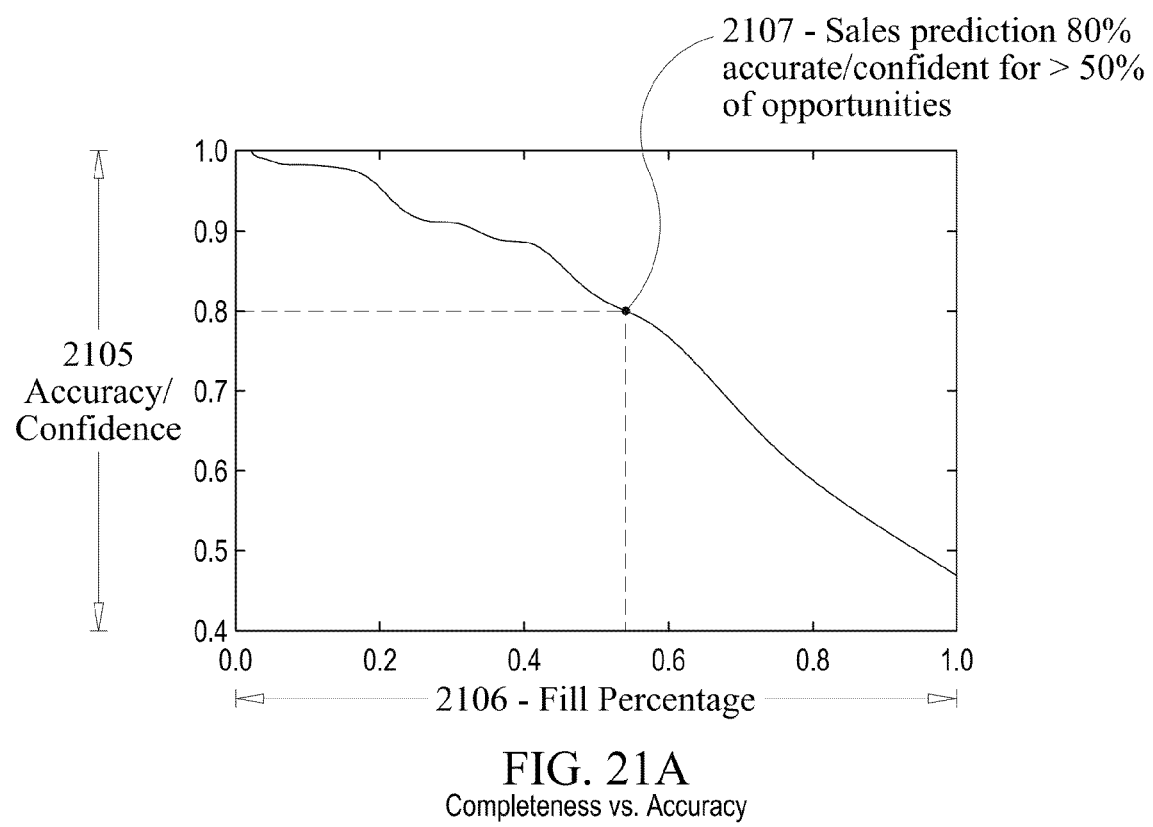
FIG. 21A provides a chart depicting prediction completeness versus accuracy.

FIG. 21A provides a chart depicting prediction completeness versus accuracy. On the vertical axis at element 2105 accuracy/confidence is shown ranging from "1.0" representing essentially perfect accuracy or the highest possible confidence in a prediction down to "0.4" on this particular scale, representing somewhat poor accuracy or low confidence. On the horizontal axis, element 2106 depicts filler percentage ranging from "0.0" meaning there is no predictive fill to "1.0," meaning all available elements are filled using predictive results where necessary. Thus, at 0.0, there are no predicted results and as such, accuracy is perfect because only known (e.g., actually observed) data is present. Conversely, at 1.0 fill percentage, predictive results become less reliable, such that any null-values present in a data set are filled using predictive values, but with accuracy/confidence reaching a low between 0.4 and 0.5.

Any number of different intersections can be drawn, however, element 2107 depicts the intersection between 0.8 accuracy/confidence on the vertical axis and above 50% fill percentage on the horizontal axis which translates to sales predictions being 80% accurate/confident for greater than 50% of the opportunities analyzed by the predictive analysis engine's core.

Different datasets may change these precise values, however, the chart depicts what is commonly found within rich datasets pertaining to such sales data. Specifically that a majority of opportunities can be predicted with a relatively high degree of accuracy/confidence, which in turn permits the salespersons to focus their efforts on those opportunities which are most likely to yield a positive result, according to the predictive analysis performed.

Figure 21B:
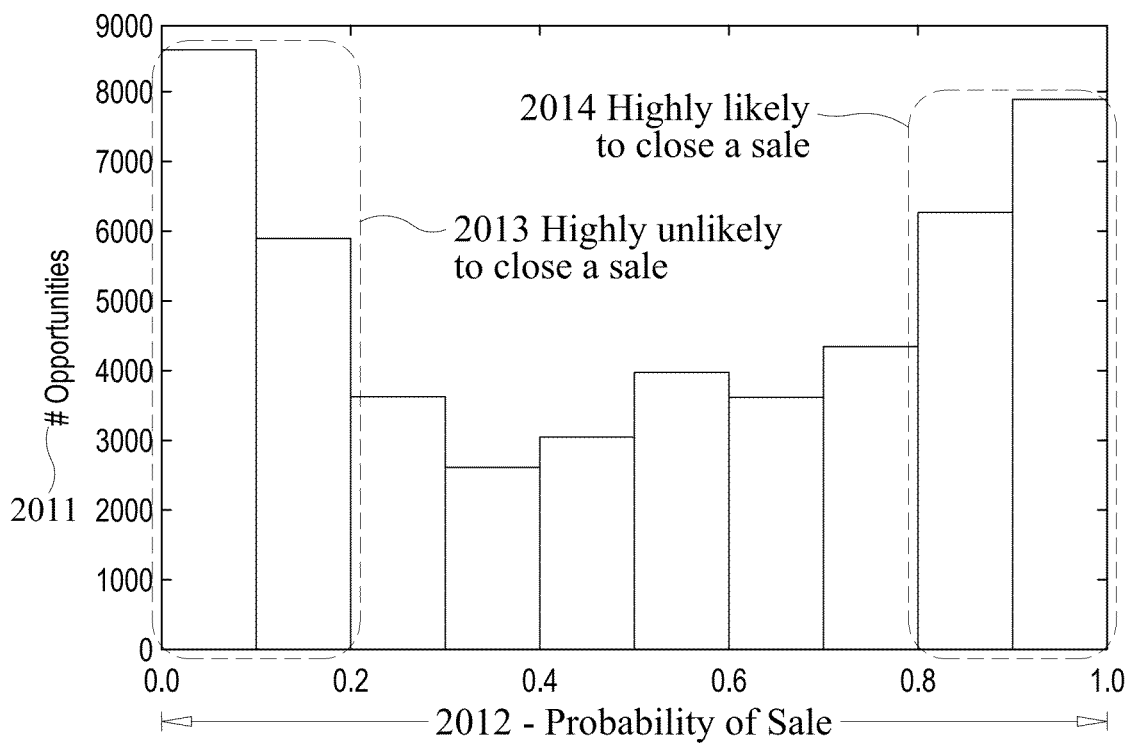
FIG. 21B provides a chart depicting an opportunity confidence breakdown.

FIG. 21B provides a chart depicting an opportunity confidence breakdown. Element 2011 on the vertical axis depicts the number of opportunities ranging from 0 to 9000 on this particular chart and element 2012 on the horizontal axis represents the probability of sale, ranging from a 0.0 confidence to a 1.0 confidence. Notably, the columns toward the left and also the columns toward the right are highly revealing. A probability of "0.0" does not correlate to complete lack of confidence, but rather, correlates to a very high degree of confidence that the sales are highly unlikely to result in a sale as depicted by element 2013 highlighting those sales opportunities ranting from 0.0 to 0.2. On the opposite end of the spectrum, element 2014 highlights those sales opportunities ranging from 0.8 to 1.0 as being highly likely to close in a sale.

Figure 21C:
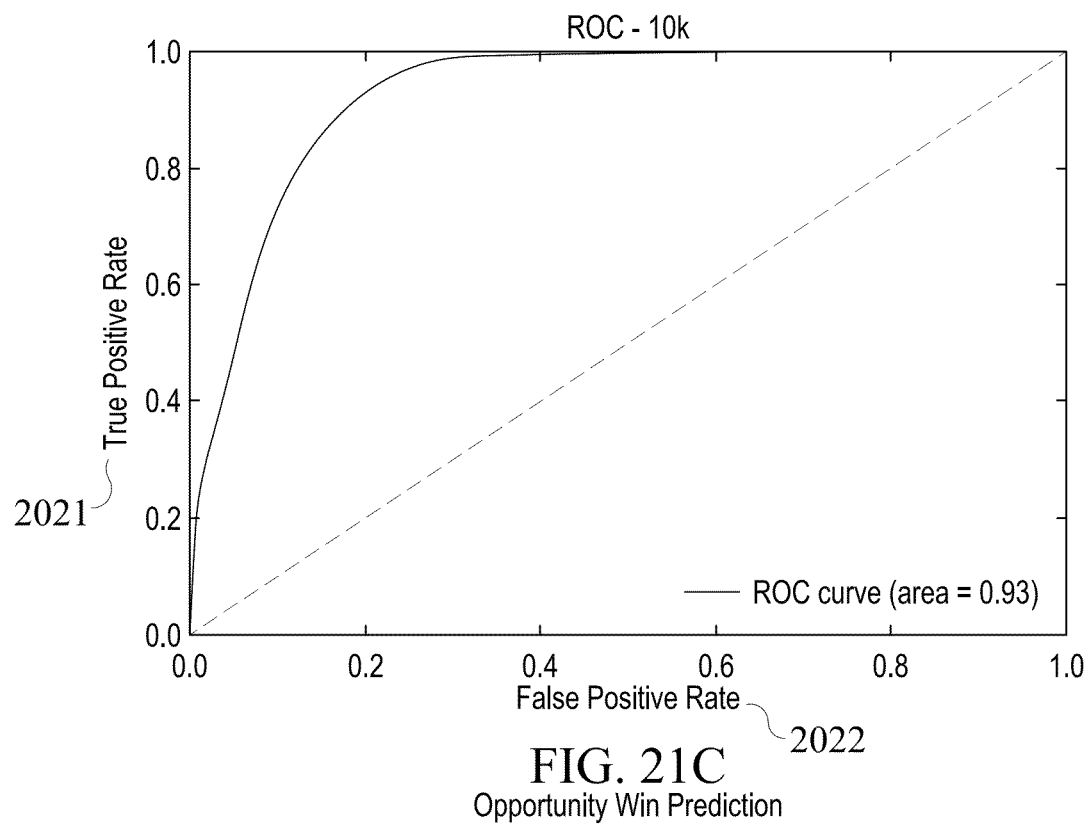
FIG. 21C provides a chart depicting an opportunity win prediction.

FIG. 21C provides a chart depicting an opportunity win prediction. In signal detection theory, a Receiver Operating Characteristic (ROC), or simply a ROC curve, is a graphical plot which illustrates the performance of a binary classifier system as its discrimination threshold is varied. It is created by plotting the fraction of true positives out of the positives (TPR=true positive rate) vs. the fraction of false positives out of the negatives (FPR=false positive rate) at various threshold settings. TPR is also known as sensitivity (also referred to as recall in some fields), and FPR is one minus the specificity or true negative rate. In general, if both of the probability distributions for detection and false alarm are known, the ROC curve can be generated by plotting the Cumulative Distribution Function (area under the probability distribution from −infinity to +infinity) of the detection probability in the y-axis versus the Cumulative Distribution Function of the false alarm probability in x-axis.

The ROC 10 k curve depicted here maps the True Positive Rate on the vertical axis marked by element 2021 ranging from a confidence of 0.0 to 1.0 and further maps the False Positive Rate on the horizontal axis marked by element 2022 ranging from a confidence of 0.0 to 1.0 resulting in a ROC curve having an area of 0.93.

Figure 22A:
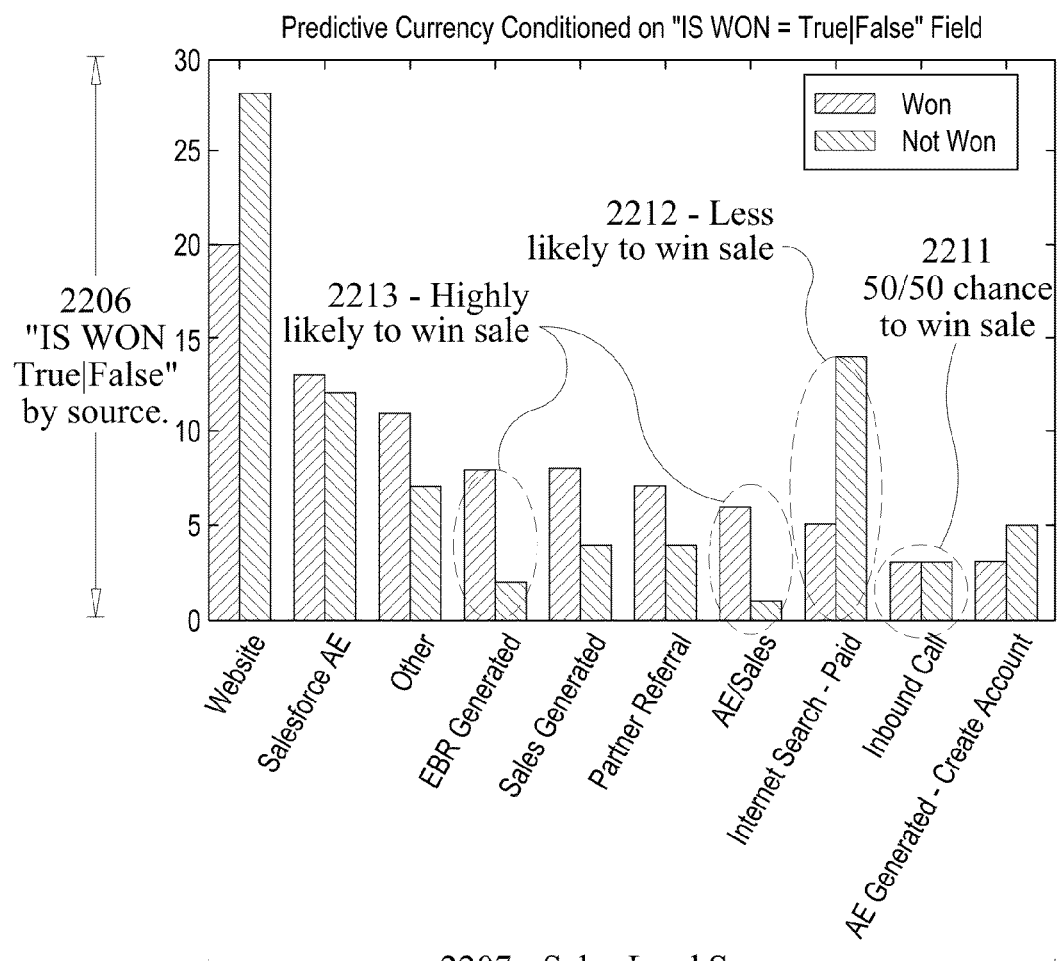
FIG. 22A provides a chart depicting predictive relationships for opportunity scoring.

FIG. 22A provides a chart depicting predictive relationships for opportunity scoring. Predictive currency is conditioned on the "IS WON=True|False" field. Element 2206 on the vertical axis depicts "IS WON" as True or False by source and element 2207 on the horizontal axis depicts a variety of sales lead sources including from left to right, website, Salesforce AE, Other, EBR Generated, Sales Generated, Partner Referral, AE/Sales, Internet Search—Paid, Inbound Call, and lastly AE Generated—Create Account on the right.

The interface depicted here is generated on behalf of a user using a historical data set subjected to predictive analysis and may aid a salesperson or sales team in determining where to apply limited resources. The chart is subject to interpretation, but certain facts are revealed by the analysis such as element 2213 which indicates that EBR Generated leads are highly likely to win a sale, element 2212 depicts that AE/Sales are less likely to win a sale, and at element 2211 it can be seen that Inbound Calls result in about a 50/50 chance to win a sale. Such data presented at the interface showing predictive relationships for opportunity scoring may thus be helpful to a sales team in determining where to focus resources.

Figure 22B:
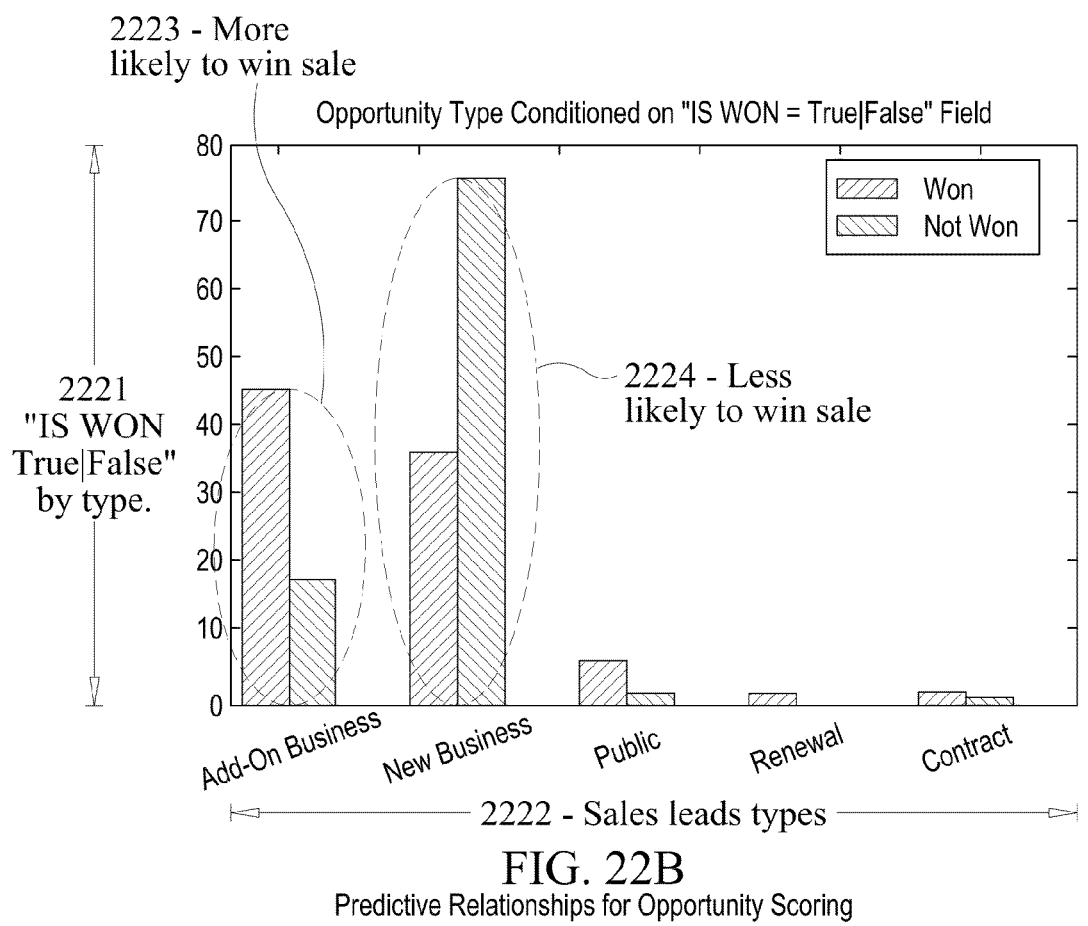
FIG. 22B provides another chart depicting predictive relationships for opportunity scoring.

FIG. 22B provides another chart depicting predictive relationships for opportunity scoring. Here the opportunity is conditioned on the "IS WON=True|False" field. Element 2221 on the vertical axis depicts "IS WON" as True or False by type and element 2222 on the horizontal axis depicts a variety of sales lead types including from left to right, Add-On Business, New Business, Public, Renewal, and Contract on the right.

Element 2223 depicts that Add-On business is more likely to win a sale and element 2224 indicates that New Business is less likely to win a sale. As before, the interface depicted here is generated on behalf of a user using a historical data set subjected to predictive analysis and may aid a salesperson or sales team in determining where to apply limited resources.

Additional functionality enables specialized UI interfaces to render a likelihood to renew an existing opportunity by providing a score or probability of retention for an existing opportunity by providing a retention score. Such functionality is helpful to sales professionals as such metrics can influence where a salesperson's time and resources are best spent so as to maximize revenue.

Opportunity scoring may utilize the RELATED command term to issue a latent structure query request to indices generated by the analysis engine's predictive analysis of a dataset. For instance, the RELATED command term may be utilized by a specialized UI to identify which fields are predictively related to another field, such as which fields are related to an "IS WON" field with true or false values. Other less intuitive fields may additionally be probabilistically related. For instance, a lead source field may be determined to be related to certain columns of the dataset whereas other columns such as the fiscal quarter may prove less related to a win/loss outcome.

Figure 22C:
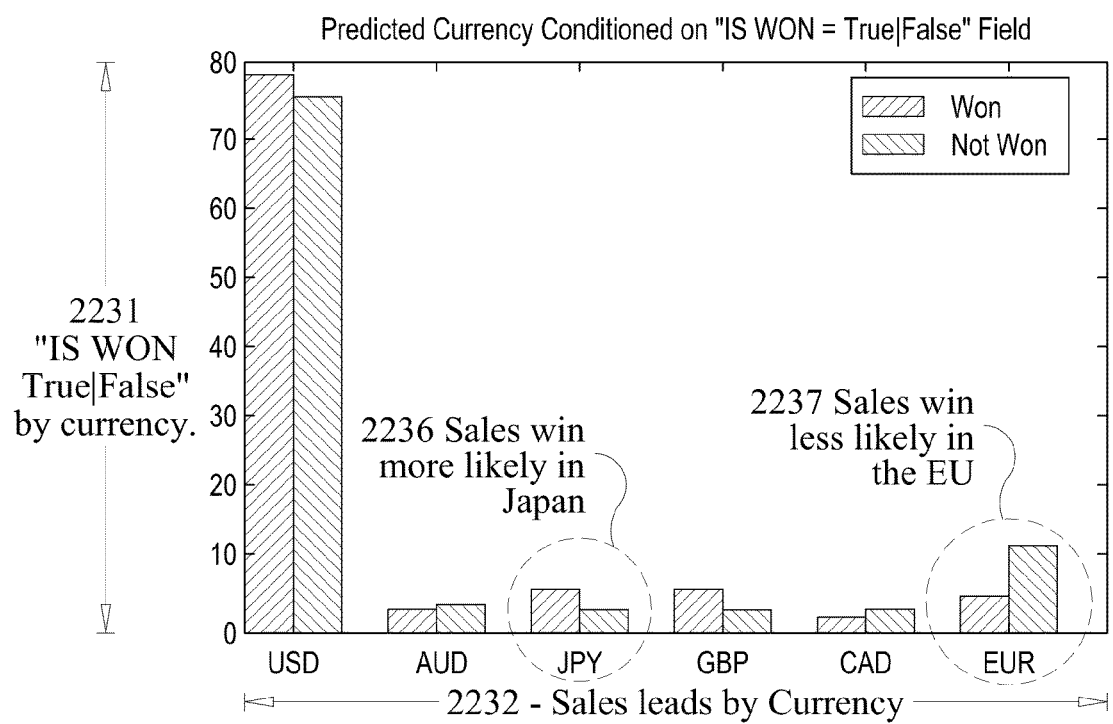
FIG. 22C provides another chart depicting predictive relationships for opportunity scoring.

FIG. 22C provides another chart depicting predictive relationships for opportunity scoring. Here the predicted currency is conditioned on the "IS WON=True|False" field. Element 2231 on the vertical axis depicts "IS WON" as True or False by currency and element 2232 on the horizontal axis depicts a variety of sales leads by currency including from left to right, United States Dollars (USD), Australian Dollars (AUD), Japanese Yen (JPY), Great British Pounds (GBP), Canadian Dollars (CAD), and lastly Euros (EUR) on the right.

Interpreting the data, it can be said at element 2236 that opportunities are more likely to result in a sales win in Japan and at element 2237 opportunities are less likely to win in European countries using the Euro. While significantly more data exists for USD based sales opportunities, there is less of a clear relationship to win/loss by currency, although slightly more sales analyzed resulted are predicted to result in a win versus a loss. As before, the interface depicted here is generated on behalf of a user using a historical data set subjected to predictive analysis and may aid a salesperson or sales team in determining where to apply limited resources.

High level use cases for such historical based data in a dataset to be analyzed and subjected to predictive analysis are not limited to the explicitly depicted examples. For instance, other use cases may include: determining a propensity to buy and scoring/ranking leads for sales representatives and marketing users. For instance, sales users often get leads from multiple sources (marketing, external, sales prospecting etc.) and often times, in any given quarter, they have more leads to follow up with than time available to them. Sales representatives often need guidance with key questions such as: which leads have the highest propensity to buy, what is the likelihood of a sale, what is the potential revenue impact if this lead is converted to an opportunity, what is the estimated sale cycle based on historical observations if this lead is converted to an opportunity, what is the score/rank for each lead in the pipeline so that high potential sales leads in a salesperson's territory may be discovered and prioritized, and so forth.

Sales representatives may seek to determine the top ten products each account will likely buy based on the predictive analysis and the deal sizes if they successfully close, the length of the deal cycle based on the historical trends of similar accounts, and so forth. When sales representatives act on these recommendations, they can broaden their pipeline and increase their chance to meet or exceed quota, thus improving sales productivity, business processes, prospecting, and lead qualification. The historical data provided and subjected to predictive analysis may yield better predictive results which may be conveyed to a user through data exploration using the various filters or through specialized UI charts and interfaces provided, each of which handle the necessary historical and predictive queries to the predictive database indices on behalf of the user.

Additional use cases for such historical based data may further include: likelihood to close/win and opportunity scoring. For instance, sales representatives and sales managers may benefit from such data as they often have too many deals in their current pipeline and must juggle where to apply their time and attention in any month/quarter. As these sales professionals approach the end of the sales period, the pressure to meet their quota is of significant importance. Opportunity scoring can assist with ranking the opportunities in the pipeline based on the probability of such deals to close, thus improving the overall effectiveness of these sales professionals.

Additional data may be subjected to the predictive analysis along with historical sales data. Additional data sources may include such data as: comments, sales activities logged, standard field numbers for activities (e.g., events, log a call, tasks etc.), C-level customer contacts, decision maker contacts, close dates, standard field numbers for times the close date has pushed, opportunity competitors, standard field opportunities, competitive assessments, executive sponsorship, standard field sales team versus custom field sales team as well as the members of the respective teams, chatter feed and social network data for the individuals involved, executive sponsor involved in a deal, DSRs (Deal Support Requests), and other custom fields.

Historical based data can be useful to the analysis engine's predictive capabilities for generating metrics such as Next Likelihood Purchase (NLP) and opportunity whitespace for sales representatives and sales managers. For instance, a sales representative or sales manager responsible for achieving quarterly sales targets will undoubtedly be interested in: which types of customers are buying which products; which prospects most resemble existing customers; are the right products being offered to the right customer at the right price; what more can we sell to my customer to increase the deal size, and so forth. Analyzing historical data for opportunities with similar customers known to have purchased may uncover selling trends, and using such metrics yields valuable insights to make predictions about what customers may buy next, thus improving sales productivity and business processes.

Another capability provided to end users is to provide customer references on behalf of sales professionals and other interested parties. When sales professionals require customer references for potential new business leads they often spend significant time searching through and piecing together such information from CRM sources such as custom applications, intranet sites, or reference data captured in their databases. However, the analysis engine's core and associated use case GUIs can provide key information to these sales professionals. For instance, the application can provide data that is grouped according to industry, geography, size, similar product footprint, and so forth, as well as provide in one place what reference assets are available for those customer references, such as customer success stories, videos, best practices, which reference customers are available to chat with a potential buyer, customer reference information grouped according to the contact person's role, such as CIO, VP of sales, etc., which reference customers have been over utilized and thus may not be good candidate references at this time, who are the sales representatives or account representatives for those reference customers at the present time or at any time in the past, who is available internally to an organization to reach out or make contact with the reference customer, and so forth. This type of information is normally present in database systems but is not organized in a convenient manner resulting in an extremely labor intensive process to retrieve the necessary referral. However, the analysis engine's core may identify such relationships and hidden structure in the data which may then be retrieved and displayed by specialized GUI interfaces for end-users, for example, by calling the GROUP command term via the GUI's functionality. Additionally, the functionality can identify the most ideal or the best possible reference customer among many based on predictive analysis and incorporate the details of using a proposed reference customer into a scored probability to win/close opportunity chart. Such data is wholly unavailable from conventional systems.

According to other embodiments, functionality is provided to predict forecast adjustments on behalf of sales professionals. For instance, businesses commonly have a system of sales forecasting as part of their critical management strategy. Yet, such forecasts are by their very nature inexact. The difficultly is knowing in which direction such forecasts are wrong and then turning that understanding into an improved picture of how the business is doing. The analysis engine's predictive analysis can improve such forecasting using a customer organization's existing data including existing forecasting data. For instance, analyzing past forecasting data in conjunction with historical sales data may aid the business with trending and with improving existing forecasts into the future which have yet to be realized. Sales managers are often asked to provide their judgment or adjustment on forecasting data for their respective sales representatives. Such activity requires such sales managers to aggregate their respective sales representatives' individual forecasts which is a very labor intensive process and tends to introduce error. Sales managers are intimately familiar with their representatives' deals and they spend time reviewing them on a periodic basis as part of a pipeline assessment. Improved forecasting results can aid such managers with improving the quality and accuracy of their judgments and assessments of current forecasting data as well as help with automating the aggregating function which is often carried out manually or using inefficient tools, such as spreadsheets, etc.

In such an embodiment, the analysis engine mines past forecast trends by the sales representatives for relationships and causations such as forecast versus quota versus actuals for a past time span, such as the past eight quarters or other appropriate time period for the business. Using the analysis engine's predictive functionality or specialized UI interfaces, a recommended judgment and/or adjustment is provided that can be applied to a current forecast. By leveraging the analytical assessment at various levels of the forecast hierarchy, organizations can reduce the variance between individual sales representative's stipulated quotas, forecasts, and actuals, over a period of time, thereby narrowing deltas between forecast and realized sales via improved forecast accuracy.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method in a host organization, the method comprising:
generating indices from a dataset of columns and rows, the indices representing probabilistic relationships between the rows and the columns of the dataset;
storing the indices within a database system of the host organization;
exposing the database system of the host organization via a request interface;
receiving, at the request interface, a query for the database system specifying a SIMILAR command term, a specified row as a parameter for the SIMILAR command term, and a specified column as a parameter for the SIMILAR command term;
querying the database system using the SIMILAR command term and passing the specified row and the specified column to generate a predictive record set;
returning the predictive record set responsive to the query, the predictive record set having a plurality of elements therein, each of the returned elements of the predictive record set including (i) a row identifier which corresponds to a row of the dataset assessed to be similar, according to a latent structure, to the specified row passed with the SIMILAR command term based on the specified column and (ii) a confidence indicator which indicates a likelihood of a latent relationship between the specified row passed with the SIMILAR command and the row identifier returned for the respective element; and
wherein returning the predictive record set responsive to the query further comprising returning one of:
  (i) a most similar row compared to the specified row passed with the SIMILAR command term responsive to the query based on the predictive record set returned and a confidence indicator for each of the similar rows returned with the predictive record set;
  (ii) a least similar row compared to the specified row passed with the SIMILAR command term responsive to the query based on the predictive record set returned and a confidence indicator for each of the similar rows returned with the predictive record set; and
  (iii) a related product in a recommender system responsive to a search by an Internet user, wherein the related product corresponds to the one of the similar rows returned with the predictive record set.

2. The method of claim 1, wherein the column passed with the SIMILAR command term provides the context of the latent structure in which the specified row is to be assessed for similarity, according to the latent structure, to the similar rows returned by the elements of the predictive record set.

3. The method of claim 1, wherein the row of the dataset assessed to be similar included with each element returned within the predictive record set is based further on a fraction of times the similar row occurs in a same row grouping as the specified row according to the column passed with the SIMILAR command term.

4. The method of claim 1, wherein querying the database system using the SIMILAR command term and passing the specified row comprises passing in a row identifier for the specified row from the dataset or the indices.

5. The method of claim 1, wherein querying the database system using the SIMILAR command term and passing the specified row comprises passing a complete row with the SIMILAR command term listing name=value pairs corresponding to all columns for other rows in the dataset or the indices.

6. The method of claim 5, wherein passing the complete row includes passing one or more null or blank values as the value in the name=value pairs.

7. The method of claim 1, wherein querying the database system using the SIMILAR command term comprises the database system estimating mutual information based at least in part on the specified row to determine a measure of mutual dependence between the value of the specified row in the indices and a value of another row present within the indices and corresponding to the column specified.

8. The method of claim 1:
wherein the rows of the dataset correspond to a plurality of documents stored as records in the dataset from which the indices are generated;
wherein passing the specified row comprises passing one of the plurality of documents as the specified row; and
wherein querying the database system using the SIMILAR command term and passing the document as the specified row causes the database system to carry out a content based search using the document's contents.

9. The method of claim 1, further comprising:
passing a minimum confidence threshold with the SIMILAR command term; and
wherein returning the predictive record set comprises returning only the elements of the predictive record set having a confidence indicator in excess of the minimum confidence threshold.

10. The method of claim 1, further comprising:
passing an optional COUNT term that, when provided, specifies a maximum quantity of elements to be returned within the predictive record set.

11. The method of claim 1, wherein the elements of the predictive record set are returned ordered by descending order according to a confidence indicator for each of the elements of the predictive record set or are returned ordered by ascending order according to the confidence indicator for each of the elements of the predictive record set.

12. The method of claim 1, further comprising:
identifying one or more of the similar rows from the predictive record set generated responsive to the querying the database system using the SIMILAR command term based on a minimum confidence threshold for the similar rows; and
inputting the identified one or more of the similar rows into a second query specifying a GROUP command term to restrict a second predictive record set returned from the second query.

13. The method of claim 1, wherein exposing the database system of the host organization comprises exposing a Predictive Query Language Application Programming Interface (PreQL API) directly to authenticated users, wherein the PreQL API is accessible to the authenticated users via a public Internet.

14. The method of claim 1:
wherein exposing the database system of the host organization comprises exposing a web form directly to authenticated users, wherein the web form is accessible to the authenticated users via a public Internet;
wherein the host organization generates a latent structure query for submission to the database system based on input from the web form; and
wherein querying the database system using the SIMILAR command term comprises querying the database system using the latent structure query via a Predictive Query Language Application Programming Interface (PreQL API) within the host organization, the PreQL API being indirectly exposed to authenticated users through the web form.

15. The method of claim 1:
wherein querying the database system using the SIMILAR command term comprises executing a Predictive Query Language (PreQL) structured query against the database for the SIMILAR command term; and
wherein the method further comprises executing one or more additional PreQL structured queries against the database system, each of the one or more additional PreQL structured queries specifying at least one command selected from the group of PreQL commands comprising: PREDICT, RELATED, SIMILAR, and GROUP.

16. The method of claim 1, further comprising:
receiving the dataset from an authenticated subscriber and subsequently receiving the query for the database system from the authenticated subscriber; and
processing the dataset on behalf of the authenticated subscriber to generate the indices.

17. The method of claim 1:
wherein each of the plurality of rows in the dataset corresponds to an entity;
wherein each of the plurality of columns corresponds to a characteristic for the entities; and
wherein a point of intersection between each respective row and each of the plurality of columns forms a cell to store a value at the point of intersection.

18. A method in a host organization, the method comprising:
generating indices from a dataset of columns and rows, the indices representing probabilistic relationships between the rows and the columns of the dataset;
storing the indices within a database system of the host organization;
exposing the database system of the host organization via a request interface;
receiving, at the request interface, a query for the database system specifying a SIMILAR command term, a specified row as a parameter for the SIMILAR command term, and a specified column as a parameter for the SIMILAR command term;
querying the database system using the SIMILAR command term and passing the specified row and the specified column to generate a predictive record set;
returning the predictive record set responsive to the query, the predictive record set having a plurality of elements therein, each of the returned elements of the predictive record set including (i) a row identifier which corresponds to a row of the dataset assessed to be similar, according to a latent structure, to the specified row passed with the SIMILAR command term based on the specified column and (ii) a confidence indicator which indicates a likelihood of a latent relationship between the specified row passed with the SIMILAR command and the row identifier returned for the respective element; and wherein querying the database system using the SIMILAR command term comprises passing a PreQL query to the database system, the PreQL query having a query syntax of:
  (i) the SIMILAR command term as a required term,
  (ii) a ROW term as a required term, the ROW term specifying the row to be passed with the SIMILAR command term,
  (ii) a COLUMN term as a required term, the COLUMN term specifying the column to be passed with the SIMILAR command term, and
  (iv) an optional FROM term specifying one or more tables, datasets, data sources, and/or indices to be queried when the optional FROM term is specified and wherein a default value is used for the one or more tables, datasets, data sources, and/or indices to be queried when the optional FROM term is not specified.

19. The method of claim 18, wherein the query syntax for the PreQL query further provides one or more of:
  an optional CONFIDENCE term that, when provided, specifies the minimum acceptable confidence indicator to be returned with the predictive record set;
  an optional COUNT term that, when provided, specifies a maximum quantity of elements to be returned within the predictive record set; and
  an optional ORDER BY term that, when provided, specifies whether the elements of the predictive record are to be returned in ascending or descending order according to a confidence indicator for each of the elements returned with the predictive record set.

20. The method of claim 18, wherein querying the database system using the SIMILAR command term comprises passing a JavaScript Object Notation (JSON) structured query to the database system, the JSON structured query having a query syntax of:
  the SIMILAR command term as a required term;
  an optional one or more tables, datasets, data sources, and/or indices to be queried or a default value for the one or more tables, datasets, data sources, and/or indices to be queried when not specified;
  the row to be passed with the SIMILAR command term;
  the column to be passed with the SIMILAR command term;
  an optional specification of a minimum acceptable confidence to be returned with the predictive record set according to a confidence indicator;
  an optional specification of a maximum quantity of elements to be returned within the predictive record set; and
  an optional specification of whether the elements of the predictive record are to be returned in ascending or descending order according to a confidence indicator for each of the elements returned with the predictive record set.

21. A non-transitory computer readable storage medium having instructions stored thereon that, when executed by a processor in a host organization, the instructions cause the host organization to perform operations comprising:
  generating indices from a dataset of columns and rows, the indices representing probabilistic relationships between the rows and the columns of the dataset;
  storing the indices within a database system of the host organization;
  exposing the database system of the host organization via a request interface;
  receiving, at the request interface, a query for the database system specifying a SIMILAR command term, a specified row as a parameter for the SIMILAR command term, and a specified column as a parameter for the SIMILAR command term;
  querying the database system using the SIMILAR command term and passing the specified row and the specified column to generate a predictive record set;
  returning the predictive record set responsive to the query, the predictive record set having a plurality of elements therein, each of the returned elements of the predictive record set including (i) a row identifier which corresponds to a row of the dataset assessed to be similar, according to a latent structure, to the specified row passed with the SIMILAR command term based on the specified column and (ii) a confidence indicator which indicates a likelihood of a latent relationship between the specified row passed with the SIMILAR command and the row identifier returned for the respective element; and
  wherein returning the predictive record set responsive to the query further comprising returning one of:
    (i) a most similar row compared to the specified row passed with the SIMILAR command term responsive to the query based on the predictive record set returned and a confidence indicator for each of the similar rows returned with the predictive record set;
    (ii) a least similar row compared to the specified row passed with the SIMILAR command term responsive to the query based on the predictive record set returned and a confidence indicator for each of the similar rows returned with the predictive record set; and
    (iii) a related product in a recommender system responsive to a search by an Internet user, wherein the related product corresponds to the one of the similar rows returned with the predictive record set.

22. The non-transitory computer readable storage medium of claim 21, wherein querying the database system using the SIMILAR command term comprises passing a PreQL query to the database system, the PreQL query having a query syntax of:
  the SIMILAR command term as a required term;
  a ROW term as a required term, the ROW term specifying the row to be passed with the SIMILAR command term;
  a COLUMN term as a required term, the COLUMN term specifying the column to be passed with the SIMILAR command term; and
  an optional FROM term specifying one or more tables, datasets, data sources, and/or indices to be queried when the optional FROM term is specified and wherein a default value is used for the one or more tables, datasets, data sources, and/or indices to be queried when the optional FROM term is not specified.

23. The non-transitory computer readable storage medium of claim 21, wherein querying the database system using the SIMILAR command term comprises passing a JavaScript Object Notation (JSON) structured query to the database system, the JSON structured query having a query syntax of:
  the SIMILAR command term as a required term;
  an optional one or more tables, datasets, data sources, and/or indices to be queried or a default value for the one or more tables, datasets, data sources, and/or indices to be queried when not specified;
  the row to be passed with the SIMILAR command term;
  the column to be passed with the SIMILAR command term;
  an optional specification of a minimum acceptable confidence to be returned with the predictive record set according to a confidence indicator;

an optional specification of a maximum quantity of elements to be returned within the predictive record set; and an optional specification of whether the elements of the predictive record set are to be returned in ascending or descending order according to a confidence indicator for each of the elements returned with the predictive record set.

24. A system to operate within a host organization, the system comprising:

a processor to execute instructions stored in memory of the system;

an analysis engine to generate indices from a dataset of columns and rows, the indices representing probabilistic relationships between the rows and the columns of the dataset;

a predictive database system to store the indices;

a request interface to expose the predictive database system;

the request interface to receive a query for the predictive database system specifying a SIMILAR command term, a specified row as a parameter for the SIMILAR command term, and a specified column as a parameter for the SIMILAR command term;

a query interface to query the predictive database system using the SIMILAR command term and passing the specified row and the specified column to generate a predictive record set; and the request interface to further return the predictive record set responsive to the query, the predictive record set having a plurality of elements therein, each of the returned elements of the predictive record set including (i) a row identifier which corresponds to a row of the dataset assessed to be similar, according to a latent structure, to the specified row passed with the SIMILAR command term based on the specified column and (ii) a confidence indicator which indicates a likelihood of a latent relationship between the specified row passed with the SIMILAR command and the row identifier returned for the respective element; and wherein request interface is to further return one of:
(i) a most similar row compared to the specified row passed with the SIMILAR command term responsive to the query based on the predictive record set returned and a confidence indicator for each of the similar rows returned with the predictive record set;
(ii) a least similar row compared to the specified row passed with the SIMILAR command term responsive to the query based on the predictive record set returned and a confidence indicator for each of the similar rows returned with the predictive record set; and
(iii) a related product in a recommender system responsive to a search by an Internet user, wherein the related product corresponds to the one of the similar rows returned with the predictive record set.

25. The system of claim 24:

wherein the predictive database system is to execute as an on-demand cloud based service at the host organization for one or more subscribers; and wherein the system further comprises an authenticator to verify client devices are associated with a subscriber and to further verify authentication credentials for the respective subscriber.

26. The system of claim 24, wherein the request interface exposes a Predictive Query Language Application Programming Interface (PreQL API) directly to authenticated users, wherein the PreQL API is accessible to the authenticated users via a public Internet.

27. The system of claim 26, wherein the query interface is to pass a Predictive Query Language (PreQL) structured query to the predictive database system to execute the query, the PreQL structured query having a query syntax of:

the SIMILAR command term as a required term;

a ROW term as a required term, the ROW term specifying the row to be passed with the SIMILAR command term;

a COLUMN term as a required term, the COLUMN term specifying the column to be passed with the SIMILAR command term; and an optional FROM term specifying one or more tables, datasets, data sources, and/or indices to be queried when the optional FROM term is specified and wherein a default value is used for the one or more tables, datasets, data sources, and/or indices to be queried when the optional FROM term is not specified.

28. The system of claim 24, further comprising:

a web-server to implement the request interface;

wherein the web-server is to receive as input, a plurality of access requests from one or more client devices from among a plurality of customer organizations communicably interfaced with the host organization via a network;

a multi-tenant database system with predictive database functionality to implement the predictive database system; and wherein each customer organization is an entity selected from the group consisting of: a separate and distinct remote organization, an organizational group within the host organization, a business partner of the host organization, or a customer organization that subscribes to cloud computing services provided by the host organization.

* * * * *